US012003266B2

(12) United States Patent
Zhou et al.

(10) Patent No.: US 12,003,266 B2
(45) Date of Patent: Jun. 4, 2024

(54) EXPOSURE REPORTING FOR WIRELESS COMMUNICATIONS

(71) Applicant: Comcast Cable Communications, LLC, Philadelphia, PA (US)

(72) Inventors: Hua Zhou, Vienna, VA (US); Esmael Hejazi Dinan, McLean, VA (US); Yunjung Yi, Vienna, VA (US); Ali Cagatay Cirik, Chantilly, VA (US); Kai Xu, Herndon, VA (US); Hyoungsuk Jeon, Centreville, VA (US); Jonghyun Park, Syosset, NY (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/357,479

(22) Filed: Jul. 24, 2023

(65) Prior Publication Data

US 2024/0056115 A1 Feb. 15, 2024

Related U.S. Application Data

(63) Continuation of application No. 17/205,820, filed on Mar. 18, 2021, now Pat. No. 11,757,483, which is a
(Continued)

(51) Int. Cl.
*H04B 1/3827* (2015.01)
*H04L 5/00* (2006.01)
(Continued)

(52) U.S. Cl.
CPC ......... *H04B 1/3838* (2013.01); *H04L 5/0051* (2013.01); *H04L 25/0226* (2013.01);
(Continued)

(58) Field of Classification Search
CPC . H04B 1/3838; H04L 5/0051; H04L 25/0226; H04W 24/08; H04W 24/10;
(Continued)

(56) References Cited

U.S. PATENT DOCUMENTS 8,755,832 B2 6/2014 Baldemair et al.
9,615,338 B2 4/2017 Kim et al.
(Continued)

FOREIGN PATENT DOCUMENTS

CN 110536397 A 12/2019
WO 2012094573 A2 7/2012

OTHER PUBLICATIONS

Qualcomm, "P-MPR and headroom reporting for MPE", R4-1913230, 3GPP TSG-RAN WG4 Meeting #93, Reno, NV, USA, Nov. 14-18, 2019 (Year: 2019).*
(Continued)

*Primary Examiner* — Brian P Cox
(74) *Attorney, Agent, or Firm* — Banner & Witcoff, Ltd.

(57) ABSTRACT

Wireless communications may use one or more devices for transmission and/or reception that may lead to potentially harmful exposure. One or more safety measures may be used for wireless communication devices, such as maximum power exposure (MPE) reporting and/or related operations. An MPE report may be sent based on MPE detection and one or more messages, such as for cell activation, bandwidth part (BWP) or other wireless resource activation and/or switching, and/or a discontinuous reception (DRX) or other state transition.

45 Claims, 62 Drawing Sheets

Related U.S. Application Data continuation of application No. 17/205,225, filed on Mar. 18, 2021, now Pat. No. 11,689,235.

(60) Provisional application No. 63/012,342, filed on Apr. 20, 2020, provisional application No. 63/004,688, filed on Apr. 3, 2020, provisional application No. 62/991,102, filed on Mar. 18, 2020.

(51) Int. Cl.

| | | |
|---|---|---|
| *H04L 25/02* | (2006.01) | |
| *H04W 24/08* | (2009.01) | |
| *H04W 24/10* | (2009.01) | |
| *H04W 52/34* | (2009.01) | |
| *H04W 52/36* | (2009.01) | |
| *H04W 72/0453* | (2023.01) | |
| *H04W 72/1263* | (2023.01) | |
| *H04W 72/21* | (2023.01) | |
| *H04W 72/23* | (2023.01) | |
| *H04W 72/50* | (2023.01) | |
| *H04W 74/0833* | (2024.01) | |
| *H04W 76/28* | (2018.01) | |

(52) U.S. Cl.
CPC ........... *H04W 24/08* (2013.01); *H04W 24/10* (2013.01); *H04W 52/34* (2013.01); *H04W 52/365* (2013.01); *H04W 72/0453* (2013.01); *H04W 72/1263* (2013.01); *H04W 72/21* (2023.01); *H04W 72/23* (2023.01); *H04W 72/535* (2023.01); *H04W 74/0833* (2013.01); *H04W 76/28* (2018.02)

(58) Field of Classification Search
CPC ............... H04W 52/34; H04W 52/365; H04W 72/0453; H04W 72/1263; H04W 72/21; H04W 72/23; H04W 72/535; H04W 74/0833; H04W 76/28
See application file for complete search history.

(56) References Cited

U.S. PATENT DOCUMENTS

| | | |
|---|---|---|
| 10,812,125 B1 | 10/2020 | Badic et al. |
| 2012/0147801 A1 | 6/2012 | Ho et al. |
| 2012/0270519 A1 | 10/2012 | Ngai et al. |
| 2017/0034788 A1 | 2/2017 | Uchino et al. |
| 2017/0332333 A1 | 11/2017 | Santhanam et al. |
| 2018/0167897 A1 | 6/2018 | Sampath et al. |
| 2018/0310254 A1 | 10/2018 | Jeong et al. |
| 2019/0200365 A1 | 6/2019 | Sampath et al. |
| 2019/0222326 A1 | 7/2019 | Dunworth et al. |
| 2020/0021421 A1 | 1/2020 | Han et al. |
| 2020/0022093 A1 | 1/2020 | Han et al. |
| 2020/0100193 A1 | 3/2020 | Cheng et al. |
| 2020/0213955 A1 | 7/2020 | Hosseini et al. |
| 2020/0229104 A1 | 7/2020 | MolavianJazi et al. |
| 2020/0267662 A1 | 8/2020 | Godala et al. |
| 2020/0267663 A1 | 8/2020 | Xu et al. |
| 2020/0314765 A1 | 10/2020 | Jung et al. |
| 2020/0314934 A1 | 10/2020 | Raghavan et al. |
| 2020/0404598 A1 | 12/2020 | Landis et al. |
| 2021/0037589 A1 | 2/2021 | Yoshioka et al. |
| 2021/0144652 A1 | 5/2021 | Gheorghiu et al. |
| 2021/0227477 A1 | 7/2021 | Lee et al. |
| 2021/0266976 A1 | 8/2021 | Taherzadeh Boroujeni et al. |
| 2021/0297104 A1 | 9/2021 | Zhou et al. |
| 2021/0297959 A1 | 9/2021 | Zhou et al. |
| 2022/0006507 A1 | 1/2022 | Guan et al. |
| 2022/0264481 A1* | 8/2022 | Caporal Del Barrio .................... H04W 52/365 |
| 2022/0377680 A1 | 11/2022 | Yuan et al. |
| 2022/0407551 A1 | 12/2022 | Yu et al. |

OTHER PUBLICATIONS

R4-2001382; 3GPP RAN WG4 Meeting #94-e; Online Feb. 24-Mar. 6, 2020, Nokia et al. "UE FR2 MPE enhancements and solutions".
R1-1911943; 3GPP TSG RAN WG1 Meeting #99; Reno, US, Nov. 18-Nov. 22, 2019; ZTE "Enhancement on FR2 MPE mitigation".
International Search Report and Written Opinion—PCT/US2021/022902—mailing date Sep. 1, 2021.
R4-1814862 3GPP TSG RAN WG4 Meeting #89 Spokane, USA, Nov. 12-16, 2018, Source: Nokia, Nokia Shanghai Bell, Title: FR2 UE RF exposure compliance and its system implications.
R1-1909225 3GPP TSG RAN WG1 Meeting #98, Prague, Czech Republic, Aug. 26-30, 2019, Source: Ericsson, Title: Enhancements to multibeam operation.
R1-1909210 3GPP TSG RAN WG1 Meeting #98, Prague, Czech Republic, Aug. 26-30, 2019, Source: Nokia, Nokia Shanghai Bell, Title: Enhancements on Multi-beam Operation.
R1-1909076 3GPP TSG RAN WG1 Meeting #98, Prague, Czech Republic, Aug. 26-30, 2019, Source: AT&T, Title: Enhancements on Multi Beam Operation.
R1-1909048 3GPP TSG RAN WG1 Meeting #98, Prague, Czech Republic, Aug. 26-30, 2019, Source: Apple Inc., Title: Remaining Issues on Multi-beam operation.
R1-1908959 3GPP TSG RAN WG1 Meeting #98, Prague, Czech Republic, Aug. 26-30, 2019, Source: Spreadtrum Communications, Title: Discussion on multi-beam operation.
R1-1908886 3GPP TSG RAN WG1 Meeting #98, Prague, Czech Republic, Aug. 26-30, 2019, Source: China Telecom, Title: Enhancements on multi-beam operation.
R1-1908784 3GPP TSG RAN WG1 Meeting #98, Prague, Czech Republic, Aug. 26-30, 2019, Source: Sony, Title: Enhancements on multi-beam operation.
R1-1908654 3GPP TSG RAN WG1 Meeting #98, Prague, Czech Republic, Aug. 26-30, 2019, Source: Intel Corporation, Title: Discussion on multi-beam enhancements.
R1-1908603 3GPP TSG RAN WG1 Meeting #98, Prague, Czech Republic, Aug. 26-30, 2019, Source: CATT, Title: Considerations on multi-beam enhancements.
R1-1908502 3GPP TSG RAN WG1 Meeting #98, Prague, Czech Republic, Aug. 26-30, 2019, Source: Samsung, Title: Enhancements on multi-beam operations.
R1-1908380 3GPP TSG RAN WG1 Meeting #98, Prague, Czech Republic, Aug. 26-30, 2019, Source: MediaTek Inc., Title: Enhancements on multi-beam operations.
R1-1908352 3GPP TSG RAN WG1 Meeting #98, Prague, Czech Republic, Aug. 26-30, 2019, Source: OPPO, Title: Discussion on Multi-beam Operation Enhancements.
R1-1908233 3GPP TSG RAN WG1 Meeting #98, Prague, Czech Republic, Aug. 26-30, 2019, Source: InterDigital Inc., Title: Views on Panel Activation and Deactivation.
R1-1908192 3GPP TSG RAN WG1 Meeting #98, Prague, Czech Republic, Aug. 26-30, 2019, Source: ZTE, Title: Enhancements on multi-beam operation.
R1-1908167 3GPP TSG RAN WG1 Meeting #98, Prague, Czech Republic, Aug. 26-30, 2019, Source: vivo, Title: Enhancements on Multi-TRP and Multi-panel Transmission.
R1-1907343 3GPP TSG RAN WG1 Meeting #97, Reno, USA, May 13-17, 2019, Source: Apple, Title: Considerations on multi-panel and MPE in FR2.
R1-1907317 3GPP TSG RAN WG1 Meeting #97, Reno, USA, May 13-17, 2019, Source: Nokia, Nokia Shanghai Bell, Title: Enhancements on Multi-beam Operation.
R1-1907290 3GPP TSG RAN WG1 Meeting #97, Reno, USA, May 13-17, 2019, Source: Qualcomm Incorporated, Title: Enhancements on Multi-beam Operation.
R1-1906251 3GPP TSG RAN WG1 Meeting #97, Reno, USA, May 13-17, 2019, Source: ZTE, Title: Enhancements on UL beam management.
R1-1905065 3GPP TSG RAN WG1 Meeting #96bis, Xi'an, China, Apr. 8-12, 2019, Source: Nokia, Nokia Shanghai Bell, Title: Enhancements on Multi-beam Operation.

(56) References Cited

OTHER PUBLICATIONS

R1-1905027 3GPP TSG RAN WG1 Meeting #96bis, Xi'an, China, Apr. 8-12, 2019, Source: Qualcomm Incorporated, Title: Enhancements on Multi-beam Operation.
R1-1904983 3GPP TSG RAN WG1 Meeting #96bis, Xi'an, China, Apr. 8-12, 2019, Source: Apple, Title: Considerations on multi-panel and MPE in FR2.
R1-1904097 3GPP TSG RAN WG1 Meeting #96bis, Xi'an, China, Apr. 8-12, 2019, Source: vivo, Title: Further discussion on Multi-Beam Operation.
R1-1904038 3GPP TSG RAN WG1 Meeting #96bis, Xi'an, China, Apr. 8-12, 2019, Source: OPPO, Title: Discussion on Multi-beam Operation Enhancements.
R1-1904028 3GPP TSG RAN WG1 Meeting #96bis, Xi'an, China, Apr. 8-12, 2019, Source: ZTE, Title: Enhancements on UL beam management.
R1-1902704 3GPP TSG RAN WG1 Meeting #96, Athens, Greece, Feb. 25-Mar. 1, 2019, Source: OPPO, Title: Discussion on multi-beam operation enhancements.
R1-1901635 3GPP TSG RAN WG1 Meeting #96, Athens, Greece, Feb. 25-Mar. 1, 2019, Source: ZTE, Title: Enhancements on multi-beam operation.
R1-1900340 3GPP TSG RAN WG1 Ad-Hoc Meeting 1901, Taipei, Taiwan, Jan. 21-25, 2019, Source: CATT, Title: Enhancements on multi-beam operation.
R1-1900296 3GPP TSG RAN WG1 Ad-Hoc Meeting 1901, Taipei, Taiwan, Jan. 21-25, 2019, Source: OPPO, Title: Discussion on the MPE (Maximum Permissible Exposure) issue.
R1-1900294 3GPP TSG RAN WG1 Ad-Hoc Meeting 1901, Taipei, Taiwan, Jan. 21-25, 2019, Source: OPPO, Title: Discussion on Multi-beam Operation Enhancements.
R1-1900088 3GPP TSG RAN WG1 Ad-Hoc Meeting 1901, Taipei, Taiwan, Jan. 21-25, 2019, Source: ZTE, Title: Enhancements on multi-beam operation.
3GPP TS 38.331 V16.0.0 (Mar. 2020) 3rd Generation Partnership Project; Technical Specification Group Radio Access Network; NR; Radio Resorce Control (RRC) protocol specification (Release 16).
3GPP TS 38.331 V15.8.0 (Dec. 2019) 3rd Generation Partnership Project; Technical Specification Group Radio Access Network; NR; Radio Resorce Control (RRC) protocol specification (Release 15).
3GPP TS 38.321 V16.0.0 (Mar. 2020) 3rd Generation Partnership Project; Technical Specification Group Radio Access Network; NR; Medium Access Control (MAC) protocol specification (Release 16).
3GPP TS 38.321 V15.8.0 (Dec. 2019) 3rd Generation Partnership Project; Technical Specification Group Radio Access Network; NR; Medium Access Control (MAC) protocol specification (Release 15).
3GPP TS 38.214 V16.0.0 (Dec. 2019) 3rd Generation Partnership Project; Technical Specification Group Radio Access Network; NR; Physical layer procedures for data (Release 16).
3GPP TS 38.213 V16.0.0 (Dec. 2019) 3rd Generation Partnership Project; Technical Specification Group Radio Access Network; NR; Physical layer procedures for data (Release 16).
3GPP TS 38.212 V16.0.0 (Dec. 2019), 3rd Generation Partnership Project; Technical Specification Group Radio Access Network; NR; Multiplexing and channel coding (Release 16).
3GPP TS 38.101-4 V15.4.0 (Dec. 2019) 3rd Generation Partnership Project; Technical Specification Group Radio Access Network; NR; User Equipment (UE) radio transmission and reception; Part 4: Performance requirements (Release 15).
3GPP TS 38.101-3 V16.2.1 (Dec. 2019) 3rd Generation Partnership Project; Technical Specification Group Radio Access Network; NR; User Equipment (UE) radio transmission and reception; Part 3: Range 1 and Range 2 Interworking operation with other radios (Release 16).
3GPP TS 38.101-2 V16.2.0 (Dec. 2019) 3rd Generation Partnership Project; Technical Specification Group Radio Access Network; NR; User Equipment (UE) radio transmission and reception;Part 2: Range 2 Standalone (Release 16).
3GPP TS 38.101-1 V16.2.0 (Dec. 2019) 3rd Generation Partnership Project; Technical Specification Group Radio Access Network; NR; User Equipment (UE) radio transmission and reception; Part 1: Range 1 Standalone (Release 16).
"On the metrics for enhanced MPE indication"; Ericsson et al.; TSG-RAN Working Group 4 (Radio) meeting #93 R4-1914141 Reno, NV, USA, Nov. 18-22, 2019 (Year: 2019).
"Further considerations on the uplink duty cycle enhancements for the MPE scenario"; Apple; 3GPP RAN WG4 Meeting #93 R4-1913530 Reno, USA, Nov. 18-22, 2019 (Year: 2019).

* cited by examiner

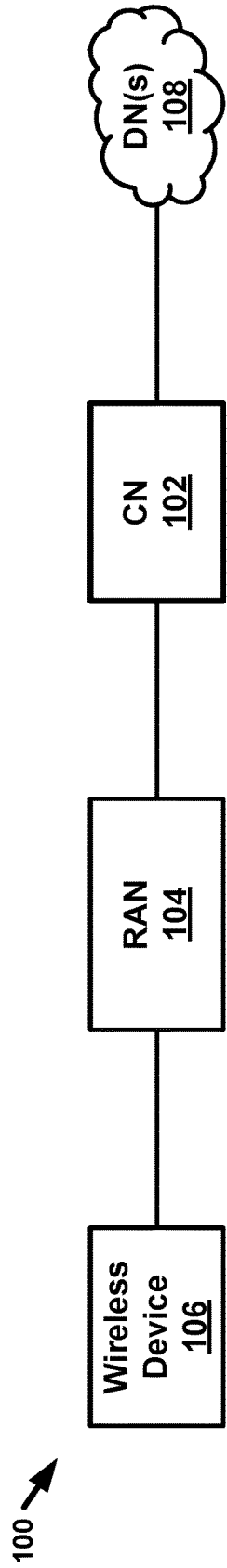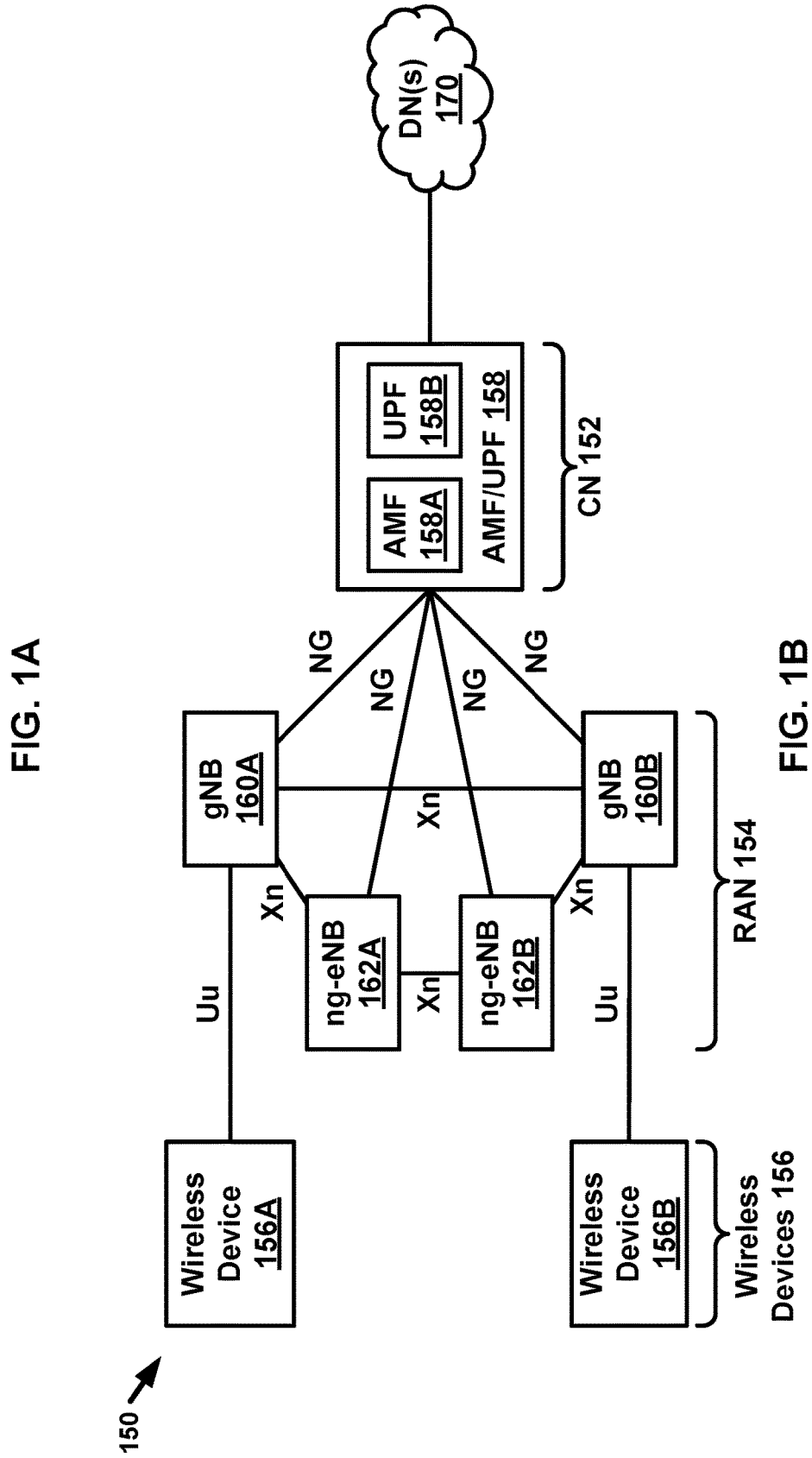

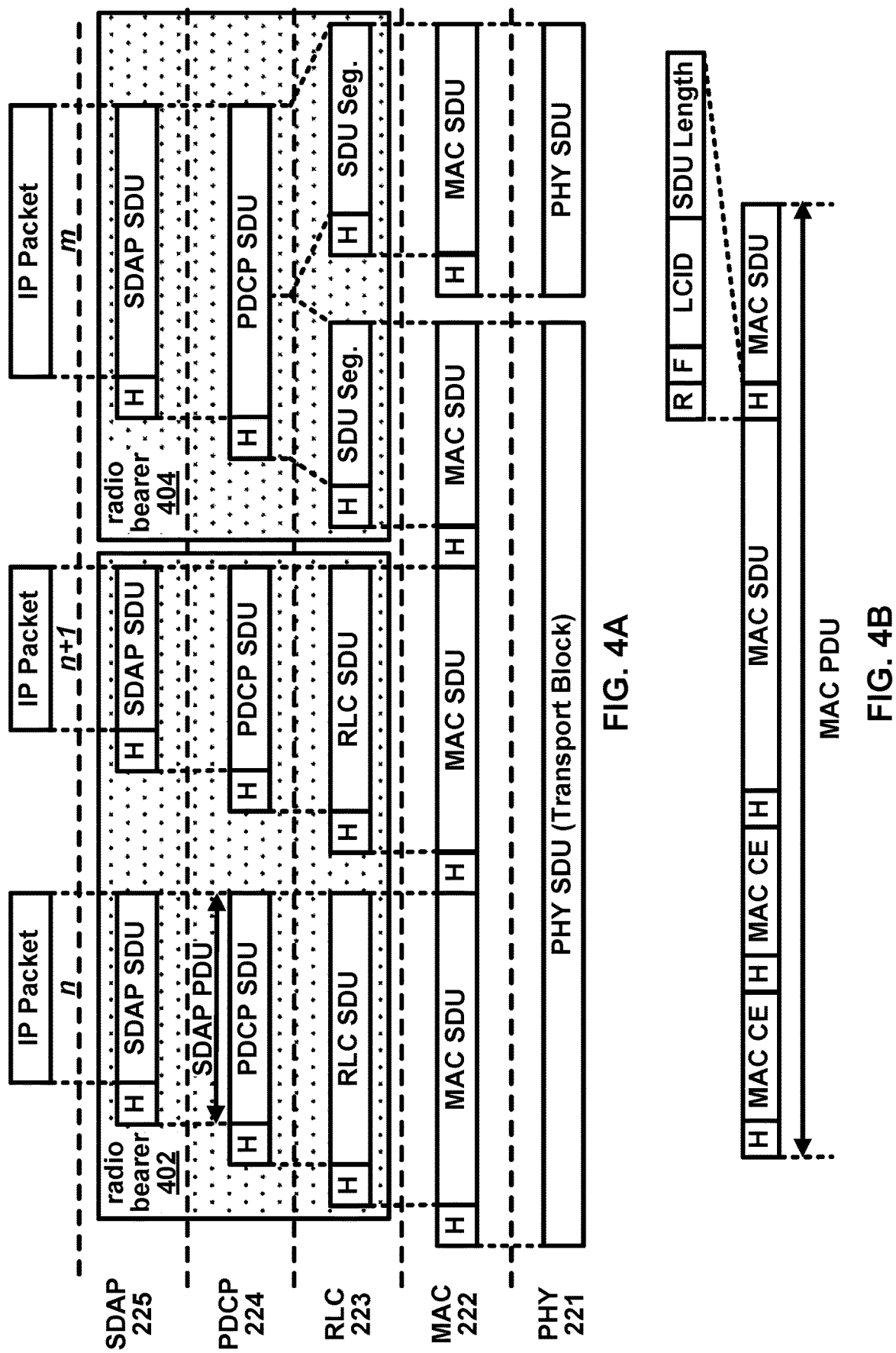

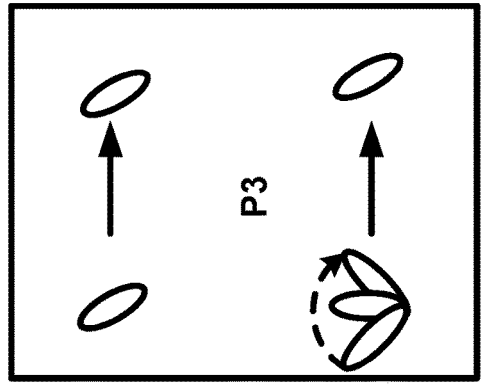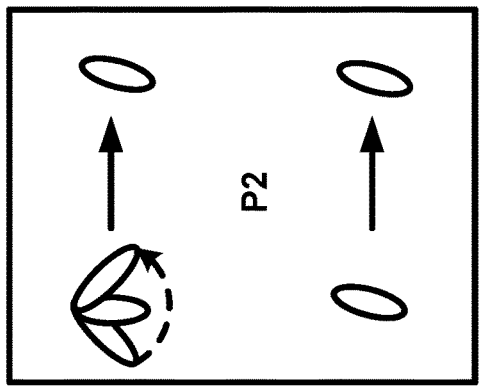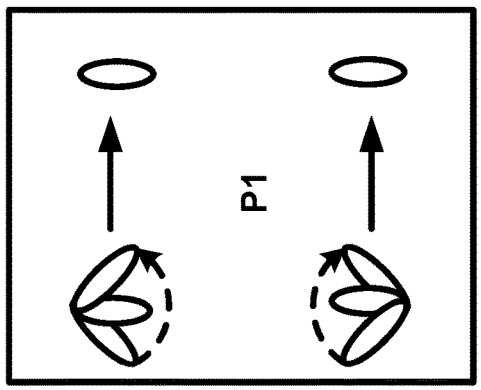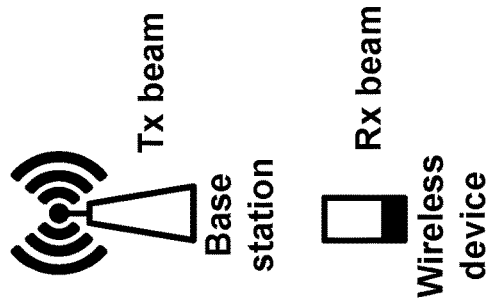
FIG. 12A
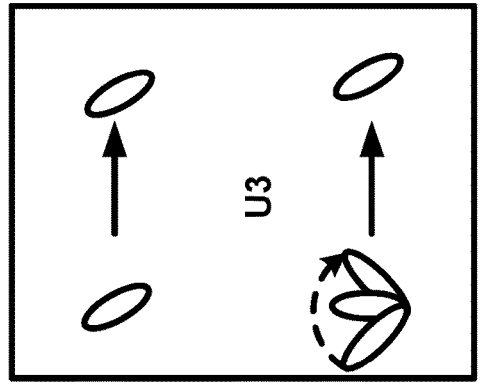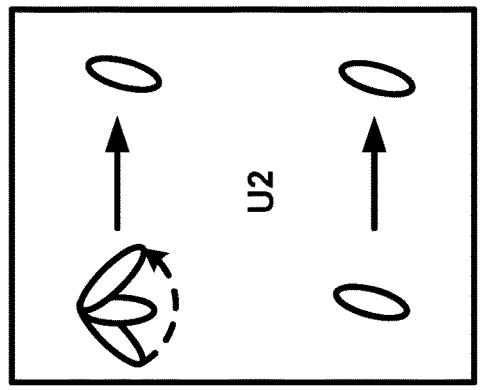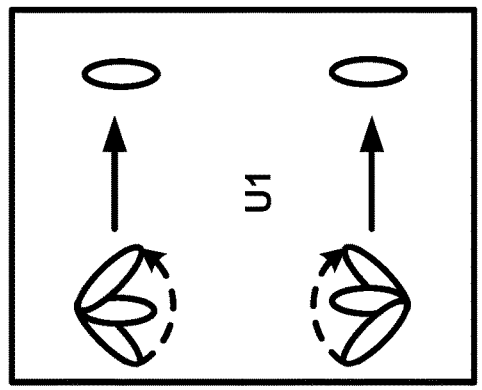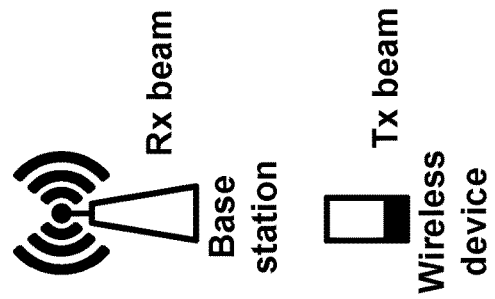
FIG. 12B

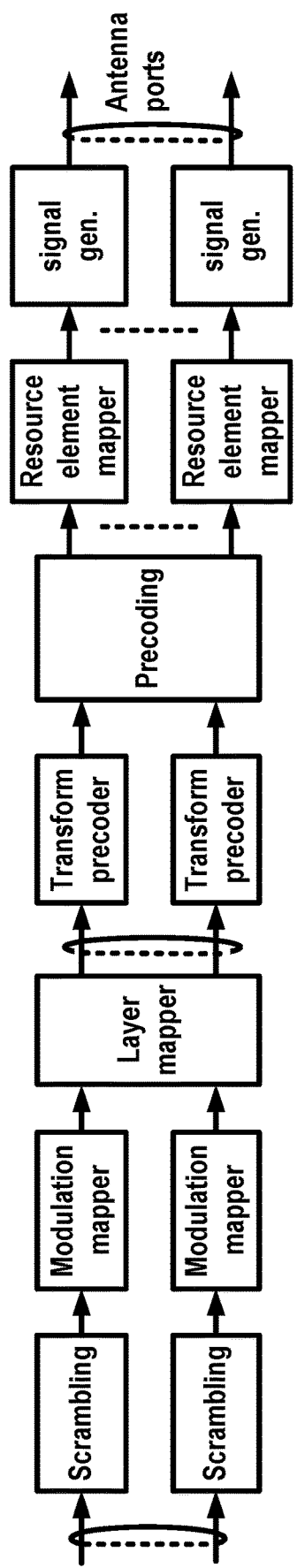
FIG. 16A
FIG. 16B
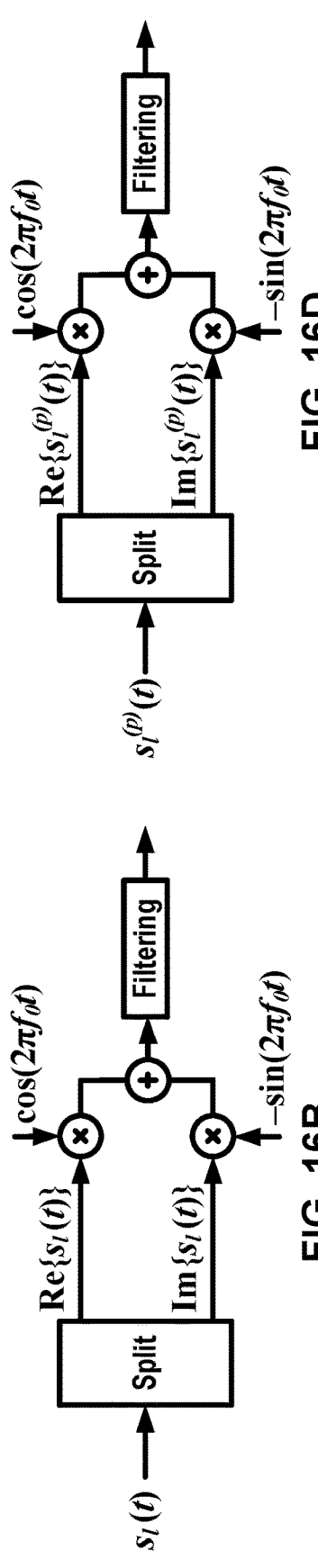
FIG. 16D
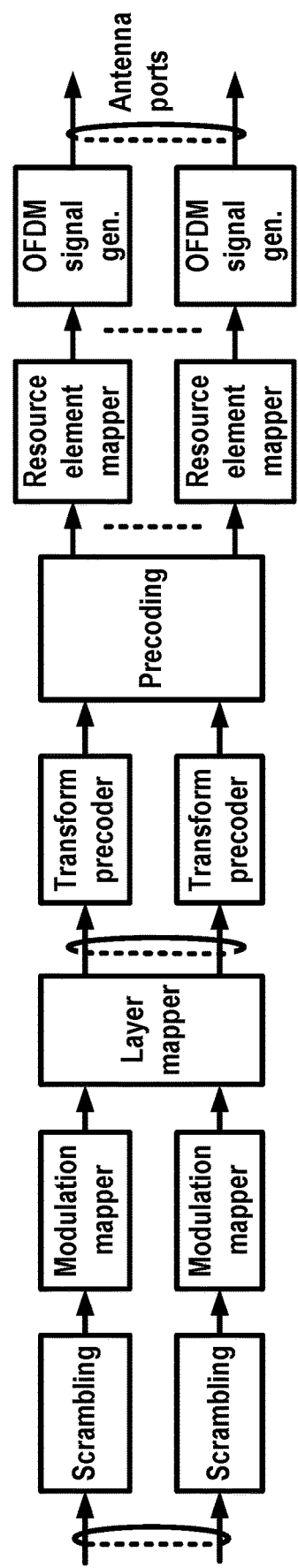
FIG. 16C

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

– *ServingCellConfig*
The IE *ServingCellConfig* is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.
*ServingCellConfig* information element

```
ServingCellConfig ::=           SEQUENCE {
 tdd-UL-DL-ConfigurationDedicated  TDD-UL-DL-ConfigDedicated  OPTIONAL,-- Cond TDD
 initialDownlinkBWP        BWP-DownlinkDedicated         OPTIONAL,   -- Need M
 downlinkBWP-ToReleaseList   SEQUENCE (SIZE (1..maxNrofBWPs)) OF BWP-Id OPTIONAL,-- Need N
 downlinkBWP-ToAddModList    SEQUENCE (SIZE (1..maxNrofBWPs)) OF BWP-Downlink       OPTIONAL,   -- Need N
 firstActiveDownlinkBWP-Id   BWP-Id  OPTIONAL,   -- Cond SyncAndCellAdd
 bwp-InactivityTimer        ENUMERATED {ms2, ...} OPTIONAL,  --Need R
 defaultDownlinkBWP-Id       BWP-Id   OPTIONAL,  -- Need S
 ...
 sCellDeactivationTimer  ENUMERATED {ms20, ms40, ...}  OPTIONAL,  -- Cond ServingCellWithoutPUCCH
 crossCarrierSchedulingConfig   CrossCarrierSchedulingConfig  OPTIONAL,-- Need M
 tag-Id
 pathlossReferenceLinking  ENUMERATED {spCell, sCell} OPTIONAL,-- Cond CellOnly   ...,}
```

– *CrossCarrierSchedulingConfig*
The IE *CrossCarrierSchedulingConfig* is used to specify the configuration when the cross-carrier scheduling is used in a cell.
CrossCarrierSchedulingConfig information element

```
CrossCarrierSchedulingConfig ::=  SEQUENCE {
 schedulingCellInfo     CHOICE {
   own              SEQUENCE {              -- Cross carrier scheduling: scheduling cell
     cif-Presence          BOOLEAN
   },
   other            SEQUENCE {              -- Cross carrier scheduling: scheduled cell
     schedulingCellId        ServCellIndex,
     cif-InSchedulingCell     INTEGER (1..7)   } }, ...}
```

FIG. 23

— SearchSpace
The IE *SearchSpace* defines how/where to search for PDCCH candidates. Each search space is associated with one *ControlResourceSet*. For a scheduled cell in the case of cross carrier scheduling, except for *nrofCandidates*, all the optional fields are absent.

SearchSpace information element

```
SearchSpace ::=           SEQUENCE {
    searchSpaceId         SearchSpaceId,
    controlResourceSetId  ControlResourceSetId   OPTIONAL,  -- Cond SetupOnly
    monitoringSlotPeriodicityAndOffset   CHOICE {
        sl1                   NULL,
        sl2                   INTEGER (0..1),
        ...
    }                                            OPTIONAL,           -- Cond Setup
    duration              INTEGER (2..2559)      OPTIONAL,  -- Need R
    monitoringSymbolsWithinSlot  BIT STRING (SIZE (14)) OPTIONAL,  -- Cond Setup
    nrofCandidates        SEQUENCE {
        aggregationLevel1     ENUMERATED {n0, n1, n2, n3, n4, n5, n6, n8},
        ...
    }                                            OPTIONAL,  -- Cond Setup
    searchSpaceType       CHOICE {
        common                SEQUENCE {
            ...
            dci-Format0-0-AndFormat1-0    SEQUENCE {
                dci-Formats   ENUMERATED {formats0-0-And-1-0, formats0-1-And-1-1},
            }                                    OPTIONAL,  -- Cond Setup
        }                                        OPTIONAL,  -- Need R
        ue-Specific           SEQUENCE {
            ...
        }
    }                                            OPTIONAL   -- Cond Setup
}
```

*searchSpaceId*
Identity of the search space. SearchSpaceId = 0 identifies the *searchSpaceZero* configured via PBCH (MIB) or *ServingCellConfigCommon* and may hence not be used in the *SearchSpace* IE. The searchSpaceId is unique among the BWPs of a Serving Cell. In case of cross carrier scheduling, search spaces with the same *searchSpaceId* in scheduled cell and scheduling cell are linked to each other. The UE applies the search space for the scheduled cell only if the DL BWPs in which the linked search spaces are configured in scheduling cell and scheduled cell are both active.

FIG. 24

— *ControlResourceSet*

The IE *ControlResourceSet* is used to configure a time/frequency control resource set (CORESET) in which to search for downlink control information.

```
ControlResourceSet ::=        SEQUENCE {
    controlResourceSetId          ControlResourceSetId,
    frequencyDomainResources      BIT STRING (SIZE (45)),
    duration                      INTEGER (1..maxCoReSetDuration),
    tci-StatesPDCCH-ToAddList     SEQUENCE(SIZE (1..maxNrofTCI-StatesPDCCH)) OF TCI-StateId OPTIONAL, -- Cond NotSIB1-initialBWP
    tci-PresentInDCI              ENUMERATED {enabled}                                                OPTIONAL, -- Need S
    ...}
``` controlResourceSetId

Value 0 identifies the common CORESET configured in *MIB* and in *ServingCellConfigCommon* (*controlResourceSetZero*) and is hence not used here in the *ControlResourceSet* IE. Values 1..*maxNrofControlResourceSets-1* identify CORESETs configured by dedicated signalling or in *SIB1*. The *controlResourceSetId* is unique among the BWPs of a serving cell.

duration

Contiguous time duration of the CORESET in number of symbols.

frequencyDomainResources

Frequency domain resources for the CORESET. Each bit corresponds a group of 6 RBs, with grouping starting from the first RB group in the BWP. The first (left-most / most significant) bit corresponds to the first RB group in the BWP, and so on....

tci-PresentInDCI

This field indicates if TCI field is present or absent in DL-related DCI. When the field is absent the UE considers the TCI to be absent/disabled. In case of cross carrier scheduling, the network sets this field to enabled for the *ControlResourceSet* used for cross carrier scheduling in the scheduling cell.

tci-StatesPDCCH-ToAddList

A subset of the TCI states defined in pdsch-Config included in the *BWP-DownlinkDedicated* corresponding to the serving cell and to the DL BWP to which the *ControlResourceSet* belong to. They are used for providing QCL relationships between the DL RS(s) in one RS Set (TCI-State) and the PDCCH DMRS ports. The network configures at most *maxNrofTCI-StatesPDCCH* entries.

FIG. 25

| MPE Instances: | Threshold Conditions: |
|---|---|
| Detect MPE instance based on 1st UL duty cycle of 1st panel and 2nd UL duty cycle of 2nd panel, comprising: 2901A | • 1st UL duty cycle evaluated on 1st panel being greater than threshold; and/or<br>• 2nd UL duty cycle evaluated on 2nd panel being less than threshold. 2901B |
| Detect MPE instance based on 1st P-MPR of 1st panel and 2nd P-MPR of 2nd panel, comprising: 2902A | • P-MPR via 1st panel being greater than threshold; or<br>• P-MPR via 2nd panel being less than threshold. 2902B |
| Detect MPE instance based on change of 1st P-MPR of 1st panel and change of 2nd P-MPR of 2nd panel, comprising: 2903A | • Change of P-MPR via 1st panel from previous P-MPR value being higher than threshold; and/or<br>• Change of P-MPR via 2nd panel from previous P-MPR value being less than threshold. 2903B |
| Detect MPE instance based on 1st RSRP and 1st P-MPR of 1st panel and 2nd RSRP and 2nd P-MPR of 2nd panel, comprising: 2904A | • A value determined based on 1st RSRP and 1st P-MPR associated with 1st panel is less than threshold; and/or<br>• A value determined based on 2nd RSRP and 2nd P-MPR associated with 2nd panel is greater than threshold. 2904B |

2900

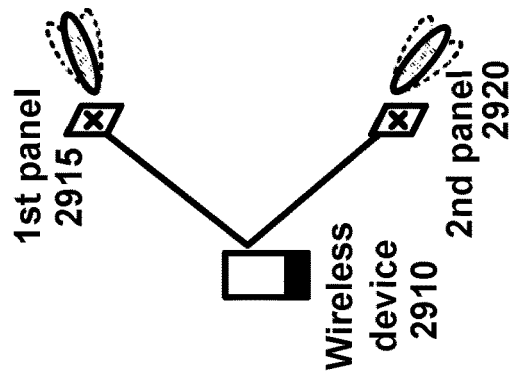

FIG. 29

| UL Beam Reporting: | Threshold Conditions: |
|---|---|
| Wireless device triggers UL beam report based on UL duty cycles of 1st panel and 2nd panel, comprising: 3501A | • 1st UL duty cycle evaluated on 1st panel being greater than a threshold; and/or<br>• 2nd UL duty cycle evaluated on 2nd panel being less than the threshold. 3501B |
| Wireless device triggers UL beam report based on P-MPRs of 1st panel and 2nd panel, comprising: 3502A | • 1st P-MPR via 1st panel being greater than a threshold; and/or<br>• 2nd P-MPR via 2nd panel being less than the threshold. 3502B |
| Wireless device triggers UL beam report based on P-MPR changes of 1st panel and 2nd panel, comprising: 3503A | • Change of P-MPR via 1st panel from a previous P-MPR being greater than a threshold; and/or<br>• Change of P-MPR via 2nd panel from a previous P-MPR being less than the threshold. 3503B |
| Wireless device triggers UL beam report based on combined values of RSRP and P-MPR of 1st panel and 2nd panel, comprising: 3504A | • A value determined based on 1st RSRP and 1st P-MPR for 1st panel is less than a threshold; and/or<br>• A value determined based on 2nd RSRP and 2nd P-MPR for 2nd panel is greater than the threshold. 3504B |
| Wireless device triggers UL beam report based on PHRs of 1st panel and 2nd panel, comprising: 3505A | • A value indicating a PHR for 1st panel is less than a threshold; and/or<br>• A value indicating a PHR for 2nd panel is greater than the threshold. 3505B |

Wireless Device 3515
1st Panel / 2nd Panel / Human body

FIG. 35

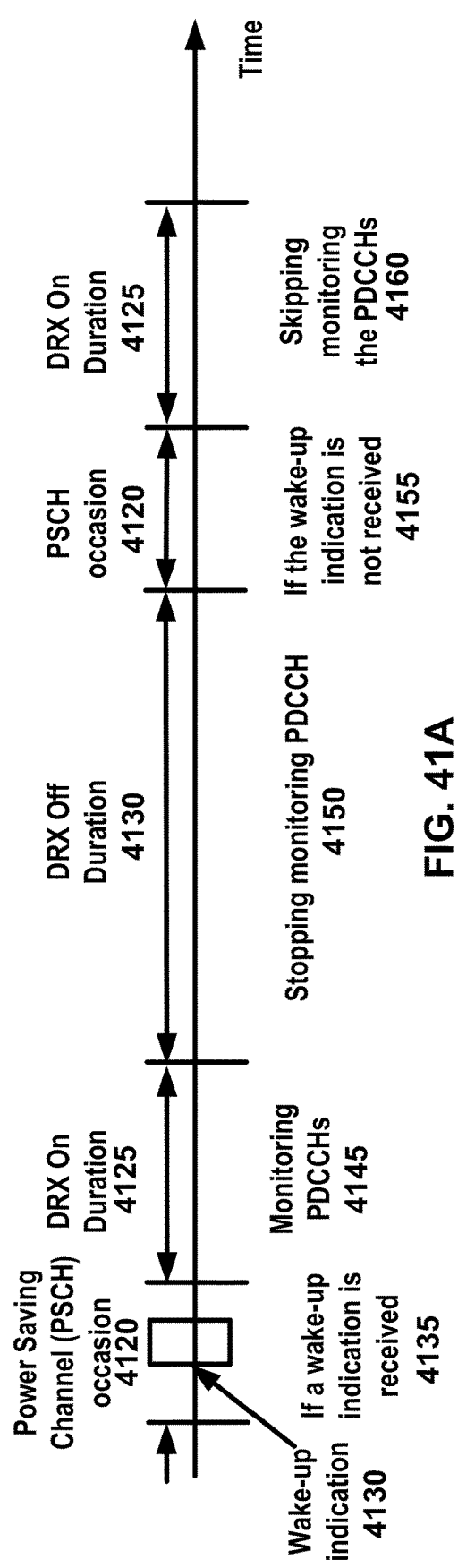
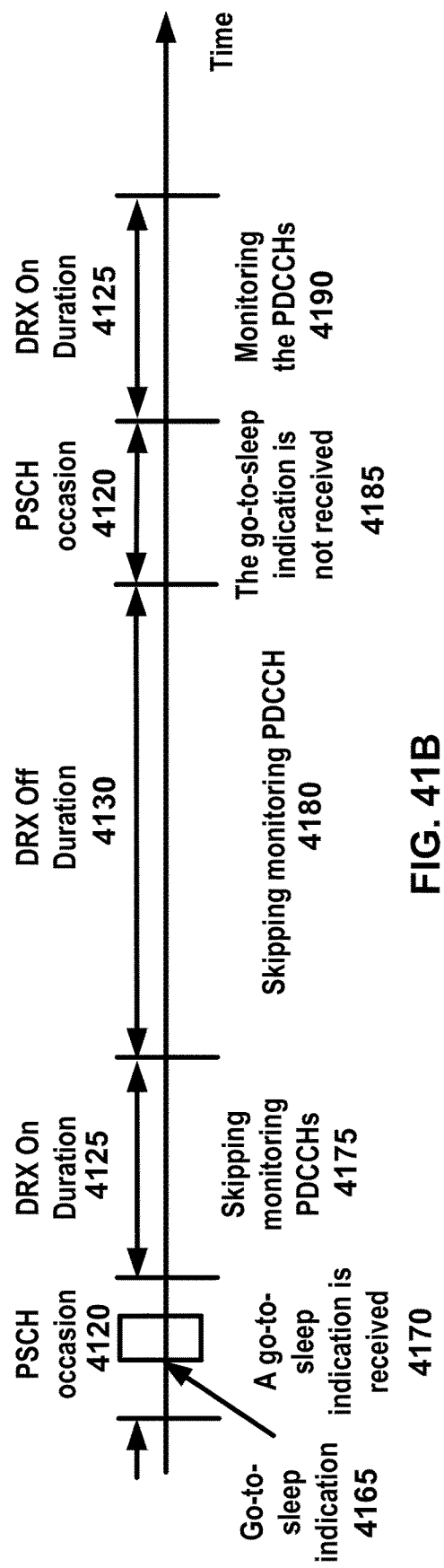
FIG. 41A
FIG. 41B

| PH | Power Headroom Level |
|---|---|
| 0 | POWER_HEADROOM_0 |
| 1 | POWER_HEADROOM_1 |
| 2 | POWER_HEADROOM_2 |
| ... | ... |
| 62 | POWER_HEADROOM_62 |
| 63 | POWER_HEADROOM_63 |

| $P_{CMAX}$ | Nominal Transmission power level |
|---|---|
| 0 | PCMAX_C_00 |
| 1 | PCMAX_C_01 |
| 2 | PCMAX_C_02 |
| ... | ... |
| 62 | PCMAX_C_62 |
| 63 | PCMAX_C_63 |

| Priority order | Logical channels |
|---|---|
| Highest(0) | C-RNTI MAC CE or data from UL-CCCH |
| 1 | CG Confirmation MAC CE or BFR MAC CE or Multiple Entry CG Confirmation MAC CE |
| 2 | Sidelink CG Confirmation MAC CE |
| 3 | LBT failure MAC CE |
| 4 | MAC CE for prioritized SL-BSR |
| 5 | MAC CE for BSR, with exception of BSR included for padding |
| 6 | Single Entry PHR MAC CE or Multiple Entry PHR MAC CE |
| 7 | MAC CE for the number of Desired Guard Symbols |
| 8 | MAC CE for Pre-emptive BSR |
| 9 | MAC CE for SL-BSR, with exception of prioritized SL-BSR and SL-BSR included for padding |
| 10 | data from any Logical Channel, except data from UL-CCCH |
| 11 | MAC CE for Recommended bit rate query |
| 12 | MAC CE for BSR included for padding |
| Lowest (13) | MAC CE for SL-BSR included for padding |

FIG. 52

| Panel Power State Reporting: | Threshold Conditions: |
|---|---|
| Wireless device triggers panel power state reporting based on UL duty cycle of 1st panel and 2nd panel, comprising: 5401A | • 1st UL duty cycle evaluated on 1st panel being greater than a threshold; and/or<br>• 2nd UL duty cycle evaluated on 2nd panel being less than the threshold. 5401B |
| Wireless device triggers panel power state reporting based on P-MPR of 1st panel and 2nd panel, comprising: 5402A | • 1st P-MPR via 1st panel being greater than a threshold; and/or<br>• 2nd P-MPR via 2nd panel being less than the threshold. 5402B |
| Wireless device triggers panel power state reporting based on P-MPR change of 1st panel and 2nd panel, comprising: 5403A | • Change of P-MPR via 1st panel from a previous P-MPR being greater than a threshold; and/or<br>• Change of P-MPR via 2nd panel from a previous P-MPR being less than the threshold. 5403B |
| Wireless device triggers panel power state reporting based on combined value of RSRP and P-MPR of 1st panel and 2nd panel, comprising: 5404A | • A value determined based on 1st RSRP and 1st P-MPR for 1st panel is less than a threshold; and/or<br>• A value determined based on 2nd RSRP and 2nd P-MPR for 2nd panel is greater than the threshold. 5404B |
| Wireless device triggers panel power state reporting based on PHR of 1st panel and 2nd panel, comprising: 5405A | • A value indicating a PHR for 1st panel is less than a threshold; and/or<br>• A value indicating a PHR for 2nd panel is greater than the threshold. 5405B |

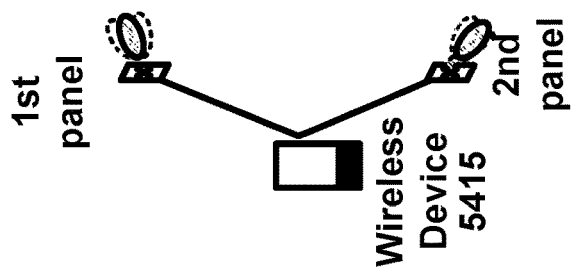

FIG. 54

R0: Panel indication of a panel
R1~3: P-MPR indication for the panel

P0~P1: Panel indication of a 1st panel
P2~P3: Panel indication of a 2nd panel

EXPOSURE REPORTING FOR WIRELESS COMMUNICATIONS

CROSS-REFERENCE TO RELATED APPLICATIONS

This application is a continuation of U.S. application Ser. No. 17/205,820, filed Mar. 18, 2021, which is a continuation of U.S. application Ser. No. 17/205,225, filed Mar. 18, 2021 (now U.S. Pat. No. 11,689,235), which claims the benefit of: U.S. Provisional Application No. 62/991,102, filed on Mar. 18, 2020, U.S. Provisional Application No. 63/004,688, filed on Apr. 3, 2020, and U.S. Provisional Application No. 63/012,342, filed on Apr. 20, 2020. Each of the above-referenced applications is hereby incorporated by reference in its entirety.

BACKGROUND

Wireless communications may cause exposure to radio frequency electromagnetic fields. Limitations on exposure, such as power restrictions, may be imposed on wireless devices.

SUMMARY

The following summary presents a simplified summary of certain features. The summary is not an extensive overview and is not intended to identify key or critical elements.

Wireless communications may use one or more devices for transmission and/or reception. Increasing a quantity of devices for transmission and/or reception, increasing a quantity of wireless communications transmitted/received, and/or increasing a quantity of power (and/or a quantity of beams used) for transmission/reception may increase a risk of potentially harmful and/or undesirable exposure to radio frequency electromagnetic fields. One or more safety measures may be implemented and/or required for wireless communication devices, such as reporting (e.g., maximum power exposure (MPE) reporting) and/or related operations that may reduce such exposure. Safety measures may be difficult to accurately implement and/or may require balancing exposure limits with potentially decreased device performance. For example, power reductions may result in failed transmissions and/or increased reporting requirements may result in increased power usage. Improvements for wireless communications may be achieved, for example, by implementing one or more safety measures while minimizing unnecessary reporting and/or other operations associated with the safety measure(s). A time window may be used to detect a quantity of exposure instances. A message may be sent indicating exposure, for example, based on a quantity of exposure events during the time window satisfying a threshold, such that unnecessary reporting and/or other operations may be reduced and safety measure(s) may be satisfied. A report may be sent based on exposure detection and one or more messages, such as for cell activation, bandwidth part (BWP) or other wireless resource activation and/or switching, and/or a discontinuous reception (DRX) or other state transition, for improved wireless device and base station synchronization in reporting. An exposure report may be on a per-panel basis using a power headroom report (PHR) such that a panel-specific report may be kept pending until sent in a PHR report, for reduced signaling overhead in reporting.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 4A shows an example downlink data flow for a user plane configuration.

FIG. 4B shows an example format of a Medium Access Control (MAC) subheader in a MAC Protocol Data Unit (PDU).

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

FIG. 19 shows example LCID values.

FIG. 20 shows example LCID values.

FIG. 23 shows an example message comprising configuration parameters for a cell.

FIG. 24 shows an example message comprising configuration parameters for a search space.

FIG. 25 shows an example message comprising configuration parameters for a control resource set (CORESET).

FIG. 29 shows examples of exposure instance detection for wireless communications.

FIG. 35 shows examples for uplink beam reporting.

FIG. 41A and FIG. 41B show examples of power saving associated with a DRX configuration.

FIG. 52 shows an example of prioritization of logical channels.

FIG. 54 shows an example of conditions for triggering power state reporting.

DETAILED DESCRIPTION

Figure 2A:
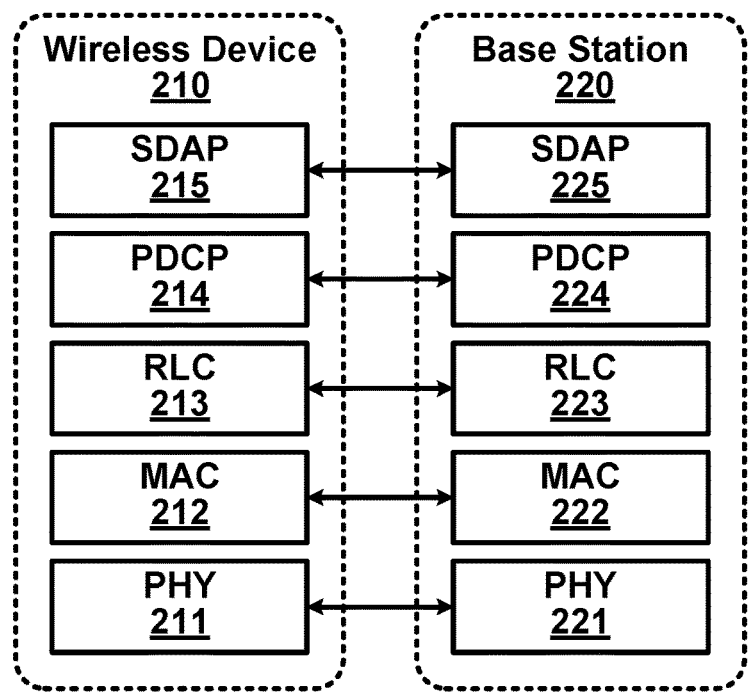
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless communication exposure detection and/or reporting.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/ unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/ configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a nextgeneration RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/ or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
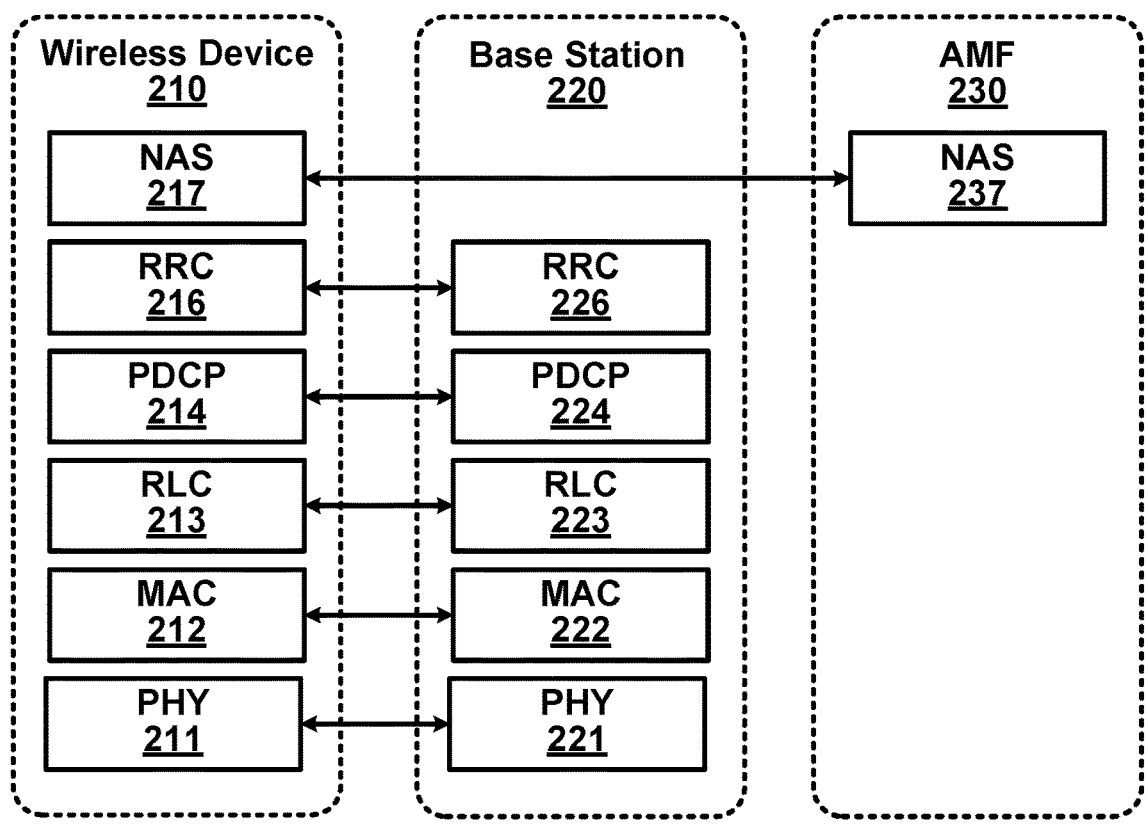
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
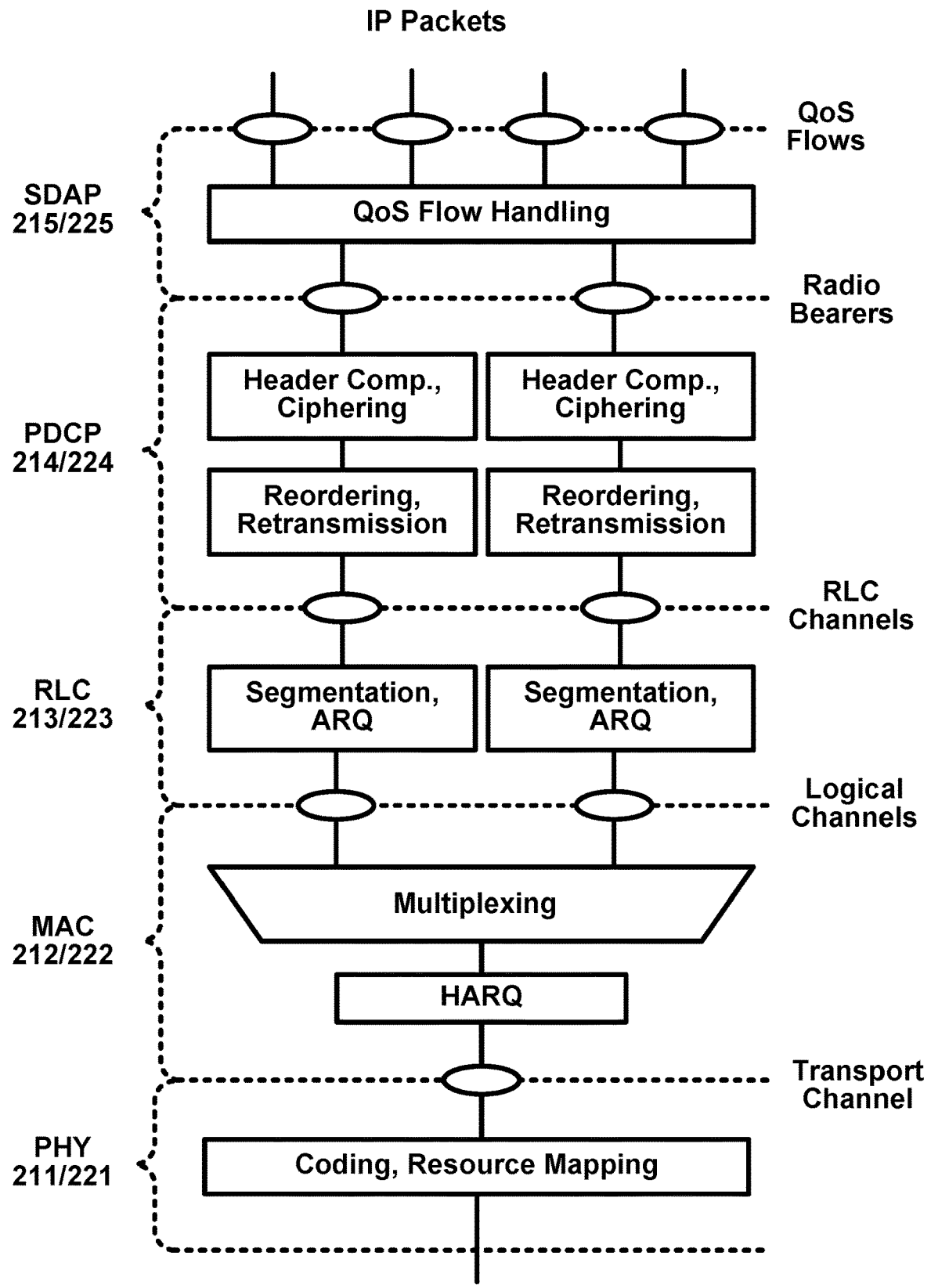
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figure 5B:
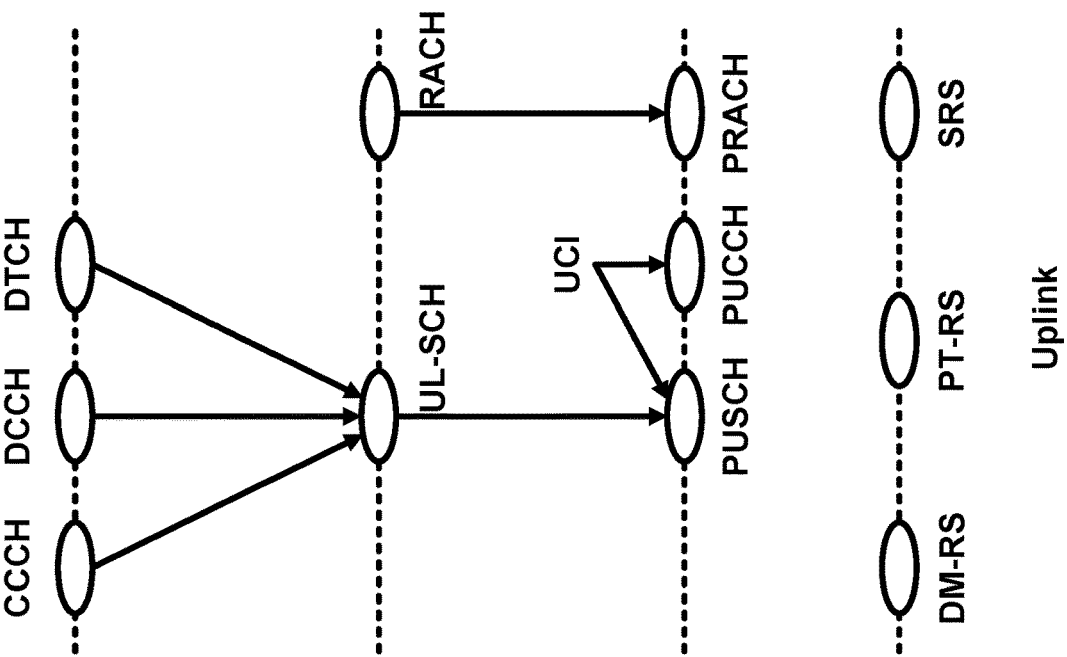
FIG. 5B shows an example mapping for uplink channels.
Figure 5A:
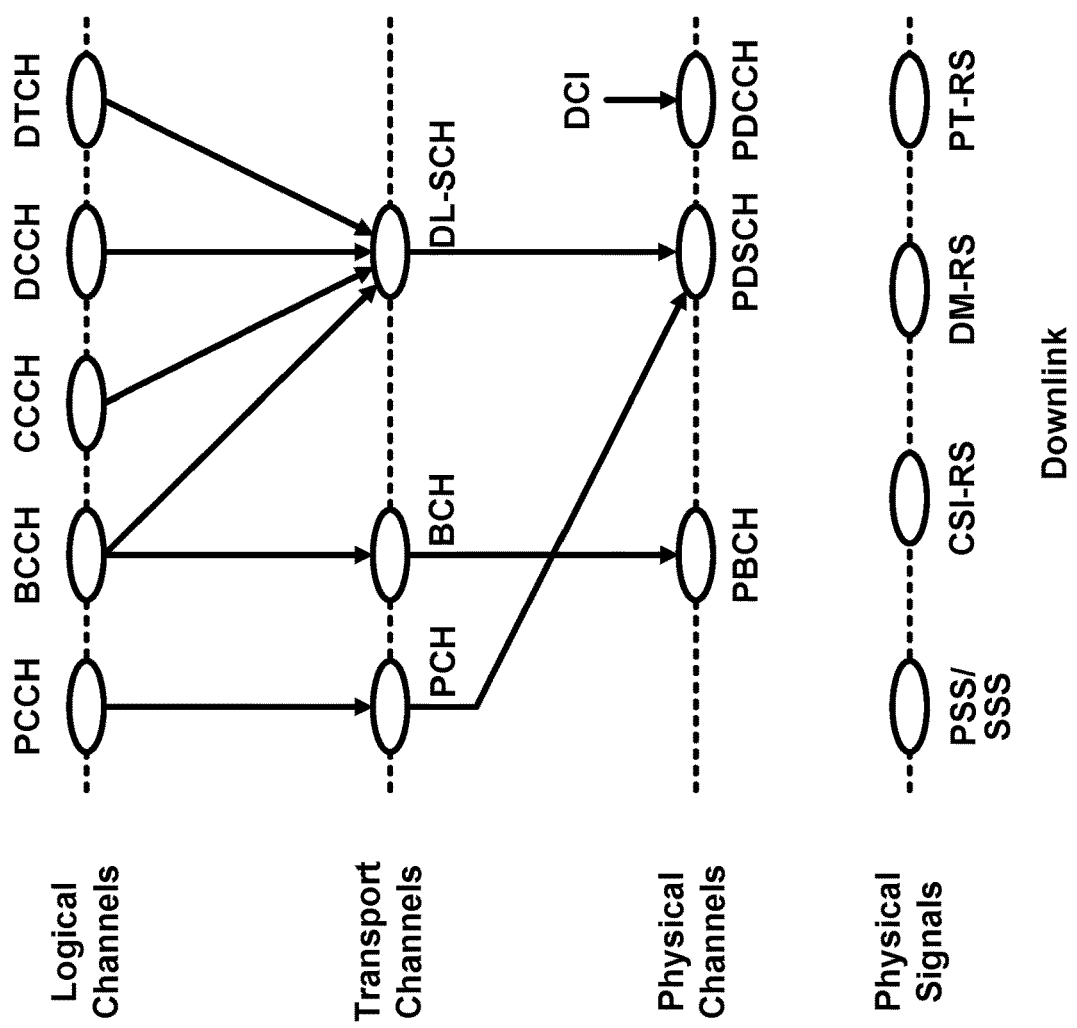
FIG. 5A shows an example mapping for downlink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
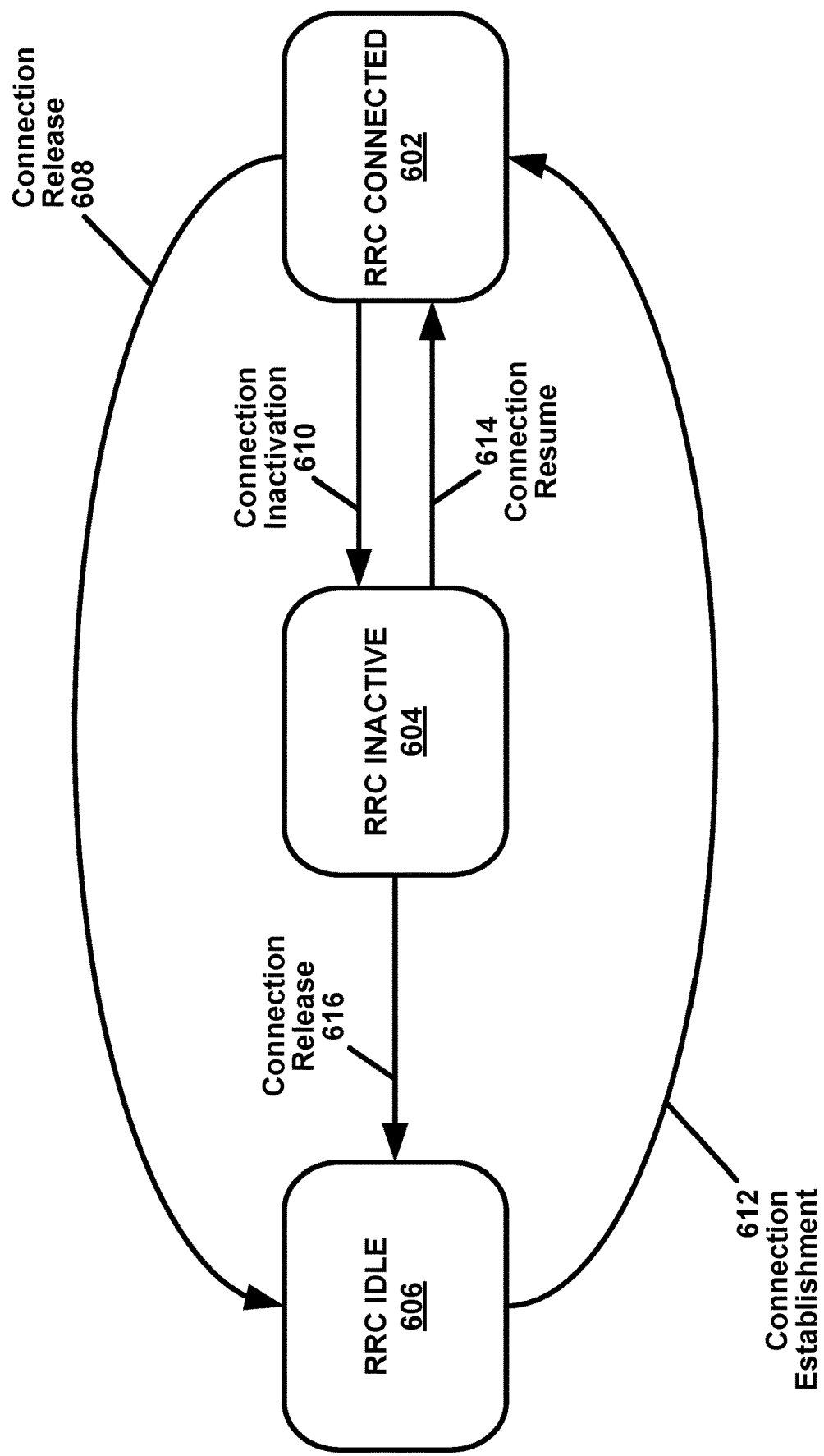
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
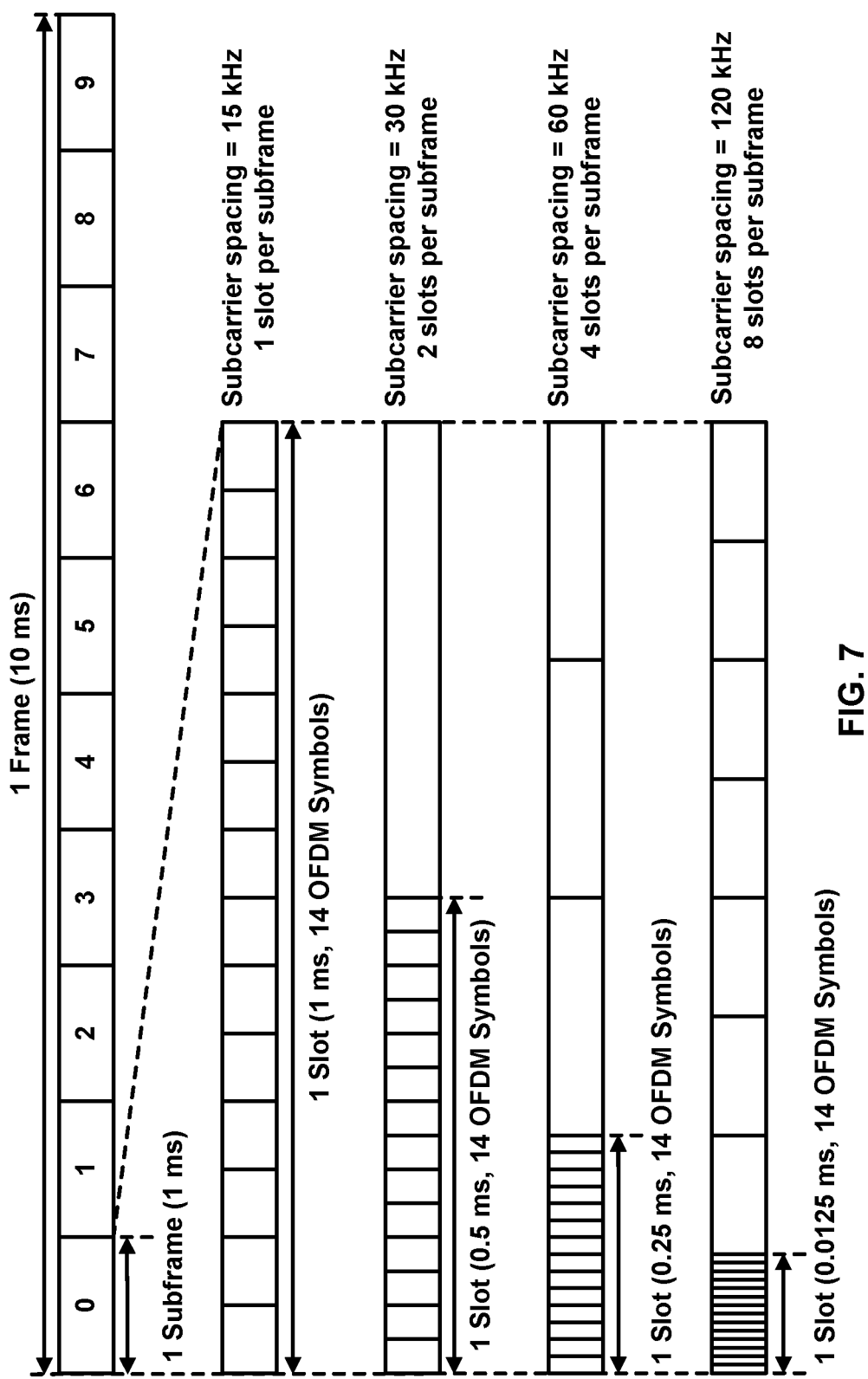
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
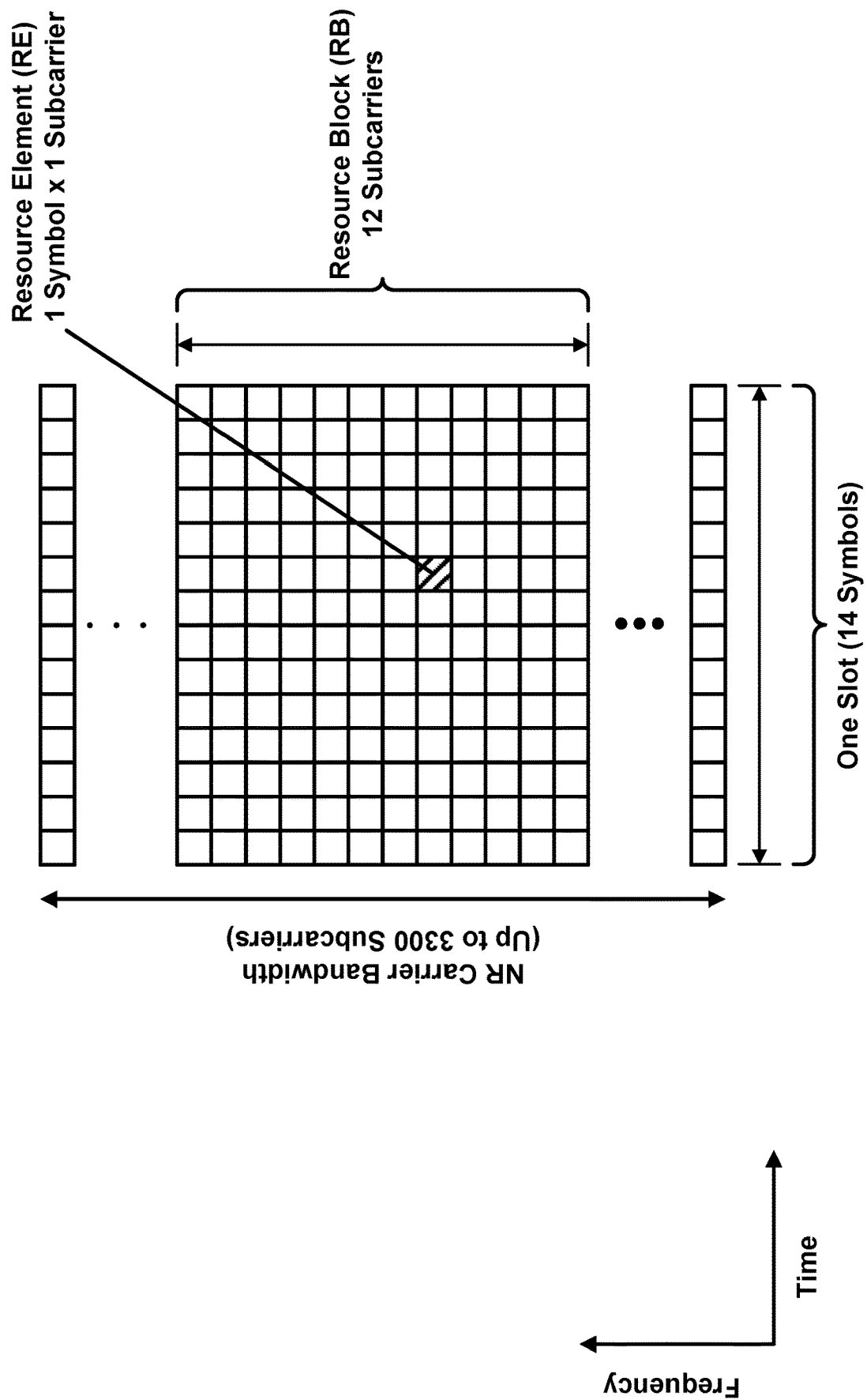
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
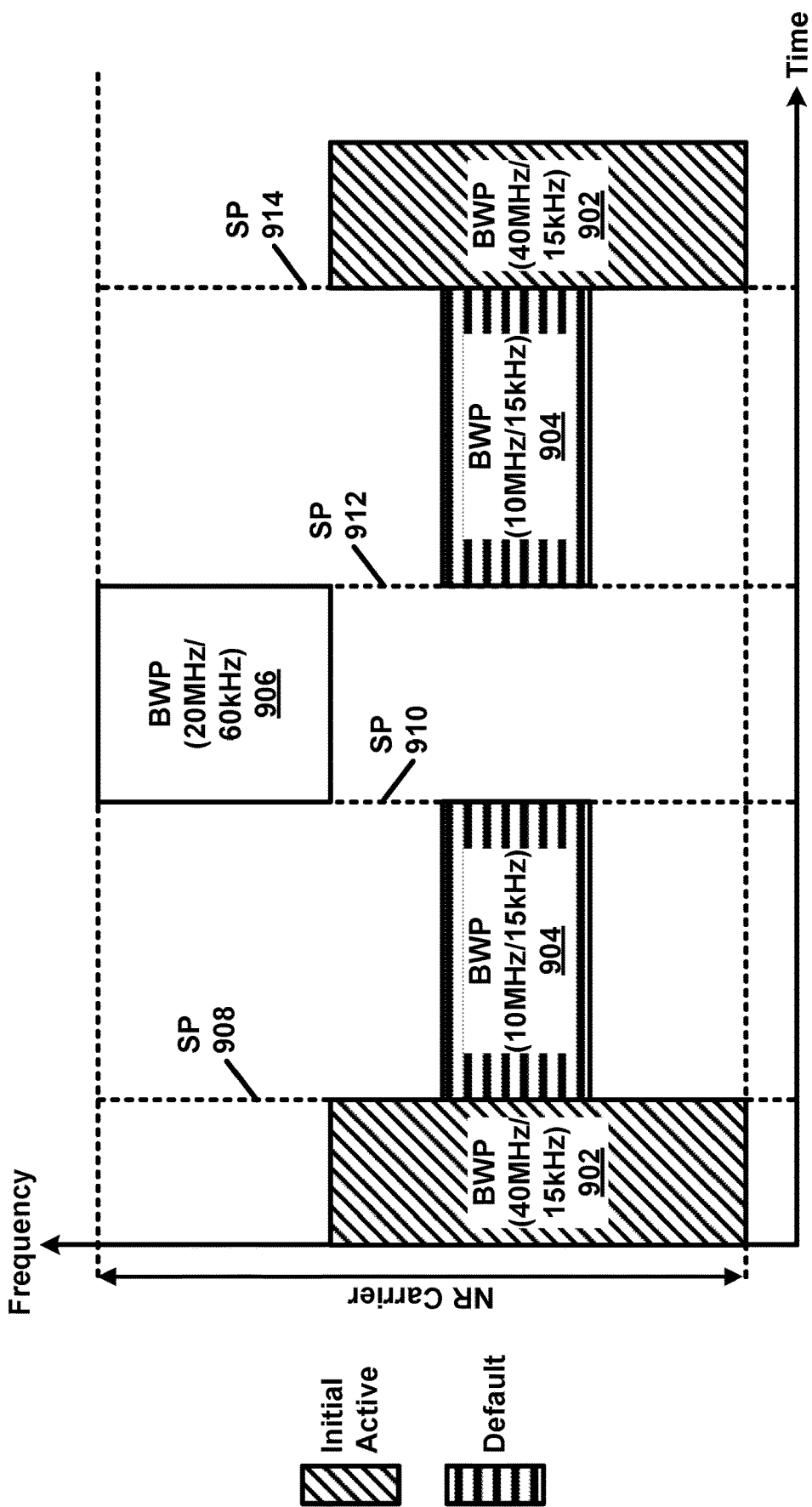
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
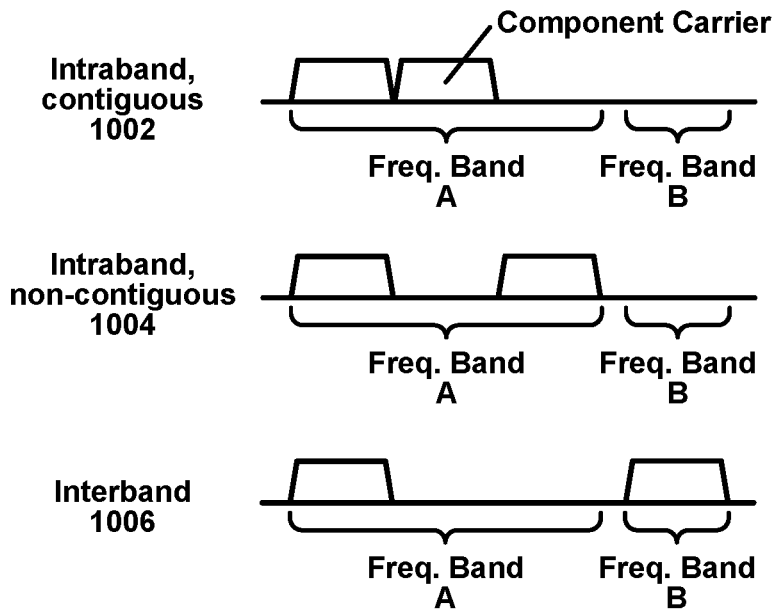
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
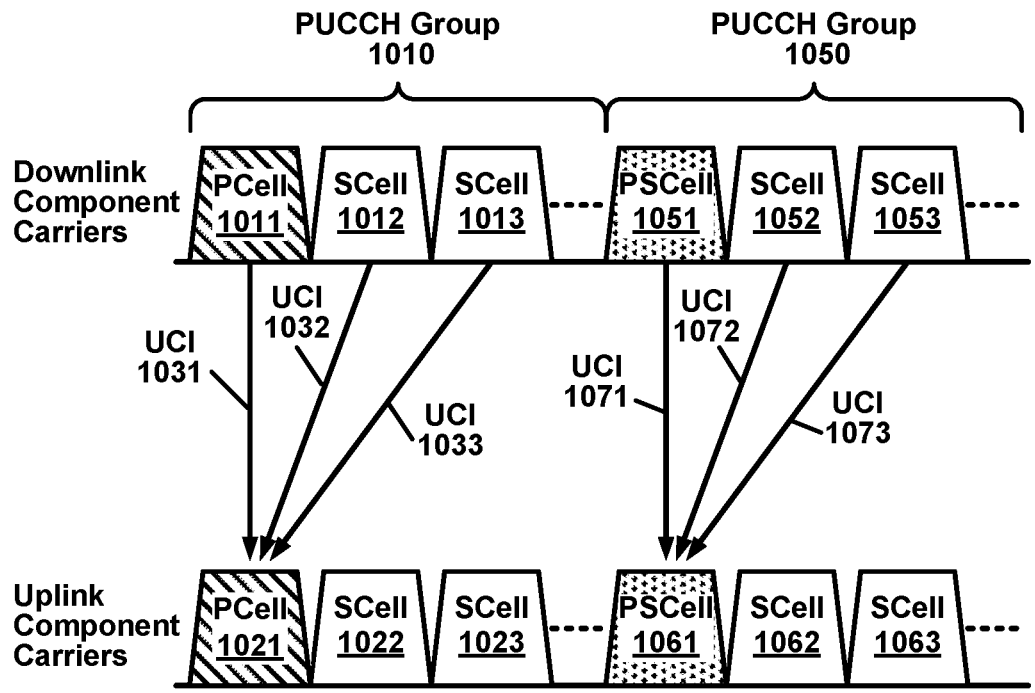
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
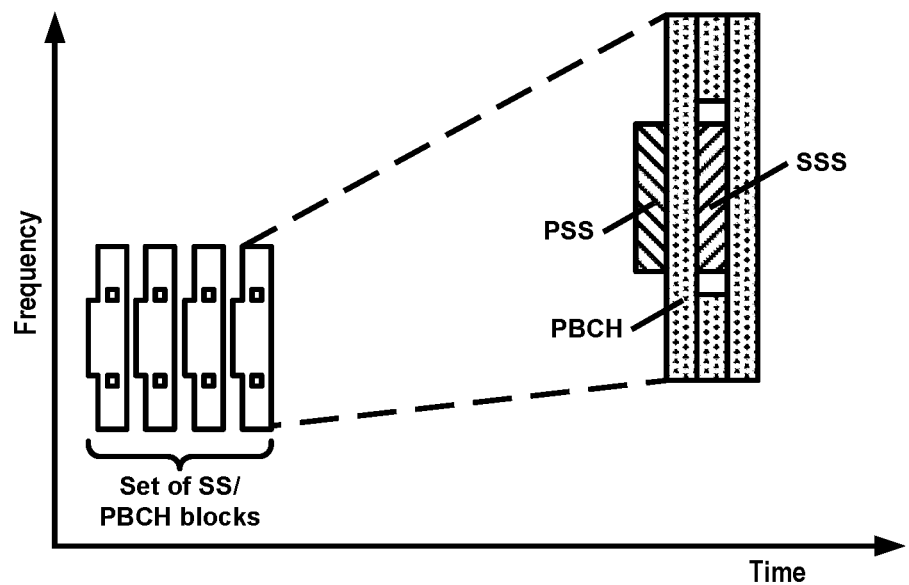
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/ transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
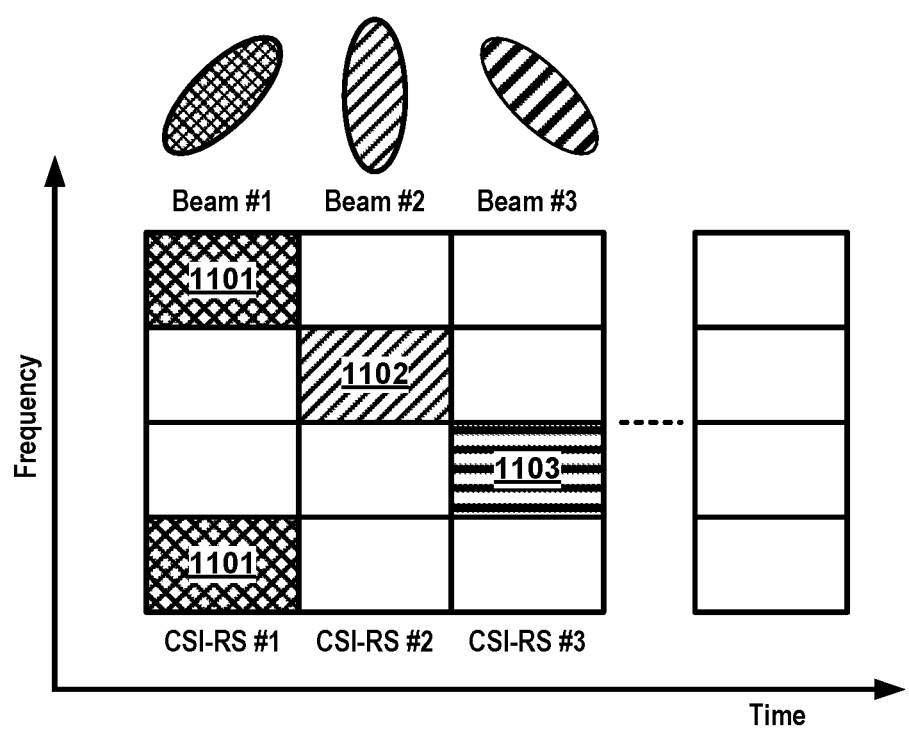
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
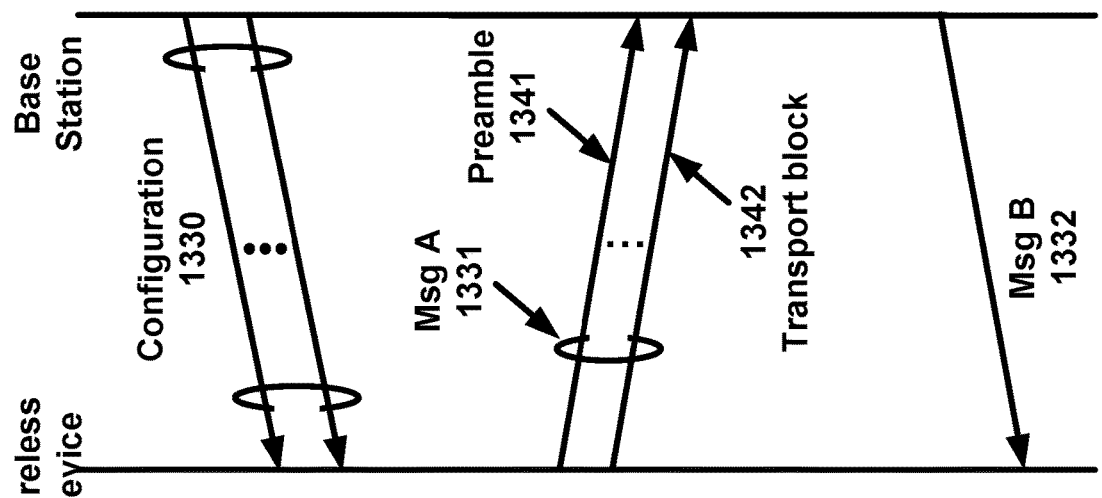
FIG. 13C shows an example two-step random access procedure.
Figure 13B:
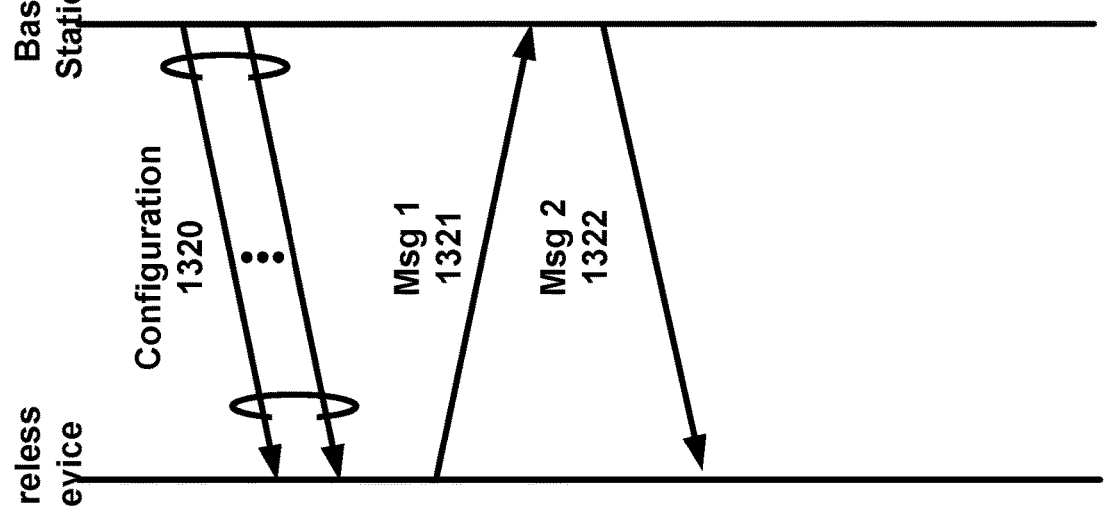
FIG. 13B shows an example two-step random access procedure.
Figure 13A:
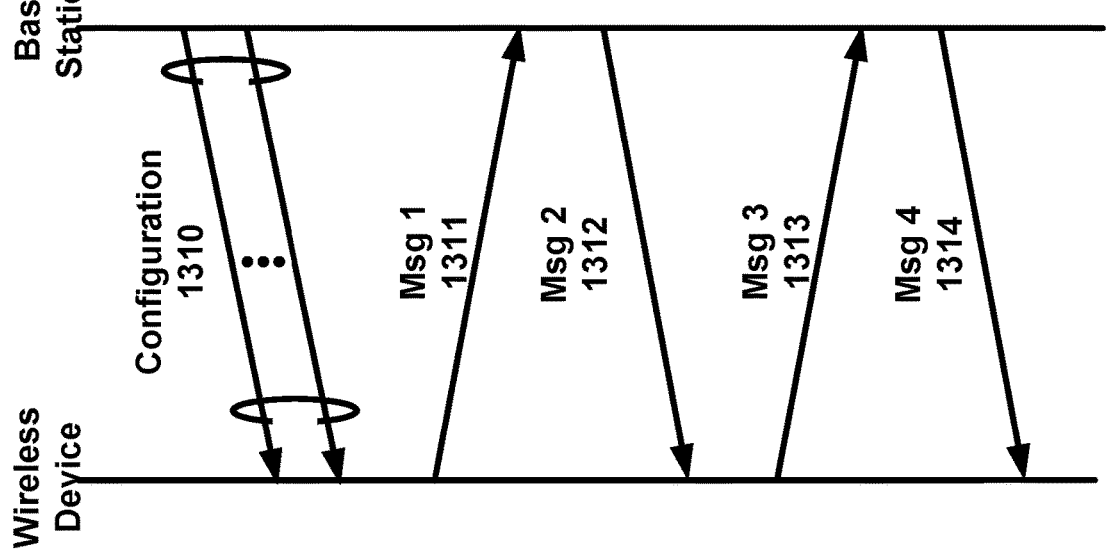
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_id+14 \times t\_id+14 \times 80 \times f\_id+14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
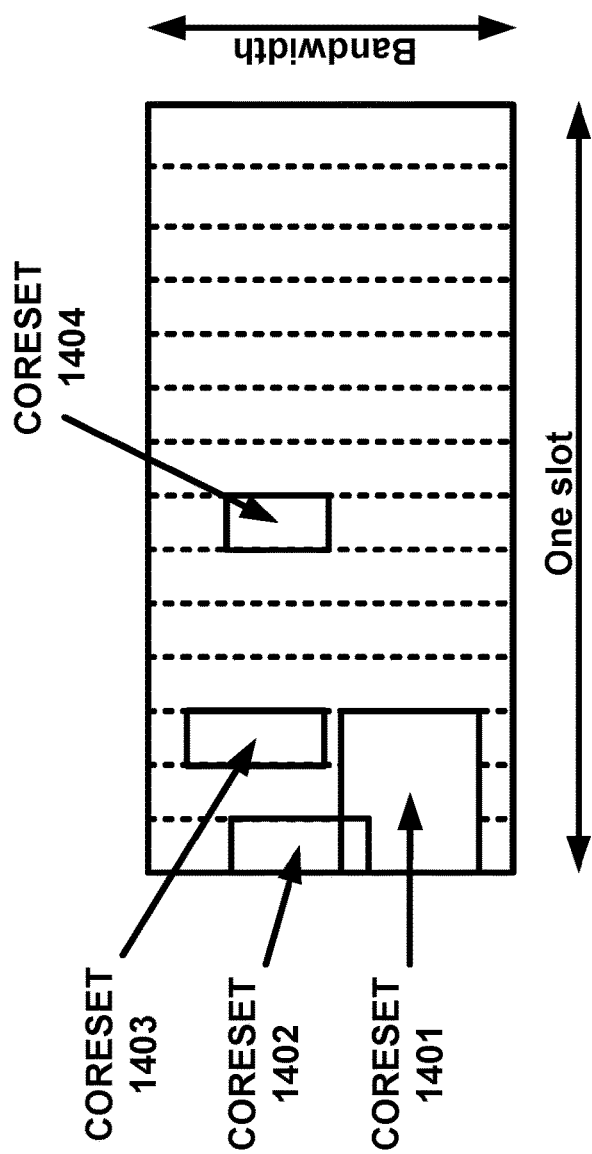
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
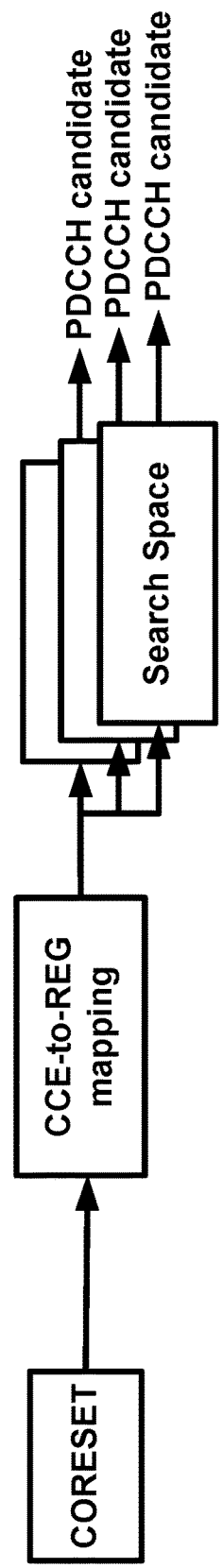
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
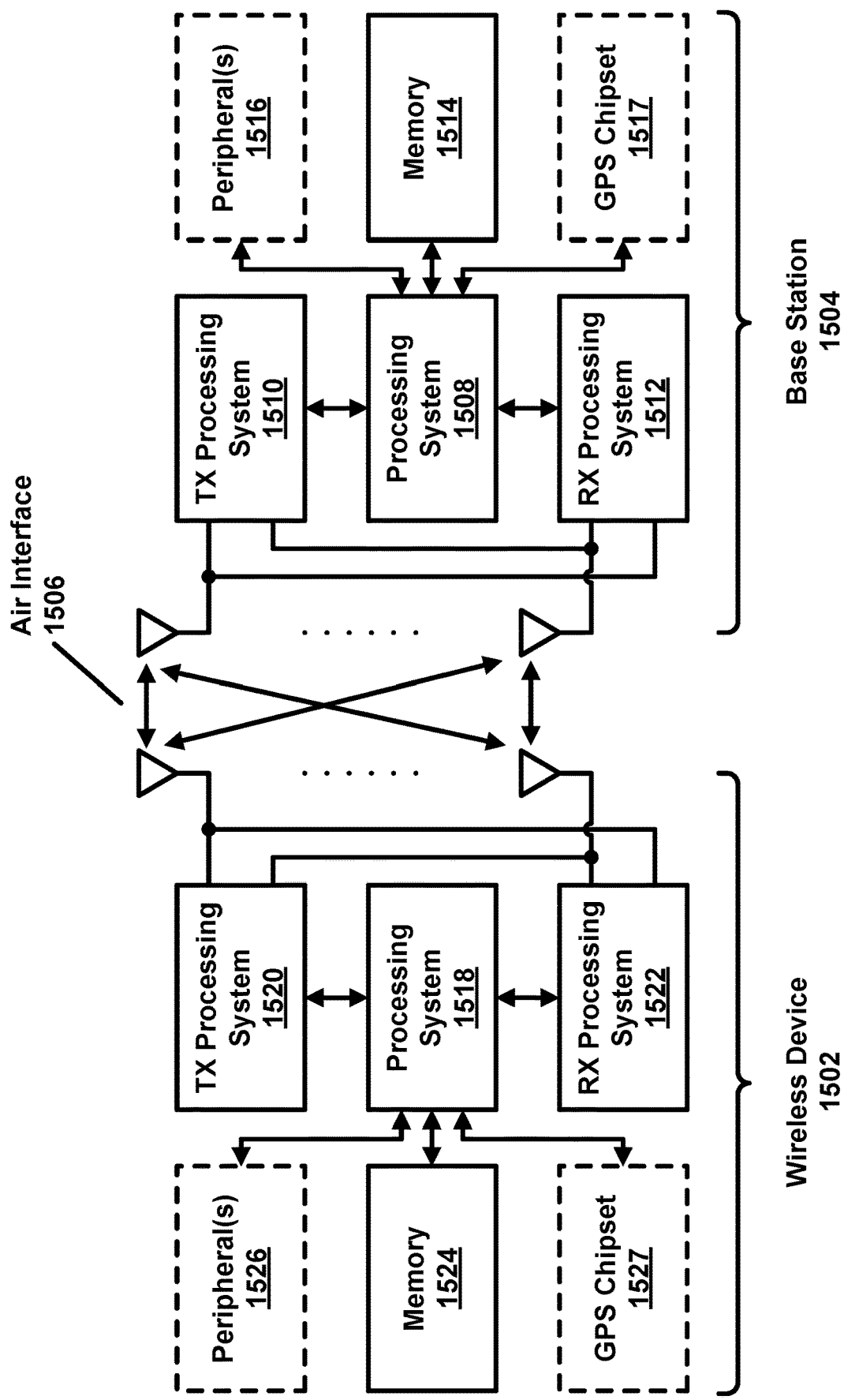
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
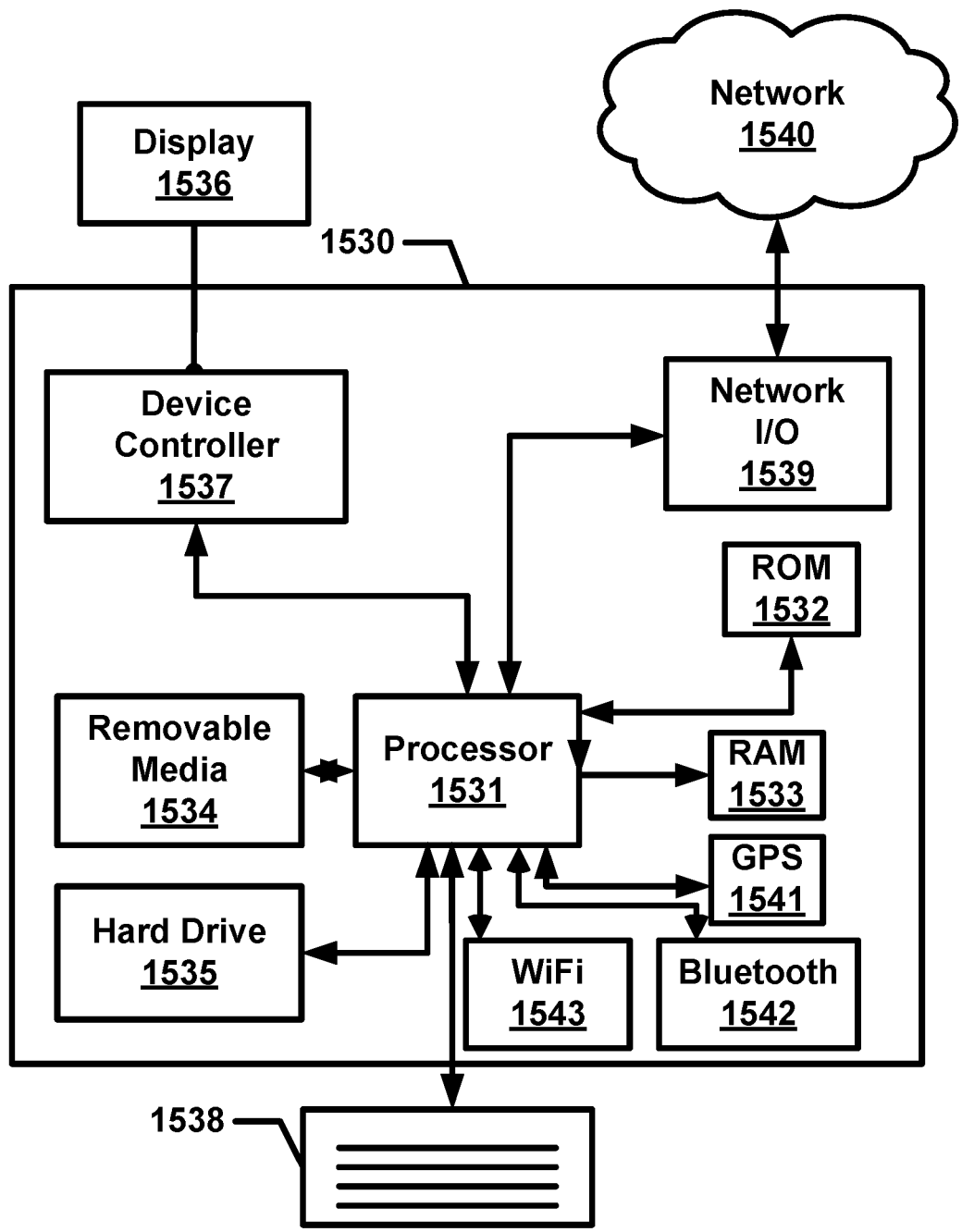
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may communicate with a wireless device via a wireless network (e.g., a communication network). The communications may use/employ one or more radio technologies (e.g., new radio technologies, legacy radio technologies, and/or a combination thereof). The one or more radio technologies may comprise at least one of: one or multiple technologies related to a physical layer; one or multiple technologies related to a medium access control layer; and/or one or multiple technologies related to a radio resource control layer. One or more enhanced radio technologies described herein may improve performance of a wireless network. System throughput, transmission efficiencies of a wireless network, and/or data rate of transmission may be improved, for example, based on one or more configurations described herein. Battery consumption of a wireless device may be reduced, for example, based on one or more configurations described herein. Latency of data transmission between a base station and a wireless device may be improved, for example, based on one or more configurations described herein. A network coverage of a wireless network may increase, for example, based on one or more configurations described herein.

A base station may send/transmit one or more MAC PDUs to a wireless device. A MAC PDU may be a bit string that is byte aligned (e.g., a multiple of eight bits) in length.

Bit strings may be represented by one or more tables in which the most significant bit may be the leftmost bit of the first line of a table, and the least significant bit may be the rightmost bit on the last line of the table. The bit string may be read from left to right and then in the reading order of the lines (e.g., from the topmost line of the table to the bottommost line of the table). The bit order of a parameter field within a MAC PDU may be represented with the first and most significant bit in the leftmost bit and the last and least significant bit in the rightmost bit.

A MAC SDU may be a bit string that is byte aligned (e.g., a multiple of eight bits) in length. A MAC SDU may be comprised in a MAC PDU from the first bit onward. A MAC CE may be a bit string that is byte aligned (e.g., a multiple of eight bits) in length. A MAC subheader may be a bit string that is byte aligned (e.g., a multiple of eight bits) in length. A MAC subheader may be placed immediately in front of a corresponding MAC SDU, MAC CE, or padding. A wireless device (e.g., the MAC entity of the wireless device) may ignore a value of reserved bits in a downlink (DL) MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, or padding.

A MAC subheader may comprise: an R field with a one-bit length; an F field with a one-bit length; an LCID field with a multi-bit length; and/or an L field with a multi-bit length, for example, if the MAC subheader corresponds to a MAC SDU, a variable-sized MAC CE, or padding.

Figure 17A:
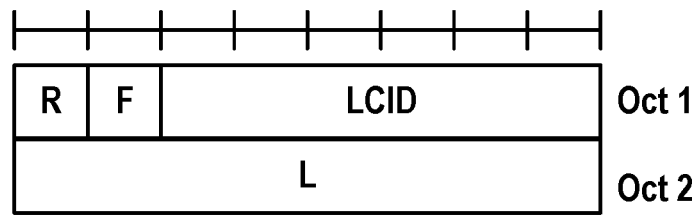
FIG. 17A, FIG. 17B, and FIG. 17C show example MAC subheaders.
Figure 17B:
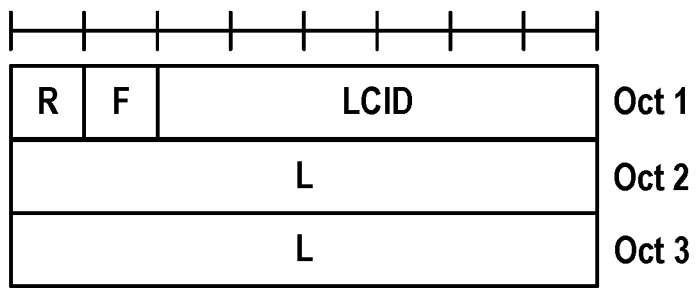
Figure 17C:
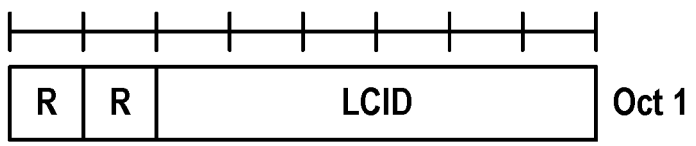

FIG. 17A shows an example of a MAC subheader. The MAC subheader may comprise an R field, an F field, an LCID field, and/or an L field. The LCID field may be six bits in length (or any other quantity of bits). The L field may be eight bits in length (or any other quantity of bits). Each of the R field and the F field may be one bit in length (or any other quantity of bits). FIG. 17B shows an example of a MAC subheader. The MAC subheader may comprise an R field, an F field, an LCID field, and/or an L field. Similar to the MAC subheader shown in FIG. 17A, the LCID field may be six bits in length (or any other quantity of bits), the R field may be one bit in length (or any other quantity of bits), and the F field may be one bit in length (or any other quantity of bits). The L field may be sixteen bits in length (or any other quantity of bits, such as greater than sixteen bits in length). A MAC subheader may comprise: an R field with a two-bit length (or any other quantity of bits) and/or an LCID field with a multi-bit length (or single bit length), for example, if the MAC subheader corresponds to a fixed sized MAC CE or padding. FIG. 17C shows an example of a MAC subheader. In the example MAC subheader shown in FIG. 17C, the LCID field may be six bits in length (or any other quantity of bits), and the R field may be two bits in length (or any other quantity of bits).

Figure 18A:
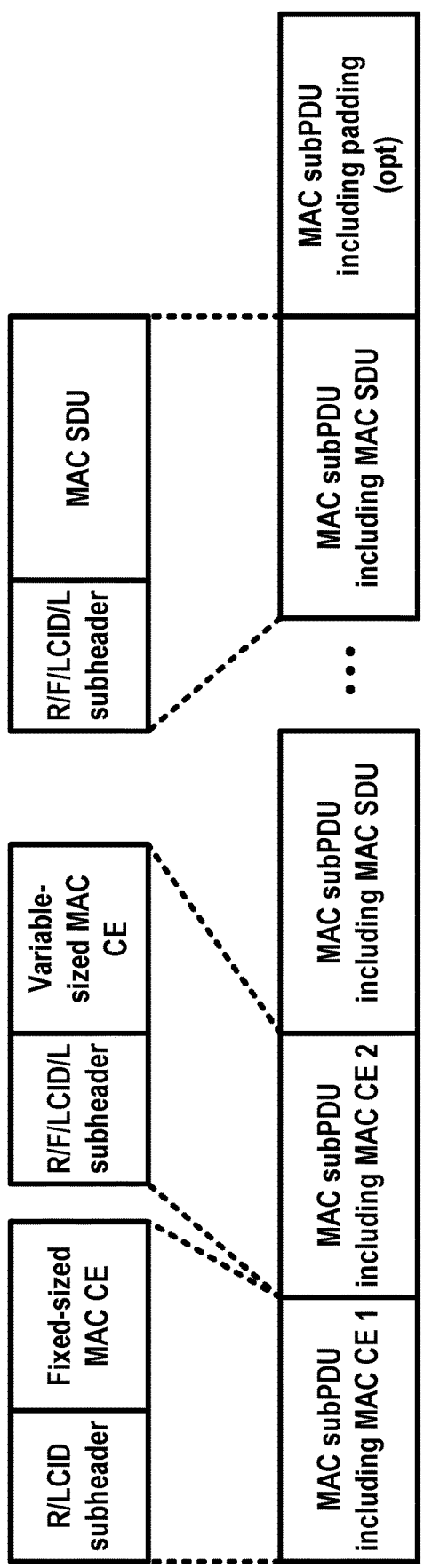
FIG. 18A and FIG. 18B show example MAC PDUs.

FIG. 18A shows an example of a MAC PDU (e.g., a DL MAC PDU). Multiple MAC CEs, such as MAC CE 1 and 2 shown in FIG. 18A, may be placed together (e.g., located within the same MAC PDU). A MAC subPDU comprising a MAC CE may be placed (e.g., located within a MAC PDU) before any MAC subPDU comprising a MAC SDU or a MAC subPDU comprising padding. MAC CE 1 may be a fixed-sized MAC CE that follows a first-type MAC subheader. The first-type MAC subheader may comprise an R field and an LCID field (e.g., similar to the MAC CE shown in FIG. 17C). MAC CE 2 may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

Figure 18B:
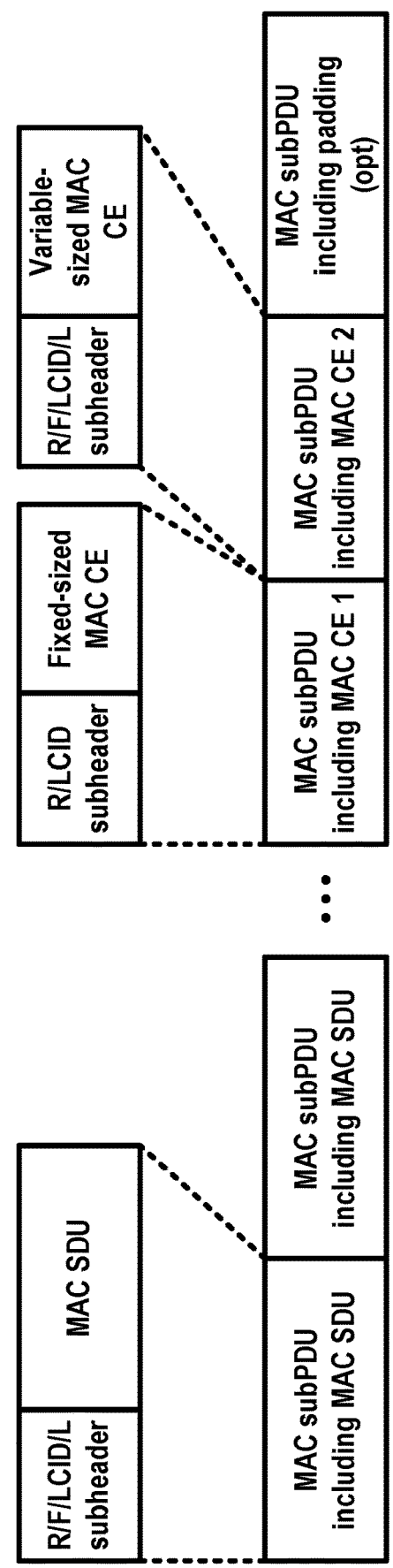

FIG. 18B shows an example of a MAC PDU (e.g., a UL MAC PDU). Multiple MAC CEs, such as MAC CE 1 and 2 shown in FIG. 18B, may be placed together (e.g., located within the same MAC PDU). A MAC subPDU comprising a MAC CE may be placed (e.g., located within a MAC PDU) after all MAC subPDUs comprising a MAC SDU. The MAC subPDU and/or the MAC subPDU comprising a MAC CE may be placed (e.g., located within a MAC PDU) before a MAC subPDU comprising padding. Similar to the MAC CEs shown in FIG. 18A, MAC CE 1 shown in FIG. 18B may be a fixed-sized MAC CE that follows a first-type MAC subheader. The first-type MAC subheader may comprise an R field and an LCID field (e.g., similar to the MAC CE shown in FIG. 17C). Similar to the MAC CEs shown in FIG. 18A, MAC CE 2 shown in FIG. 18B may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

A base station (e.g., the MAC entity of a base station) may send/transmit one or more MAC CEs to a wireless device (e.g., a MAC entity of a wireless device). FIG. 19 shows example LCID values. The LCID values may be associated with one or more MAC CEs. The LCID values may be associated with a downlink channel, such as a DL-SCH. The one or more MAC CEs may comprise at least one of: an semi-persistent zero power CSI-RS (SP ZP CSI-RS) Resource Set Activation/Deactivation MAC CE, a PUCCH spatial relation Activation/Deactivation MAC CE, an SP SRS Activation/Deactivation MAC CE, an SP CSI reporting on PUCCH Activation/Deactivation MAC CE, a TCI State Indication for wireless device-specific (e.g., UE-specific) PDCCH MAC CE, a TCI State Indication for wireless device-specific (e.g., UE-specific) PDSCH MAC CE, an Aperiodic CSI Trigger State Subselection MAC CE, an SP CSI-RS/CSI interference measurement (CSI-IM) Resource Set Activation/Deactivation MAC CE, a wireless device (e.g., UE) contention resolution identity MAC CE, a timing advance command MAC CE, a DRX command MAC CE, a Long DRX command MAC CE, an SCell activation/deactivation MAC CE (e.g., 1 Octet), an SCell activation/deactivation MAC CE (e.g., 4 Octet), and/or a duplication activation/deactivation MAC CE. A MAC CE, such as a MAC CE sent/transmitted by a base station (e.g., a MAC entity of a base station) to a wireless device (e.g., a MAC entity of a wireless device), may be associated with (e.g., correspond to) an LCID in the MAC subheader corresponding to the MAC CE. Different MAC CEs may correspond to a different LCID in the MAC subheader corresponding to the corresponding MAC CE. An LCID having an index value "111011" in a MAC subheader may indicate that a MAC CE associated with the MAC subheader is a long DRX command MAC CE, for example, for a MAC CE associated with the downlink.

A wireless device (e.g., a MAC entity of a wireless device) may send/transmit to a base station (e.g., a MAC entity of a base station) one or more MAC CEs. FIG. 20 shows an example LCID values that may be associated with the one or more MAC CEs. The LCID values may be associated with an uplink channel, such as a UL-SCH. The one or more MAC CEs may comprise at least one of: a short buffer status report (BSR) MAC CE, a long BSR MAC CE, a C-RNTI MAC CE, a configured grant confirmation MAC CE, a single entry power headroom report (PHR) MAC CE, a multiple entry PHR MAC CE, a short truncated BSR, and/or a long truncated BSR. A MAC CE may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a short-truncated command MAC CE, for example, for a MAC CE associated with the uplink.

Two or more component carriers (CCs) may be aggregated, such as in carrier aggregation (CA). A wireless device may simultaneously receive and/or transmit data via one or more CCs, for example, depending on capabilities of the wireless device (e.g., using the technique of CA). A wireless device may support CA for contiguous CCs and/or for non-contiguous CCs. CCs may be organized into cells. CCs may be organized into one PCell and one or more SCells.

A wireless device may have an RRC connection (e.g., one RRC connection) with a network, for example, if the wireless device is configured with CA. During an RRC connection establishment/re-establishment/handover, a cell providing/sending/configuring NAS mobility information may be a serving cell. During an RRC connection re-establishment/handover procedure, a cell providing/sending/configuring a security input may be a serving cell. The serving cell may be a PCell. A base station may send/transmit, to a wireless device, one or more messages comprising configuration parameters of a plurality of SCells, for example, depending on capabilities of the wireless device.

A base station and/or a wireless device may use/employ an activation/deactivation mechanism of an SCell, for example, if configured with CA. The base station and/or the wireless device may use/employ an activation/deactivation mechanism of an SCell, for example, to improve battery use and/or power consumption of the wireless device. A base station may activate or deactivate at least one of one or more SCells, for example, if a wireless device is configured with the one or more SCells. An SCell may be deactivated unless an SCell state associated with the SCell is set to an activated state (e.g., "activated") or a dormant state (e.g., "dormant"), for example, after configuring the SCell.

A wireless device may activate/deactivate an SCell. A wireless device may activate/deactivate a cell, for example, based on (e.g., after or in response to) receiving an SCell Activation/Deactivation MAC CE. The SCell Activation/Deactivation MAC CE may comprise one or more fields associated with one or more SCells, respectively, to indicate activation or deactivation of the one or more SCells. The SCell Activation/Deactivation MAC CE may correspond to one octet comprising seven fields associated with up to seven SCells, respectively, for example, if the aggregated cell has less than eight SCells. The SCell Activation/Deactivation MAC CE may comprise an R field. The SCell Activation/Deactivation MAC CE may comprise a plurality of octets comprising more than seven fields associated with more than seven SCells, for example, if the aggregated cell has more than seven SCells.

Figure 21A:
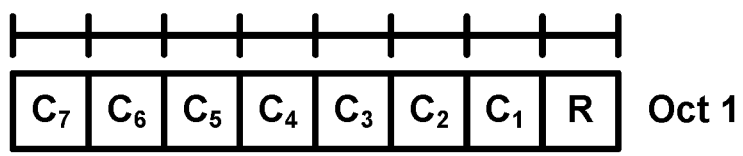
FIG. 21A and FIG. 21B show example SCell Activation/Deactivation MAC CEs.

FIG. 21A shows an example SCell Activation/Deactivation MAC CE of one octet. A first MAC PDU subheader comprising a first LCID (e.g., '111010' as shown in FIG. 19) may indicate/identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first quantity/number of C-fields (e.g., seven or any other quantity/number) and a second quantity/number of R-fields (e.g., one or any other quantity/number).

Figure 21B:
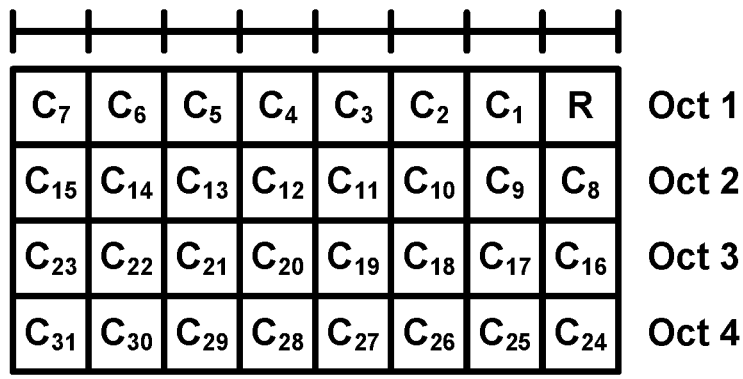

FIG. 21B shows an example SCell Activation/Deactivation MAC CE of four octets. A second MAC PDU subheader comprising a second LCID (e.g., '111001' as shown in FIG. 19) may indicate/identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third quantity/number of C-fields (e.g., 31 or any other quantity/number) and a fourth quantity/number of R-fields (e.g., 1 or any other quantity/number).

As shown in FIG. 21A and/or FIG. 21B, a Ci field may indicate an activation/deactivation status of an SCell with/corresponding to an SCell index i, for example, if an SCell with/corresponding to SCell index i is configured. An SCell with an SCell index i may be activated, for example, if the Ci field is set to one. An SCell with an SCell index i may be deactivated, for example, if the Ci field is set to zero. The wireless device may ignore the Ci field, for example, if there is no SCell configured with SCell index i. An R field may indicate a reserved bit. The R field may be set to zero or any other value (e.g., for other purposes).

A base station may send/transmit, to a wireless device, one or more messages comprising an SCell timer (e.g., sCellDeactivationTimer). A wireless device may deactivate an SCell, for example, based on (e.g., after or in response to) an expiry of the SCell timer. An SCell configured with an uplink control channel (e.g., a PUCCH SCell) may not be configured with an SCell timer. Each other SCell (e.g., except for the SCell configured with an uplink control channel) may run the SCell timer.

A wireless device may activate an SCell, for example, if the wireless device receives an SCell Activation/Deactivation MAC CE activating the SCell. A wireless device may perform one or more first operations, for example, based on (e.g., after or in response to) the activating the SCell. The one or more first operations may comprise at least one of: SRS transmissions on/via the SCell; CQI/PMI/RI/CSI-RS resource indicator (CRI) reporting for the SCell; PDCCH monitoring on/via the SCell; PDCCH monitoring for the SCell (e.g., on/via a PCell or another SCell); and/or PUCCH transmissions on/via the SCell.

The wireless device may start or restart a first SCell timer (e.g., sCellDeactivationTimer) associated with the SCell, for example, based on (e.g., after or in response to) the activating the SCell. The wireless device may start or restart the first SCell timer in the slot, for example, in which the SCell Activation/Deactivation MAC CE activating the SCell is received. The wireless device may (re-)initialize one or more suspended configured uplink grants of a configured grant (e.g., a configured grant Type 1) associated with the SCell according to a stored configuration, for example, based on (e.g., after or in response to) the activating the SCell. The wireless device may trigger PHR, for example, based on (e.g., after or in response to) the activating the SCell.

A wireless device may deactivate the activated SCell, for example, if the wireless device receives an SCell Activation/Deactivation MAC CE deactivating an activated SCell. The wireless device may deactivate the activated SCell, for example, if a first SCell timer (e.g., sCellDeactivationTimer)

associated with an activated SCell expires. The wireless device may stop the first SCell timer associated with the activated SCell, for example, based on (e.g., after or in response to) the deactivating the activated SCell. The wireless device may clear one or more configured downlink assignments and/or one or more configured uplink grants of a configured grant (e.g., a configured uplink grant Type 2) associated with the activated SCell, for example, based on (e.g., after or in response to) the deactivating the activated SCell. The wireless device may suspend one or more configured uplink grants of a configured uplink grant (e.g., a configured uplink grant Type 1) associated with the activated SCell and/or flush HARQ buffers associated with the activated SCell, for example, based on (e.g., after or in response to) the deactivating the activated SCell.

A wireless device may not perform one or more second operations, for example, if an SCell is deactivated. The one or more second operations may comprise at least one of: sending/transmitting SRS on/via the SCell; reporting CQI/PMI/RI/CRI for the SCell; sending/transmitting UL-SCH on/via the SCell; sending/transmitting RACH on/via the SCell; monitoring at least one first PDCCH on/via the SCell; monitoring at least one second PDCCH for the SCell (e.g., on/via a PCell or another SCell); and/or sending/transmitting a PUCCH on/via the SCell.

A wireless device may restart a first SCell timer (e.g., sCellDeactivationTimer) associated with an activated SCell, for example, if at least one first PDCCH on the activated SCell indicates an uplink grant or a downlink assignment. A wireless device may restart the first SCell timer (e.g., sCellDeactivationTimer) associated with the activated SCell, for example, if at least one second PDCCH on/via a serving cell (e.g., a PCell or an SCell configured with PUCCH, i.e., PUCCH SCell) scheduling the activated SCell indicates an uplink grant or a downlink assignment for the activated SCell. A wireless device may abort an ongoing random access procedure on the SCell, for example, if an SCell is deactivated and if there is an ongoing random access procedure on the SCell.

A base station may configure a wireless device with uplink (UL) bandwidth parts (BWPs) and/or downlink (DL) BWPs, for example, to enable bandwidth adaptation (BA) on a PCell. The base station may further configure the wireless device with at least DL BWP(s) (e.g., there may be no UL BWPs in the UL) to enable BA on an SCell, for example, if a carrier aggregation is configured for the wireless device. For the PCell, an initial active BWP may be a first BWP used for initial access. For the SCell, a first active BWP may be a second BWP configured for the wireless device to operate on the SCell upon the SCell being activated.

A base station and/or a wireless device may independently switch a DL BWP and/or an UL BWP, for example, in a paired spectrum (e.g., FDD). A base station and/or a wireless device may simultaneously switch a DL BWP and an UL BWP, for example, in an unpaired spectrum (e.g., TDD).

A base station and/or a wireless device may switch a BWP between configured BWPs, for example, based on DCI or a BWP inactivity timer. A base station and/or a wireless device may switch an active BWP to a default BWP, for example, based on (e.g., after or in response to) an expiry of a BWP inactivity timer associated with a serving cell if the BWP inactivity timer is configured for the serving cell. The default BWP may be configured by the network (e.g., via one or more RRC message).

One UL BWP for each uplink carrier and one DL BWP may be active at a time in an active serving cell, for example, for FDD systems if configured with BA. One Dl/UL BWP pair may be active at a time in an active serving cell, for example, for TDD systems. Operating on the one UL BWP and the one DL BWP (or the one Dl/UL pair) may improve wireless device battery consumption efficiencies. BWPs, other than the one active UL BWP and the one active DL BWP, (e.g., configured for the wireless device and/or that the wireless device may work on) may be deactivated. The wireless device may not monitor PDCCH on/via the deactivated BWPs and/or not send/transmit, on/via the deactivated BWPs, PUCCH, PRACH, and/or UL-SCH. A serving cell may be configured with at most a first quantity/number (e.g., four or any other quantity/number) of BWPs. There may be one active BWP at any point in time, for example, for an activated serving cell.

A BWP switching for a serving cell may be used to activate an inactive BWP and/or deactivate an active BWP at a time. In The BWP switching may be controlled by a PDCCH indicating a downlink assignment and/or an uplink grant. The BWP switching may be controlled by a BWP inactivity timer (e.g., bwp-InactivityTimer). The BWP switching may be controlled by a base station and/or a wireless device (e.g., a MAC entity of a base station and/or a wireless device), for example, based on (e.g., after or in response to) initiating a random access procedure. A BWP may be initially active without receiving a PDCCH indicating a downlink assignment or an uplink grant, for example, after an addition of an SpCell or activation of an SCell. The active BWP for a serving cell may be indicated by an RRC message and/or a PDCCH. A DL BWP may be paired with a UL BWP, and BWP switching may be common for both UL and DL, for example, for an unpaired spectrum.

Figure 22:
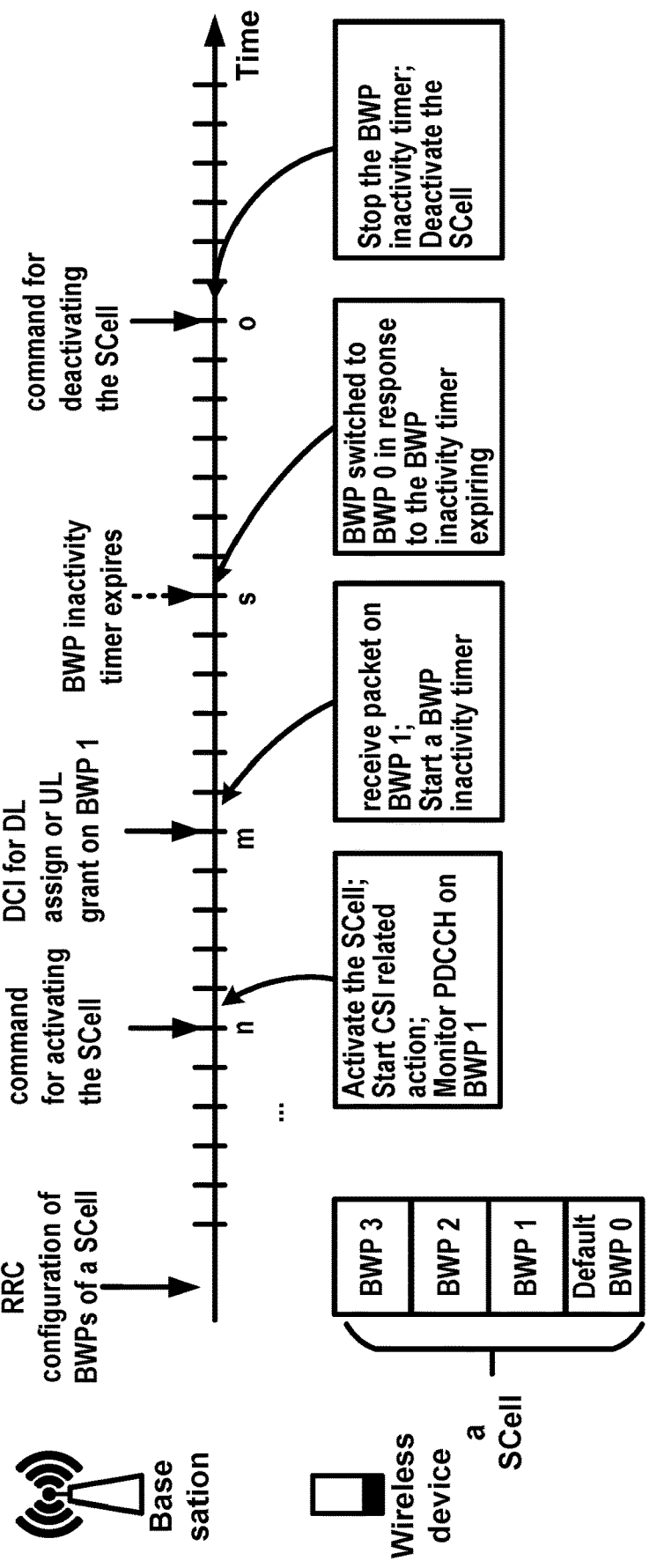
FIG. 22 shows an example of bandwidth part (BWP) management.

FIG. 22 shows an example of BWP management. BWP management may comprise BWP switching (e.g., switching on an SCell). A wireless device may receive one or more RRC messages 2210 comprising parameters of an SCell and one or more BWP configurations associated with the SCell. The one or more RRC messages 2210 may comprise at least one of: an RRC connection reconfiguration message (e.g., RRCReconfiguration); an RRC connection reestablishment message (e.g., RRCRestablishment); and/or an RRC connection setup message (e.g., RRCSetup). Among the one or more BWPs, at least one BWP may be configured as the first active BWP (e.g., BWP 1 shown in FIG. 22), one BWP as the default BWP (e.g., BWP 0 shown in FIG. 22). The wireless device may receive an activation indication 2220 (e.g., a command, a MAC CE) to activate the SCell (e.g., during n-th slot). The wireless device may start an SCell deactivation timer (e.g., sCellDeactivationTimer), and start CSI-related actions for the SCell, and/or start CSI-related actions for the first active BWP of the SCell. The wireless device may start monitoring a PDCCH on/via BWP 1, for example, based on (e.g., after or in response to) activating the SCell.

The wireless device may start or restart a BWP inactivity timer (e.g., bwp-InactivityTimer) (e.g., during m-th slot), for example, based on (e.g., after or in response to) receiving DCI 2230 indicating a DL assignment on BWP 1. The wireless device may switch back to the default BWP (e.g., BWP 0) as an active BWP, for example, if the BWP inactivity timer expires (e.g., during s-th slot). The wireless device may deactivate the SCell and/or stop the BWP inactivity timer, for example, if the sCellDeactivationTimer expires.

Using the BWP inactivity timer may further reduce power consumption of a wireless device, for example, if the wireless device is configured with multiple cells and/or one or more cells having a wide bandwidth (e.g., 1 GHz). The wireless device may only send/transmit or receive via a narrow-bandwidth BWP (e.g., 5 MHz) on the PCell or an SCell, for example, if there is no activity on an active BWP. The wireless device may determine an expiry of the BWP inactivity timer (e.g., during s-th slot). The wireless device may switch the active BWP (e.g., the BWP 1) to the default BWP (e.g., the BWP 0), for example, based on (e.g., after or in response to) the .expiry of the BWP inactivity timer.

A wireless device (e.g., a MAC entity of the wireless device) may apply normal operations on an active BWP for an activated serving cell configured with a BWP. The normal operations may comprise at least one of: sending/transmitting on/via a UL-SCH; sending/transmitting on/via a RACH; monitoring a PDCCH; sending/transmitting a PUCCH; and/or receiving a DL-SCH; and/or (re-) initializing any suspended configured uplink grants of a configured grant (e.g., configured grant Type 1) according to a stored configuration, if any.

A wireless device (e.g., a MAC entity of the wireless device) may not perform one or more operations, for example, on/via an inactive BWP for each activated serving cell configured with a BWP. The one or more operations not performed by the wireless device (e.g., a MAC entity of the wireless device) may comprise at least one of: sending/transmitting on/via a UL-SCH; sending/transmitting on/via a RACH; monitoring a PDCCH; sending/transmitting a PUCCH; sending/transmitting an SRS, receiving a DL-SCH; clearing any configured downlink assignment and/or configured uplink grant of a configured grant (e.g., configured grant Type 2); and/or suspending any configured uplink grant of a configured grant (e.g., configured Type 1).

A wireless device may perform BWP switching to a BWP indicated by a PDCCH transmission (e.g., DCI, a PDCCH order, etc.), for example, if the wireless device (e.g., a MAC entity of the wireless device) receives the PDCCH transmission for a BWP switching of a serving cell at time that a random access procedure associated with this serving cell is not ongoing. A bandwidth part indicator field value may indicate an active DL BWP, from a configured DL BWP set, for DL receptions, for example, if the bandwidth part indicator field is configured in DCI format 1_1. A bandwidth part indicator field value may indicate an active UL BWP, from a configured UL BWP set, for UL transmissions, for example, if the bandwidth part indicator field is configured in DCI format 0_1.

A wireless device may be provided with, by a higher layer parameter (e.g., Default-DL-BWP), a default DL BWP among the configured DL BWPs, for example, for a primary cell and/or a secondary cell. The default DL BWP may be the initial active DL BWP, for example, if the wireless device is not provided with a default DL BWP by the higher layer parameter (e.g., Default-DL-BWP).

A wireless device may be provided with a timer value for the primary cell by a higher layer parameter (e.g., bwp-InactivityTimer). The wireless device may increment the configured timer (if running), for example, every interval of 1 millisecond for frequency range 1, every 0.5 milliseconds for frequency range 2, or any other interval for another frequency range. The wireless device may increment the configured timer, for example, if the wireless device does not detect DCI format 1_1 for a paired spectrum operation or if the wireless device does not detect DCI format 1_1 or DCI format 0_1 for an unpaired spectrum operation during the interval. The wireless device may receive a deactivation indication 2240 (e.g., a command, a MAC CE) for deactivating one or more SCells. The wireless device may stop the BWP inactivity timer and/or deactivate the one or more SCells, for example, based on (e.g., after or in response to) receiving the deactivation indication 2240.

The wireless device procedures on a secondary cell may be the same as, or similar to, the wireless device procedures on the primary cell, for example, if the wireless device is configured for the secondary cell with a higher layer parameter (e.g., Default-DL-BWP) indicating a default DL BWP among the configured DL BWPs and/or the wireless device is configured with a higher layer parameter (e.g., bwp-InactivityTimer) indicating a timer value. The wireless device may perform the same or similar procedures, for example, using the timer value for the secondary cell and/or the default DL BWP for the secondary cell. The wireless device may use the indicated DL BWP and the indicated UL BWP on the secondary cell as the respective first active DL BWP and first active UL BWP on a secondary cell or carrier, for example, if the wireless device is configured with, by a higher layer parameter (e.g., Active-BWP-DL-SCell), a first active DL BWP and with, by a higher layer parameter (e.g., Active-BWP-UL-SCell), a first active UL BWP on the secondary cell or carrier.

FIG. 23 shows an example message comprising configuration parameters for a cell. The message may comprise an RRC message. The message may comprise a serving cell configuration information element. The configuration parameters may comprise at least one of: a TDD configuration parameter (e.g., tdd-UL-DL-ConfigurationDedicated, TDD-UL-DL-ConfigDedicated), an initial BWP ID, a plurality of DL BWPs, a plurality of UL BWPs, a first active BWP, a BWP inactivity timer, an SCell deactivation timer, and/or a cross carrier scheduling configuration information element (e.g., CrossCarrierSchedulingConfig). The message may comprise one or more algorithms (e.g., computer code or subroutines) for determining a ServingCellConfig information element and/or a CrossCarrierSchedulingConfig information element. An information element ServingCellConfig (e.g., ServingCellConfig IE) may be used to configure (e.g., add or modify) a wireless device with a serving cell. The serving cell may be an SpCell and/or an SCell of an MCG or a SCG. The configuration parameters may be specific to a wireless device and/or may be cell specific. Reconfiguration between a PUCCH and PUCCHless SCell may be supported, for example, using an SCell release and add. An information element CrossCarrierSchedulingConfig may be used to specify configuration parameters, for example, if cross-carrier scheduling is used in a cell. The configuration parameters may comprise one or more PDCCH configuration parameters of a first cell and/or one or more PDCCH configuration parameters of a second cell. The PDCCH configuration parameters may comprise one or more: control resource sets, search spaces (configured in SearchSpace IE), a downlink preemption indication, PUSCH power control parameters, PUCCH power control parameters, and/or SRS power control parameters.

FIG. 24 shows an example message comprising configuration parameters for a search space. The message may comprise an RRC message. A search space information element (e.g., SearchSpace IE) may define/indicate how and/or where to search for PDCCH candidates. Each search space may be associated with at least one ControlResourceSet. For a scheduled cell using cross-carrier scheduling, except for nrofCandidates, optional fields shown in FIG. 24 may be absent. One or more search space configuration parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number/quantity of candidates for an aggregation level 2445 (nrofCandidates), and/or a SS type indicating a common SS type or a wireless device specific (e.g., UE-specific) SS type (searchSpaceType). The monitoring slot periodicity and offset parameter may indicate slots (e.g. in a radio frame) and/or a slot offset (e.g., related to a starting of a radio frame) for PDCCH monitoring. The monitoring symbol indication may indicate on which symbol(s) of a slot a wireless device may monitor PDCCH on the SS. The control resource set ID may identify/indicate a control resource set on which a SS may be located. The searchSpaceId 2420 may identify/indicate the search space (e.g., a set of PDCCH candidates for a wireless device to monitor). Each search space may comprise a set of control elements at a different aggregation level(s) which may determine the number/quantity of candidates there are to decode at one or more aggregation levels. The condition SearchSpaceId equals zero may identify/indicate a searchSpaceZero that may be configured via PBCH (MIB) or ServingCellConfigCommon and may not be used in the SearchSpace IE. The searchSpaceId may be unique among the BWPs of a Serving Cell. Search spaces with the same searchSpaceId in a scheduled cell and scheduling cell (e.g., for cross-carrier scheduling) may be linked to each other. A wireless device may apply a search space for a scheduled cell, for example, if the DL BWPs in which the linked search spaces are configured in the scheduling cell and scheduled cell are both active.

FIG. 25 shows an example a message comprising configuration parameters for a control resource set (CORESET). The message may comprise an RRC messageA base station may send/transmit to a wireless device one or more configuration parameters of a CORESET. An information element ControlResourceSet may be used to configure a time/frequency CORESET in which to search for DCI. The configuration parameters may comprise at least one of: a CORESET ID identifying/indicating the CORESET, a frequency resource indication, a time duration parameter indicating a number/quantity of symbols of the CORESET, a CCE-REG mapping type indicator (not shown in FIG. 25), a plurality of TCI states (e.g., tci-StatesPDCCH-ToAddList), an indicator (e.g., tci-PresentinDCU) indicating whether a TCI is present in a DCI, and/or the like. A controlResourceSetId value zero may identify/indicate a common CORESET configured in MIB and/or in ServingCellConfigCommon (controlResourceSetZero). The values one though maxNrofControlResourceSets-1 may identify/indicate CORESETs configured by dedicated signaling and/or in SB1. The controlResourceSetId may be unique among the BWPs of a serving cell. The frequency resource indication, comprising a number/quantity of bits (e.g., 45 bits or any other quantity of bits), may indicate frequency domain resources. Each bit of the indication mat correspond to a group of 6 RBs (and/or any other quantity of RBs), for example, with grouping starting from the first RB group in a BWP of a cell (e.g., SpCell, SCell). The first (e.g., left-most/most significant) bit may correspond to the first RB group in the BWP, and so on. A bit that is set to 1 may indicate that an RB group, corresponding to the bit, belongs to the frequency domain resource of a CORESET. Bits corresponding to a group of RBs not fully contained in the BWP within which the CORESET is configured may be set to zero. A time duration parameter may correspond to a layer 1 parameter CORESET-time-duration and/or may define/indicate the contiguous time duration in a number/quantity of symbols for a CORESET using an integer range that spans from one to maxCoReSetDuration. A CCE-REG mapping type indicator may provide a choice of mapping methods for control channel element (CCE) to resource element group (REG). The CCE may comprise a number/quantity (e.g., 6) of resource-element groups (REGs). The REG may comprise a resource block in an OFDM symbol. The mapping of the coded and modulated DCI on the resource elements may be based on mapping of CCEs and REGs (e.g., CCE-to-REG mapping). A tci-StatesPDCCH-ToAddList parameter may comprise a subset of the TCI states defined/indicated in pdsch-Config, which may be included in the BWP-DownlinkDedicated corresponding to the serving cell and/or to the DL BWP to which the ControlResourceSet belongs. The subset of the TCI states may be used for providing QCL relationships between DL reference signals (RS) in one RS set (e.g., TCI-State) and the PDCCH DMRS ports. A network may configure (e.g., at most) a maxNrofTCI-StatesPDCCH entries. The tci-PresentinDCI parameter may indicate if the TCI field is present or not present in a DL related DCI. If the field is absent, a wireless device may consider/determine the TCI to be absent/disabled. A network may set the TCI field to enabled for the ControlResourceSet used for cross-carrier scheduling in the scheduling cell (e.g., if cross-carrier scheduling is used).

A wireless device may monitor a set of PDCCH candidates. A set of PDCCH candidates may be defined in terms of PDCCH search space sets. A search space set may comprise a CSS set and/or a USS set. A wireless device may monitor PDCCH candidates in one or more of the following search spaces sets: a Type0-PDCCH CSS set, a Type0A-PDCCH CSS set, a Type1-PDCCH CSS set, a Type2-PDCCH CSS set, a Type3-PDCCH CSS set, a USS set, and/or any other type of CSS set and/or USS set. A Type0-PDCCH CSS set may be configured by pdcch-ConfigSIB1 in MIB and/or by searchSpaceSIB1 in PDCCH-ConfigCommon and/or by searchSpaceZero in PDCCH-ConfigCommon, for example, for a DCI format with CRC scrambled by a SI-RNTI on the primary cell of the MCG. A Type0A-PDCCH CSS set may be configured by searchSpaceOtherSystemInformation in PDCCH-ConfigCommon, for example, for a DCI format with CRC scrambled by a SI-RNTI on the primary cell of the MCG. A Type1-PDCCH CSS set may be configured by ra-SearchSpace in PDCCH-ConfigCommon, for example, for a DCI format with CRC scrambled by a RA-RNTI or a TC-RNTI on the primary cell. A Type2-PDCCH CSS set may be configured by pagingSearchSpace in PDCCH-ConfigCommon, for example, for a DCI format with CRC scrambled by a P-RNTI on the primary cell of the MCG. A Type3-PDCCH CSS set may be configured by SearchSpace in PDCCH-Config with searchSpaceType=common, for example, for DCI formats with CRC scrambled by INT-RNTI, SFI-RNTI, TPC-PUSCH-RNTI, TPC-PUCCH-RNTI, and/or TPC-SRS-RNTI (e.g., only for the primary cell, C-RNTI, MCS-C-RNTI, and/or CS-RNTI(s)). A USS set may be configured by SearchSpace in PDCCH-Config with searchSpaceType=ue-Specific, for example, for DCI formats with CRC scrambled by C-RNTI, MCS-C-RNTI, SP-CSI-RNTI, or CS-RNTI(s).

A wireless device may determine a PDCCH monitoring occasion. The wireless device may determine a PDCCH monitoring occasion, for example, on an active DL BWP. The wireless device may determine a PDCCH monitoring occasion based on one or more PDCCH configuration parameters comprising: a PDCCH monitoring periodicity, a PDCCH monitoring offset, and/or a PDCCH monitoring pattern within a slot. For a search space set (SS s), the wireless device may determine that a PDCCH monitoring occasion(s) exists in a slot with number $n_{s,f}^{\mu}$ in a frame with number $n_f$, for example, if $(n_f \cdot N_{slot}^{frame,\mu} + n_{s,f}^{\mu} - o_s)$ mod $k_s = 0$. $N_{slot}^{frame,\mu}$ may indicate a number/quantity of slots in a frame if numerology μ is configured. $o_s$ may indicate a slot offset, for example, indicated in the PDCCH configuration parameters. $k_s$ may indicate a PDCCH monitoring periodicity, for example, indicated in the PDCCH configuration parameters. A wireless device may monitor PDCCH candidates for the search space set for $T_s$ consecutive slots, starting from slot $n_{s,f}^{\mu}$, and may not monitor PDCCH candidates for search space set s for the next $k_s - T_s$ consecutive slots. A USS at CCE aggregation level L∈{1, 2, 4, 8, 16} may be defined by a set of PDCCH candidates for CCE aggregation level L.

A wireless device may determine CCE indexes. A wireless device may determine, for a search space set s associated with CORESET p, CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ as:

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i,$$

where, $Y_{p,n_{s,f}^{\mu}} = 0$ for any CSS; $Y_{p,n_{s,f}^{\mu}} = (A_p \cdot Y_{p,n_{s,f}-1}^{\mu})$ mod D for a USS, $Y_{p,-1} = n_{RNTI} \neq 0$, $A_p = 39827$ for p mod 3=0, $A_p = 39829$ for p mod 3=1, $A_p = 39839$ for p mod 3=2, and D=65537; i=0, . . . , L−1; $N_{CCE,p}$ may indicate the number/quantity of CCEs, numbered from 0 to $N_{CCE,p}-1$, in CORESET p; $n_{CI}$ may indicate the carrier indicator field value, for example, if the wireless device is configured with a carrier indicator field by Cross-CarrierSchedulingConfig for the serving cell on which PDCCH is monitored. Otherwise, including for any CSS, $n_{CI}=0$; $m_{s,n_{CI}}=0, \ldots, M_{s,n_{CI}}^{(L)}-1$, where $M_{s,n_{CI}}^{(L)}$ is the number/quantity of PDCCH candidates the wireless device may be configured to monitor for aggregation level L of a search space set s for a serving cell corresponding to $n_{CI}$; for any CSS, $M_{s,max}^{(L)} = M_{s,0}^{(L)}$; for a USS, M may indicate the maximum of M, ca over all configured $n_{CI}$ values for a CCE aggregation level L of search space set s; and/or the RNTI value used for $n_{RNTI}$ may indicate the C-RNTI.

A wireless device may monitor a set of PDCCH candidates according to one or more configuration parameters. The configuration parameters may be for a search space set comprising a plurality of search spaces (SSs). A wireless device may monitor a set of PDCCH candidates in one or more CORESETs for detecting one of several DCI messages. Monitoring may comprise decoding one or more PDCCH candidates of the set of the PDCCH candidates according to the monitored DCI formats. Monitoring may comprise decoding a DCI content of one or more PDCCH candidates with possible (and/or configured) PDCCH locations, possible (and/or configured) PDCCH formats (e.g., number/quantity of CCEs, number/quantity of PDCCH candidates in common SSs, and/or number/quantity of PDCCH candidates in the UE-specific SSs) and/or possible (and/or configured) DCI formats. The decoding may be referred to as blind decoding.

Figure 26:
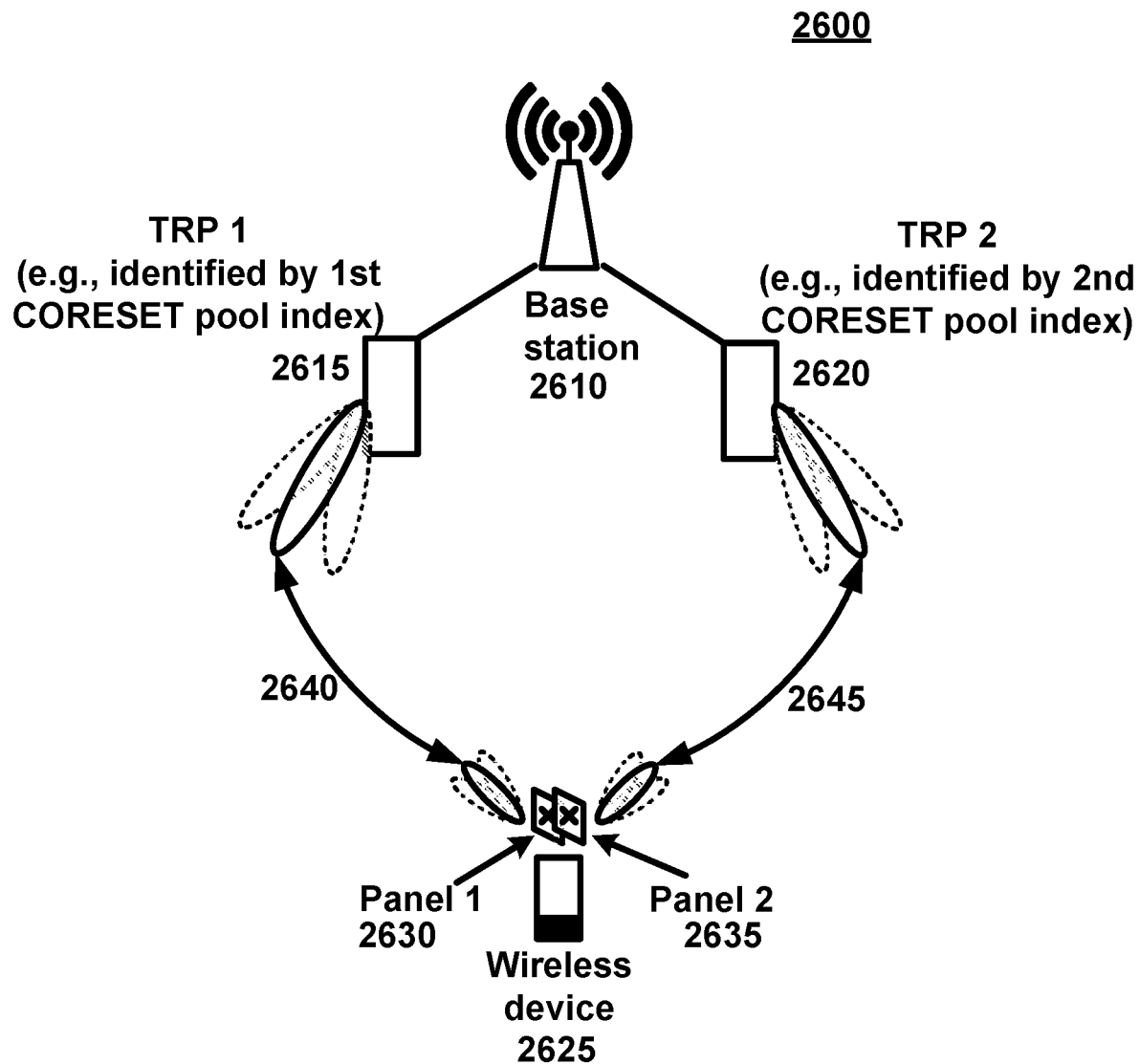
FIG. 26 shows an example of wireless communications using multiple transmission reception points (TRPs) and/or multiple panels.

FIG. 26 shows an example of wireless communication using multiple transmission reception points (TRPs) and/or multiple panels. As used herein, a TRP may refer to any transmitter/receiver device (e.g., at a base station and/or at any other computing device). As used herein, a panel and/or an antenna panel may refer to any transmitter/receiver device (e.g., at a wireless device and/or at any other computing device). A base station 2610 may be equipped with multiple TRPs (e.g., TRP 1 2615 and TRP 2 2620). The TRP 1 may be identified by a first CORESET pool index; and TRP 2 may be identified by a second CORESET pool index. A wireless device 2625 may be equipped with more than one panel (e.g., Panel 1 2630 and Panel 2 2635). Transmission and reception with multiple TRPs and/or multiple panels may improve system throughput and/or transmission robustness for a wireless communication in a high frequency (e.g., above 6 GHz). Shown in FIG. 26, the base station 2610 may be equipped with multiple TRPs 2615 and 2620. The base station 2610 may send/transmit to the wireless device 2625 via TRP 1 2615 or TRP 2 2620 RRC messages comprising configuration parameters of a plurality of CORESETs on a cell (or a BWP of the cell). The wireless device 2625 with multiple panels (e.g., panel 1 2630 and panel 2 2635) resides within a proximity 2640 to TRP1 and a proximity 2645 to TRP 2. Each of the plurality of CORESETs may be identified with a CORESET index and may be associated with (or configured with) a CORESET pool (or group) index. One or more CORESETs, of the plurality of CORESETs, having a same CORESET pool index may indicate that DCIs received on the CORESETs are sent/transmitted from a same TRP of a plurality of TRPs of the base station 2610. The wireless device 2625 may determine receiving beams (or spatial domain filters) for PDCCHs/PDSCHs based on a TCI indication (e.g., DCI) and a CORESET pool index associated with a CORESET for the DCI.

A TRP of multiple TRPs of the base station may be identified/indicated by at least one of: a TRP identifier (ID), a cell index, and/or a reference signal index. A TRP ID of a TRP may comprise a control resource set group (and/or pool) index (e.g., CORESETPoolIndex) of a control resource set group from which DCI is sent/transmitted from the base station on a control resource set. A TRP ID of a TRP may comprise a TRP index indicated in the DCI. A TRP ID of a TRP may comprise a TCI state group index of a TCI state group. A TCI state group may comprise at least one TCI state with which the wireless device receives the downlink TBs, and/or with which the base station sends/transmits the downlink TBs.

A wireless device may receive one or more PDCCHs scheduling fully/partially/non-overlapped PDSCHs in time and frequency domain. The wireless device may receive one or more RRC messages (e.g., PDCCH-Config IE) comprising a first CORESET pool index (e.g., CORESETPoolIndex) value and/or a second CORESET pool index (e.g., in a ControlResourceSet IE). The wireless device may determine the reception of full/partially overlapped PDSCHs in a time domain, for example, if PDCCHs that schedule two PDSCHs are associated with different control resource sets (e.g., ControlResourceSets) comprising different values of a CORESET pool index (e.g., CORESETPoolIndex).

A wireless device may be configured to determine that a control resource set (e.g., ControlResourceSet) is assigned with a coreset pool index (e.g., CORESETPoolIndex) as 0 (or any other value) for a control resource set (e.g., ControlResourceSet) without/lacing a coreset pool index (e.g., CORESETPoolIndex). Scheduling information for receiving a PDSCH transmission may be indicated and/or carried by the corresponding PDCCH, for example, if the wireless device is scheduled with full/partially/non-overlapped PDSCHs in time and frequency domain. A wireless device may be expected to be scheduled with the same active BWP and the same SCS. A wireless device may be scheduled with multiple codewords (e.g., two or any other quantity, such as a maximum quantity of two) simultaneously, for example, if the wireless device is scheduled with full/partially overlapped PDSCHs in time and frequency domain.

A wireless device may be allowed to perform one or more of the following operations, for example, if PDCCH transmission(s) that schedule two PDSCHs are associated with different control resource sets (e.g., ControlResourceSets) having different values of coreset pool indexes (e.g., CORE-SETPoolIndex). For example, for any two HARQ process IDs in a given scheduled cell, the wireless device may be scheduled to receive a PDSCH transmission starting earlier than the end of the first PDSCH transmission with a PDCCH transmission associated with a different value of coreset pool index (e.g., CORESETpoolIndex) that ends later than symbol i, for example, if the wireless device is scheduled to start receiving a first PDSCH transmission starting in symbol j by a PDCCH transmission associated with a value of a coreset pool index (e.g., CORESETpoolIndex) ending in symbol i. The wireless device may receive (e.g., in a given scheduled cell) a first PDSCH transmission in slot i, with the corresponding HARQ-ACK assigned to be sent/transmitted in slot j, and a second PDSCH transmission associated with a value of a coreset pool index (e.g., CORESETpoolIndex) different from that of the first PDSCH transmission starting later than the first PDSCH transmission with its corresponding HARQ-ACK assigned to be sent/transmitted in a slot before slot j.

A wireless device configured by higher layer parameter (e.g., PDCCH-Config) may contain two different values of a coreset pool index (e.g., CORESETPoolIndex) in a control resource set (e.g., ControlResourceSet), for example, if a TCI indication (e.g., tci-PresentInDCI) is enabled (e.g., is set to 'enabled') and/or if the TCI indication (e.g., tci-PresentIn-DCI) is not configured in an RRC connected mode. If A wireless device may assume/determine that DM-RS ports of a PDSCH associated with a value of a coreset pool index (e.g., CORESETPoolIndex) of a serving cell are quasi co-located with the RS(s) with respect to the QCL parameter(s), for example, if the offset between the reception of the DL DCI and the corresponding PDSCH transmission is less than a threshold (e.g., timeDurationForQCL). The QCL parameter(s) may be used for a PDCCH quasi co-location indication of the CORESET associated with a monitored search space with the lowest CORESET-ID among CORESETs. The CORESETs are configured with the same value of a coreset pool index (e.g., CORESETPoolIndex) as the PDCCH transmission scheduling that PDSCH transmission. The PDCCH transmission schedules the PDSCH transmission in the latest slot in which one or more CORESETs associated with the same value of coreset pool index (e.g., CORESETPoolIndex) as the PDCCH transmission scheduling that PDSCH transmission within the active BWP of the serving cell are monitored by the wireless device. The offset between the reception of the DL DCI and the corresponding PDSCH transmission may be less than the threshold (e.g., timeDurationForQCL) and at least one configured TCI states for the serving cell of scheduled PDSCH may contain a QCL type (e.g., 'QCL-TypeD). The wireless device may be configured to determine that the DM-RS ports of PDSCH of a serving cell are quasi co-located with the RS(s) with respect to the QCL parameter(s) associated with the TCI states, for example, if at least one TCI codepoint indicates two TCI states. The TCI states may correspond to the lowest codepoint among the TCI codepoints containing two different TCI states.

A wireless device (e.g., if configured with multiple panels) may determine to activate (or select) at least one of the multiple panels to receive downlink signals/channels sent/transmitted from one of multiple TRPs of a base station. The activation/selection of at least one of the multiple panels may be based on receiving downlink signaling indicating the activation/selection. The activation/selection may be performed (e.g., automatically performed) based on measuring downlink channel qualities of one or more reference signals sent/transmitted from the base station. The wireless device may apply a spatial domain filter to send/transmit from a panel of the multiple panels to one of the multiple TRPs of the base station. The panel and/or the spatial domain filter may be determined based on at least one of: an UL TCI indication of a DCI, a panel ID in the DCI, an SRI indication of a DCI, a CORESET pool index of a CORESET for receiving the DCI, and/or the like.

A wireless device may determine a panel and/or a transmission beam (and/or spatial domain transmission filter) on the panel, for example, if a wireless device receives DCI indicating an uplink grant. The panel may be indicated (e.g., explicitly indicated) by a panel ID comprised in the DCI. The panel may be indicated (e.g., implicitly indicated) by an SRS ID (and/or an SRS group/pool index), a UL TCI pool index of a UL TCI for uplink transmission, and/or a CORESET pool index of a CORESET for receiving the DCI.

A wireless device may use at least one of multiple panels to communicate with a base station. The wireless device may use at least one of multiple panels, for example if using a high frequency/range of frequencies (e.g., above 6 GHz, or any other frequency/frequencies). The wireless device may be required to comply with applicable RF exposure requirements. The RF exposure requirements may comprise one or more maximum permissible exposure (MPE) parameters associated with a frequency and/or a frequency range. The one or more MPE parameters associated with a frequency/frequency range may comprise a maximum (or allowed) electric field strength value (E) in a unit of V/in, a maximum (or allowed) magnetic field strength value (H) in a unit of A/m, a maximum (or allowed) power density value (S) in a unit of mW/cm$^2$, and/or an averaging time value in a unit of minutes. Any other variable, and any other unit of measurement, may be used for the one or more MPE parameters. RF exposure requirement is defined/indicated as an allowed power density averaged over $68/f^{1.05}$ minutes where f is a value of carrier frequency in units of GHz (e.g., in a frequency of FR2). The averaging period may be about 2 minutes for 28 GHz, and/or about 1.45 minutes in 39 GHz. Any averaging period may be used. Any allowed power density average may be used over any duration and/or for any carrier frequency.

Figure 27A:
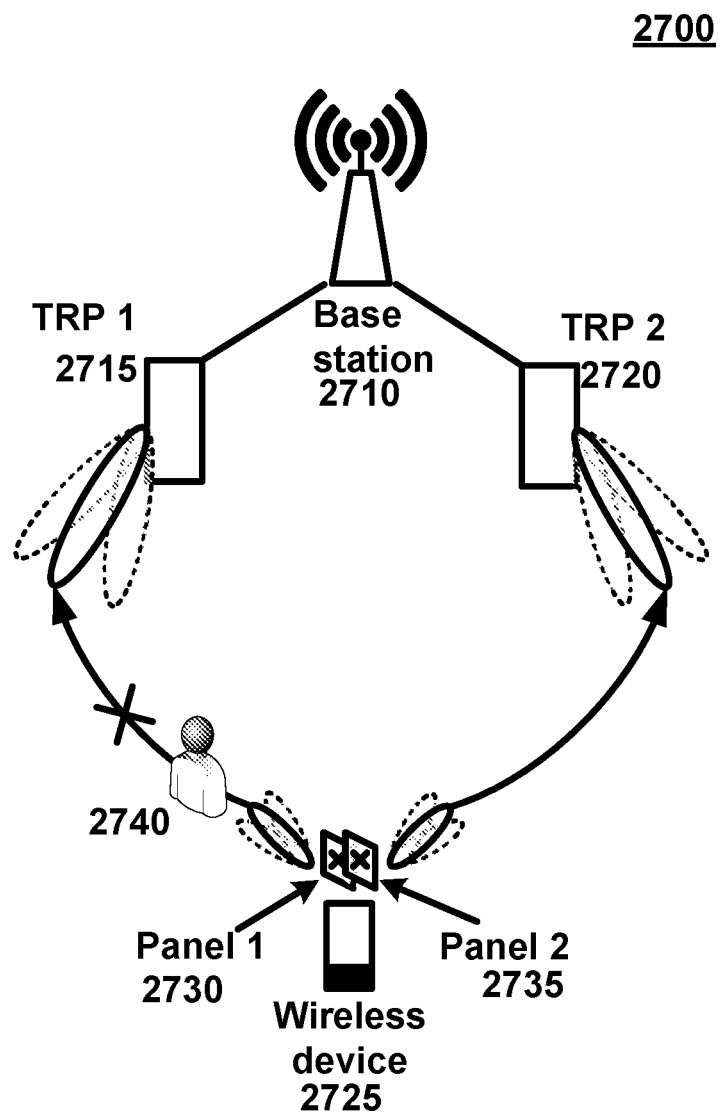
FIG. 27A shows an example of wireless communications using multiple TRPs and/or multiple panels.

FIG. 27A shows an example of wireless communications using multiple TRPs and/or multiple panels (e.g., antennas, antenna panels, etc.). One or more devices (e.g., using TRPs and/or panels) may be configured to detect uplink coverage losses and/or maximum power exposure (MPE) related issues. A wireless communication system 2700 may comprise at least one base station 2710, one or more TRPs (e.g., TRP 1 2715 and TRP 2 2720), and/or at least one wireless device 2725. The wireless device 2725 may comprise one or more panels (e.g., panel 1 2730 and panel 2 2735). The wireless device may determine/detect/sense that there may be a human body (or soft objects, living organism, etc.) 2740 in proximity to (e.g., within a threshold distance and/or in a path of a beam for transmission/reception) a first panel 2730

(e.g., panel 1) of the wireless device 2725. The wireless may determine/detect/sense that there is not a human body 2740 (and/or may not determine/detect/sense the presence of a human body) in proximity to (e.g., within a threshold distance and/or in a path of a beam for transmission/reception) a second panel 2735 (e.g., panel 2) of the wireless device 2725. The wireless device 2725 may determine/detect/sense the proximity of a human body by using one or more sensors (e.g., which may be installed in the wireless device 2725). The wireless device 2725 may determine/detect/sense the proximity of the human body 2740, for example, based on one or more indications of another wireless device or a base station (e.g., the base station 2710). The wireless device 2725 may (e.g., automatically or based on one or more conditions) reduce a transmission power (e.g., a maximum transmission power) via the first panel 2730, for example, in order to comply with one or more RF exposure requirements based on one or more MPE parameters on an operating frequency/frequencies. Reducing a transmission power (e.g., a maximum transmission power) may result in uplink coverage loss. Uplink coverage loss may be particularly undesirable, for example, if the wireless device 2725 is located at or near an edge of a coverage region of the base station 2710 (e.g., at or near a cell edge). The wireless device 2725 may use a second panel 2735 (e.g., panel 2 to send/transmit uplink signals/channels to the base station 2710 (e.g., instead of reducing a transmission power (e.g., a maximum transmission power) via the first panel 2730 for complying with the RF exposure requirement). The wireless device 2725 may use the second panel 2735, for example, if the second panel 2735 is not in a proximity of the human body 2740. Transmission via the second panel 2735 may relax (e.g., reduce a requirement for) a transmission power limitation for compliance of one or more RF exposure requirements. For example, by using the second panel 2735, the wireless device 2725 may be able to send/transmit a message to the base station 2710 (e.g., via TRP 2 2720) without reducing a transmission power (e.g., by using a maximum transmission power). The wireless device 2725 may indicate (e.g., to the base station 2710) that an object (e.g., human body) in proximity to a first active panel (e.g., Panel 1 2730) is detected, and/or that an object (e.g., human body) in proximity to a second panel (e.g., Panel 2 2735) is not detected. The wireless device 2725 may indicate that one or more objects are in proximity to one or more panels (e.g., an active panel, an inactive panel, etc.), for example, in order to avoid uplink coverage loss as a result of a compliance with one or more RF exposure requirements. The base station 2710 may send/transmit a message/command indicating an active panel switching, for example, from the first panel (e.g., Panel 1 2730) to the second panel (e.g., Panel 2 2735). The base station 2710 may send/transmit the message/command, for example, based on (e.g., after or in response to) receiving one or more indications from the wireless device 2725 (e.g., indicating that one or more objects are in proximity to one or more panels associated with the wireless device 2725).

A wireless device, by complying with RF exposure requirements based on proximity detection, may automatically reduce maximum output power for sending/transmitting signals or channels to a base station. The amount of maximum output power reduction, due to complying with the RF exposure requirements, may be referred to as power management maximum power reduction (P-MPR). A wireless device may apply P-MPR$_{f,c}$ for carrier f of serving cell c for various examples. For example, the wireless device may apply P-MPR P-MPR$_{f,c}$ for carrier f of serving cell c to help ensure (and/or increase likelihood of) compliance with applicable electromagnetic power density exposure requirements and/or to address unwanted emissions and/or self-defense requirements, for example, based on simultaneous transmissions on multiple RAT(s) (e.g., for conditions that may or may not be within the scope of one or more 3GPP RAN specifications). the wireless device may apply P-MPR P-MPR$_{f,c}$ for carrier f of serving cell c to help to ensure (and/or increase a likelihood of) compliance with applicable electromagnetic power density exposure requirements, for example, based on proximity detection being used to address requirements that may require a lower maximum output power. P-MPR$_{f,c}$ may be 0 dB, for example, for wireless device conformance testing.

A wireless device may reduce an output power (e.g., a maximum output power) due to modulation orders. A wireless device may send/transmit a bandwidth configuration, a waveform type, and/or one or more allocations (e.g., narrow allocations). The amount of an output power reduction (e.g., a maximum output power reduction), such as due to implementing modulation orders, bandwidth, and/or waveform type, etc., may be referred to as a maximum power reduction (MPR). In the above example, a cause of MPR may be different from a cause of P-MPR.

A wireless device may be signaled by a base station with one or more (e.g., additional) emission requirements. Each emission requirement (and/or each additional emission requirement) may be associated with a unique network signaling (NS) value. The NS value may be indicated in signaling (e.g., RRC signaling) by a frequency band (e.g., an NR frequency band number or any other frequency band indication) of an applicable operating band. The NS value may be indicated in a field (e.g., as an associated value indicated in the field additionalSpectrumEmission). A wireless device may reduce power, for example, to meet/satisfy one or more requirements (e.g., each emission requirement). This reduced power may be referred to as an additional maximum power reduction (A-MPR).

A wireless device may configure a maximum output power (e.g., P$_{CMAX,f,c}$) for a carrier (e.g., carrier f) of a serving cell (e.g., serving cell c). The wireless device may configure the maximum output power, for example, based on one or more of: a P-MPR, a MPR, a A-MPR, a power value of a power class of the wireless device, and/or a maximum Effective Isotropic Radiated Power (EIRP$_{max}$) of the wireless device. P$_{CMAX,f,c}$ may be defined as an output power available to a reference point of a given transmitter branch that corresponds to a reference point of a higher-layer filtered RSRP measurement. A wireless device may set a maximum output power (e.g., P$_{CMAX,f,c}$) for a carrier (e.g., carrier f) of a serving cell (e.g., serving cell c) such that corresponding measured peak EIRP P$_{UMAX,f,c}$ is within the following bounds:

$$P_{Powerclass} - \text{MAX}(\text{MAX}(MPR_{f,c}, A\text{-}MPR_{f,c}) + \Delta MB_{P,n}, P\text{-}MPR_{f,c}) - \text{MAX}\{T(\text{MAX}(MPR_{f,c}, A\text{-}MPR_{f,c})), T(PMPR_{f,c})\} \leq P_{UMAX,f,c} \leq EIRP_{max}.$$

The corresponding measured total radiated power (e.g., P$_{TMAX,f,c}$) may be bounded by P$_{TMAX,f,c} \leq$ TRP$_{max}$. The variable P$_{Powerclass}$ may indicate a power value corresponding to a power class of the wireless device. EIRP$_{max}$ may indicate the applicable maximum EIRP. MPR$_{f,c}$ may indicate the MPR applicable for modulation orders, bandwidth, and/or waveform types related to frequency f on cell c. A-MPR$_{f,c}$ may indicate the additional maximum power reduction indicated by the base station. $\Delta MB_{P,n}$ may indicate a peak EIRP relaxation. $TRP_{max}$ may indicate the maximum total radiated power for the power class of a wireless device.

A wireless device may send/transmit one or more RRC messages indicating a capability parameter (e.g., maxUplinkDutyCycle-FR2 for a UE) to facilitate electromagnetic power density exposure requirements. The wireless device may send/transmit the one or more messages indicating the capability parameter in addition to, for example, a power reduction indication (e.g., MPR, A-MPR and/or P-MPR). A wireless device may follow uplink scheduling and/or apply $P\text{-}MPR_{f,c}$, for example, if the wireless device's capability parameter field (e.g., maxUplinkDutyCycle-FR2) is present and/or if the percentage of uplink symbols sent/transmitted within a time duration (e.g., within any 1 second evaluation period) is larger than a threshold (e.g., maxUplinkDutyCycle-FR2). Compliance of electromagnetic power density exposure requirements may be ensured by scaling down a power density and/or by other operations, for example, if a field for the wireless device's capability parameter (e.g., maxUplinkDutyCycle-FR2) is absent.

Wireless communications may use one or more devices for transmission and/or reception. For example, a wireless device may use one or more antenna panels and/or any other device for transmission and/or reception of wireless communications. A base station may use one or more TRPs and/or any other device for transmission and/or reception of wireless communications. Increasing a quantity of devices for transmission/reception, increasing a quantity of wireless communications transmitted/received, and/or increasing a quantity of power (and/or a quantity of beams used) for transmission/reception may increase a risk of potentially harmful and/or undesirable exposure to radio frequency (RF) electromagnetic fields. One or more safety measures may be implemented and/or required for wireless communication devices, for example, to reduce the quantity/likelihood of potentially harmful and/or undesirable exposure to RF electromagnetic fields. A maximum power exposure (MPE), and/or any other restriction on exposure, may be implemented and/or required (e.g., by the Federal Communications Commission (FCC) and/or any other regulatory or standards organization). Such exposure restriction and/or limitation may be based on one or more of: a frequency range (e.g., in MHz, GHz, etc.), an electric field strength (e.g., in V/m), a magnetic field strength (e.g., in A/m), a power density (e.g., mW/area such as $mW/cm^2$), and/or any combination thereof of wireless transmissions. For example, an MPE requirement may be based on a quantity of millimeter wave (mmWave) radiation exposure to a human (and/or any other living organism) over a duration of time. Transmission power may need to be reduced, for example, if a human is in close proximity (e.g., within a threshold range) of a transmitter/receiver that may otherwise exceed an MPE requirement/limitation (e.g., an antenna panel on a wireless device transmitting a wireless signal via a beam at a level that may exceed an MPE).

Figure 27B:
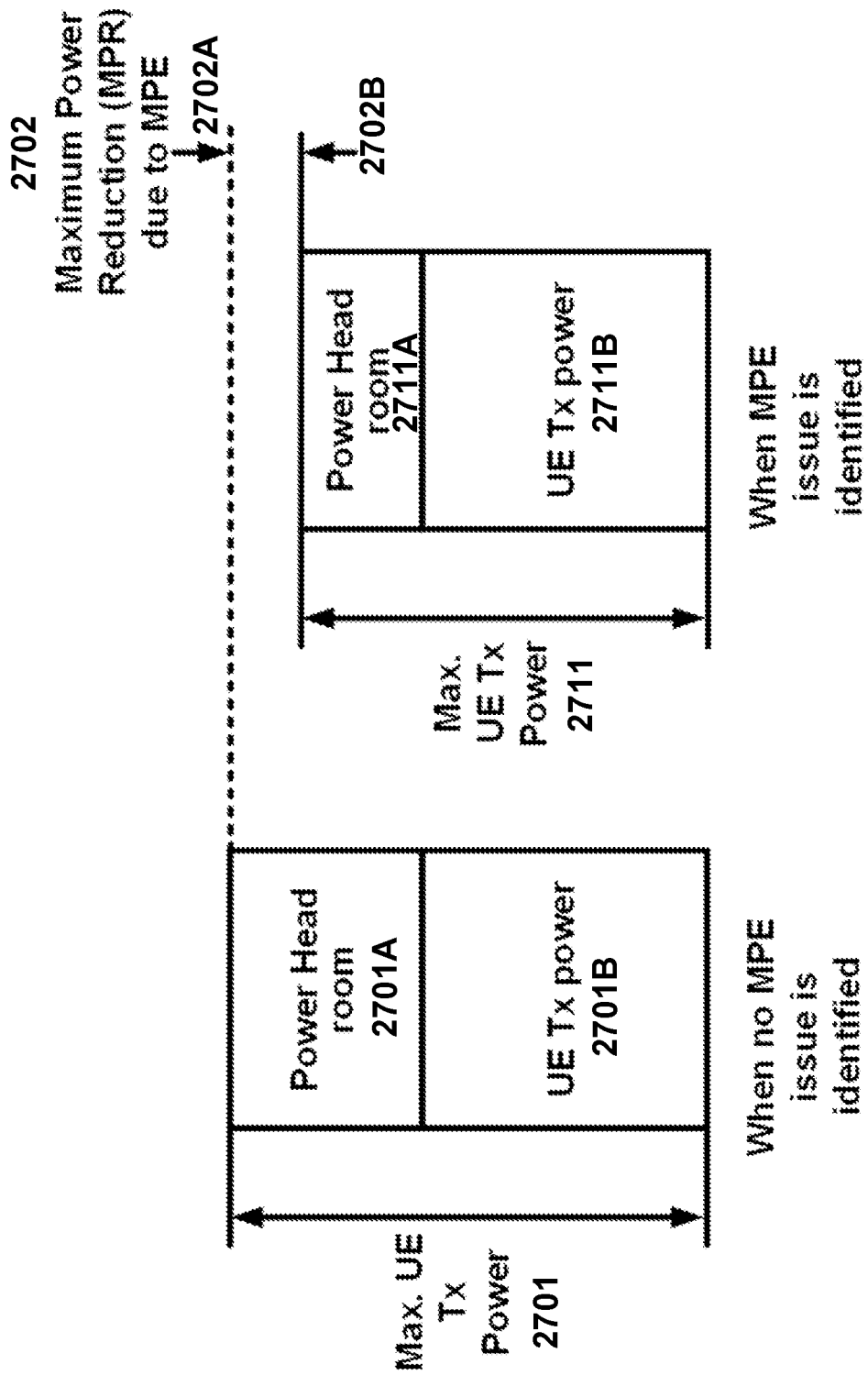
FIG. 27B shows an example of power reduction based on an exposure.

FIG. 27B shows an example of power reduction based on an exposure. A wireless device (and/or any other device such as a base station, an IoT device, a core network device, etc.) may have a maximum transmission power 2701 (e.g., Max. UE Tx Power) for transmissions during which no MPE (or other exposure requirement/limit) is identified. This maximum transmission power may correspond to $P_{CMAX}$ and/or any other indication of a maximum transmission power (e.g., maximum allowable transmission power). Wireless device transmission power may comprise power allocated for a first message (e.g., a data transmission) indicated as 2701B (e.g., UE Tx power) and a residual/residue power (e.g., a difference between a wireless device maximum transmission power and an estimated power for uplink transmission) indicated as 2701A. The wireless device may determine one or more MPE instances, which may lead to a requirement of a reduction of transmission power, such as a maximum power reduction (MPR) 2702 due to the one or more MPE instances. The MPR 2702 may comprise a reduction of transmission power from a first level 2702A (e.g., at or near the maximum transmission power 2701) down to a second level 2702B. The residual (or residue) power 2711A (e.g., a difference between a reduced maximum transmission power 2702B and the estimated power for uplink transmission transmission) 2711B may be reduced due to the MPE detection. The wireless device may be required to reduce transmission power by a quantity of the MPR 2702 based on an MPE indication, for example, down to a maximum transmission power 2711 (e.g., Max. UE Tx Power) that may be less than the maximum transmission power 2701 for transmissions during which no MPE is identified/indicated. Power reduction based on an exposure indication, and/or reporting on exposure, may result in decreased performance of a wireless device (and/or any other device such as a base station, an IoT device, a core network device, etc.). One or more messages may not be successfully transmitted/received, for example, based on a power reduction. A wireless device configured with multiple antenna panels (or any other type of multiple transmission/reception device) may trigger switching to/from another panel (or another transmission/reception device), which may lead to increased latency, increased power consumption by the wireless device, and/or increased interference with other wireless transmissions (e.g., by other wireless devices). A wireless device may increase power consumption, for example, based on requirements for exposure reporting (e.g., additional messages for reporting exposure indications).

A P-MPR may be greater than an MPR or an A-MPR, for example, in a high frequency condition. Reducing maximum output power by P-MPR to comply with RF exposure requirements may decrease uplink coverage. Reducing maximum output power for uplink transmission may not impact downlink coverage. A mismatch of downlink coverage and uplink coverage may occur, for example, due to complying with one or more MPE requirements. An uplink coverage loss based on complying with MPE requirement may be generally referred to as an MPE related issue. At least some wireless devices may be configured to switch (e.g., automatically switch) from a first panel to a second panel, for example, to avoid reducing maximum output power based on an MPE detection (e.g., if the wireless device senses that a human body is (or soft object(s) are) within a proximity of a first panel of the wireless device). The wireless device may send/transmit, to a base station, a per beam and/or a per panel power head room (PHR) MAC CE report for facilitating the base station's handling of an MPE related issue. The base station may send, to the wireless device, an indication/command to switch from a first panel to a second panel, for example, based on a per-beam and/or a per-panel PHR report. The wireless device may send to a base station an indication of an uplink coverage problem on a first panel, for example, due to an MPE related issue. The wireless device may send an indication to a base station that a second panel is better than the first panel (e.g., in terms of applicable power reduction). At least some wireless devices may prematurely switch back and forth between a first panel and a second panel, for example, due to a dynamic presence of a human body in an area (e.g., within a threshold proximity of a panel of the wireless device). Such wireless devices may increase a processing time for responding to and/or addressing a presence (e.g., a dynamic presence) of a human body in an area (e.g., within a threshold proximity of a panel of the wireless device) which may result in a loss of uplink coverage. Such wireless devices may unnecessarily and/or frequently report, to a base station, an MPE related issue, which may increase signaling overhead and/or increase power consumption by the wireless device.

As described herein, improvements may be achieved, for example, by implementing one or more safety measures (e.g., MPE reporting, application of MPR, etc.) while minimizing unnecessary reporting (e.g., MPE reporting) and/or other operations associated with the safety measure(s) (e.g., MPR power reduction). A time window may be used to detect a quantity of exposure instances (e.g., MPE indications). The quantity may be compared with a threshold, for example, to determine whether one or more safety measures must be implemented (e.g., MPE reporting, application of MPR, etc.). A base station may send, to the wireless device, a message (e.g., an RRC message) comprising one or more indications (e.g., configuration parameters) of the time window and/or the threshold. A message may be sent (e.g., MPE report) indicating exposure, for example, based on a quantity of exposure events during the time window satisfying a threshold (e.g., a quantity of MPE exposure indications greater than a threshold during the time window), such that unnecessary reporting and/or other operations may be reduced and safety measure(s) may be satisfied. Based on (e.g., after or in response to) detection of one or more exposures (e.g., MPE(s)), a wireless device may send/transmit, to the base station, an exposure indication (e.g., MPE report) in a transmission comprising one or more of: a preamble (e.g., via a RACH resource associated with an MPE report for a particular antenna panel), a scheduling request (e.g., via a PUCCH resource associated with an MPE report for a particular antenna panel), a sounding reference signal (e.g., via a dedicated SRS associated with an MPE report for a particular panel), and/or any other message (e.g., via a PUCCH).

A wireless device may be configured to comply with one or more MPE requirements. The wireless device may comply with the one or more MPE requirements while maintaining reliable coverage (e.g., for uplink and/or downlink). The wireless device may be comprise one or more panels (e.g., antenna panels, antennas, etc.) for transmission and/or reception via wireless communications. A base station may configure/determine one or more MPE detection windows (and/or an MPE detection timer) for one or more wireless devices. The base station may configure/determine one or more thresholds for MPE detection. The base station may send, to the wireless device, one or more messages comprising one or more indications indicating the one or more MPE detection windows and/or the one or more thresholds. The wireless device may determine one or more MPE detection windows and/or one or more thresholds (e.g., for detection of an MPE occurrence). The wireless device may trigger an uplink coverage recovery signal transmission, for example, based on (e.g., after or in response to) at least one of: detecting a number/quantity of MPE instances within an MPE detection window, an MPE detection timer is running and/or not expired, and/or the number/quantity of detections of MPE instances during the MPE detection window satisfies (e.g., is greater than or equal to) a threshold. The wireless device may detect an MPE instance, for example, based on P-MPR values of one or more panels, duty cycles of the one or more panels, and/or a combined value of P-MPR and RSRP of each of one or more panels. A wireless communication system may comprise a base station using a dedicated RACH resource for an uplink coverage recovery and a wireless device triggering a RACH procedure via the dedicated RACH resource. The wireless device may trigger/initiate a RACH procedure, for example, based on detecting a number/quantity of MPE instances (e.g., satisfying a threshold). The base station may configure a dedicated SR resource for an uplink coverage recovery. The wireless device may trigger/send an SR via the dedicated SR resource, for example, based on (e.g., after or in response to) detecting a number/quantity of MPE instances (e.g., satisfying a threshold). The base station may be configure a dedicated SRS for an uplink coverage recovery. The wireless device may trigger/send a transmission of the dedicated SRS, for example, based on (e.g., after or in response to) detecting a number/quantity of MPE instances (e.g., satisfying a threshold). A wireless device may trigger/send a transmission of an RRC message (e.g., a UE assistance message). The assistance message may indicate that an uplink coverage loss is occurring (or has occurred) on a first panel of multiple panels of the wireless device. The message may be based on (e.g., sent after or in response to) the wireless device detecting a number/quantity of MPE instances on the first panel (e.g., satisfying a threshold). The base station may send/configure a dedicated configured grant for an uplink coverage recovery (and/or uplink coverage loss mitigation). The wireless device may send/transmit an uplink TB with transmission repetitions via the dedicated configured grant and/or with a transmission power reduction that may be based on (e.g., sent after or in response to) detecting a number/quantity of MPE instances (e.g., satisfying a threshold). As described herein, uplink coverage may be improved, for example, based on MPE detection and/or reporting (e.g., due to the dynamic presence of a human body in the proximity of a wireless device).

Figure 28:
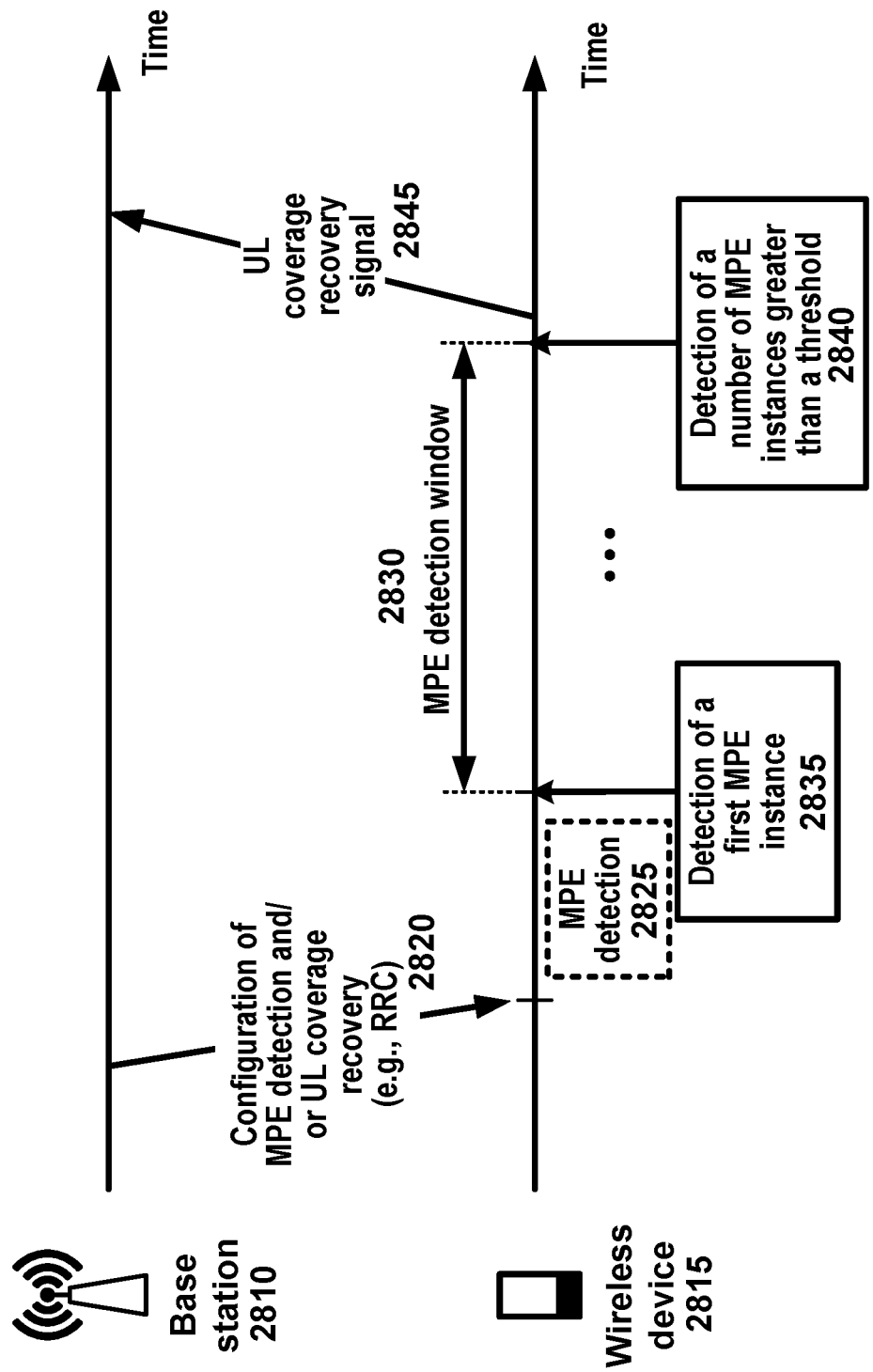
FIG. 28 shows an example method for exposure detection and/or reporting.

FIG. 28 shows an example method for exposure detection and/or reporting. The method may comprise coverage loss mitigation. The method may improve MPE detection and/or reporting. A base station 2810 may send/transmit, to a wireless device 2815, one or more messages 2820 (e.g., one or more RRC messages) comprising configuration parameters. The configuration parameters may be for MPE detection 2825 and/or uplink coverage recovery, and/or uplink coverage loss mitigation. The configuration parameters may comprise one or more of: a length (e.g., time duration) of MPE detection (or measurement) window 2830, and/or a threshold (e.g., for triggering an uplink coverage recovery signal transmission). The length of MPE detection window 2830 may be in units of milliseconds, seconds, or minutes; in units of mini-slots, slots or frames; or in any other period (e.g., any quantity of time duration). A threshold may be a number/quantity being equal to or greater than 1 (or any other number/quantity). The configuration parameters of the uplink coverage recovery (and/or of the uplink coverage loss mitigation) may be implemented based on examples of FIG. 31, FIG. 32 and/or FIG. 33, described herein. The wireless device 2815 may start detecting a first MPE instance 2835 based on the configuration parameters associated with one or more MPE detection. An MPE instance may be detected based on one or more examples of FIG. 29, described herein. As referred to herein, an MPE instance may comprise any exposure detection. An exposure detection may comprise, for example, a permissible exposure detection (e.g., an exposure detection less than a threshold value in measurement and/or time duration), an impermissible exposure detection (e.g., an exposure detection greater than a threshold value in measurement and/or time duration), and/or any combination thereof. The MPE detection window 2830 may be configured, predefined, and/or preconfigured with a fixed window size (and/or with a variable window size based on one or more conditions). The width of the detection window 2830 may be defined/indicated by the detection of a first MPE instance 2835 and/or detection of a number/quantity of MPE instances greater than a threshold 2840. A threshold for triggering an uplink coverage recovery signal transmission 2845 may be configured, predefined, and/or preconfigured with a fixed value (and/or with a variable value based on one or more conditions). The value may be one, or any number/quantity greater than one. The one or more configuration messages 2820 may comprise configuration parameters for the uplink coverage recovery signal 2845.

A wireless device may detect a first MPE instance. The wireless device may start an MPE detection window, for example, based on (e.g., after or in response to) detecting the first MPE instance. The wireless device may not start the MPE detection window, for example, based on (e.g., after or in response to) not detecting a first MPE instance. The wireless device may detect a number/quantity of MPE instances within/during the MPE detection window. The number/quantity of MPE instances may be contiguous. Contiguous MPE instances may be defined/indicated as MPE instances occurring in contiguous measurement (and/or detection) intervals. A contiguous MPE instance may occur at a fixed time interval, for example, a fixed time interval after a previous MPE instance. For example, a third contiguous MPE instance may occur at a same time interval after a second contiguous MPE instance relative to a time interval of the second contiguous MPE instance occurring after a first contiguous MPE instance. Contiguous MPE instances may occur during a time interval that is shorter than non-contiguous MPE instances. A time window/interval for contiguous MPE instances may be any duration, such as 100 seconds, during which contiguous MPE instances may be detected at periodic portion thereof, such as every 1 second (or any other duration) of a 100 second time window/interval. Detecting contiguous MPE instances may indicate a constant presence of a human body in proximity (e.g., within a threshold distance/area) of the wireless device. The wireless device may trigger a transmission of the uplink coverage recovery signal, for example, based on (e.g., after or in response to) detecting a number/quantity of MPE instances within/during the MPE detection window and/or based on the number/quantity satisfying (e.g., being greater than) a threshold. The uplink coverage recovery signal may be implemented based on examples of FIG. 31, FIG. 33 and/or FIG. 34, described herein.

A wireless device may detect sporadic MPE instances, for example, if a human body moves within the proximity of the wireless device. Detecting sporadic MPE instances may not necessarily cause an uplink coverage loss based on an MPE requirement (e.g., due to complying with MPE requirement). By defining a threshold and/or an evaluation window, the wireless device may avoid unnecessarily triggering an uplink coverage recovery process. By implementing and/or utilizing a threshold and/or an evaluation window, the wireless device may achieve advantages such as improved power consumption efficiency, enhanced uplink throughput, and/or decreased uplink transmission latency.

FIG. 29 shows examples of exposure instance detection for wireless communications. Exposure instance detection may be for a wireless device using multiple TRPs and/or multiple panels for communication with a base station. A table 2900 shows examples of maximum power exposure (MPE) instance detections for a wireless communication for a wireless device 2910 using multiple panels (e.g., antenna panels, antennas, transmission/reception devices, etc.) comprising a first panel 2915 and at least a second panel 2910. While examples are shown in the table 2900, MPE instances and corresponding threshold conditions(s) may be used other than those shown in the table 2900. The first panel 2915 and/or the second panel 2920 may be activated. The wireless device 2910 may send/transmit uplink signals via the first panel 2915 during a first time period, for example, if the first panel 2915 is activated. The wireless device 2910 may send/transmit uplink signals via the second panel 2920 during a second time period, for example, if the second panel is activated. The wireless device 2910 may detect an MPE instance based on measurements of the first panel 2915 and/or the second panel 2920. Table 2900 shows multiple examples of MPE instance conditions that may be detected (e.g., 2901A, 2902A, 2903A, and 2904A), and corresponding threshold conditions for detection by the wireless device 2910 (e.g., 2901B, 2902B, 2903B, and 2904B). The elements of Table 2900 are based on an uplink duty cycle of a cell. The uplink duty cycle of a cell may be defined/indicated as a percentage or quantity of uplink symbols sent/transmitted via the cell within/during an evaluation period (e.g., a millisecond, a second, or any other time duration or period). The uplink duty cycle may be evaluated per panel, for example, if the wireless device 2910 switches an uplink transmission between the first panel 2915 and the second panel 2920. A first uplink duty cycle of the first panel may be defined/indicated as percentage or quantity of uplink symbols sent/transmitted via the first panel within/during an evaluation period. A second uplink duty cycle of the second panel 2920 may be defined/indicated as a percentage or quantity of uplink symbols sent/transmitted via the second panel within/during the evaluation period.

The wireless device 2910 may detect an MPE instance based on a first uplink duty cycle of the first panel 2915 and a second uplink duty cycle of the second panel 2920 (e.g., 2901A). An MPE instance (e.g., 2901A) may be detected and/or resolved efficiently, for example, if the following threshold conditions occur (e.g., 2901B): the first uplink duty cycle evaluated on the first panel 2915 is greater than a threshold, and/or the second uplink duty cycle evaluated on the second panel 2920 is less than the threshold.

A wireless device may determine whether to apply a P-MPR value based on a joint evaluation of a first uplink duty cycle of a first panel and a second uplink duty cycle of at least a second panel. The wireless device 2910 may detect an MPE instance, for example, based on a first P-MPR of the first panel 2915 and a second P-MPR of the second panel 2920 (e.g., 2902A). An MPE instance may be detected and/or resolved efficiently, for example, if the following threshold conditions occur (e.g., 2902B): the P-MPR via the first panel 2915 is greater than a threshold, and/or the P-MPR via the second panel 2920 is less than the threshold (e.g., 2902B). The first uplink duty cycle and the second uplink duty cycle may be evaluated in a same evaluation period. The wireless device 2910 may determine to apply the P-MPR value based on a summation of the first uplink duty cycle and the second uplink duty cycle being greater than a threshold (e.g., maxUplinkDutyCycle-PC2-FR1, maxUplinkDutyCycle-FR2, and the like). The wireless device 2910 may determine to apply the P-MPR value based on one of the first uplink duty cycle and the second uplink duty cycle being greater than the threshold. The wireless device 2910 may apply the P-MPR based on at least one of: the first uplink duty cycle, the second uplink duty cycle, a greatest of the first uplink duty cycle and the second uplink duty cycle, and/or a least of the first uplink duty cycle and the second uplink duty cycle. The wireless device 2910 may apply the P-MBP based on at least one or more conditions provided by configuration information (e.g., one or more RRC messages, DCI, MAC CE, etc.), and/or the one or more conditions may be predefined (e.g., preconfigured in the wireless device 2910).

The wireless device 2910 may detect an MPE instance based on (e.g., after or in response to) determining that a first uplink duty cycle evaluated on the first panel 2915 (e.g., within/during an evaluation period) is greater than a threshold and/or based on determining that a second uplink duty cycle evaluated on at least a second panel 2920 (e.g., within/during the evaluation period) is less than the threshold. The threshold may be a parameter determined based on a capability parameter associated with the wireless device 2910. The wireless device 2910 may send/transmit to a base station one or more capability messages (e.g., UECapabilityInformation IE) comprising the threshold. The wireless device 2910 may send/transmit the one or more capability messages (e.g., RRC message(s)), for example, based on (e.g., after or in response to) receiving, from the base station, one or more messages (e.g., RRC message(s)) indicating a capability enquiry (e.g., UECapabilityEnquiry IE). The threshold may be indicated by a duty cycle parameter (e.g., maxUplinkDutyCycle in UECapabilityInformation). The duty cycle parameter (e.g., maxUplinkDutyCycle) may indicate a percentage or quantity (e.g., maximum percentage or quantity) of symbols during an evaluation period (e.g., 1 second or any other duration) that may be scheduled for uplink transmission, for example, which may help to ensure compliance with applicable electromagnetic power density exposure requirements (e.g., provided by one or more regulatory bodies, standards organizations, etc.). The wireless device 2910 may determine that an uplink coverage loss may occur on the first panel 2915, for example, if the first uplink duty cycle of the first panel 2915 is greater than the threshold. The uplink coverage loss may result from the application of P-MPR on the first panel 2915 (e.g., based on proximity detection near, or in the direction of, the first panel). The wireless device 2910 may determine there is a lower probability that an uplink coverage loss may occur on the second panel 2920 than on the first panel 2915, for example, if the second uplink duty cycle of the second panel 2920 is less than the threshold. The wireless device may detect (or declare) an MPE instance, for example, based on (e.g., after or in response to) the first uplink duty cycle evaluated on the first panel 2915 being greater than the threshold and/or the second uplink duty cycle evaluated on the second panel 2920 (e.g., within/during the evaluation period) being less than the threshold.

A wireless device may detect/determine an MPE instance based on a first P-MPR of a first panel and a second P-MPR of at least a second panel. The wireless device 2910 may determine a P-MPR based on at least one of two requirements: compliance with applicable electromagnetic power density exposure requirements and/or addressing unwanted emissions/self-defense requirements based on simultaneous transmissions on multiple RAT(s) (e.g., for conditions that may be beyond the scope of 3GPP RAN specifications or other requirements); and/or compliance with applicable electromagnetic power density exposure requirements based on proximity detection used to address one or more requirements that require a lower maximum output power. The wireless device 2910 may determine a first value of a first P-MPR of the first panel 2915 based on the two requirements applying to the first panel 2915, for example, if the wireless device 2910 determines a transmission via the first panel 2915. The wireless device 2910 may determine a second value of a second P-MPR of the second panel 2920, for example, based on the two requirements applying to the second panel 2920, for example, if the wireless device 2910 determines a transmission via the second panel 2920. The wireless device 2910 may detect (and/or declare/indicate) an MPE instance based on (e.g., after or in response to) the first P-MPR of the first panel 2915 being greater than a threshold and/or the second P-MPR of the second panel 2920 being less than the threshold. The threshold may be a power reduction value that may be determined based on a wireless device capability.

A wireless device may send/transmit, to a base station, one or more wireless device capability messages (e.g., UECapabilityInformation IE, RRC message(s), etc.) comprising a threshold (e.g., associated with one or more MPE instances). The wireless device may send/transmit the capability via one or more messages (e.g., RRC message(s)), for example, based on (e.g., after or in response to) receiving from the base station a capability enquiry/request (e.g., UECapabilityEnquiry IE). The threshold may indicate a P-MPR value. The wireless device may determine it is possible that an uplink coverage loss may occur on a panel (e.g., due to compliance with one or more MPE requirements based on proximity detection), for example, if the applied P-MPR value is greater than the threshold. The wireless device may determine it is not possible that an uplink coverage loss may have occurred on a panel, for example, if the applied P-MPR value is less than the threshold.

A wireless device may determine that an uplink coverage loss may occur on a first panel, and/or may not occur on a second panel, for example, if the wireless device determines that the first P-MPR of the first panel is greater than a threshold and/or if the wireless device determines that the second P-MPR of the second panel is less than a threshold. The wireless device may detect an MPE instance based on a comparison between the first P-MPR of the first panel and the second P-MPR of the second panel. The wireless device may determine that an uplink coverage loss may be more likely to occur on the first panel than on the second panel, for example, if the wireless device determines that the first P-MPR of the first panel is higher than the second P-MPR of the second panel. The wireless device may trigger/initiate a transmission of an uplink coverage recovery signal (e.g., based on examples described with respect to FIG. 31, FIG. 32 and/or FIG. 33), for example, if the wireless device detects a number/quantity of MPE instances occurring on the first panel or on the second panel (e.g., within a detection window, such as described with respect to FIG. 28).

The wireless device 2910 may detect an MPE instance based on change of a first P-MPR of the first panel and change of a second P-MPR of the second panel (e.g., 2903A). The change of P-MPR may be determined on a per-panel basis. The wireless device 2910 may determine a change of a P-MPR of a panel based on comparison between a P-MPR determined for a latest (or current) uplink transmission and a P-MPR determined for a previous uplink transmission (e.g., before/preceding the latest uplink transmission). The wireless device 2910 may detect an MPE instance based on (e.g., after or in response to) a change of the first P-MPR value being greater than a threshold and/or change of the second P-MPR value being less than the threshold (e.g., 2903B). The threshold may be a power reduction value that may be determined based on a wireless device capability.

The wireless device may send/transmit to the base station one or more wireless device capability messages (e.g., UECapabilityInformation IE, RRC message(s), etc.) comprising a threshold (e.g., associated with an MPE instance). The wireless device may send/transmit the capability messages based on (e.g., after or in response to) receiving, from a base station, one or more messages (e.g., RRC message(s)) indicating a request for a capability (e.g., UECapabilityEnquiry IE). The threshold may indicate a P-MPR change value. The wireless device may determine it is possible that an uplink coverage loss may occur on a panel (e.g., due to compliance with MPE requirements based on proximity detection), for example, if the P-MPR change applied by the wireless device is greater than the threshold). The wireless device may determine it is not possible that an uplink coverage loss may occur on a panel (e.g., due to compliance with MPE requirements based on proximity detection), for example, if the P-MPR change applied by the wireless device is less than the threshold.

The wireless device may detect an MPE instance based on a comparison between a first change of a first P-MPR of a first panel and a second change of a second P-MPR of a second panel. The wireless device may determine that an uplink coverage loss may occur more likely on a first panel than on a second panel, for example, if the wireless device determines that the first change of the first P-MPR of the first panel is greater than the second change of the second P-MPR of the second panel. The wireless device may trigger/initiate a transmission of an uplink coverage recovery signal (e.g., based on examples described with respect to FIG. 31, FIG. 32 and/or FIG. 33), for example, if the wireless device detects/determines a number/quantity of MPE instances occurring on the first panel or on the second panel (e.g., within a detection window such as described with respect to FIG. 28).

The wireless device 2910 may detect/determine an MPE instance based on a first P-MPR and a first RSRP of the first panel 2915, and a second P-MPR and a second RSRP of the second panel 2920 (e.g., 2904A). A P-MPR may be determined based on one or more examples described herein. The RSRP may be defined/indicated as a linear average over power contributions of resource elements of the antenna port(s) that carry reference signals (e.g., SSB and/or CSI-RSs) configured for RSRP measurements within a measurement frequency bandwidth in configured reference signals occasions. A first frequency range (e.g., FR 1) reference point for the RSRP may be the antenna connector of the wireless device 2910. RSRP for a second frequency range (e.g., FR 2) may be measured based on a combined signal from antenna elements corresponding to a receiver branch (e.g., an indicated receiver branch). A first RSRP of the first panel 2915 may be measured on received RSs via the first panel 2915. A second RSRP of the second panel 2920 may be measured on received RSs via the second panel 2920. The first RSRP may be same as, or different from, the second RSRP. The wireless device 2910 may detect an MPE instance based on a combined value of a first P-MPR and a first RSRP of the first panel 2915 being less than a threshold, and/or a combined value of a second P-MPR and a second RSRP of the second panel 2920 being greater than the threshold (e.g., 2904B). A combined value of a RSRP and a P-MPR may be determined as the value of the RSRP minus the value of the P-MPR (e.g., if the value of the P-MPR is equal to or greater than 0). The threshold may be determined based on a wireless device capability.

A wireless device may send/transmit to the base station one or more wireless device capability messages (e.g., UECapabilityInformation IE, RRC message(s), etc.) comprising a threshold. The wireless device may send/transmit the capability messages based on (e.g., after or in response to) receiving, from a base station, one or more messages (e.g., RRC message(s)) indicating a request for capability (e.g., UECapabilityEnquiry IE). The threshold may indicate a combined RSRP and P-MPR value. The wireless device may determine it is possible that an uplink coverage loss may occur on a panel (e.g., due to compliance with MPE requirements based on proximity detection), for example, if a combined value of measured RSRP value and applicated P-MPR value on a panel is less than threshold. The wireless device may determine it is not possible that an uplink coverage loss may occur on a panel, for example, if a combined value of measured RSRP value and applicated P-MPR value on a panel is greater than threshold.

A wireless device may detect an MPE instance based on comparison between a first combined value of a first P-MPR and a first RSRP of a first panel, and a second combined value of a second P-MPR and a second RSRP of the second panel. The wireless device may determine that an uplink coverage loss may occur more likely on the first panel than on the second panel, for example, if the wireless device determines that the first combined value of the first panel is less than the second combined value of the second panel. The wireless device may trigger/initiate a transmission of an uplink coverage recovery signal (e.g., based on examples described with respect to FIG. 31, FIG. 32 and/or FIG. 33), for example, if the wireless device detects/determines a number/quantity of MPE instances occurring on the first panel or on the second panel (e.g., within a detection window such as described with respect to FIG. 28).

The one or more examples described with respect to FIG. 29 may be combined for detecting an MPE instance. A wireless device may detect an MPE instance based on a joint evaluation of one or more of uplink duty cycles, P-MPR, and/or RSRP on a panel. A wireless device may detect an MPE instance based on at least one of: a first uplink duty cycle of a first panel being greater than a first threshold and/or a first P-MPR of a first panel being greater than a second threshold, and/or a second uplink duty cycle of a second panel being less than the first threshold and/or a second P-MPR of the second panel being less than the second threshold. A wireless device may detect an MPE instance based on at least one of: a first uplink duty cycle of a first panel being greater than a first threshold and/or a combined value of a first P-MPR and a first RSRP of the first panel being greater than a second threshold; and/or a second uplink duty cycle of a second panel being less than the first threshold and/or a combined value of a second P-MPR and a second RSRP of the second panel being less than the second threshold.

Figure 30:
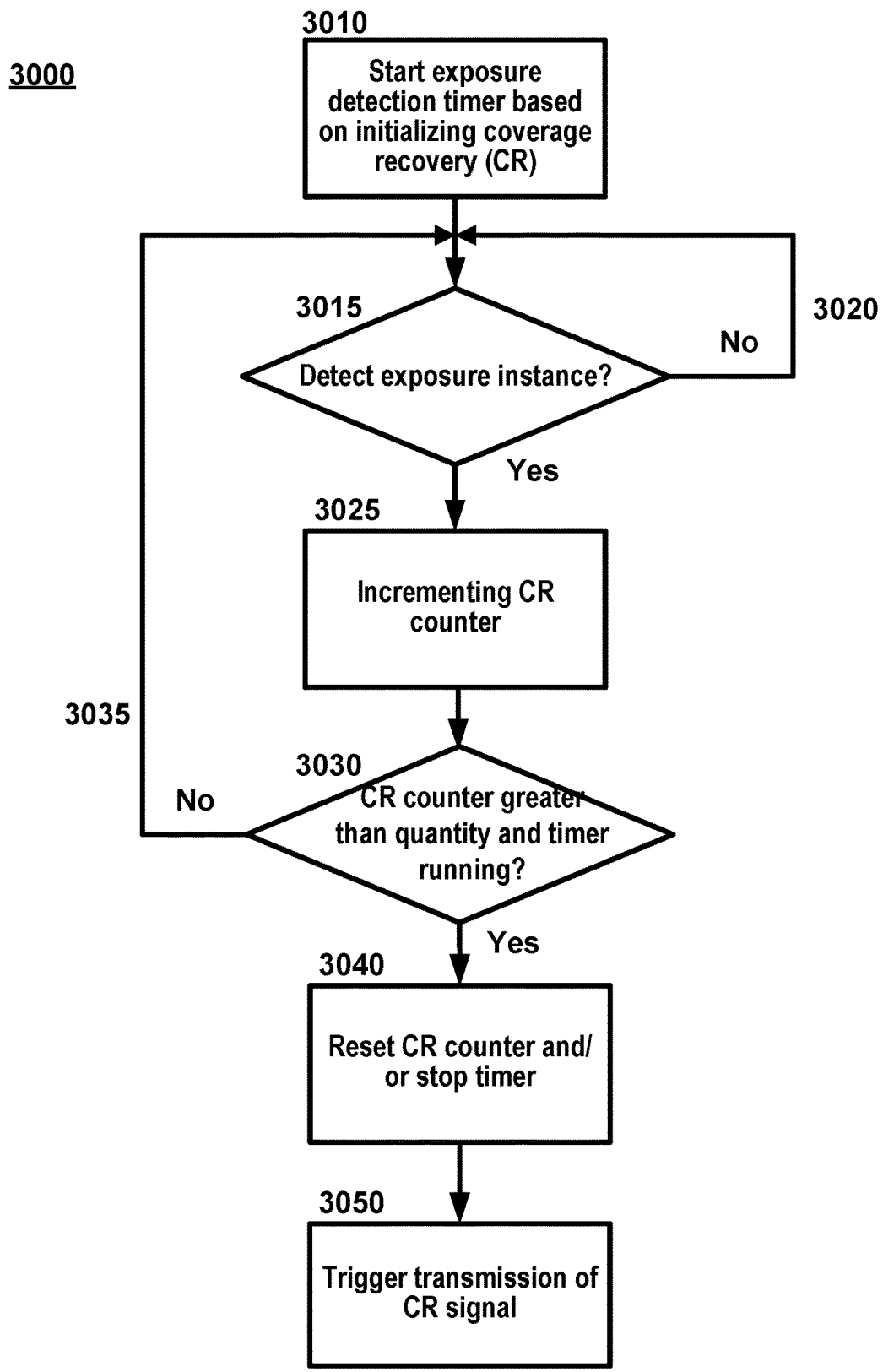
FIG. 30 shows an example method for coverage recovery and/or coverage loss mitigation.

FIG. 30 shows an example method for coverage recovery and/or coverage loss mitigation. A method 3000 may comprise uplink coverage recovery and/or coverage loss mitigation. At step 3010, a wireless device may start a detection timer (e.g., an MPE detection timer) based on initializing a coverage recovery. At step 3015, the wireless device may determine whether an exposure instance (e.g., an MPE instance) has been detected. If no exposure instance is detected (e.g., step 3020), then the wireless device may repeat step 3015. At step 3025, the wireless device may increment a coverage recovery counter. At step 3030, the wireless device may determine whether the CR counter is greater than a quantity and/or whether the CR timer is running. The quantity may be preset, prestored, and/or provided in one or more configuration parameters received from a base station or another wireless device. If the CR counter is not greater than the quantity (e.g., step 3035), the wireless device may repeat step 3015 to determine whether an exposure instance has been detected. At step 3040, the wireless device may reset the CR counter and/or stop the detection timer. At step 3050, the wireless device may trigger/initiate/send a transmission of a CR signal. The CR signal may be associated with a reporting of one or more MPE indication(s).

A base station may send/transmit, to a wireless device, one or more messages (e.g., RRC messages) comprising configuration parameters for uplink coverage recovery. The configuration parameters may comprise a timer value for an MPE detection timer and/or a number/quantity for triggering an uplink coverage recovery signal transmission. The wireless device may start the MPE detection timer with the timer value. The wireless device may start the MPE detection timer based on detecting a first MPE instance. The wireless device may set an MPE detection counter to a first value (e.g., 0 or 1) based on detecting the first MPE instance. The wireless device may detect the first MPE instance based on one or more conditions s (e.g., such as described with respect to FIG. 29). The MPE detection timer and/or the number/quantity may be separately and/or independently configured from a BFR timer and/or a number/quantity for triggering a BFR procedure.

A wireless device may determine whether a second MPE instance is detected. Based on whether a second MPE instance is detected, the wireless device may increment the MPE detection counter by a value (e.g., 1 or any other value). The wireless device may continue detecting MPE instances at a next measurement period, for example, if the second MPE instance is not detected. The wireless device may not increment the MPE detection counter, for example, if the second MPE instance is not detected. The wireless device may determine whether the MPE detection counter is equal to or greater than the number/quantity (e.g., which may be configured by one or more RRC messages), for example, if the MPE detection timer is running and based on detecting the second MPE instance. The wireless device may continue detecting one or more MPE instances at a next measurement period (e.g., based on the examples described with respect to FIG. 29) for example, if the MPE detection counter is not equal to or greater than the number/quantity and/or if the MPE detection timer is running. The wireless device may continue detecting MPE instances at a next measurement period (e.g., based on the examples described with respect to FIG. 29) and/or reset the MPE detection timer and/or the MPE detection counter, for example, if the MPE detection counter is not equal to or greater than the number/quantity and/or if the MPE detection timer expires. The wireless device may trigger/initiate/send an uplink coverage recovery signal transmission, for example, if the MPE detection counter is equal to or greater than the number/quantity and/or if the MPE detection timer is running. The uplink coverage recovery signal transmission may be implemented based on the examples described with respect to FIGS. 31, 32 and/or FIG. 33.

Figure 31:
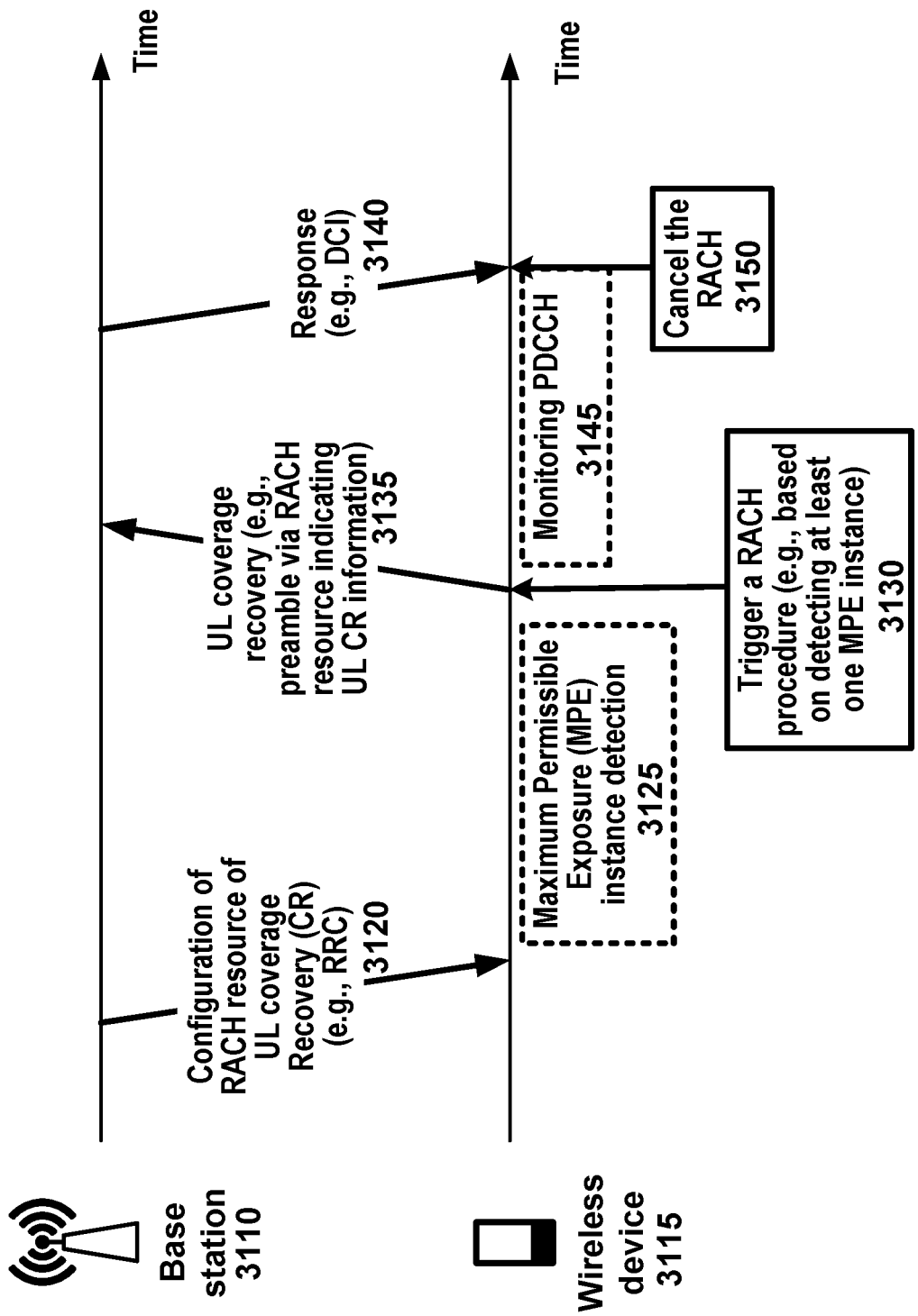
FIG. 31 shows an example method for coverage recovery and/or coverage loss mitigation.

FIG. 31 shows an example method for coverage recovery and/or coverage loss mitigation. A random access channel (RACH) may be used for uplink coverage recovery and/or uplink coverage loss mitigation. One or more uplink coverage recovery signal transmissions may be sent/transmitted by a wireless device 3115. The wireless device 3115 may be configured with one or more panels (e.g., antenna panels, antennas, transmission/reception devices, etc.) that may detect and/or mitigate uplink coverage loss. The coverage loss may be a result of complying with one or more MPE requirements. The uplink coverage recovery signal transmissions may comprise one or more transmissions of a preamble via a RACH resource.

A base station 3110 may send/transmit, to a wireless device 3115, one or more messages (e.g., RRC messages) 3120 comprising configuration parameters of RACH resources for uplink coverage recovery. The RACH resource for the uplink coverage recovery procedure may be separately or independently configured from RACH resources for random access procedure (e.g., initial access, beam failure recovery, and/or handover). The RACH resource may be per-BWP configured, or per-cell configured. One or more configuration parameters of a RACH resource may comprise at least one of: a PRACH configuration index, one or more frequency domain allocation parameters, a maximum number/quantity of preamble transmission, a power ramping step, a RA response window, one or more preambles, a number/quantity of SSBs per RACH occasion, a number/quantity of contentions based preambles per SSB, a subcarrier spacing indicator, a PRACH root sequence index, a RSRP threshold value, a contention resolution timer, a CSI-RS index, and/or a SSB index. Separately or independently configuring the RACH resource for the uplink coverage recovery procedure from the RACH resource for random access procedure may be implemented by messages (e.g., RRC messages) comprising a first RACH resource for the uplink coverage recovery procedure and second RACH resource(s) for the random access procedure. The RACH resource for the uplink coverage recovery procedure may be a contention free RACH resource dedicated for the wireless device. The RACH resource for the uplink coverage recovery procedure may be a contention-based RACH resource for the wireless device.

The one or more messages may configure panel specific RACH resource for uplink coverage recovery procedure. The one or more messages may comprise configuration parameters of a first RACH resource associated with a first panel of multiple panels associated with the wireless device 3115 and a second RACH resource associated with a second panel of the multiple panels associated with the wireless device 3115. The wireless device 3115 may determine to send/transmit an uplink coverage recovery signal/message 3135 via the first RACH resource and/or via the second RACH resource, for example, based on detecting a number/quantity of MPE instances (e.g., during a time window 3125). The uplink coverage recovery signal/message 3135 may comprise a preamble of the first RACH resource and/or of the second RACH resource.

The wireless device 3115 may detect a number/quantity of MPE instances (e.g., during a time window 3125), for example, based on the examples described with respect to FIGS. 28, FIG. 29 and/or FIG. 30. At step 3130, the wireless device 3115 may trigger/initiate a RACH procedure based on the RACH resource(s) configured for the uplink coverage recovery procedure. The wireless device 3115 may trigger/initiate the RACH procedure, for example, based on (e.g., after or in response to) detecting a number/quantity of MPE instances. The wireless device may send/transmit a preamble, via the RACH resource, indicating uplink coverage recovery information (e.g., 3135). The uplink coverage recovery information may comprise an uplink coverage loss occurring on a first (or latest in use) active panel and/or an uplink coverage loss not occurring on a second (or not latest in use) active panel.

The wireless device 3115 may trigger a RACH procedure based on a number/quantity of MPE instances being detected on one of multiple panels, for example, if the wireless device 3115 is configured with multiple RACH resources, wherein each RACH resource may be associated with a corresponding panel of multiple panels. The wireless device 3115 may select a RACH resource, from the multiple RACH resources. The selected RACH resource may be associated with an active panel, of the multiple panels, on which the wireless device 3115 may not detect MPE instances, or on which the wireless device 3115 may detect a number/quantity of MPE instances (e.g., wherein the number/quantity may be less than a threshold based on a configuration indicated by the base station 3110). The selected RACH resource may be associated with an active panel, of the multiple panels, on which the wireless device 3115 may detect a number/quantity of MPE instances (e.g., wherein the number/quantity may be greater than a threshold based on a configuration indicated by the base station 3110). The wireless device 3115 may send/transmit a preamble associated with the selected RACH resource. The preamble being sent/transmitted via the selected RACH resource may indicate that a first active panel has uplink coverage loss (e.g., due to complying with MPE requirements) and/or that a second active panel does not have uplink coverage loss.

At step 3145, the wireless device 3115 may monitor a PDCCH. The wireless device 3115 may monitor the PDCCH for receiving a response related to sending/transmitting the preamble (e.g., 3135). The wireless device 3135 may receive a response 3140. The response 3140 may comprise DCI, via the PDCCH, on a control resource set and/or on a search space. The response 3140 may be a response to a preamble. The search space and/or the control resource set (e.g., based on examples described with respect to FIG. 24 and/or FIG. 25) may be configured by the base station 3110 for uplink coverage recovery. The search space and/or the control resource set for an uplink coverage recovery procedure may be separately and/or independently configured from search spaces and/or control resource sets for other purposes (e.g., downlink/uplink scheduling, BFR procedure, power control, slot format indication, pre-emption indication, and/or the like). The wireless device 3115 may receive the response 3140. The response 3140 (e.g., DCI) may indicate a panel which may be different from the latest active panel. By using the panel indicated in the response 3140, the wireless device may avoid and/or minimize/reduce uplink coverage loss (e.g., based on proximity detection). Based on receiving the response 3140 (e.g., DCI), the wireless device may cancel a RACH procedure (e.g., that may have been initiated at step 3130). The wireless device 3115 may repeat sending/transmitting the uplink coverage recovery signal/message 3135 (e.g., a preamble), and/or may re-send/re-transmit a preamble, via the selected RACH resource, and/or may repeat monitoring the PDCCH for a response (e.g., 3145), for example, if the wireless device 3115 does not receive a response (e.g., the response 3140). The wireless device 3115 may indicate an uplink coverage loss information by sending/transmitting a preamble via a RACH resource based on detecting an uplink coverage loss (e.g., due to complying with MPE requirements if the wireless device detects a human body in the proximity of the wireless device). The wireless device 3115 may indicate an uplink coverage loss information by sending/transmitting a preamble via a RACH resource based on detecting an uplink coverage loss on a first panel of the wireless device and/or based on not detecting an uplink coverage loss on a second panel of the wireless device 3115. The base station 3110 may be aware of (e.g., may determine) the uplink coverage loss (on one of the multiple panels of the wireless device), for example, based on receiving the preamble via a dedicated RACH resource for the uplink coverage recovery procedure. The base station may correspondingly send/transmit a message (e.g., DCI) indicating a panel switching from a first panel having uplink coverage loss to a panel without uplink coverage loss, for example, based on receiving the preamble via the RACH resource. Procedures described herein may timely improve uplink coverage, for example, due to complying with MPE requirements based on proximity detection.

Figure 32:
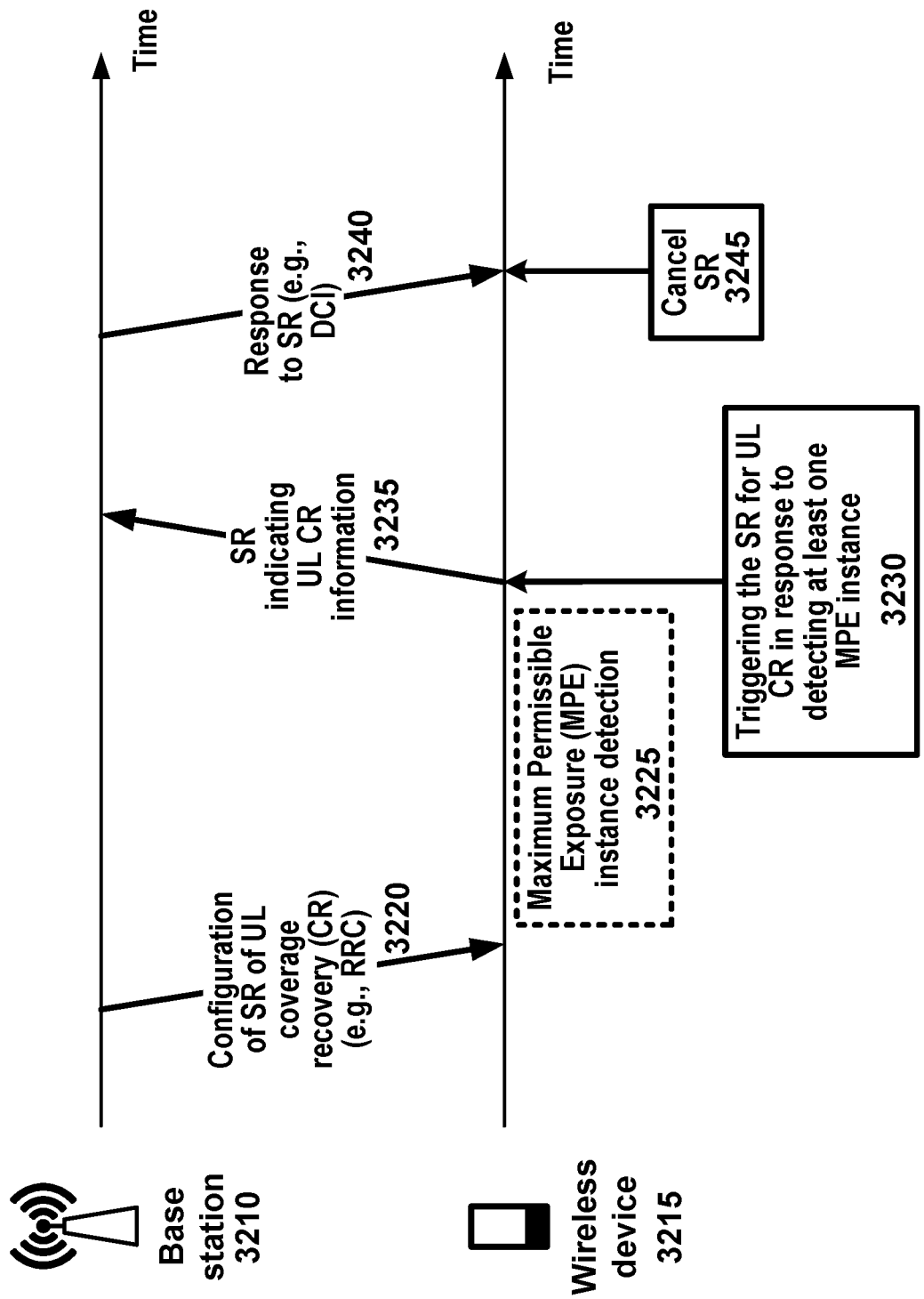
FIG. 32 shows an example method for coverage recovery and/or coverage loss mitigation.

FIG. 32 shows an example method for coverage recovery and/or coverage loss mitigation. A scheduling request (SR) may be used for uplink coverage recovery and/or uplink coverage loss mitigation. An uplink coverage recovery signal transmission may comprise one or more transmissions of a scheduling request (SR) via a PUCCH resource. A base station 3210 may send/transmit, to a wireless device 3215, one or more messages 3220 (e.g., RRC messages) comprising configuration parameters of a plurality of SR configurations. Each SR configuration may be associated with (or identified/indicated by) an SR ID. One or more configuration parameters of a SR configuration may comprise at least one of: an SR ID, an SR prohibit timer, and/or a maximum SR transmission number/quantity. A PUCCH resource associated with a SR configuration may be indicated in a message (e.g., in a SchedulingRequestResourceConfig IE). The message (e.g., SchedulingRequestResourceConfig IE) may comprise at least one of: an SR resource ID, an SR ID, a periodicity and/or an offset parameter, and/or a PUCCH resource ID. The PUCCH resource ID may identify/indicate a PUCCH resource via which the wireless device 3215 may send/transmit at least one SR. One or more of the plurality of SR configurations may be for an uplink grant request. At least one SR configuration may be dedicated for uplink coverage recovery. The at least one dedicated SR configuration may be indicated in configuration parameters of an uplink coverage recovery procedure. The at least one dedicated SR configuration may be configured per-BWP configured, per-cell, and/or per frequency/frequencies.

The one or more messages 3220 may configure panel-specific SR(s) configured for uplink coverage recovery. If the wireless device is equipped with multiple panels, the one or more RRC messages may comprise configuration parameters of a first SR configuration associated with a first panel of the multiple panels and a second SR configuration associated with a second panel of the multiple panels. The wireless device 3215 may determine to send/transmit an uplink coverage recovery signal 3235 via a first PUCCH resource of the first SR configuration or a second PUCCH resource of the second SR configuration.

The wireless device 3215 may detect/determine a number/quantity of MPE instances (e.g., during a time window 3225). The wireless device 3225 may determine/determine the number/quantity of MPE instances, for example, based on the examples described with respect to FIG. 28, FIG. 29, and/or FIG. 30. At step 3230, the wireless device 3215 may trigger/initiate an SR procedure based on the SR configuration(s) configured for uplink coverage recovery. The wireless device 3215 may trigger/initiate the SR procedure, for example, based on detecting the number/quantity of MPE instances (e.g., during the time window 3225). The wireless device 3215 may send/transmit an SR 3235 (e.g., a positive SR), via a PUCCH resource, indicating uplink coverage recovery information. The uplink coverage recovery information may comprise an uplink coverage issue occurring on a first (or latest in use) active panel and/or an uplink coverage issue not occurring on a second (or not latest in use) active panel.

The wireless device may trigger the SR procedure (e.g., at 3230) based on a number/quantity of MPE instances being detected on one of multiple panels, for example, if the wireless device 3215 is configured with multiple SR configurations. Each SR configuration may be associated with a corresponding panel of multiple panels. The wireless device 3215 may select an SR configuration, from the multiple SR configurations. The selected SR configuration may be associated with an active panel, of the multiple panels, on which the wireless device does not detect MPE instances, or on which the wireless device detects/determines a number/quantity of MPE instances (e.g., wherein the number/quantity may be below a threshold). The selected SR configuration may be associated with an active panel, of the multiple panels, on which the wireless device detects/determines a number/quantity of MPE instances (e.g., wherein the number/quantity may be greater than a threshold). The wireless device may send/transmit an SR 3235 via a PUCCH resource associated with the selected SR configuration. The SR being sent/transmitted via the PUCCH resource of the selected SR configuration may indicate that a first active panel has uplink coverage loss (e.g., due to complying with MPE requirements) and/or a second active panel does not have uplink coverage loss.

The wireless device 3215 may monitor a PDCCH (e.g., based on or after sending the SR 3235). The wireless device may monitor the PDCCH, for example, for receiving a response 3240 to the SR. The response 3240 may comprise DCI. The wireless device 3215 may receive the response 3240 via the PDCCH on a dedicated control resource set and/or on a dedicated search space. The response 3240 (e.g., DCI) may indicate a panel that may be different from the latest active panel. The wireless device 3215 may avoid and/or reduce/minimize uplink coverage loss (e.g., based on proximity detection), for example, by using the indicated panel (e.g., after receiving the response 3240). At step 3245, the wireless device 3215 may cancel a triggered SR (e.g., cancel configured/scheduled re-transmissions of the SR 3235), for example, based on receiving the response 3240. The wireless device 3215 may repeat sending/transmitting the SR via a PUCCH resource of the selected SR configuration and/or monitoring the PDCCH for a response, for example, based on not receiving the response 3240 (e.g., based on not receiving DCI in response to the SR 3235). The wireless device 3215 may indicate an uplink coverage loss information by sending/transmitting an SR via a PUCCH resource, for example, based on detecting an uplink coverage loss (e.g., due to complying with MPE requirements if the wireless device detects a human body in the proximity of the wireless device). The wireless device 3215 may indicate an uplink coverage loss information by sending/transmitting an SR via a PUCCH resource, for example, based on detecting an uplink coverage loss on a first panel of the wireless device and not detecting an uplink coverage loss on a second panel of the wireless device. The base station 3210 may be aware of (e.g., may determine) an uplink coverage loss (e.g., on one of the multiple panels of the wireless device), for example, based on receiving the SR via a PUCCH resource of a dedicated SR configuration for uplink coverage recovery. The base station 3210 may correspondingly send/transmit a message (e.g., DCI, RRC, MAC CE, etc.) indicating a panel switching from a first panel having uplink coverage loss to a second panel without uplink coverage loss, for example, based on receiving the SR via the PUCCH resource. As described herein, improvements may result in uplink coverage recovery signaling and/or latency (e.g., due to complying with MPE requirements based on proximity detection).

The base station 3210 may send/transmit, to the wireless device 3215, one or more messages 3220 (e.g., RRC messages) comprising configuration parameters of a plurality of SRS resources (or SRS resource sets). One or more configuration parameters of an SRS resource may comprise at least one of: a SRS ID, a number of SRS ports, one or more transmission comb parameters, a resource mapping indicator, one or more frequency domain parameters, a resource type indicator, a SRS sequence ID, and/or one or more SRS spatial relation information parameters (e.g., reference signal index, BWP ID and cell ID). One or more SRS resources may be dedicated for uplink transmission based on uplink coverage loss (e.g., due to complying with MPE requirements). The dedicated SRS resource(s) for uplink transmission based on uplink coverage loss may be configured per-BWP configured, per-cell, and/or per frequency/frequencies. The dedicated SRS resource(s) (or resource set) for the uplink transmission may be configured with smaller frequency radio resources than that of an SRS for normal uplink transmission (e.g., without uplink coverage loss). The dedicated SRS resource(s) (or resource set) for the uplink transmission may be configured with smaller number/quantity of antenna ports than that of an SRS for normal uplink transmission (e.g., without uplink coverage loss). The dedicated SRS resource(s) (or resource set) for the uplink transmission may be configured with smaller number/quantity of antenna ports than that of an SRS for normal uplink transmission (e.g., without uplink coverage loss).

The wireless device 3215 may detect/determine a number/quantity of MPE instances (e.g., during the time window 3225), for example, based on examples described with respect to FIG. 28, FIG. 29 and/or FIG. 30. The wireless device 3215 may send/transmit a first SRS 3235 configured for uplink transmission based on uplink coverage loss (e.g., due to complying with MPE requirements), for example, based on (e.g., after or in response to detecting/determining the number/quantity of MPE instances). The transmission of the first SRS may indicate that an uplink coverage loss occurs at the wireless device 3215. The wireless device 3215 may prioritize the first SRS transmission over second SRSs, for example, based on transmission of the first SRS overlapping in time with transmission of the second SRSs (e.g., aperiodic SRS triggered by a DCI, or periodic SRS for CSI acquisition or beam management, or semi-persistent SRS triggered by a MAC CE). Prioritizing the first SRS transmission over the second SRSs may comprise reducing transmission power of the second SRSs, dropping the transmission of the second SRSs, and/or sending/transmitting the first SRS.

The wireless device 3215 may send/transmit one or more of multiple SRS resources based on a number/quantity of MPE instances being detected/determined on one or more of multiple panels, for example, if the wireless device is configured with multiple SRS resources. Each SRS resource may be associated with a corresponding panel of multiple panels. The wireless device 3215 may select an SRS, from the multiple SRS resources. The selected SRS resource may be associated with an active panel, of the multiple panels, on which the wireless device 3215 does not detect one or more MPE instances, or on which the wireless device 3215 detects a number/quantity of MPE instances (e.g., wherein the number/quantity may be less than a threshold). The selected SRS resource may be associated with an active panel, of the multiple panels, on which the wireless device 3215 may detect/determine a number/quantity of MPE instances (e.g., wherein the number/quantity may be greater than a threshold). The wireless device 3215 may send/transmit the SRS via the selected SRS resource. The SRS being sent/transmitted via the selected SRS resource may indicate that a first active panel has uplink coverage loss (e.g., due to complying with MPE requirements) and/or that a second active panel does not have uplink coverage loss. The base station 3210 may be aware of (e.g., may determine) uplink coverage loss occurring on an active panel, for example, based on receiving the SRS 3235. The base station 3210 and may send/transmit a message/command indicating an active panel switching, for example, based on receiving the SRS 3235.

A wireless device may trigger a transmission of assistance information comprising an uplink coverage loss information. The wireless device may trigger the transmission of assistance information comprising the uplink coverage loss information, for example, based on detecting/determining a number/quantity of MPE instances (e.g., based on examples described with respect to FIG. 28, FIG. 29 and/or FIG. 30). The wireless device may send/transmit a message (e.g., an RRC message) comprising the assistance information (e.g., UEAssistanceInformation IE) and the uplink coverage loss information. The uplink coverage loss information may comprise at least one of: a first ID indicating a panel having an uplink coverage loss, a second ID indicating a panel not having an uplink coverage loss, a P-MPR value for a current active panel, a joint value of a P-MPR and RSRP for a current active panel, a BWP ID indicating a BWP having an uplink coverage loss, a cell ID indicating a cell having an uplink coverage loss. A base station may send/transmit a message/command (e.g., an RRC message, a MAC CE, and/or DCI) indicating an active panel switching, for example, based on receiving the assistance information (e.g., UEAssistanceInformation IE) from the wireless device. The uplink coverage loss information may comprise at least one of: a first ID identifying a first panel, a P-MPR value associated with the first panel, a RSRP value associated with the first panel, a joint value of P-MPR and RSRP value of the first panel, at least a second ID identifying at least a second panel, a P-MPR value associated with the at least second panel, a RSRP value associated with the at least second panel, a joint value of P-MPR and RSRP value of the at least second panel. The base station may send/transmit a message/command (e.g., an RRC message, a MAC CE, and/or a DCI) indicating an active panel switching, for example, based on receiving the assistance information (e.g., UEAssistanceInformation IE) from the wireless device.

Figure 33:
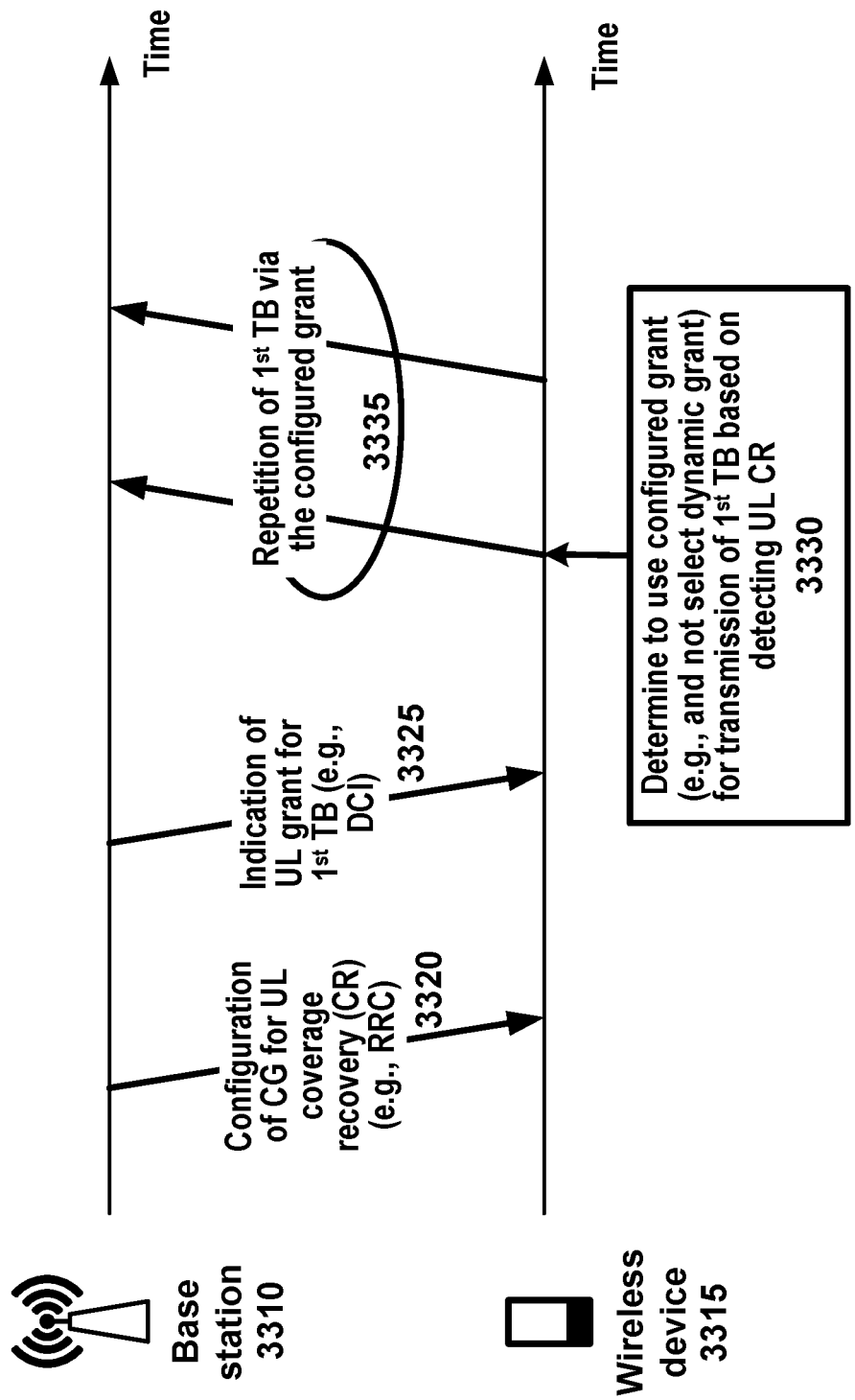
FIG. 33 shows an example method for transmission via a configured grant based on coverage loss.

FIG. 33 shows an example method for transmission via a configured grant based on coverage loss. if A wireless device 3315 may detect an uplink coverage loss (e.g., due to complying with MPE requirements). A base station 3310 may send/transmit, to the wireless device 3315, one or more messages 3320 (e.g., one or more RRC messages). The one or more messages 3320 may comprise configuration parameters of a plurality of configured grants (CGs) for uplink coverage recovery (CR). Each CG may be associated with and/or identified/indicated by a CG ID. One or more configuration parameters of a CG may comprise at least one of: a frequency hopping indicator, a DMRS configuration, an MCS table and transmission form precoder indicator, a UCI on PUSCH configuration, a resource allocation indication, an RBG size, a power control loop indicator, a number/quantity of HARQ processes, a number/quantity of repetitions, a sequence of RV for the repetitions, a periodicity, one or more time domain resources, one or more frequency domain resources, and/or the like. One or more of the plurality of CGs may be dedicated for uplink transmission based on uplink coverage loss (e.g., due to complying with MPE requirements). The dedicated CG for uplink transmission based on uplink coverage loss may be configured per-BWP, per-cell, and/or per-frequency/frequencies. The dedicated CG(s) for the uplink transmission may be configured with a repetition number/quantity greater than that of a CG for normal uplink transmission (e.g., without uplink coverage loss). The dedicated CG(s) for the uplink transmission may be configured with an MCS level less than that of a CG for normal uplink transmission (e.g., without uplink coverage loss). The dedicated CG(s) for the uplink transmission may be configured with frequency radio resources less than that of a CG for normal uplink transmission (e.g., without uplink coverage loss).

The wireless device 3315 may detect a number/quantity of MPE instances based on the examples described with respect to FIG. 28, FIG. 29 and/or FIG. 30. The wireless device 3315 may receive an indication 3325 of an uplink grant (e.g., a dynamic grant and/or a configured grant) for transmission of a first TB. The indication 3325 may comprise DCI. At step 3330 (e.g., which may be optional), the wireless device 3315 may optionally select/determine to use a dedicated CG (e.g., instead of the uplink grant indicated by the indication 3325), for transmission of the first TB, for example, based on detecting/determining the number/quantity of MPE instances. The wireless device 3315 may send/transmit the first TB via PUSCH resources of the dedicated CG, for example, based on the dedicated CG. The wireless device 3315 may send/transmit the first TB with a number/quantity of repetitions 3335 greater than that of the uplink grant indicated by the indication 3325, for example, based on the dedicated CG. The wireless device 3315 may send/transmit the first TB with an MCS level less than that of the uplink grant indicated by the indication 3325, for example, based on the dedicated CG. The wireless device 3315 may send/transmit the first TB using frequency resources less than that of the uplink grant indicated by the indication 3325, for example, based on the dedicated CG. The wireless device 3315 may adjust, for a transmission of a TB, uplink transmission formats (e.g., MCS level, frequency radio resource, transmission repetition, number/quantity of antenna ports, time radio resources, and/or the like). The wireless device may adjust the transmission of a TB according to a dedicated configured grant configured for uplink coverage loss (e.g., due to complying with MPE requirements). Such an adjustment may be based on detecting the uplink coverage loss. The wireless device 3315 may not use a dynamic uplink grant indicated in the indication 3325 for the transmission of the TB, for example, based on (e.g., after or in response to) detecting the uplink coverage loss. As described herein, improvements may be achieved in uplink transmission throughput and/or uplink coverage loss due to complying with one or more MPE requirements.

A wireless device may receive, from a base station, one or more messages (e.g., RRC messages) comprising one or more indications of a first number/quantity and/or a detection window for triggering an MPE reporting (and/or an uplink coverage loss reporting). The wireless device may detect a second number/quantity of MPE instances associated with a first uplink panel within/during the detection window. The wireless device may trigger/initiate/send a transmission of an MPE report, for example, based on the second number/quantity being greater than or equal to the first number/quantity. The MPE report may comprise a first field indicating the first uplink panel and/or a second field indicating a transmission power reduction value for the first uplink panel. The MPE report may indicate an uplink coverage loss occurs/occurred on the first panel. The one or more messages comprise configuration parameters of a plurality of panels comprising the first uplink panel. Each panel may be associated with a group of uplink transmission configuration indication (TCI) states and/or spatial relation information (SRI) states. Each panel may be associated with a panel ID.

The one or more messages comprise a time window for MPE instance detection. The wireless device may detect the second number/quantity of MPE instances within/during an MPE instance detection window. The number/quantity of MPE instances may comprise contiguous MPE instances. The contiguous MPE instances comprise one or more MPE instances occurring in contiguous detection intervals. The wireless device may send/transmit the MPE report via a RACH resource. The RACH resource may be configured in the one or more messages for the MPE reporting. The wireless device may send/transmit the MPE report via a PUCCH resource of an SR configuration. The SR configuration may be configured in the one or more messages for the MPE reporting. The wireless device may send/transmit the MPE report in a message comprising assistance information (e.g., UEAssistanceInformation IE). The wireless device may trigger/initiate/send transmission of the assistance information based on detecting the second number/quantity of MPE instances. The wireless device may detect/determine the second number/quantity of MPE instances based on uplink duty cycle value of the first panel. The wireless may detect/determine at least one of the second number of MPE instances based on the uplink duty cycle value being greater than a threshold. The wireless device may detect/determine the second number/quantity of MPE instances based on a P-MRP value and/or an RSRP value of the first panel.

The wireless device may determine the RSRP value of the first panel, for example, based on measurement of an RS (e.g., SSB/PBCH, and/or CSI-RS) on the first panel. The wireless device may receive a message (e.g., DCI) as a response to the transmission of the MPE report. The message (e.g., DCI) may indicate switching from the first panel to a second panel for an uplink transmission. The wireless device may detect the second number/quantity of MPE instances based on a P-MPR value of the first panel. The wireless device may detect/determine at least one of the second number/quantity of MPE instances based on the P-MPR value being greater than a threshold.

A wireless device may receive, from a base station, one or more messages (e.g., RRC messages) comprising configuration parameters of a RACH associated with reporting of MPE information. The wireless device may detect/determine a number/quantity of MPE instances associated with a first uplink panel. The wireless device may send/transmit, based on detecting/determining the number/quantity of MPE instances, a preamble, associated with the RACH resource, indicating the detection the number/quantity of MPE instances on the first uplink panel. The sending/transmitting of the preamble via the RACH resource may indicate an uplink coverage loss occurs on the first uplink panel.

A wireless device may receive, from a base station, one or more messages (e.g., one or more RRC messages) comprising configuration parameters of an SR configuration associated with reporting of MPE information. The wireless device may detect/determine a number/quantity of MPE instances associated with a first uplink panel. The wireless device may send/transmit, based on detecting/determining the number/quantity of MPE instances, an SR based on the SR configuration, indicating the detection/determining the number/quantity of MPE instances on the first uplink panel. The sending/transmitting of the SR based on the SR configuration may indicate an uplink coverage loss occurs on the first uplink panel.

A wireless device may reduce uplink transmission power in order to comply with one or more RF exposure requirements. A wireless device may reduce uplink transmission power, for example, if at least a portion of a human body (or other living organism) is detected in the proximity of the wireless device. Reducing uplink transmission power may result in uplink coverage loss. A wireless device may indicate, to a base station, that a proximity of a first active panel is detected and/or a proximity of a second panel is not detected, for example, in an attempt to avoid/minimize/reduce uplink coverage loss due to complying with one or more RF exposure requirements. A base station may send (e.g., transmit) a command indicating active panel switching from the first panel to the second panel, for example, based on (e.g., after or in response to) receiving the indication. A wireless device may send (e.g., transmit) an uplink beam report comprising an indication of a proximity detection. A wireless device may send (e.g., transmit) an uplink beam report aperiodically and/or periodically.

Figure 34:
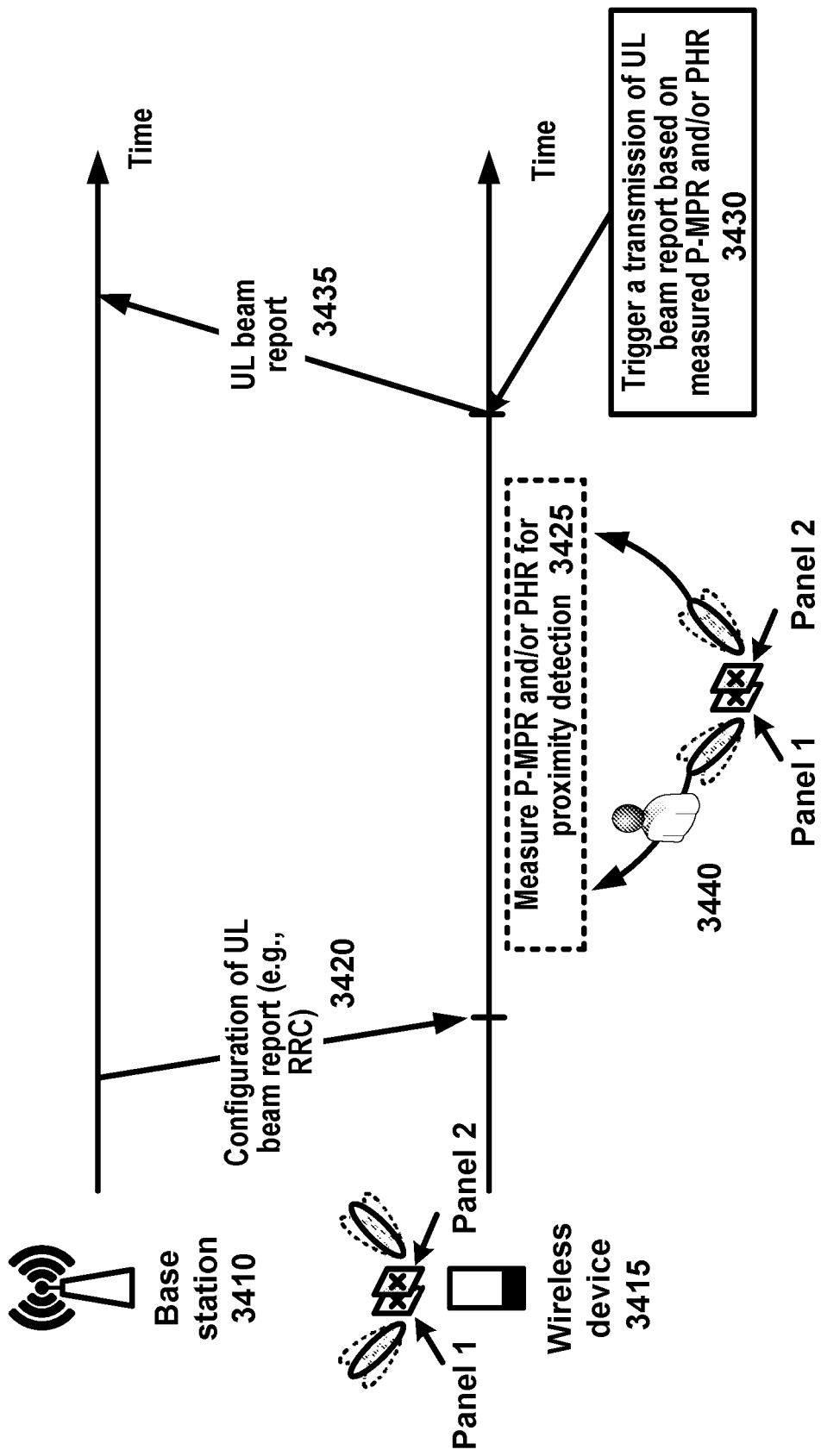
FIG. 34 shows an example of P-MPR and/or PHR reporting.

FIG. 34 shows an example of P-MPR and/or PHR reporting. The P-MPR and/or PHR reporting may comprise aperiodic sending (e.g., transmission) of uplink beam reports comprising one or more indications of proximity detection. A base station 3410 may send (e.g., transmit), to a wireless device 3415, one or more messages 3420 (e.g., RRC message(s)) comprising first configuration parameters of an uplink beam report and/or second configuration parameters of a channel state information (CSI) report. A CSI report may comprise at least one of: a channel quality indicator (CQI), a precoding matrix indicator (PMI), a CSI-RS resource indicator (CRI), a SS/PBCH block resource indicator (SSBRI), a layer indicator (LI), a rank indicator (RI), a layer 1 reference signal received power (L1-RSRP), and/or a layer 1 signal to interference and noise ratio (L1-SINR). The wireless device 3415 may send (e.g., transmit), to the base station 3410, one or more quantities of a CSI report indicating downlink channel quality of one or more RSs sent (e.g., transmitted) from the base station 3410 to the wireless device 3415. The second configuration parameters of a CSI report may comprise at least one of: a report configuration ID, a serving cell index, one or more CSI-RS resource configuration indexes, a report configuration type indicator, a report quantity indicator, one or more report frequency configuration parameters, an indication of a time restriction for channel and/or interference measurement, a codebook configuration, a group-based beam reporting indication, a CQI table, and/or the like. The report configuration type indicator may indicate that the CSI report is a periodic report configured with report slot configuration and PUCCH resource. The report configuration type indicator may indicate that the CSI report is a semi-persistent report (e.g., via a PUCCH) configured with a report slot configuration and/or a PUCCH resource. The report configuration type indicator may indicate that the CSI report is a semi-persistent report (e.g., via a PUSCH) configured with a report slot configuration, a report slot offset configuration, and/or an open loop power control parameter (e.g., P0 and alpha). The report configuration type indicator may indicate that the CSI report is an aperiodic report configured with a report slot offset configuration. The report quantity indicator may indicate at least one of (e.g., which one of): a CRI-RI-PMR-CQI, a CRI-RI-L1, a CRI-RI-L1-CQI, a CRI-RI-CQI, a CRI-RSRP, an SSB-Index-RSRP, and/or a CRI-RI-LI-PMI-CQI that the wireless device may send (e.g., transmit) in a CSI report.

The wireless device 3415 may send (e.g., transmit) an uplink beam report 3435. The uplink beam report 3435 may indicate that proximity to a human body (or other living organism) 3440 with a first panel (e.g., Panel 1) of a plurality of panels is detected by the wireless device 3415 and/or that proximity to a human body (or other living organism) (e.g., 3440) is not detected for at least a second panel (e.g., Panel 2) of the plurality of panels. The uplink beam report 3435 may be the same as or different from a CSI report. The uplink beam report 3435 may comprise at least one of: a first index identifying/indicating a first panel (e.g., Panel 1), a second index identifying/indicating at least a second panel (e.g., Panel 2), a first P-MPR value for sending (e.g., transmission) via the first panel, a second P-MPR value for sending (e.g., transmission) via the second panel, a first PHR value for sending (e.g., transmission) via the first panel, a second PHR value for sending (e.g., transmission) via the second panel, a first maximum output power for sending (e.g., transmission) via the first panel, and/or a second maximum output power for sending (e.g., transmission) via the second panel. A P-MPR may comprise/indicate a transmission power reduction value for uplink transmission. The wireless device 3415 may determine the P-MPR based on compliance with one or more RF exposure requirements due to proximity detection. A PHR sent (e.g., transmitted) in the uplink beam report 3435 via a PUCCH resource may be referred to as an L1-PHR. The wireless device 3415 may determine a value of the L1-PHR based on at least one of: L1-RSRP of a pathloss RS associated with a panel, a P-MPR of the panel, and/or other power parameters.

The CSI report may be defined (or redefined) to comprise a downlink CSI report and/or an uplink beam report. The CSI report may be defined (or redefined) to comprise not only the downlink CSI report, but also uplink beam report (e.g., indicating proximity detection and/or uplink coverage loss). A base station may send (e.g., transmit), to a wireless device, one or more messages (e.g., RRC message(s)) comprising configuration parameters (e.g., of a CSI report). The configuration may comprise at least one of: a CQI, a PMI, a CRI, a SSBRI, an LI, an RI, an L1-RSRP, an L1-SINR, a P-MPR, and/or an L1-PHR. A report quantity type of the configuration parameters of the CSI report may indicate at least one of (e.g., which one of) a CQI, a PMI, a CRI, a SSBRI, an LI, an RI, an L1-RSRP, an L1-SINR, a P-MPR, and/or an L1-PHR that may be sent (e.g., transmitted) in the CSI report.

The wireless device 3415 may be equipped with multiple panels comprising a first panel (e.g., Panel 1) and at least a second panel (e.g., Panel 2). The first panel may be activated. The second panel may be activated. The first panel and the second panel both may be activated. The wireless device 3415 may send (e.g., transmit) uplink signals via the first panel, for example, during a time period that the first panel is activated. The wireless device 3415 may send (e.g., transmit) uplink signals via the second panel, for example, during a time period that the second panel is activated.

A wireless device may use (e.g., apply) a spatial domain filter to send (e.g., transmit) from a panel of the multiple panels to at least one TRP (e.g., one of multiple TRPs) of a base station. The panel and/or the spatial domain filter may be determined based on at least one of: an UL TCI indication of a DCI, a panel ID in the DCI, an SRI indication of a DCI, a CORESET pool index of a CORESET for receiving the DCI, and/or the like.

A wireless device may determine a panel and/or a transmission beam (and/or a spatial domain transmission filter) on a panel, for example, if the wireless device receives DCI indicating an uplink grant. The panel may be indicated (e.g., explicitly indicated) by a panel ID. The DCI may comprise the panel ID. The panel may be indicated (e.g., implicitly indicated) by an SRS ID (and/or an SRS group/pool index), a UL TCI pool index of a UL TCI for uplink transmission, and/or a CORESET pool index of a CORESET (e.g., for receiving the DCI).

At step 3425, the wireless device 3425 may perform proximity detection on one or more panels (e.g., a plurality of panels), such as Panel 1 and/or Panel 2. Any quantity of panels may be used by the wireless device 3415. The wireless device 3415 may perform proximity detection based on a P-MPR and/or a PHR (and/or a L1-PHR). at step 3430, the wireless device 3415 may trigger/initiate/send, based on the P-MPR and/or the PHR (e.g., a measured P-MBR and/or a measured PHR), transmission of an uplink beam report 3435. The uplink beam report 3435 may comprise an indication of one or more proximity detections (e.g., 3440). The wireless device may trigger the uplink transmission of the uplink beam report, for example, as described with respect to FIG. 35. The wireless device 3415 may send (e.g., transmit) the uplink beam report 3435 via an uplink channel (e.g., PUCCH and/or PUSCH) based on configuration parameters (e.g., first configuration parameters) of the uplink beam report 3435.

FIG. 35 shows examples for uplink beam reporting. One or more uplink beam reports may be triggered for a wireless device 3515. The wireless device 3515 may be configured with one more panels (e.g., multiple panels). The wireless device 3515 may be configured with multiple panels comprising a first panel and at least a second panel. The first panel may be activated. The second panel may be activated. The first panel and the second panel both may be activated. The wireless device 3515 may send (e.g., transmit) uplink signals via a panel, for example, during a time period that the panel is activated.

The wireless device 3515 may trigger an uplink beam report. The uplink beam report may comprise one or more indications of proximity detection. The proximity detection may be based on uplink duty cycle(s) of the first panel and/or uplink duty cycle(s) of the second panel. An uplink duty cycle of a cell may be defined/indicated as percentage or quantity of uplink symbols sent (e.g., transmitted) via the cell within/during an evaluation period (e.g., a millisecond, a second, or any other duration). An uplink duty cycle may be evaluated on a per-panel basis. An uplink duty cycle may be evaluated per-panel, for example, if the wireless device switches uplink transmission between the first panel and the second panel. A first uplink duty cycle of the first panel may be defined/indicated as percentage or quantity of uplink symbols sent (e.g., transmitted) via the first panel within/during an evaluation period. A second uplink duty cycle of the second panel may be defined/indicated as a percentage or quantity of uplink symbols sent (e.g., transmitted) via the second panel within/during the evaluation period.

A wireless device may determine whether to use (e.g., apply) a P-MPR value. A wireless device may determine whether to use (e.g., apply) a P-MPR value based on a joint evaluation of a first uplink duty cycle of the first panel and/or a second uplink duty cycle of the second panel. The first uplink duty cycle and/or the second uplink duty cycle may be evaluated in a same evaluation period. The wireless device may determine to use (e.g., apply) the P-MPR value, for example, based on a summation of the first uplink duty cycle and the second uplink duty cycle being greater than a threshold (e.g., maxUplinkDutyCycle-PC2-FR1, maxUplinkDutyCycle-FR2, and the like). The wireless device may determine to use (e.g., apply) the P-MPR value based on at least one of the first uplink duty cycle and the second uplink duty cycle being greater than the threshold. The at least one duty cycle may be a smaller one or a larger one of the first uplink duty cycle and the second uplink duty cycle, which may be determined by a configuration and/or which may be defined/predefined.

A wireless device may trigger an uplink beam report via a PUCCH (or a PUSCH) based on (e.g., after or in response to) the first uplink duty cycle evaluated on the first panel (e.g., within an evaluation period) being greater than a threshold and/or the second uplink duty cycle evaluated on the second panel (within the evaluation period) being less than the threshold. The threshold may be a parameter determined based on the wireless device's capability.

A wireless device may send (e.g., transmit) to a base station one or more wireless device capability messages (e.g., UECapabilityInformation IE, RRC message(s), etc.) comprising the threshold. The wireless device may send (e.g., transmit) the one or more capability messages based on (e.g., after or in response to) receiving, from a base station, one or more messages for capability enquiry (e.g., UECapabilityEnquiry IE, RRC message(s), etc.). A threshold may be indicated by a duty cycle indication (e.g., maxUplinkDutyCycle in UECapabilityInformation). A duty cycle indication (e.g., maxUplinkDutyCycle) may indicate a percentage or quantity of symbols (e.g., a maximum percentage or quantity of symbols), for example, during an evaluation period (e.g., 1 second or any other duration) that may be scheduled for uplink transmission (e.g., so as to ensure compliance with applicable electromagnetic power density exposure requirements provided by one or more regulatory bodies, standards organizations, etc.).

A wireless device may determine that it is possible that an uplink coverage loss may occur on the first panel due to use (e.g., application) of P-MPR on the first panel (e.g., due to proximity detection near (or in the direction of) the first panel). The wireless device may determine that it is possible that an uplink coverage loss may occur on the first panel due to use (e.g., application) of P-MPR on the first panel (e.g., due to proximity detection near (or in the direction of) the first panel), for example, if the first uplink duty cycle of the first panel is greater than the threshold. The wireless device may determine that it is less possible that an uplink coverage loss may occur on the second panel than on the first panel. The wireless device may determine that it is less possible that an uplink coverage loss may occur on the second panel than on the first panel, for example, if the second uplink duty cycle of the second panel is less than the threshold. The wireless device may detect (or predict) an uplink coverage loss based on the first uplink duty cycle evaluated on the first panel being greater than the threshold and/or the second uplink duty cycle evaluated on the second panel (e.g., within the evaluation period) being less than the threshold.

The wireless device 3515 may trigger an uplink beam report (e.g., 3501A). The wireless device may trigger an uplink beam report, for example, if the wireless device determines that the first uplink duty cycle evaluated on the first panel is greater than the threshold and/or the second uplink duty cycle evaluated on the second panel (e.g., within the evaluation period) is less than the threshold and/or based on proximity detection on the first panel (e.g., 3501B). An uplink beam report may comprise at least one of: a first index identifying the first panel, the first uplink duty cycle, a second index identifying the second panel, and/or the second uplink duty cycle. The uplink beam report may indicate an uplink coverage loss is occurring on the first panel.

The wireless device 3515 may trigger an uplink beam report (e.g., comprising proximity detection) (e.g., 3502A) based on a first P-MPR of the first panel and a second P-MPR of the second panel. The wireless device 3515 may determine P-MPR based on at least one of: ensuring compliance with applicable electromagnetic power density exposure requirements and/or addressing unwanted emissions/self-defense requirements for simultaneous transmissions on multiple RAT(s) (e.g., which may or may not be within a scope of 3GPP RAN or other specifications), and/or ensuring compliance with applicable electromagnetic power density exposure requirements (e.g., if proximity detection is used to address such requirements that require a lower maximum output power). The wireless device 3515 may determine a first value of a first applicable P-MPR of the first panel (e.g., based on one or more of the above requirements), for example, if the wireless device determines a transmission via the first panel. The wireless device may determine a second value of a second applicable P-MPR of the second panel (e.g., based on one or more of the above requirements), for example, if the wireless device determines a transmission via the second panel. The wireless device may determine (and/or predict) an uplink coverage loss of the first panel, for example, based on the first P-MPR of the first panel being greater than a threshold and/or the second P-MPR of the second panel being less than the threshold (e.g., 3502B). The threshold may be a power reduction value determined based on a wireless device capability.

A wireless device may send (e.g., transmit), to a base station, one or more wireless device capability messages (e.g., UECapabilityInformation IE, RRC message(s), etc.) comprising a threshold. The wireless device may send (e.g., transmit) the one or more capability messages based on (e.g., after or in response to) receiving, from the base station, one or more messages for capability enquiry (e.g., UECapabilityEnquiry IE, RRC message(s), etc.). The threshold may indicate a P-MPR value. The wireless device may determine that it is possible that an uplink coverage loss may occur on the panel (e.g., due to compliance with MPE requirements, for example, related to proximity detection). The wireless device may determine that it is possible that an uplink coverage loss may occur on the panel (e.g., due to compliance with MPE requirements, for example, related to proximity detection), for example, if a used (e.g., applied) P-MPR value for a panel is greater than the threshold. The wireless device may determine that it is not possible (e.g., unlikely) that an uplink coverage loss may occur on the panel. The wireless device may determine that it is not possible (e.g., unlikely) that an uplink coverage loss may occur on the panel, for example, if the used (e.g., applied) P-MPR value for the panel is less than the threshold.

The wireless device may determine that an uplink coverage loss may occur on the first panel and/or may not occur on the second panel. The wireless device may determine that an uplink coverage loss may occur on the first panel and/or may not occur on the second panel, for example, if the wireless device determines that the first P-MPR of the first panel is greater than the threshold and/or the second P-MPR of the second panel is less than the threshold. The wireless device may determine (or predict) an uplink coverage loss based on a comparison between the first P-MPR of the first panel and the second P-MPR of the second panel. The wireless device may determine that an uplink coverage loss may more likely occur on the first panel than on the second panel. The wireless device may determine that an uplink coverage loss may more likely occur on the first panel than on the second panel, for example, if the wireless device determines that the first P-MPR of the first panel is greater than the second P-MPR of the second panel. The wireless device may trigger an uplink beam report via a PUCCH (or a PUSCH). The wireless device may trigger an uplink beam report via a PUCCH (or a PUSCH), for example, if the wireless device determines that the first P-MPR of the first panel is greater than the second P-MPR of the second panel. The uplink beam report may comprise at least one of: a first index identifying the first panel, the first P-MPR value, a first $P_{CMAX}$ determined on the first panel, a second index identifying the second panel, the second P-MPR value, and/or a second $P_{CMAX}$ determined on the second panel.

The wireless device 3515 may trigger an uplink beam report (e.g., comprising an indication of proximity detection) based on change of a first P-MPR of the first panel and change of a second P-MPR of the second panel (e.g., 3503A). The change of P-MPR may be determined per panel. The wireless device may determine change of a P-MPR of a panel based on a comparison between a P-MPR determined for a latest (or current) uplink transmission and a P-MPR determined for a previous uplink transmission, for example, before the latest uplink transmission. The wireless device may detect (or predict) an uplink coverage loss based on (e.g., after or in response to) change of the first P-MPR being greater than a threshold and/or change of the second P-MPR being less than the threshold (e.g., 3503B). The threshold may be a power reduction value determined based on a wireless device capability.

The wireless device may send (e.g., transmit) to the base station one or more wireless device capability messages (e.g., UECapabilityInformation IE, RRC message(s), etc.) comprising a threshold. The wireless device may send (e.g., transmit) the one or more capability messages based on (e.g., after or in response to) receiving, from the base station, one or more messages for capability enquiry (e.g., UECapabilityEnquiry IE, RRC message(s)). The threshold may indicate a P-MPR change value. The wireless device may determine it is possible that an uplink coverage loss may occur on the panel (e.g., due to compliance with MPE requirements, for example, related to proximity detection). The wireless device may determine it is possible that an uplink coverage loss may occur on the panel (e.g., due to compliance with MPE requirements, for example, related to proximity detection), for example, if a P-MPR change used (e.g., applied) for a panel by the wireless device is greater than the threshold. The wireless device may determine it is not possible (e.g., unlikely) that an uplink coverage loss may occur on the panel (e.g., due to compliance with MPE requirements, for example, related to proximity detection). The wireless device may determine it is not possible (e.g., unlikely) that an uplink coverage loss may occur on the panel (e.g., due to compliance with MPE requirements, for example, related to proximity detection), for example, if the P-MPR change used (e.g., applied) for the panel is less than the threshold.

The wireless device may detect (or predict) an uplink coverage loss of a panel based on a comparison between a first change of a first P-MPR of the first panel and a second change of a second P-MPR of the second panel. The wireless device may determine that an uplink coverage loss may more likely occur on the first panel than on the second panel. The wireless device may determine that an uplink coverage loss may more likely occur on the first panel than on the second panel, for example, if the wireless device determines that the first change of the first P-MPR of the first panel is greater than the second change of the second P-MPR of the second panel. The wireless device may trigger an uplink beam report via a PUCCH (or a PUSCH). The wireless device may trigger an uplink beam report via a PUCCH (or a PUSCH), for example, if the wireless device determines that the first change of the first P-MPR of the first panel is greater than the second change of the second P-MPR of the second panel. The uplink report may comprise at least one of: a first index identifying the first panel, the first change of the first P-MPR, a first $P_{CMAX}$ determined on the first panel, a second index identifying the second panel, the second change of the second P-MPR, and/or a second $P_{CMAX}$ determined on the second panel.

The wireless device 3515 may trigger an uplink beam report (e.g., comprising an indication of proximity detection and/or an indication of uplink coverage loss) based on a first P-MPR and a first RSRP of the first panel and/or a second P-MPR and a second RSRP of the second panel (e.g., 3504A). A P-MPR may be determined based on one or more of the examples described herein. RSRP may be defined as a linear average over power contributions of resource elements of the antenna port(s) that carry reference signals (e.g., SSB and/or CSI-RSs) configured for RSRP measurements within measurement frequency bandwidth in configured reference signal occasions. A reference point for the RSRP may be the antenna connector of the wireless device (e.g., for a first frequency range, such as FR 1). The RSRP may be measured based on combined signals from antenna elements corresponding to a given receiver branch (e.g., for a second frequency range, such as FR 2). A first RSRP of the first panel may be measured on received RSs via the first panel. A second RSRP of the second panel may be measured on received RSs via the second panel. The first RSRP may be the same as or different from the second RSRP. The wireless device 3515 may trigger the uplink beam report based on a combined value of a first P-MPR and a first RSRP of the first panel being less than a threshold, and/or a combined value of a second P-MPR and a second RSRP of the second panel being greater than the threshold (e.g., 3504B). A combined value of an RSRP and a P-MPR may be determined as the value of the RSRP minus the value of the P-MPR (e.g., if the value of the P-MPR is greater than or equal to 0). The threshold may be determined based on a wireless device capability. The uplink beam report may comprise at least one of: a first index identifying the first panel, the first P-MPR, the first RSRP, a combined value of the first P-MPR and the first RSRP, a first $P_{CMAX}$ configured on the first panel, a second index identifying the second panel, the second P-MPR, the second RSRP, a combined value of the second P-MPR and the second RSRP, and/or a second $P_{CMAX}$ configured on the second panel.

A wireless device may send (e.g., transmit) to the base station one or more wireless device capability messages (e.g., UECapabilityInformation IE, RRC message(s), etc.) comprising a threshold. The wireless device may send (e.g., transmit) the one or more capability messages based on (e.g., after or in response to) receiving, from the base station, one or more messages for capability enquiry (e.g., UECapabilityEnquiry IE, RRC message(s), etc.). The threshold may indicate a combined RSRP and P-MPR value. The wireless device may determine it is possible that an uplink coverage loss may occur on the panel (e.g., due to compliance with MPE requirements, for example, related to proximity detection). The wireless device may determine it is possible that an uplink coverage loss may occur on the panel (e.g., due to compliance with MPE requirements, for example, related to proximity detection), for example, if a combined value of measured RSRP value and applicable P-MPR value on a panel is less than the threshold. The wireless device may determine it is not possible (e.g., unlikely) that an uplink coverage loss may occur on the panel. The wireless device may determine it is not possible (e.g., unlikely) that an uplink coverage loss may occur on the panel, for example, if a combined value of measured RSRP value and applicable P-MPR value on a panel is greater than the threshold.

The wireless device may trigger the uplink beam report based on a comparison between a first combined value of a first P-MPR and a first RSRP of the first panel and a second combined value of a second P-MPR and a second RSRP of the second panel. The wireless device may determine that an uplink coverage loss may more likely occur on the first panel than on the second panel. The wireless device may determine that an uplink coverage loss may more likely occur on the first panel than on the second panel, for example, if the wireless device determines that the first combined value of the first panel is less than the second combined value of the second panel.

The wireless device 3515 may trigger an uplink beam report (e.g., comprising an indication of proximity detection and/or an indication of uplink coverage loss) based on a first PHR (e.g., L1-PHR) of the first panel and a second PHR (e.g., L1-PHR) of the second panel (e.g., 3504A). A PHR may be a Type 1 PHR based on an actual or reference PUSCH transmission. The PHR may be a Type 2 PHR based on a PUCCH transmission. The PHR may be a Type 3 PHR based on an actual SRS transmission. A wireless device may determine that a Type 1 PHR for an activated serving cell is based on an actual PUSCH transmission. For PUSCH transmission occasion i on active UL BWP b of carrier f of serving cell C, the wireless device may compute the Type 1 PHR as $PH_{type1b,f,c}(i,j,q_d,l) = P_{CMAX,f,c}(i) - \{P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\}$ [dB], where $M_{RB,b,f,c}^{PUSCH}(i)$ may be a bandwidth of the PUSCH resource assignment expressed in number of resource blocks for PUSCH transmission occasion i on active UL BWP b of carrier f of serving cell c. $\alpha_{b,f,c}(j)$ may be a power compensation factor configured by the base station. $\Delta_{TF,b,f,c}(i)$ may be a value of power adjustment for transmission format of the PUSCH. $f_{b,f,c}(i,l)$ may be the PUSCH power control adjustment state l for active UL BWP b of carrier f of serving cell C. $P_{O\_PUSCH,b,f,c}(j)$ may be a target PUSCH received power configured by the base station. $PL_{b,f,c}(q_d) = \text{referenceSignalPower} - \text{RSRP}$, where referenceSignalPower may be provided by the base station and RSRP may be measured on a reference serving cell. The RSRP may be an L1-RSRP without filtering based on a filter configuration configured by the base station. The RSRP may be an L3-RSRP with filtering based on a filter configuration configured by the base station. The wireless device may determine a value of $P_{CMAX,f,c}(i)$ based on at least one of: a P-MPR, an MPR, an A-MPR, a power value of a power class of the wireless device, and/or a maximum Effective Isotropic Radiated Power ($EIRP_{max}$) of the wireless device, by implementing examples explained previously.

The wireless device may determine that a Type 1 PHR for an activated serving cell is based on a reference PUSCH transmission. For PUSCH transmission occasion i on active UL BWP b of carrier f of serving cell C, the wireless device may compute the Type 1 PHR as: $PH_{type1b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\}$ [dB], where $\tilde{P}_{CMAX,f,c}(i)$ may be computed assuming MPR=0 dB, A-MPR=0 dB, P-MPR=0 dB. $\Delta T_C$=0 dB. MPR, A-MPR, P-MPR, and $\Delta T_C$ are determined based on examples described herein. $P_{O\_PUSCH,b,f,c}(j)$ and $\alpha_{b,f,c}(j)$ are obtained using $P_{O\_NOMINAL\_PUSCH,f,c}(0)$ and p0-PUSCH-AlphaSetId=0. $PL_{b,f,c}(q_d)$ may be obtained using pusch-PathlossReferenceRS-Id=0, and l=0.

A wireless device may determine that a Type 3 PHR for an activated serving cell is based on an actual SRS transmission. The wireless device may compute/determine a Type 3 PHR as $PH_{type3b,f,c}(i,q_s) = P_{CMAX,f,c}(i) - \{P_{O\_SRSb,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i)\}$ [dB]. The wireless device may compute/determine a Type 3 PHR as $PH_{type3b,f,c}(i,q_s) = P_{CMAX,f,c}(i) - \{P_{O\_SRSb,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i)\}$ [dB], for example, for SRS transmission occasion i on active UL BWP b of carrier f of serving cell c and if the wireless device is not configured for PUSCH transmissions on carrier f of serving cell C. $M_{SRS,b,f,c}(i)$ may be an SRS bandwidth expressed in number of resource blocks for SRS transmission occasion i on active UL BWP b of carrier f of serving cell c. $\alpha_{SRS,b,f,c}(q_s)$ may be a power compensation factor configured by the base station. $h_{b,f,c}(i)$ may be the SRS power control adjustment state l for active UL BWP b of carrier f of serving cell C. $P_{O\_SRS,b,f,c}(q_s)$ may be a target SRS received power configured by the base station. The wireless device may determine a value of P (i) based on at least one of: a P-MPR, an MPR, an A-MPR, a power value of a power class of the wireless device, and/or a maximum Effective Isotropic Radiated Power ($EIRP_{max}$) of the wireless device, by implementing examples explained previously.

A wireless device may determine that a Type 3 PHR for an activated serving cell is based on a reference SRS transmission. The wireless device may compute/determine a Type 3 PHR as $PH_{type3b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\}$ [dB]. The wireless device may compute/determine a Type 3 PHR as $\{P_{O\_SRS,b,f,c}(q_s) + \alpha_{SRS,b,f,c}(q_s) \cdot PL_{b,f,c}(q_d) + h_{b,f,c}(i)\}$ [dB], for example, for SRS transmission occasion i on UL BWP b of carrier f of serving cell c, and if the wireless device is not configured for PUSCH transmissions on UL BWP b of carrier f of serving cell c. $q_s$ may be an SRS resource set corresponding to SRS-ResourceSetId=0 for UL BWP b and $P_{O\_SRS,b,f,c}(q_s)$, $\alpha_{SRS,f,c}(q_s)$, $PL_{b,f,c}(q_d)$, and $h_{b,f,c}(i)$ may be obtained from SRS-ResourceSetId=0 for UL BWP b. $\tilde{P}_{CMAX,f,c}(i)$ may be computed/determined assuming MPR=0 dB, A-MPR=0 dB, P-MPR=0 dB, and $\Delta T_C$=0 dB.

A PHR may comprise at least one of: an L1-PHR and an L2-PHR. A PHR evaluated based on an L1-RSRP may be referred to as an L1-PHR. The PHR sent (e.g., transmitted) in an uplink beam report (e.g., comprised in UCIs, or sent (e.g., transmitted) in PUCCH) may be referred to as L1-PHR. The existing PHR evaluated based on L3-RSRP and sent (e.g., transmitted) in a PHR MAC CE may be referred to as L2-PHR.

The wireless device 3515 may trigger the uplink beam report based on a first PHR of the first panel being less than a threshold and/or a second PHR of the second panel being greater than the threshold (e.g., 3505B). The wireless device may determine (or predict) that an uplink coverage loss may more likely occur on the first panel than on the second panel. The wireless device may determine (or predict) that an uplink coverage loss may more likely occur on the first panel than on the second panel, for example, if the wireless device determines that the first PHR of the first panel is less than the threshold and/or the second PHR of the second panel is greater than the threshold. The threshold may be configured by the base station, for example, by implementing the examples described herein, or preconfigured to a fixed value. The uplink beam report may comprise at least one of: a first index identifying the first panel, the first PHR, the first P-MPR value, a first $P_{CMAX}$ configured on the first panel, a second index identifying the second panel, the second PHR, the second P-MPR value, and/or a second $P_{CMAX}$ configured on the second panel.

A wireless device may trigger the uplink beam report based on a comparison between a first PHR of the first panel and a second PHR of the second panel. The wireless device may determine (or predict) that an uplink coverage loss may more likely occur on the first panel than on the second panel. The wireless device may determine (or predict) that an uplink coverage loss may more likely occur on the first panel than on the second panel, for example, if the wireless device determines that the first PHR of the first panel is less (e.g., in absolute value) than the second PHR of the second panel. The uplink beam report may comprise at least one of: a first index identifying/indicating the first panel, the first PHR, the first P-MPR value, a first $P_{CMAX}$ configured on the first panel, a second index identifying the second panel, the second PHR, the second P-MPR value, and/or a second $P_{CMAX}$ configured on the second panel.

One or more examples described with respect to FIG. 35 may be combined for determining to trigger an uplink beam report. A wireless device may trigger the uplink beam report based on a joint evaluation of at least one of: uplink duty cycle, P-MPR, change of P-MPR, RSRP, and/or PHR on a panel. As shown in FIG. 34 and FIG. 35, a wireless device may trigger an uplink beam report based on one or more of uplink duty cycle, P-MPR, change of P-MPR, RSRP, and/or PHR. A wireless device may send (e.g., transmit) the uplink beam report if one or more conditions are met, for example, based on examples described with respect to FIG. 35. Transmission of an uplink beam report may be aperiodic. Aperiodic transmission of the uplink beam report may reduce uplink signaling overhead and/or timely notify the base station uplink coverage issue due to proximity detection.

Figure 36:
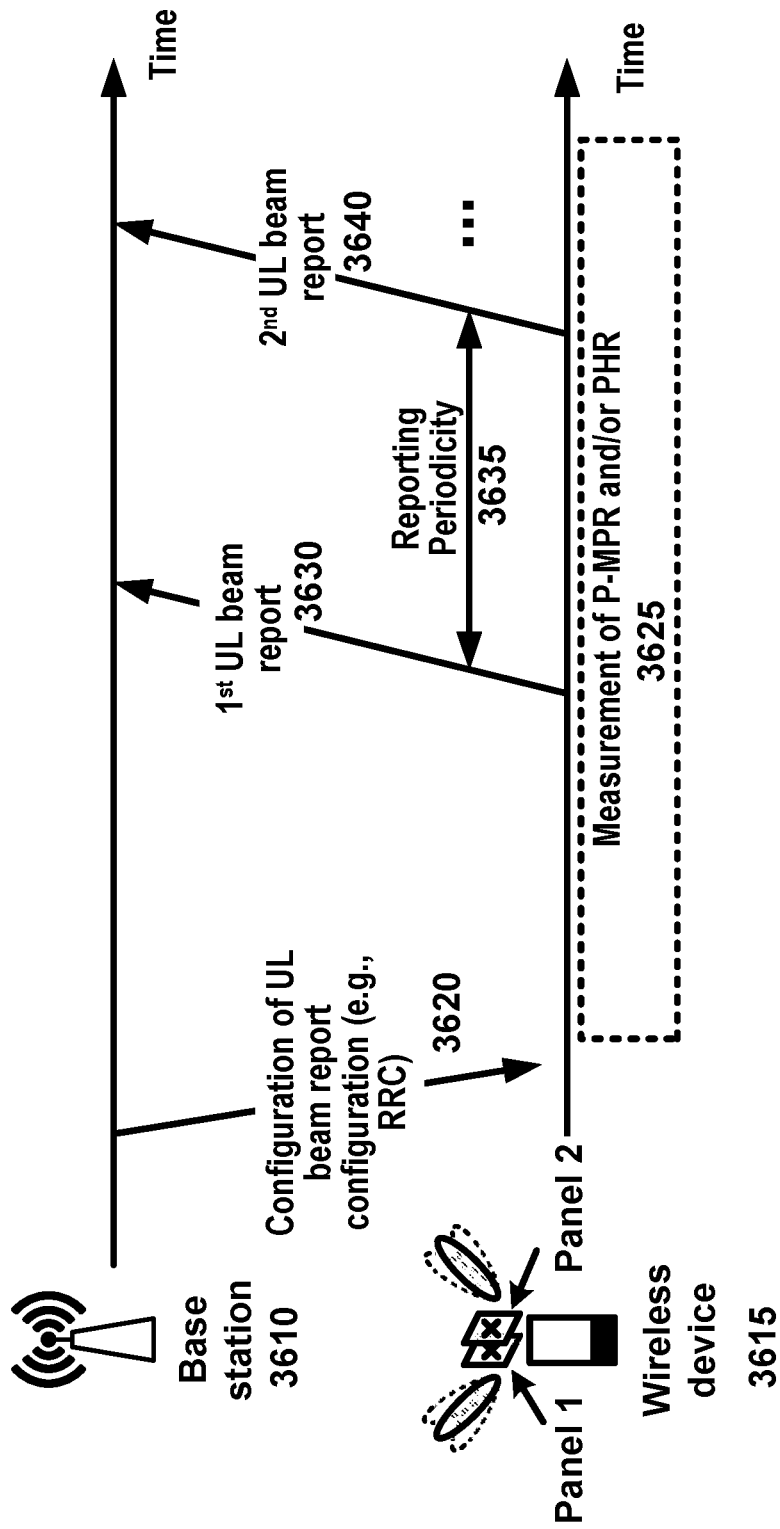
FIG. 36 shows an example of P-MPR and/or PHR reporting.

FIG. 36 shows an example of P-MPR and/or PHR reporting. The P-MPR and/or PHR reporting may be periodic. A wireless device 3615 may send/transmit periodic uplink beam reports (e.g., for indication of proximity detection and/or uplink coverage loss). A base station 3610 may send (e.g., transmit) to the wireless device 3615 one or more messages (e.g., RRC messages) comprising configuration parameters 3620 of uplink beam report. The configuration parameters 3620 may be sent (e.g., transmitted) by implementing one or more examples described with respect to FIG. 35.

At step 3625, the wireless device 3615 may measure P-MPR and/or PHR (e.g., based on one or more examples described with respect to FIG. 35). The wireless device 3615 may be equipped/configured with a plurality of panels comprising a first panel and at least a second panel (e.g., based on one or more examples described with respect to FIG. 35).

The wireless device 3615 may send (e.g., transmit) one or more periodic uplink beam reports 3630, 3640 based on the configuration parameters 3620 of the uplink beam report. The wireless device 3615 may differ from the wireless device 3515, for example, based on the wireless device 3615 sending/transmitting one or more periodic uplink beam reports 3630, 3640. The wireless device 3615 may send (e.g., transmit) the one or more periodic uplink beam reports 3630, 3640 based on continuous measurements 3625 (e.g., L1-RSRP, L3-RSRP, P-MPR, and/or PHR) on the plurality of panels. The wireless device 3615 may send (e.g., transmit) the one or more uplink beam reports 3630, 3640 with a transmission periodicity 3635 indicated in the configuration parameters 3620. The wireless device 3615 may send (e.g., transmit) the one or more uplink beam reports 3630, 3640 via a PUCCH resource indicated in the configuration parameters 3620. The one or more uplink beam reports 3630, 3640 may comprise at least one of: a first index indicating a first panel, a first P-MPR value associated with the first panel, a first PHR value associated with the first panel, a first RSRP value associated with the first panel, a first $P_{CMAX}$ determined on the first panel, a second index indicating a second panel, a second P-MPR value associated with the second panel, a second PHR value associated with the second panel, a second RSRP value associated with the second panel, and/or a second $P_{CMAX}$ determined on the second panel.

The wireless device 3615 may send (e.g., transmit) one or more periodic uplink beam reports 3630, 3640 indicating P-MPR/RSRP/PHR values for active panels. Based on the periodically indicated P-MPR/RSRP/PHR values for the active panels, the base station 3610 may predict on which panel an uplink coverage loss, if any, may occur. The base station 3610 may send (e.g., transmit) to the wireless device 3615 a command indicating an active panel switching (e.g., to avoid uplink coverage loss) for uplink transmission based on the prediction. Periodic transmission of the one or more uplink beam reports 3630, 3640 may reduce actual occurrence of uplink coverage loss.

A wireless device may send (e.g., transmit) one or more periodic or aperiodic uplink beam reports comprising P-MPR and/or PHR (e.g., L1-PHR) of the multiple panels (e.g., such described with respect to FIG. 34 and/or FIG. 36). A wireless device may send (e.g., transmit) one or more periodic or aperiodic uplink beam reports comprising P-MPR and/or PHR (e.g., L1-PHR) of the multiple panels, for example, if the wireless device is configured with multiple panels and operating in high frequency (e.g., 30 GHz, 50 GHz, or any other frequency). The one or more uplink beam reports may indicate proximity detection, uplink coverage loss, and/or P-MPR/PHR of at least one of the multiple panels. A wireless device may send (e.g., transmit) to a base station one or more CSI reports indicating downlink channel quality of one or more reference signals sent (e.g., transmitted) from a base station to the wireless device. The one or more uplink beam reports may be different from the one or more CSI reports. The one or more uplink beam reports may indicate that a second panel or a beam of the second panel from the multiple panels is suitable for uplink transmission. The one or more uplink beam reports may indicate that a second panel or a beam of the second panel from the multiple panels is suitable for uplink transmission, for example, if proximity is detected on a first panel and/or uplink coverage loss is occurring on the first panel. A base station may instruct (e.g., indicate to) the wireless device to change to the second panel for uplink transmission (e.g., PUCCH/PUSCH/SRS), for example, based on (e.g., after or in response to) receiving the uplink beam report. A CSI report may comprise L1-RSRP and/or L1-SINR and/or may indicate a downlink beam and/or a downlink TRP for receiving downlink transmission. A base station may determine a downlink transmission beam for a downlink transmission (e.g., PDCCH/PDSCH/CSI-RS), for example, based on (e.g., after or in response to) receiving the CSI report. A CSI report comprising PMI/CRI/RI etc. may indicate a quantity of spatial property (e.g., rank, precoding weight index, etc.) of a radio propagation channel from the base station to the wireless device. A base station may determine a transmission format (e.g., MCS, resource allocation of PDCCH/PDSCH, MIMO transmission format, etc.) on a PDSCH, for example, based on (e.g., after or in response to) receiving the CSI report.

At least some wireless devices may not be able to efficiently and/or accurately determine when and/or where to send/transmit an MPE report. Such wireless devices may be configured with multiple panels and may be configured to detect a human body in proximity of an active panel. Such wireless devices may determine to send/transmit an MPE report based on an MPE instance. However, such wireless devices may send an MPE report too frequently, too infrequently, via a wrong cell and/or via a wrong BWP or other wireless resource. For example, a wireless device may send (e.g., transmit) one or more CSI reports if an SCell is activated, if a BWP of a cell is activated, and/or if the SCell is transitioned into a dormant state. Based on the CSI reports, a base station may obtain downlink channel quality or downlink beam information, which may be used for determining downlink beam, or downlink transmission format for downlink data transmission. If the wireless device is configured with multiple panels, the wireless device may detect a human body in proximity of an active panel. The base station may not be aware of the proximity detection at the wireless device, for example, before the wireless device indicates the proximity detection. The base station may continue indicating (e.g., instructing) uplink transmission via the active panel. This may result in uplink coverage loss. For reducing uplink coverage loss (e.g., due to complying with RF exposure requirements, for example, related to proximity detection), it may be beneficial to send (e.g., transmit) timely uplink beam reports, for example, before the base station schedules an uplink transmission, and/or if the wireless device is scheduled/configured for an uplink transmission. The wireless device may not be able to determine when to send (e.g., transmit) the uplink beam reports and/or where to send (e.g., transmit) the uplink beam reports, if, for example, the wireless device is configured with multiple cells and/or with multiple BWPs (or multiples of other wireless resources). A base station may not know when and/or from where (e.g., via which cell, via which BWP, or via which other wireless resource) to receive a uplink beam report. Uplink scheduling without sufficient MPE reporting may result in problems such as broken/failed uplink transmission, and/or reduced uplink transmission throughput.

As described herein, a wireless device may be configured with improved MPE reporting. A wireless device may send/transmit an MPE report comprising one or more panel-specific power backoff values for one or more panels. The wireless device may send/transmit an MPE report based on (e.g., after or in response to) activating a cell. A wireless device may send/transmit an MPE report comprising one or more panel-specific power backoff values for a BWP (or other wireless resource, frequency range, etc.) of a cell. The wireless device may send/transmit the MPE report based on (e.g., after or in response to) switching an active BWP to the BWP used to send the MPE report (or switching another first wireless resource to a second wireless resource used to send the MPE report). A wireless device may send/transmit an MPE report comprising one or more panel-specific power backoff values for a BWP, cell, and/or any wireless resource (e.g., frequency range, etc.), based on (e.g., after or in response to) transitioning to a DRX active time (and/or any other state transition). A base station may be configured to receive the MPE report, for example, based on (e.g., after or in response to) sending one or more messages to activate a cell, to activate or switch a BWP (or other wireless resource), and/or to transition a wireless device to a DRX active time (and/or any other state transition). Improved MPE reporting described herein may provide advantages such as reduced transmission failure, increased uplink transmission throughput, reduced latency, and/or increased synchronization between a wireless device and a base station.

Figure 37:
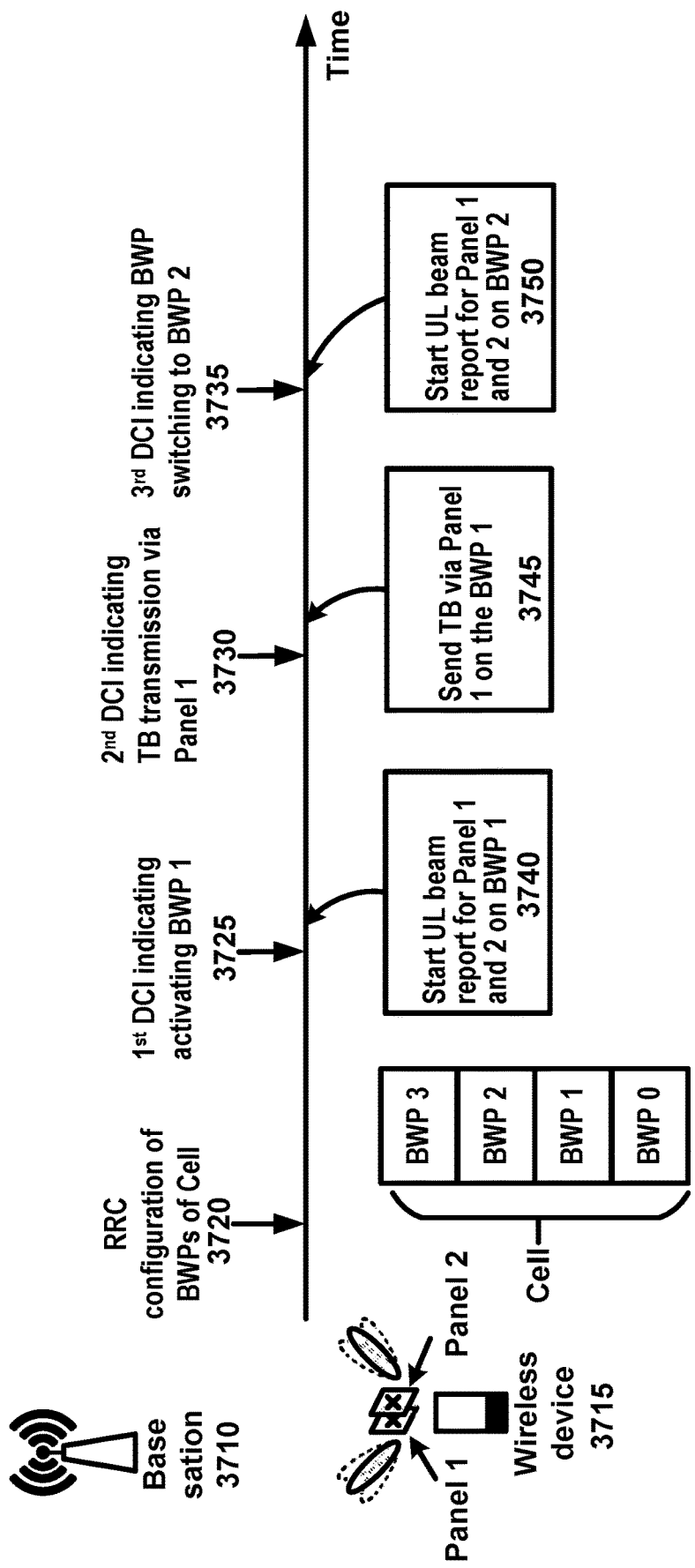
FIG. 37 shows an example of uplink beam reporting and/or BWP switching.

FIG. 37 shows an example of uplink beam reporting and/or BWP switching. Uplink beam reporting and/or BWP switching may comprise at least one of: a P-MPR, an RSRP, and/or a PHR. BWP switching may be performed, for example, if a wireless device 3715 is configured with multiple BWPs in a cell. A base station 3710 may send (e.g., transmit), to a wireless device 3715, one or more messages 3720 (e.g., RRC messages) comprising configuration parameters of a cell. The cell may be a PCell or a PSCell. The cell may comprise a plurality of BWPs. The wireless device 3715 may be equipped/configured with a plurality of panels comprising a first panel and at least a second panel (e.g., such as described with respect to FIG. 35).

The wireless device 3715 may receive first DCI 3725 indicating an activation of a first BWP (e.g., BWP 1) of the plurality of BWPs. The first BWP may be an uplink BWP. The first BWP may be a downlink BWP. The first DCI 3725 may be based on a DCI format 1_1/1_2, or DCI format 0_1/0_2. The first DCI 3725 may comprise a BWP indication field indicating the first BWP. The first DCI 3725 may comprise an uplink grant on the first BWP, or a downlink resource assignment on the first BWP. At step 3740, the wireless device 3715 may send (e.g., transmit) an uplink beam report for the first BWP based on (e.g., after or in response to) the first DCI 3725. The wireless device 3715 may send the uplink beam report for the first BWP, for example, if the first BWP is in an active state. The uplink beam report may comprise at least one of: a P-MPR, an RSRP, and/or a PHR for one or more panels (e.g., Panel 1 and/or Panel 2) of a plurality of panels. The uplink beam report may be implemented as aperiodic uplink beam report (e.g., based on one or more examples described with respect to FIG. 34 and/or FIG. 35). The uplink beam report may be implemented as a periodic uplink beam report (e.g., based on one or more examples as described with respect to FIG. 36). The wireless device 3715 may send (e.g., transmit) the uplink beam report via a PUCCH resource of a PCell or a PUCCH SCell. The wireless device 3715 may send (e.g., transmit) one or more UCI bits comprising the uplink beam report via the PUCCH resource. The wireless device 3715 may determine at least one of: a first P-MPR of the first panel being less than a second P-MPR of a second panel, a first RSRP of the first panel being greater than a second RSRP of the second panel, and/or a first PHR of the first panel being greater than a second PHR of the second panel, for example, if the wireless device 3715 detects a human body in proximity with the second panel.

The base station 3710 may receive, from the wireless device 3715, the uplink beam report comprising the at least one of the P-MPR, the RSRP and/or the PHR for the one or more panels. The base station 3710 may send (e.g., transmit) second DCI 3730 indicating an uplink transmission via a PUSCH resource of a first panel (e.g., Panel 1), for example, based on the uplink beam report. The base station 3710 may indicate the uplink transmission via the first panel based on the uplink beam report indicating at least one of: a first P-MPR of the first panel being less than a second P-MPR of a second panel, a first RSRP of the first panel being greater than a second RSRP of the second panel, and/or a first PHR of the first panel being greater than a second PHR of the second panel. At step 3745, the wireless device 3715, based on the second DCI, may send (e.g., transmit) one or more uplink data packets (e.g., a transport block) via the PUSCH resource of the first panel.

The base station 3710 may send (e.g., transmit), to the wireless device 3715, third DCI 3735 indicating an active BWP switching from the first BWP to a second BWP (e.g., BWP 2). The second BWP may be an uplink BWP. The second BWP may be a downlink BWP. The wireless device 3715 may activate the second BWP and/or deactivate the first BWP, for example, based on (e.g., after or in response to) receiving the third DCI. At step 3750, the wireless device 3715 may send (e.g., transmit) a uplink beam report comprising P-MPR/RSRP/PHR of one or more panels measured on the second BWP, for example, based on the activating the second BWP. The wireless device 3715 may stop sending (e.g., transmitting) the uplink report for the first BWP, for example, Based on the deactivating the first BWP.

The wireless device 3715 may be required to send (e.g., transmit) the uplink beam report at a time, for example, after receiving the first DCI and/or the third DCI. The wireless device 3715 may send (e.g., transmit) the uplink beam report, for example, to align the base station 3710 and the wireless device 3715, for example, if switching an active BWP. A time at this the uplink beam report is to be sent/transmitted may be determined based on a configured value by the base station 3710. The wireless device 3715 may send (e.g., transmit) the uplink beam report, for example, at a time determined based on a parameter of a wireless device's capability. The wireless device 3715 may send (e.g., transmit) wireless device 3715 capability message (RRC message) comprising the parameter, for example, based on (e.g., after or in response to) receiving a wireless device 3715 capability enquiry message (e.g., RRC message) from the base station 3710. The wireless device 3715 may send (e.g., transmit) the uplink beam report at a time determined based on a predefined value.

The uplink beam reporting and/or BWP switching described with respect to FIG. 37 may be extended to semi-persistent uplink beam reporting. A semi-persistent uplink beam report via a PUCCH may be triggered by a MAC CE indicating an activation/deactivation of the semi-persistent uplink beam report (e.g., a SP uplink beam report activation/deactivation MAC CE). The semi-persistent uplink beam report via a PUSCH may be triggered by DCI indicating an activation/deactivation of the semi-persistent uplink beam report.

The wireless device 3715 may (e.g., based on activating a BWP of a cell) send (e.g., transmit) to a base station 3710 one or more uplink beam reports (e.g., periodic, aperiodic, and/or semi-persistent) comprising one or more parameters (e.g., P-MPR, RSRP and/or PHR) related to proximity detection, and/or uplink coverage loss due to complying with RF exposure requirements. The wireless device 3715 may (e.g., based on deactivating a BWP of a cell) stop sending (e.g., transmitting) the one or more uplink beam reports. Operations described herein may improve uplink transmission coverage, increase uplink robustness, and/or decrease power consumption of the wireless device 3715.

Figure 38:
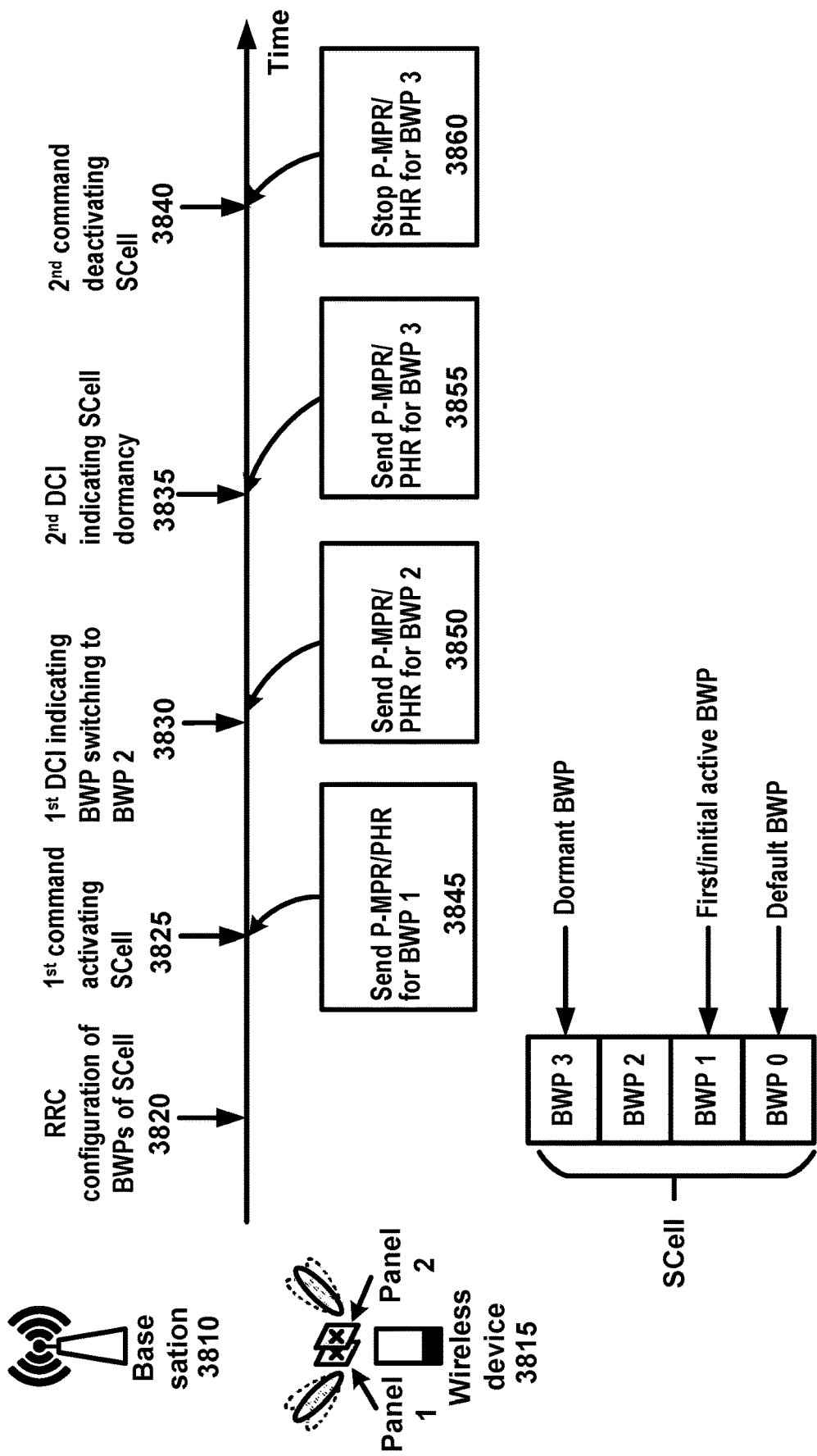
FIG. 38 shows an example of uplink beam reporting for an SCell.

FIG. 38 shows an example uplink beam reporting for an SCell. A base station 3810 may send (e.g., transmit), to a wireless device 3815, one or more messages 3820 (e.g., RRC messages) comprising configuration parameters of a cell. The cell may be a SCell. The cell may comprise one or more (e.g., a plurality of) BWPs. The BWPs may comprise a first BWP as a default BWP (e.g., BWP 0), a second BWP as a first active BWP and/or an initial active BWP (e.g., BWP 1), and/or third BWP as a dormant BWP (e.g., BWP 3). The wireless device 3815 may be equipped/configured with a plurality of panels comprising a first panel and a second panel (e.g., based on one or more examples described with respect to FIG. 35).

The wireless device 3815 may receive a first command 3825 indicating an activation of the cell. The first command may be a SCell activation/deactivation MAC CE (e.g., as shown in FIG. 21A and/or FIG. 21B). The first command may be an RRC message comprising a SCell state parameter of the cell being set to a first value (e.g., "active"). The first command may be DCI indicating an activation of the cell. The first command may be DCI indicating a transition of a SCell from a dormancy to a non-dormancy. The wireless device 3815 may activate the cell based on (e.g., after or in response to) receiving the first command indicating the activation of the cell. The wireless device 3815 may activate the first active BWP, or the initial active BWP based on the activation of the cell. At step 3845, the wireless device 3815 may send (e.g., transmit) uplink beam report (e.g., P-MPR, RSRP and/or PHR) of one or more panels of the plurality of panels for the first active BWP (or the initial active BWP). The uplink beam report may comprise at least one of: a P-MPR, an RSRP, and/or a PHR of the first active BWP (and/or the initial active BWP) for one or more panels (e.g., Panel 1 and/or Panel 2) of a plurality of panels. The uplink beam report may be implemented as aperiodic uplink beam report (e.g., based on one or more examples described with respect to FIG. 34 and/or FIG. 35). The uplink beam report may be implemented as periodic uplink beam report (e.g., based on one or more examples described with respect to FIG. 36). The wireless device 3815 may send (e.g., transmit) the uplink beam report via a PUCCH resource of a PCell and/or via a PUCCH SCell. The wireless device 3815 may send (e.g., transmit) one or more UCI bits comprising the uplink beam report via the PUCCH resource. The wireless device 3815 may determine at least one of: a first P-MPR of the first panel being less than a second P-MPR of a second panel, a first RSRP of the first panel being greater than a second RSRP of the second panel, and/or a first PHR of the first panel being greater than a second PHR of the second panel, for example, when the wireless device 3815 detects a human body in proximity with the second panel.

The base station 3810 may send (e.g., transmit), to the wireless device 3815, first DCI 3830 indicating an active BWP switching to a second BWP (e.g., BWP 2). The second BWP may be an uplink BWP. The second BWP may be a downlink BWP. The wireless device 3815 may activate the second BWP (e.g., BWP 2) and/or deactivate the first BWP (e.g., BWP 1), for example, based on (e.g., after or in response to) receiving the first DCI. At step 3850, the wireless device 3815 may send (e.g., transmit) an uplink beam report comprising at least one of a P-MPR, an RSRP, and/or aPHR of one or more panels measured on the second BWP (e.g., BWP 2), for example, based on the activating the second BWP. The wireless device 3815 may stop sending (e.g., transmitting) the uplink report for the first BWP (e.g., BWP 1), for example, based on the deactivating the first BWP (e.g., BWP 1).

The wireless device 3815 may receive second DCI 3835 comprising a dormancy indication for the cell. The wireless device 3815 may switch from the second BWP (e.g., BWP 2) to the dormant BWP (e.g., BWP 3) based on (e.g., after or in response to) receiving the dormancy indication. At step 3855, the wireless device 3815 may send (e.g., transmit) an uplink beam report comprising at least one of a P-MPR, an RSRP, and/or a PHR of one or more panels measured on the dormant BWP (e.g., BWP 3), for example, based on (e.g., after or in response to) switching to the dormant BWP (e.g., BWP 3).

The wireless device 3815 may (e.g., based on an indication configured in RRC messages sent (e.g., transmitted) from the base station 3810) determine whether to send (e.g., transmit) the uplink beam report (e.g., P-MPR/RSRP/PHR of one or more panels) for the dormant BWP (e.g., BWP 3), for example, if the wireless device 3815 transitions the cell to the dormant state. The wireless device 3815 may receive, from the base station 3810, one or more messages (e.g., RRC messages) comprising the indication indicating whether the uplink beam report for the dormant BWP (e.g., BWP 3) is enabled or disabled. The wireless device 3815 may send (e.g., transmit) the uplink beam report for the dormant BWP (e.g., BWP 3), for example, based on (e.g., after or in response to) the indication indicating the uplink beam report for the dormant BWP (e.g., BWP 3) is enabled (e.g., if the wireless device 3815 transitions the cell to the dormant state). The wireless device 3815 may not send (e.g., transmit the uplink beam report for the dormant BWP (e.g., BWP 3), for example, based on (e.g., after or in response to) the indication indicating the uplink beam report for the dormant BWP (e.g., BWP 3) is disabled (e.g., if the wireless device 3815 transitions the cell to the dormant state).

The wireless device 3815 may receive, from the base station 3810, one or more messages (e.g., RRC messages) comprising the indication indicating whether a periodic uplink beam report (e.g., a P-MPR, an RSRP, and/or a PHR of one or more panels) for the dormant BWP is enabled or disabled. The wireless device 3815 may send (e.g., transmit) the periodic uplink beam report for the dormant BWP, for example, based on (e.g., after or in response to) the indication indicating the periodic uplink beam report for the dormant BWP is enabled (e.g., if the wireless device 3815 transitions the cell to the dormant state). The wireless device 3815 may not send (e.g., transmit) an aperiodic uplink beam report for the dormant BWP, for example, if the wireless device 3815 transitions the cell to the dormant state. The wireless device 3815 may not send (e.g., transmit) the periodic uplink beam report for the dormant BWP, for example, based on (e.g., after or in response to) the indication indicating the periodic uplink beam report for the dormant BWP is disabled (e.g., if the wireless device 3815 transitions the cell to the dormant state).

The wireless device 3815 may receive, from the base station 3810, one or more messages (e.g., RRC messages) comprising the indication indicating whether aperiodic uplink beam report (e.g., a P-MPR, an RSRP, and/or a PHR of one or more panels) for the dormant BWP is enabled or disabled. The wireless device 3815 may send (e.g., transmit) the aperiodic uplink beam report for the dormant BWP, for example, based on (e.g., after or in response to) the indication indicating the aperiodic uplink beam report for the dormant BWP is enabled (e.g., if the wireless device 3815 transitions the cell to the dormant state). The wireless device 3815 may not send (e.g., transmit) periodic uplink beam report for the dormant BWP, for example, if the wireless device 3815 transitions the cell to the dormant state. The wireless device 3815 may not send (e.g., transmit) the aperiodic uplink beam report for the dormant BWP, for example, based on (e.g., after or in response to) the indication indicating the aperiodic uplink beam report for the dormant BWP is disabled (e.g., if the wireless device 3815 transitions the cell to the dormant state).

The wireless device 3815 may receive a second command 3840 indicating deactivation of the cell (e.g., SCell). The second command 3840 may be a SCell activation/deactivation MAC CE (e.g., such as shown in FIG. 21A and/or FIG. 21B). The wireless device 3815 may deactivate the cell. At step 3860, the wireless device 3815 may stop the uplink beam report (e.g., comprising P-MPR/RSRP/PHR) of the one or more panels, for example, based on (e.g., after or in response to) deactivating the cell.

The uplink beam reporting described with respect to FIG. 38 may be extended to semi-persistent uplink beam reporting. A semi-persistent uplink beam report via a PUCCH may be triggered by a MAC CE indicating an activation/deactivation of the semi-persistent uplink beam report (e.g., a SP uplink beam report activation/deactivation MAC CE). The semi-persistent uplink beam report via a PUSCH may be triggered by DCI indicating an activation/deactivation of the semi-persistent uplink beam report.

The wireless device 3815 may determine whether to send (e.g., transmit) one or more uplink beam reports (e.g., periodic, aperiodic, and/or semi-persistent). The wireless device 3815 may determine whether to send the one or more uplink beam reports, for example, based on a state (e.g., an active state, a dormant state, or a deactivated state) of a SCell. The one or more uplink beam reports may comprise one or more parameters (e.g., a P-MPR, an RSRP and/or a PHR) related to proximity detection, and/or uplink coverage loss due to complying with RF exposure requirements. Operations described herein may improve uplink transmission coverage and/or uplink robustness, for example, for communications between a wireless device 3815 and a base station 3810 via a SCell.

DRX operation may be used by a wireless device for various advantages, such as reduced power consumption and/or increased battery life. With DRX configured, a wireless device may discontinuously monitor downlink control channel (e.g., PDCCH and/or EPDCCH). A base station may configure DRX operation using a set of DRX parameters (e.g., using RRC configuration). The set of DRX parameters may be selected/determined based on the application type such that the wireless device may reduce power and/or resource consumption. A wireless device may receive data packets using an extended delay, for example, based on (e.g., after or in response to) DRX being configured/activated. The wireless device may receive packets using an extended delay, for example, if the wireless device may be in DRX Sleep/Off state at the time of data arrival at the wireless device and if the base station may wait until the wireless device transitions to the DRX On state.

The wireless device in a DRX mode may power down most of its circuitry, for example, if there are no packets to be received. The wireless device may monitor PDCCH discontinuously in the DRX mode. The wireless device may monitor the PDCCH continuously. The wireless device may monitor the PDCCH continuously, for example, if a DRX operation is not configured. In a DRX mode, a time during which the wireless device listens to the downlink (DL) (or monitor PDCCHs) may be called DRX Active (e.g., DRX On) state, and a time during which the wireless device does not listen and/or monitor PDCCH may be called DRX Sleep (e.g., DRX Off) state.

Figure 39:
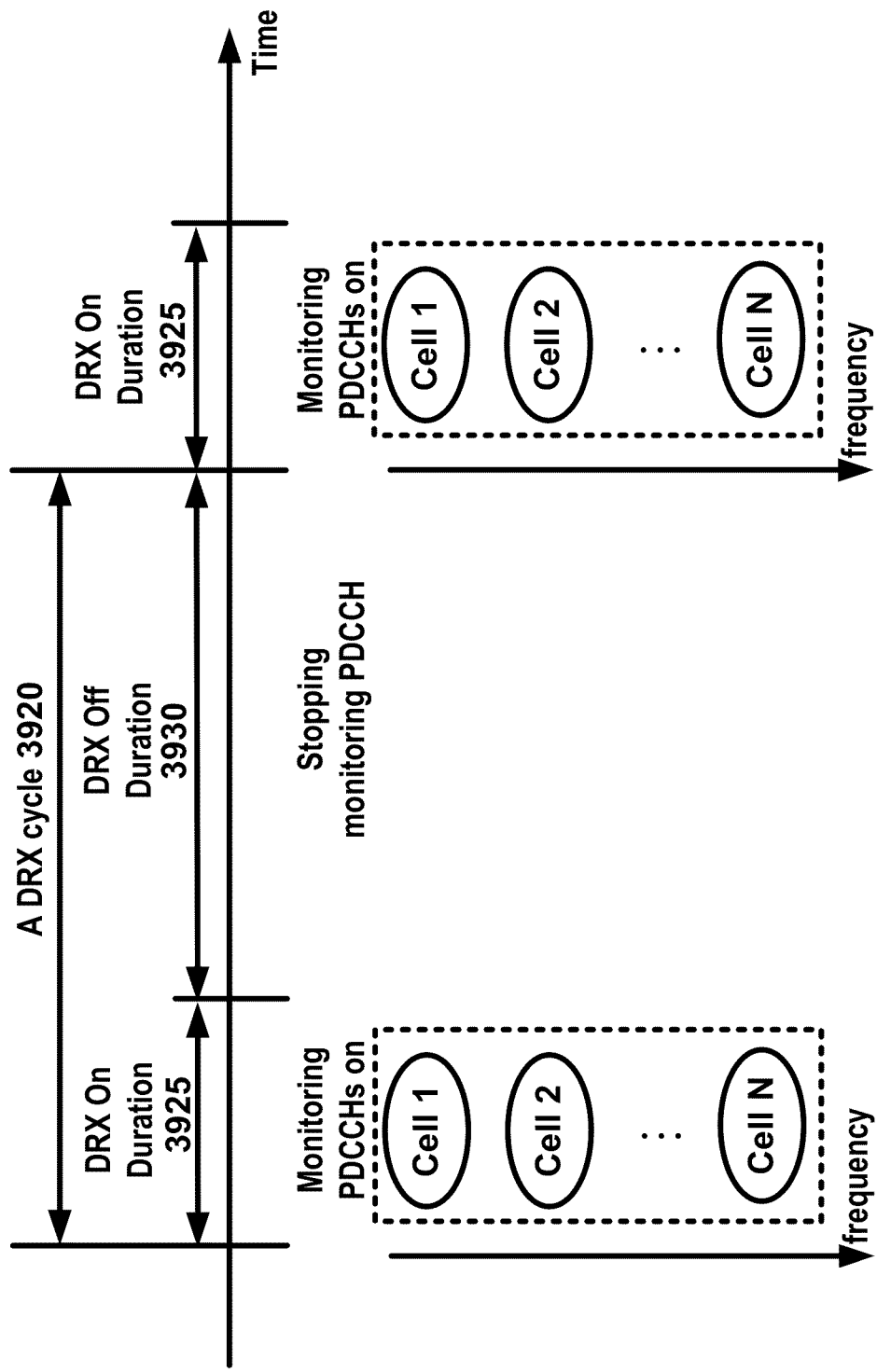
FIG. 39 shows an example of a DRX cycle.

FIG. 39 shows an example of a DRX cycle. A base station may send (e.g., transmit) one or more RRC messages comprising one or more DRX parameters of a DRX cycle 3920. The one or more parameters may comprise a first parameter and/or a second parameter. The first parameter may indicate a first time value of the DRX Active state (e.g., DRX On duration) 3925 of the DRX cycle 3920. The second parameter may indicate a second time of the DRX Sleep state (e.g., DRX Off duration) 3930 of the DRX cycle 3920. The one or more parameters may further comprise a time duration of the DRX cycle 3920. The wireless device in the DRX Active state may monitor PDCCHs for detecting one or more quantities of DCI on a serving cell. The wireless device in the DRX Sleep state 3930 may stop monitoring PDCCHs on the serving cell. The wireless device may monitor all PDCCHs on (or for) the multiple cells in the DRX Active state 3925. The wireless device may monitor all PDCCHs on (or for) the multiple cells in the DRX Active state 3925, for example, if multiple cells are in active state. The wireless device, for example, during the DRX Off 3930 duration, the wireless device may stop monitoring all PDCCH on (or for) the multiple cells. The wireless device may repeat the DRX operations according to the one or more DRX parameters.

DRX may be beneficial to the base station. The wireless device may be sending (e.g., transmitting) periodic CSI and/or SRS frequently (e.g., based on the configuration), for example if DRX is not configured. The wireless device may not send (e.g., transmit) periodic CSI and/or SRS, for example, during DRX Off 3930 periods. The base station may assign these resources to the other wireless devices to provide advantages such as improved resource utilization efficiency.

A wireless device (e.g., a MAC entity of the wireless device) may be configured by RRC with a DRX functionality that controls the wireless device's downlink control channel (e.g., PDCCH) monitoring activity for a plurality of RNTIs for the MAC entity. The plurality of RNTIs may comprise at least one of: a C-RNTI; a CS-RNTI; an INT-RNTI; a SP-CSI-RNTI; a SFI-RNTI; a TPC-PUCCH-RNTI; a TPC-PUSCH-RNTI; a Semi-Persistent Scheduling C-RNTI; an eIMTA-RNTI; an SL-RNTI; an SL-V-RNTI; a CC-RNTI; and/or an SRS-TPC-RNTI. The wireless device (e.g., the MAC entity of the wireless device) may monitor the PDCCH discontinuously using the DRX operation, for example, based on (e.g., after or in response to) being in RRC_CONNECTED. The wireless device (e.g., the MAC entity of the wireless device) may monitor the PDCCH discontinuously using the DRX operation, for example, Based on (e.g., after or in response to) being in RRC_CONNECTED, (e.g., if DRX is configured). The wireless device (e.g., the MAC entity of the wireless device) may monitor the PDCCH continuously. The wireless device (e.g., the MAC entity of the wireless device) may monitor the PDCCH continuously, for example, if DRX is not configured.

RRC may control DRX operation by configuring a plurality of timers. The plurality of timers may comprise: a DRX On duration timer (e.g., drx-onDurationTimer); a DRX inactivity timer (e.g., drx-InactivityTimer); a downlink DRX HARQ RTT timer (e.g., drx-HARQ-RTT-TimerDL); an uplink DRX HARQ RTT Timer (e.g., drx-HARQ-RTT-TimerUL); a downlink retransmission timer (e.g., drx-RetransmissionTimerDL); an uplink retransmission timer (e.g., drx-RetransmissionTimerUL); one or more parameters of a short DRX configuration (e.g., drx-ShortCycle and/or drx-ShortCycleTimer); and/or one or more parameters of a long DRX configuration (e.g., drx-LongCycle). Time granularity for DRX timers may be in terms of PDCCH subframes (e.g., indicated as psf in the DRX configurations), or in terms of milliseconds or any other time duration.

The Active Time may include a time, for example, during which at least one timer is running, for example, based on (e.g., after or in response to) a DRX cycle 3920 being configured. The at least one timer may comprise at least one of: a drx-onDurationTimer, drx-InactivityTimer, a drx-RetransmissionTimerDL, a drx-RetransmissionTimerUL, and/or a mac-ContentionResolutionTimer.

A drx-InactivityTimer may specify/indicate a time duration for which the wireless device may be active, for example, after successfully decoding a PDCCH indicating a new transmission (UL or DL or SL). This timer may be restarted upon receiving PDCCH for a new transmission (UL or DL or SL). The wireless device may transition to a DRX mode (e.g., using a short DRX cycle or a long DRX cycle) based on (e.g., after or in response to) the expiry of this timer. A drx-ShortCycle may be a first type of DRX cycle (e.g., if configured) that needs to be followed, for example, if the wireless device enters DRX mode. A DRX-Config IE may indicate the length of the short cycle. A drx-ShortCycleTimer may be expressed as multiples of a short DRX cycle. The timer may indicate the number/quantity of initial DRX cycles to follow the short DRX cycle, for example, before entering the long DRX cycle. A drx-onDurationTimer may specify/indicate a time duration, for example, at the beginning of a DRX Cycle 3920 (e.g., DRX On). A drx-onDurationTimer may indicate a time duration, for example, before entering the sleep mode (DRX Off). A drx-HARQ-RTT-TimerDL may specify/indicate a minimum duration from the time new transmission is received and, for example, before the wireless device may expect a retransmission of a same packet. One or more timers (e.g., a drx-HARQ-RTT-TimerDL timer) may be fixed and/or may not be configured by RRC. A drx-RetransmissionTimerDL may indicate a maximum duration for which the wireless device may be monitoring PDCCH. A drx-RetransmissionTimerDL may indicate a maximum duration for which the wireless device may be monitoring PDCCH, for example, if a retransmission from the base station is expected by the wireless device.

The Active Time may comprise a time, for example, during which a scheduling request may be sent via a PUCCH and is pending, for example, based on (e.g., after or in response to) a DRX cycle 3920 being configured. The Active Time may comprise a time, for example, during which an uplink grant for a pending HARQ retransmission may occur and there is data in the corresponding HARQ buffer for synchronous HARQ process, for example, based on (e.g., after or in response to) a DRX cycle 3920 being configured. The Active Time may comprise a time, for example, during which a PDCCH indicating a new transmission addressed to the C-RNTI of the MAC entity has not been received, for example, based on (e.g., after or in response to) a DRX cycle 3920 being configured (e.g., after successful reception of a random access response for the preamble not selected by the wireless device/MAC entity).

A DL HARQ RTT Timer may expire in a subframe and the data of the corresponding HARQ process may not be successfully decoded. The wireless device (e.g., MAC entity of the wireless device) may start the drx-RetransmissionTimerDL for the corresponding HARQ process. An UL HARQ RTT Timer may expire in a subframe. The wireless device (e.g., MAC entity of the wireless device) may start the drx-RetransmissionTimerUL for the corresponding HARQ process. A DRX Command MAC control element or a Long DRX Command MAC control element may be received. The wireless device (e.g., MAC entity of the wireless device) may stop drx-onDuration Timer and stop drx-InactivityTimer. A drx-InactivityTimer may expire or a DRX Command MAC control element may be received in a subframe. The wireless device (e.g., MAC entity of the wireless device) may start or restart drx-ShortCycleTimer and may use Short DRX Cycle, for example, based on the Short DRX cycle being configured. The MAC entity may use the Long DRX cycle, for example, based on the Short DRX cycle not being configured.

A drx-ShortCycleTimer may expire in a subframe. The wireless device (e.g., a MAC entity of the wireless device) may use the Long DRX cycle. A Long DRX Command MAC control element may be received. The wireless device (e.g., a MAC entity of the wireless device) may stop drx-ShortCycle Timer and may use the Long DRX cycle.

The wireless device may start drx-onDurationTimer, for example, if the Short DRX Cycle is used and [(SFN*10)+subframe number] modulo (drx-ShortCycle)=(drxStartOffset) modulo (drx-ShortCycle). The wireless device may start drx-onDurationTimer, for example, if the Long DRX Cycle is used and [(SFN*10)+subframe number] modulo (drx-longCycle)=drxStartOffset.

Figure 40:
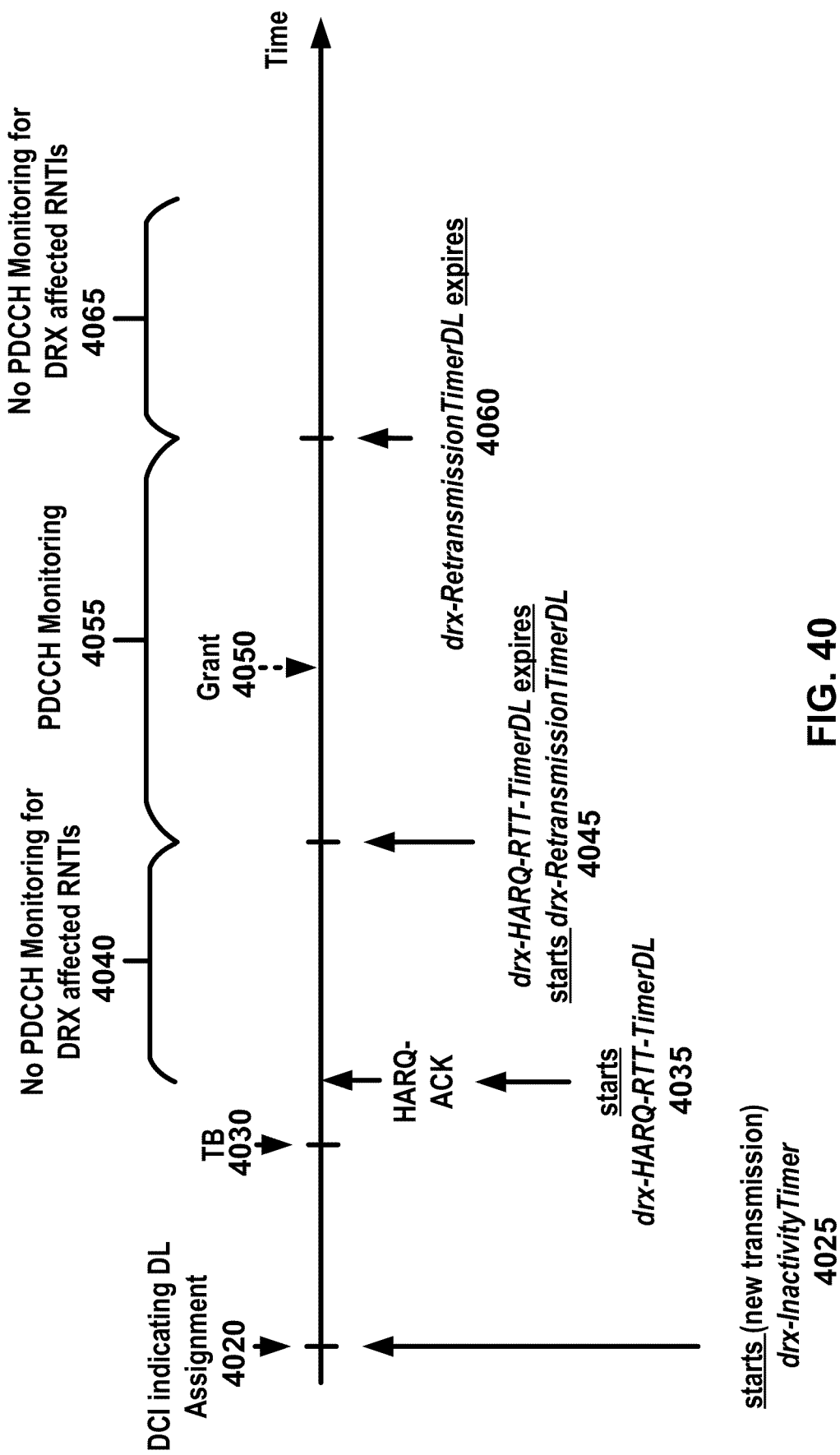
FIG. 40 shows an example of a DRX configuration.

FIG. 40 shows an example of DRX configuration. A base station may send (e.g., transmit) an RRC message comprising configuration parameters of DRX operation. At step 4020, the base station may send (e.g., transmit) DCI for downlink resource allocation (e.g., assignment) via a PDCCH, to a wireless device. At step 4025, the wireless device may start the drx-InactivityTimer and monitor the PDCCH. At step 4030, the wireless device may start a HARQ RTT Timer (e.g., drx-HARQ-RTT-TimerDL). At step 4030, the wireless device may receive a transmission block (TB). At step 4035, the wireless device may start a HARQ RTT Timer (e.g., drx-HARQ-RTT-TimerDL). The wireless device may start a HARQ RTT Timer (e.g., drx-HARQ-RTT-TimerDL), for example, after receiving a transmission block (TB) and, for example, while the drx-InactivityTimer is running. The wireless device may start a HARQ RTT Timer (e.g., drx-HARQ-RTT-TimerDL), for example, after the wireless device sends (e.g., transmits) a NACK to the base station upon unsuccessful receiving the TB. The wireless device may stop monitoring the PDCCH. The wireless device may stop monitoring the PDCCH, for example, when the HARQ RTT Timer is running at step 4040. At step 4045, the HARQ RTT Timer may expire. At step 4045, the wireless device may start a HARQ retransmission timer (e.g., drx-RetransmissionTimerDL). At 4055, the wireless device may monitor the PDCCH. The wireless device may start monitoring the PDCCH and start a HARQ retransmission timer (e.g., drx-RetransmissionTimerDL), for example, when the HARQ RTT Timer expires. At 4050, the wireless device may receive second DCI indicating a DL grant for the retransmission of the TB. The wireless device may receive second DCI indicating a DL grant for the retransmission of the TB, for example, while the HARQ retransmission timer is running. At step 4060, the wireless device may stop monitoring the PDCCH. The wireless device may stop monitoring the PDCCH, for example, if the wireless device does not receive the second DCI before the HARQ retransmission timer expires. At step 4065, the wireless device may not monitor the PDCCH for DRX-affected RNTIs.

FIG. 41A shows an example of a power saving mechanism based on wake-up indication. A base station may send (e.g., transmit) one or more messages comprising parameters of a wake-up duration 4120 (e.g., a power saving duration, or a Power Saving Channel (PSCH) occasion), to a wireless device. The wake-up duration 4120 may be allocated (e.g., represented by) a number/quantity of slots (or symbols), for example, before a DRX On duration 4125 of a DRX cycle. The number/quantity of slots (or symbols) (e.g., a gap between a wakeup duration 4120 and a DRX On duration 4125), may be configured in one or more RRC messages and/or predefined as a fixed value. The gap may be used for at least one of: synchronization with the base station; measuring reference signals; and/or retuning RF parameters. The gap may be determined based on a capability of the wireless device and/or the base station. The parameters of the wake-up duration 4120 may be predefined without RRC configuration. The wake-up mechanism may be based on a wake-up indication 4130 via a PSCH. The parameters of the wake-up duration 4120 may comprise at least one of: a PSCH channel format (e.g., numerology, DCI format, PDCCH format); a periodicity of the PSCH; a control resource set and/or a search space of the PSCH. If the wireless device is configured with the parameters of the wake-up duration 4120, the wireless device may monitor the wake-up signal (e.g., wake-up indication) 4130 or the PSCH, for example, during the wake-up duration 4120. If the wireless device is configured with the parameters of the PSCH occasion, the wireless device may monitor the PSCH for detecting a wake-up indication 4130, for example, during the PSCH occasion 4120. The wake-up indication may be DCI with CRC scrambled with a power saving RNTI (e.g., PS-RNTI). The DCI with CRC scrambled with PS-RNTI may be referred to as DCP. At step 4135, the wireless device may receive a wake-up indication 4130. Based on (e.g., after or in response to) receiving the wake-up signal/channel (or a wake-up indication 4130 via the PSCH), at step 4145, the wireless device may wake-up to monitor PDCCHs according to the DRX configuration. Based on (e.g., after or in response to) receiving the wake-up indication via the PSCH, the wireless device may monitor PDCCHs in the DRX active time 4125 (e.g., when drx-onDurationTimer is running). The wireless device may go back to sleep. The wireless device may go back to sleep, for example, if the wireless device does not receive PDCCHs in the DRX active time 4125. At step 4150, the wireless device may remain in sleep, for example, during the DRX off duration 4130 of the DRX cycle. At step 4160, the wireless device may skip monitoring PDCCHs in the DRX active time 4125, for example, if the wireless device does not receive the wake-up signal/channel (or a wake-up indication 4130 via the PSCH) during the wake-up duration (or the PSCH occasion) 4120 (e.g., at step 4155).

A power saving mechanism may be based on a go-to-sleep indication via a PSCH. FIG. 41B shows an example of a power saving based on a go-to-sleep indication 4165. At step 4170, the wireless device may receive a go-to-sleep indication 4165. Based on (e.g., after or in response to) receiving a go-to-sleep indication 4165 via the PSCH, at step 4175, the wireless device may go back to sleep and skip monitoring PDCCHs, for example, during the DRX active time 4125 (e.g., next DRX On duration of a DRX cycle). At step 4190, the wireless device may monitor PDCCHs according to the configuration parameters of the DRX operation. The wireless device may monitor PDCCHs, for example, during the DRX active time 4125, according to the configuration parameters of the DRX operation. The wireless device may monitor PDCCHs during the DRX active time 4125, for example, if the wireless device does not receive the go-to-sleep indication 4175 via the PSCH during the wake-up duration 4120 (e.g., step 4185). This mechanism may reduce power consumption for PDCCH monitoring, for example, during the DRX active time 4125.

A power saving mechanism may be implemented by combining FIG. 41A and FIG. 41B. A base station may send (e.g., transmit) a power saving indication, for example, in DCI via a PSCH, indicating whether the wireless device shall wake up for the next DRX On duration 4125 or skip the next DRX On duration 4125. The wireless device may receive the DCI, for example, via the PSCH. Based on (e.g., after or in response to) the power saving indication (e.g., wake-up indication 4130) indicating the wireless device shall wake up for next DRX On duration 4125, the wireless device may wake up for next DRX On duration 4125. At step 4145, the wireless device may monitor the PDCCH in the next DRX On duration 4125, for example, based on (e.g., after or in response to) the wake-up indication 4130. Based on (e.g., after or in response to) the power saving indication (e.g., go-to-sleep indication 4165) indicating the wireless device shall skip (or go to sleep) for next DRX On duration 4125, at step 4175, the wireless device may go to sleep or skip for next DRX On duration 4125. The wireless device may skip monitoring PDCCH in the next DRX On duration 4125 based on (e.g., after or in response to) the power saving indication indicating the wireless device shall go to sleep for next DRX On duration 4125.

Figure 42:
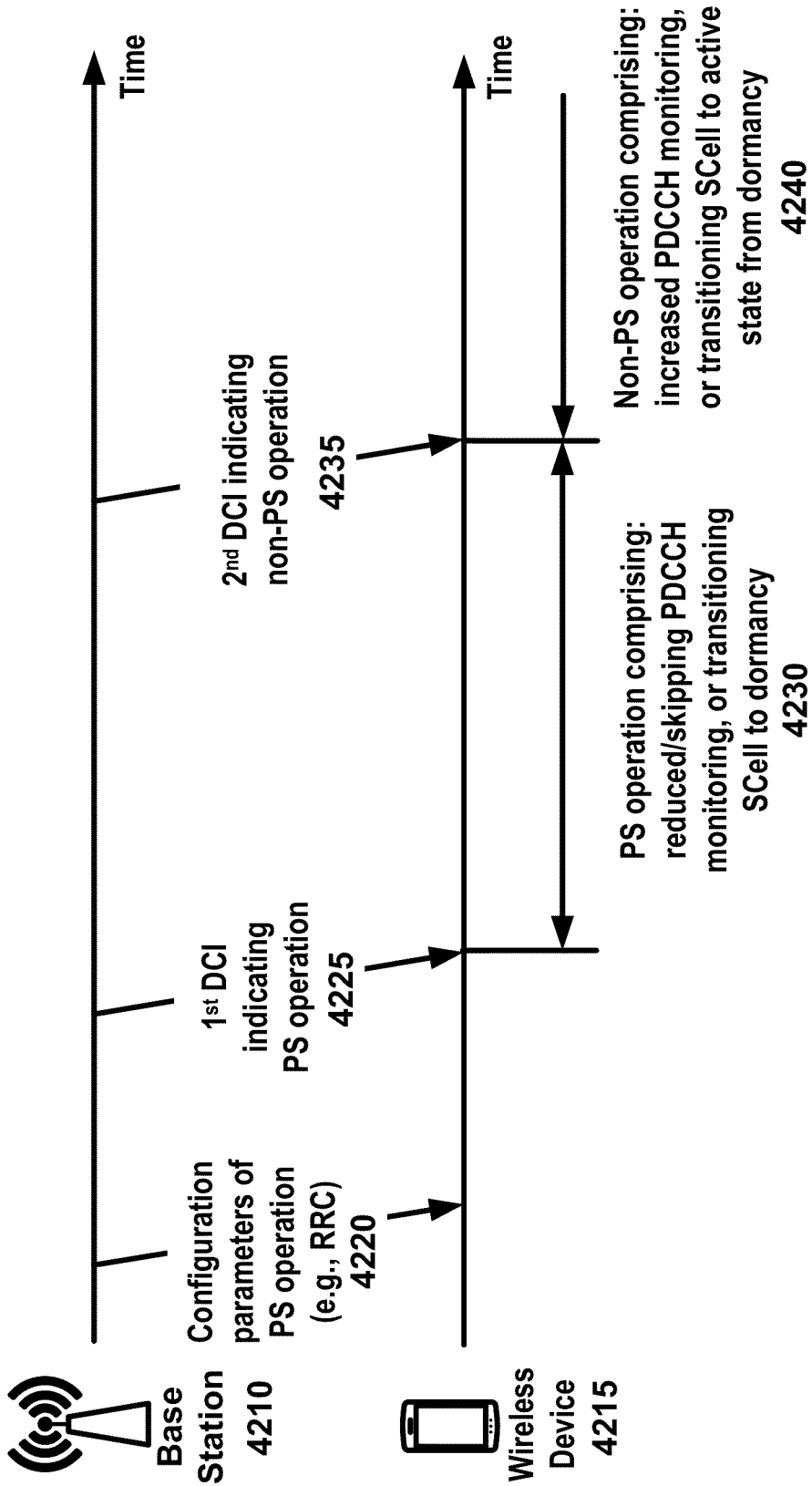
FIG. 42 shows an example of power saving based on a DCI indication.

FIG. 42 shows an example of power saving based on a DCI indication. A base station 4210 (e.g., gNB) may send (e.g., transmit) to a wireless device 4215 one or more messages 4220 (e.g., one or more RRC messages) comprising first configuration parameters of a power saving channel (PSCH) and second configuration parameters of a power saving (PS) operation. The first configuration parameters of the PSCH may comprise at least one of: one or more first search spaces (SSs) and/or one or more first CORESET on which the wireless device 4215 monitors the PSCH, one or more first DCI formats with which the wireless device 4215 monitors the PSCH, a radio network temporary identifier (RNTI) dedicated for monitoring the PSCH (e.g., PS-RNTI different from 3GPP existing RNTI values configured for the wireless device4215). The second configuration parameters of the PS operation may comprise at least one of: one or more second SSs and/or one or more second CORESETs on which the wireless device 4215 monitors PDCCHs in the PS operation, one or more first DCI formats with which the wireless device 4215 monitors PDCCHs in the PS operation, one or more MIMO parameters indicating a first maximum number of antenna (layers, ports, TRPs, panels, and/or the like) based on which the wireless device 4215 performs MIMO processing (transmission or reception) in the PS operation, one or more first cross-slot scheduling indicator indicating whether cross-slot scheduling is configured or not if the wireless device 4215 is in the PS operation, a BWP index indicating on which the wireless device 4215 sends (e.g., transmits) or receives data packet in the PS operation, and/or a cell index indicating on which the wireless device 4215 sends (e.g., transmits) or receives data packet in the PS operation. The one or more RRC messages may further comprise third configuration parameters of a normal function operation (e.g., full function, non-PS, or the like). The third configuration parameters may comprise at least one of: one or more third SSs and/or one or more third CORESETs on which the wireless device 4215 monitors PDCCHs in the non-PS operation, one or more second DCI formats with which the wireless device 4215 monitors PDCCHs in the non-PS operation, one or more MIMO parameters indicating a second maximum number of antenna(s) (layers, ports, TRPs, panels, and/or the like) based on which the wireless device 4215 performs MIMO processing (transmission or reception) in the non-PS operation, one or more second cross-slot scheduling indicator indicating whether cross-slot scheduling is configured or not if the wireless device 4215 is in the non-PS operation, and/or the like. The wireless device4215, based on cross-slot scheduling being configured, may switch off some receiver modules (e.g., data buffering, RF chain, channel tracking, etc.), for example, after receiving DCI indicating a cross-slot scheduling and, for example, before receiving a data packet based on the DCI, for power saving. The one or more second SSs and/or the one or more second CORESETs may occupy smaller radio resources than the one or more third SSs and/or the one or more third CORESETs, for example, for the purpose of power saving. The first maximum number may be less than the second maximum number, for example, for the purpose of power saving.

The wireless device 4215 may monitor the PSCH (e.g., on the first SS/CORESET) for detecting DCI with CRC scrambled by the PS-RNTI, for example, during the PSCH monitoring occasions (e.g., if the wireless device 4215 is configured with the parameters of the PSCH and PS operation). At step 4225, the wireless device 4215 may detect (e.g., receive) a PS indication contained in the DCI received via the PSCH, for example, based on the PSCH monitoring. The DCI may further indicate an active BWP switching. At step 4230, the wireless device 4215 may start performing a PS operation based on the one or more second configuration parameters of the PS operation, for example, based on (e.g., after or in response to) receiving the PS indication via the PSCH. Performing a PS operation based on the one or more second configuration parameters may comprise at least one of: monitoring PDCCHs on second PDCCH occasions and on second SSs/CORESETs, refraining from (e.g., stopping) monitoring the PSCH on first SSs/CORESETs, refraining from (e.g., stopping) monitoring PDCCHs on third PDCCH occasions and on third SSs/CORESETs, sending (e.g., transmitting) or receiving data packets with the first maximum number of antenna(s) (layers, ports, TRPs, panels, and/or the like), and/or sending (e.g., transmitting) or receiving data packets with cross-slot scheduling based on the one or more first cross-slot scheduling indicator. Performing the PS operation may further comprise switching an active BWP of one or more cells (e.g., a PCell/SCell, or a cell group) to a dormant BWP of the one or more cells. The wireless device 4215 may monitor the PDCCHs on second PDCCH occasions and on second SSs/CORESETs continuously. The wireless device 4215 may monitor the PDCCHs on second PDCCH occasions and on second SSs/CORESETs continuously, for example, if DRX operation is not configured. The wireless device 4215 may monitor the PDCCHs on second PDCCH occasions and on second SSs/CORESETs discontinuously in a DRX active time (e.g., next DRX On duration). The wireless device 4215 may monitor the PDCCHs on second PDCCH occasions and on second SSs/CORESETs discontinuously in a DRX active time (e.g., next DRX On duration), for example, if DRX operation is configured. The wireless device 4215, based on the monitoring the PDCCH on second PDCCH occasions, may send (e.g., transmit) or receive data packets or TBs based on (e.g., after or in response to) receiving DCI indicating an uplink grant or a downlink assignment.

The wireless device 4215 may transition a SCell from an active state to a dormant state, based on the PS indication indicating a state transition of the SCell (e.g., based on (e.g., after or in response to) receiving the PS indication via the PSCH). A dormant state of a SCell may be a time period during which the wireless device 4215 may: stop (e.g., refrain from) monitoring PDCCH(s) on/for the SCell, stop (e.g., refrain from) receiving PDSCH(s) on the SCell, stop (e.g., refrain from) sending (e.g., transmitting) uplink signals (PUSCH, PUCCH, PRACH, DMRS, and/or PRACH) on the SCell, and/or send (e.g., transmit) CSI report for the SCell. The wireless device 4215 may maintain the dormant state of the SCell, for example, until the wireless device 4215 receives a second indicator indicating a transition of the SCell from the dormant state to the active state.

The wireless device 4215 may monitor the PSCH (e.g., on the first SS/CORESET). The wireless device 4215 may monitor the PSCH (e.g., on the first SS/CORESET), for example, if the wireless device 4215 is configured with the parameters of the PSCH and PS operation, and, for example, during the PSCH monitoring occasions. The wireless device 4215 may not detect a PS indication via the PSCH. The wireless device 4215 may not detect a PS indication via the PSCH, for example, if a base station 4210 determines that the wireless device 4215 shall stay in a full function mode, or a non-PS mode. Based on (e.g., after or in response to) not receiving the PS indication via the PSCH, the wireless device 4215 may start performing operations in a full function mode based on the one or more third configuration parameters. A base station 4210 may send (e.g., transmit) a PS indication indicating whether the wireless device 4215 shall stay in a full function mode. The wireless device 4215 may receive the PS indication via a PSCH. Based on (e.g., after or in response to) the PS indication indicating the wireless shall stay in a full function mode, the wireless device 4215 may start performing operations in the full function mode based on the one or more third configuration parameters. At step 4235, the base station 4210 may send to the wireless device 4215 second DCI indicating non-PS operation. At step 4240, the wireless device may start performing operations in a full function (e.g., non-PS) mode.

Performing operations in a full function mode based on the one or more third configuration parameters may comprise at least one of: monitoring PDCCHs on third PDCCH occasions and on third SSs/CORESETs, refraining from (e.g., stopping) monitoring the PSCH on first SSs/CORESETs, refraining from (e.g., stopping) monitoring PDCCHs on second PDCCH occasions and on second SSs/CORESETs, sending (e.g., transmitting) or receiving data packets with the second maximum number of antenna(s) (layers, ports, TRPs, panels, and/or the like), sending (e.g., transmitting) or receiving data packets with same-slot scheduling based on the one or more second cross-slot scheduling indicator indicating same-slot scheduling is configured. The wireless device 4215 may monitor the PDCCHs on third PDCCH occasions and on third SSs/CORESETs continuously. The wireless device 4215 may monitor the PDCCHs on third PDCCH occasions and on third SSs/CORESETs continuously, for example, if DRX operation is not configured. The wireless device 4215 may monitor the PDCCHs on third PDCCH occasions and on third SSs/CORESETs discontinuously in a DRX active time. The wireless device 4215 may monitor the PDCCHs on third PDCCH occasions and on third SSs/CORESETs discontinuously in a DRX active time, for example, if DRX operation is configured. The wireless device 4215, based on the monitoring the PDCCH on third PDCCH occasions, may send (e.g., transmit) or receive data packets or TBs based on (e.g., after or in response to) receiving DCI indicating an uplink grant or a downlink assignment.

A wireless device 4215 (e.g., if configured with DRX operation) may not be required to report CSI (e.g., CQI/ PMI/CRI/SSBRI/L1/RI/L1-RSRP/L1-SINR) on PUCCH, for example, if the wireless device 4215 is not in an Active Time of the DRX operation. The wireless device 4215 may be required to report CSI on PUCCH, for example, if the wireless device 4215 is in an Active Time of the DRX operation. The Active Time may include a time duration during which, for example, one or more DRX timers (e.g., drx-onDurationTimer, drx-InactivityTimer, drx-RetransmissionTimerDL, drx-RetransmissionTimerUL, ra-ContentionResolutionTimer, etc.) are running, a SR is sent on a PUCCH and is pending, and/or a PDCCH indicating a new transmission addressed to the C-RNTI of a wireless device (e.g., a MAC entity of a wireless device) has not been received, for example, after successful reception of a RAR for a RA preamble not selected by the MAC entity among contention-based RA preambles. The wireless device 4215 may not send (e.g., transmit) CSI report (e.g., SP CSI on PUSCH, or CSI report via PUCCH) in a first symbol. The wireless device 4215 may not send (e.g., transmit) CSI report (e.g., SP CSI on PUSCH, or CSI report via PUCCH) in a first symbol, for example, if a MAC entity of the wireless device 4215 would not be in Active Time (e.g., considering grants/assignments/DRX Command MAC CE/Long DRX Command MAC CE received and Scheduling Request sent until 4 ms prior to the first symbol, for example, if evaluating DRX Active Time conditions).

A base station 4210 may send (e.g., transmit) to the wireless device 4215 one or more RRC messages comprising a CSI masking parameter (e.g., csi-Mask with a boolean value) indicating whether the wireless device 4215 limits CSI reports to the on-duration period (e.g., when drx-onDurationTimer is running) of a DRX cycle (e.g., such as described with respect to FIG. 39). The wireless device 4215 may send (e.g., transmit) the CSI reports. The wireless device 4215 may send (e.g., transmit) the CSI reports, for example, based on (e.g., after or in response to) the CSI masking parameter indicating the wireless device 4215 limits CSI reports to the on-duration period of the DRX cycle (e.g., if the drx-onDurationTimer is running in the DRX cycle). The wireless device 4215 may not send (e.g., transmit) CSI report (e.g., on PUCCH) in a first symbol. The wireless device 4215 may not send (e.g., transmit) CSI report (e.g., on PUCCH) in a first symbol, for example, if drx-onDurationTimer would not be running (e.g., considering grants/assignments/DRX Command MAC CE/Long DRX Command MAC CE received until 4 ms prior to the first symbol, for example, if evaluating DRX Active Time conditions).

The wireless device 4215 may send (e.g., transmit) periodic or aperiodic uplink beam report comprising P-MPR and/or PHR (e.g., L1-PHR) of the multiple panels, as shown in FIG. 34 and/or FIG. 36. The wireless device 4215 may send (e.g., transmit) periodic or aperiodic uplink beam report comprising P-MPR and/or PHR (e.g., L1-PHR) of the multiple panels, for example, if the wireless device 4215 is configured with multiple panels at a wireless device 4215 and operating in high frequency (e.g., 30 GHz, 50 GHz, or any other frequency). The uplink beam report may indicate proximity detection, or uplink coverage loss on one of the multiple panels. The wireless device 4215 may send (e.g., transmit) to the base station 4210 one or more CSI reports indicating downlink channel quality of one or more reference signal sent (e.g., transmitted) from a base station 4210 to the wireless device 4215. The uplink beam report may be different from the one or more CSI reports. The uplink beam report may indicate that a second panel or a beam of the second panel from the multiple panels is suitable for next uplink transmission, for example, if proximity is detected on a first panel and/or uplink coverage loss is occurring on the first panel. A base station 4210 may indicate (e.g., instruct) the wireless device 4215 to change to the second panel for uplink transmission (e.g., PUCCH/PUSCH/SRS), for example, based on (e.g., after or in response to) receiving the uplink beam report. A CSI report may indicate a downlink beam or a downlink TRP for receiving downlink transmission. A CSI report may indicate a downlink beam or a downlink TRP for receiving downlink transmission, for example, if the CSI report comprises L1-RSRP and/or L1-SINR. The base station 4210 may determine a downlink transmission beam for the downlink transmission (e.g., PDCCH/PDSCH/CSI-RS), for example, based on (e.g., after or in response to) receiving the CSI report. A CSI report may indicate a quantity of spatial property (e.g., rank, precoding weight index, etc.) of a radio propagation channel from the base station 4210 to the wireless device 4215. A CSI report may indicate a quantity of spatial property (e.g., rank, precoding weight index, etc.) of a radio propagation channel from the base station 4210 to the wireless device 4215, for example, if the CSI report comprises PMI/CRI/RI etc. The base station 4210 may determine a transmission format (e.g., MCS, resource allocation of PDCCH/PDSCH, MIMO transmission format, etc.) on a PDSCH, for example, based on (e.g., after or in response to) receiving the CSI report.

At least some wireless devices may not be able to determine when and/or where to send (e.g., transmit) an uplink beam report, for example, if a DRX operation is configured. A wireless device may autonomously determine to send (e.g., transmit) an uplink beam report (e.g., comprising P-MPR/PHR). A wireless device may autonomously determine to send (e.g., transmit) an uplink beam report (e.g., comprising P-MPR/PHR), for example, if a MAC entity of the wireless device is not in an Active time of a DRX operation, and, for example, if the DRX operation is configured for the wireless device 4215. A wireless device may autonomously determine to send (e.g., transmit) an uplink beam report (e.g., comprising P-MPR/PHR). A wireless device may autonomously determine to send (e.g., transmit) an uplink beam report (e.g., comprising P-MPR/PHR), for example, when a drx-onDurationTimer is not running for a DRX cycle, and, for example, if the wireless device uses the DRX cycle. A base station may not be aware of the wireless device sending (e.g., transmitting) the uplink beam report via uplink radio resources in the DRX off time (e.g., not in Active time, or when the drx-onDurationTimer is not running). It may be possible that the base station has allocated the uplink radio resources to other wireless devices for uplink transmission. This misalignment on the uplink beam report for DRX operation may result in increased uplink interferences, reduced uplink throughput, and/or increased power consumption. As described herein, DRX operation for uplink beam report may be improved.

Figure 43A:
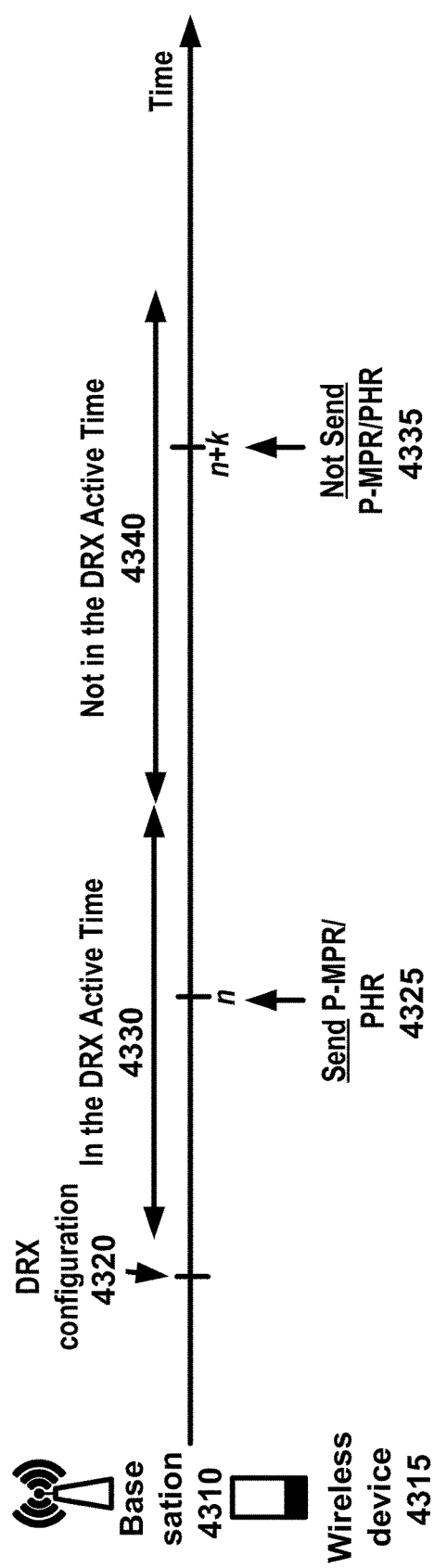
FIG. 43A and FIG. 43B show examples of uplink beam reporting using DRX.

FIG. 43A shows an example of uplink beam reporting using DRX. A wireless device 4315 may receive, from a base station 4310, one or more messages 4320 (e.g., RRC messages) comprising at least one of: first parameters controlling a DRX operation and second parameters of CSI report and uplink beam report. The first parameters may comprise one or more timer values of one or more DRX timers (e.g., drx-onDurationTimer, drx-InactivityTimer, drx-RetransmissionTimerDL, drx-RetransmissionTimerUL, ra-ContentionResolutionTimer, etc.)(e.g., based on or more examples described with respect to FIG. 39 and/or FIG. 40). The second parameters of the CSI report and the uplink beam report may be implemented based on one or more examples described with respect to FIG. 34).

At step 4325, the wireless device 4315 may send (e.g., transmit) the uplink beam report and/or the CSI report, for example, during an Active Time 4330 of the DRX operation. The CSI report (not shown in FIG. 43A) may comprise one or more quantities of CQI, PMI, CRI, SSBRI, LI, RI, L1-RSRP, and/or L1-SINR. The uplink beam report may comprise one or more quantities of P-MPR and PHR of one or more panels of the wireless device 4315. The uplink beam report may be a periodic report, such as described with respect to FIG. 36. The uplink beam report may be an aperiodic report, such as described with respect to FIG. 34 and/or FIG. 35. The wireless device 4315 may send (e.g., transmit) the uplink beam report and/or the CSI report via a PUCCH resource. The wireless device 4315 may send (e.g., transmit) the uplink beam report and/or the CSI report via a PUSCH resource.

At step 4335, the wireless device 4315 may not send (e.g., transmit) the uplink beam report and the CSI report (not shown in FIG. 43A) in a first symbol. The wireless device 4315 may not send (e.g., transmit) the uplink beam report and the CSI report (not shown in FIG. 43A) in a first symbol, for example, if a MAC entity of the wireless device 4315 would not be in Active Time 4340 (e.g., considering grants/assignments/DRX Command MAC CE/Long DRX Command MAC CE received and SR sent until 4 ms prior to the first symbol, for example, if evaluating DRX Active Time conditions).

Figure 43B:
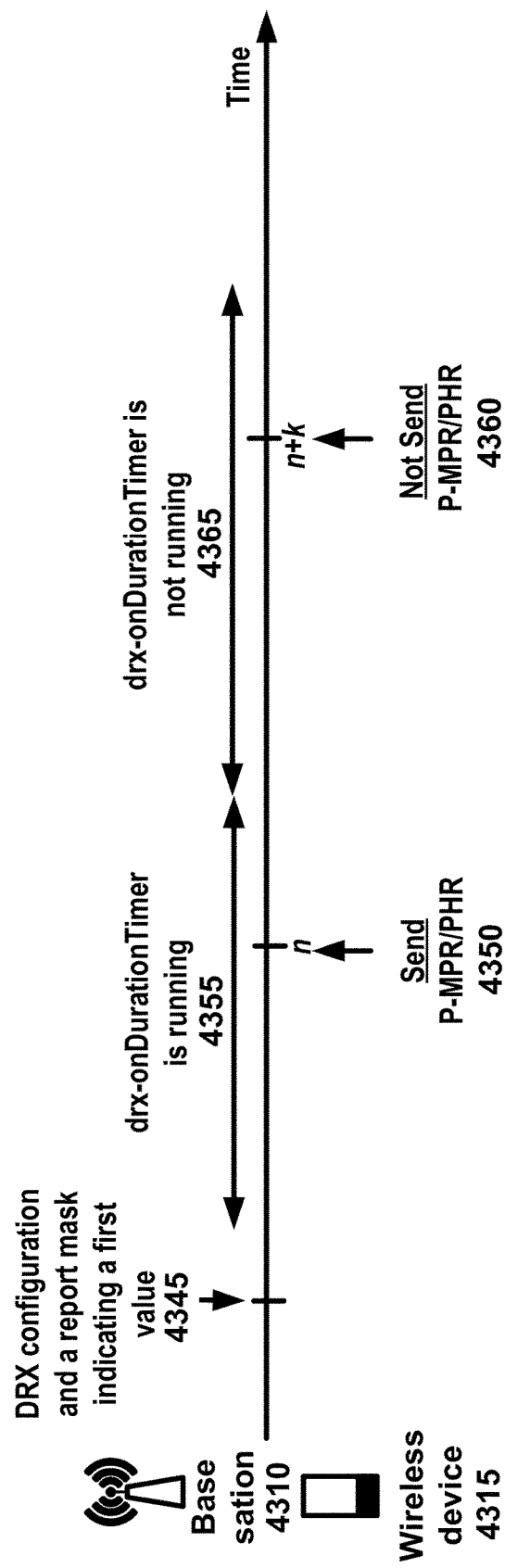

FIG. 43A may be improved by limiting the uplink beam report to a DRX On duration of a DRX cycle. FIG. 43B shows an example of an improvement. A base station 4310 may send (e.g., transmit) to a wireless device 4315 one or more RRC messages 4345 comprising a report mask parameter (e.g., csi-Mask, uplink beam report Mask, and the like). The report mask parameter may indicate whether the wireless device 4315 limits the uplink beam report to a DRX on-duration time of a DRX cycle. If the report mask parameter indicates, for example, with a first value (e.g., "true"), that the wireless device 4315 limits the uplink beam report to a DRX on-duration time of a DRX cycle, at step 4350, the wireless device 4315 may send (e.g., transmit) the uplink beam report, for example, when drx-onDurationTimer is running in the DRX cycle (e.g., step 4355). At step 4360, the wireless device 4315 may not send (e.g., transmit) the uplink beam report, for example, when drx-onDurationTimer is not running in the DRX cycle (e.g., step 4365). If the report mask parameter indicates that the wireless device 4315 limits the uplink beam report to a DRX on-duration time of a DRX cycle, the wireless device 4315 may not send (e.g., transmit) the uplink beam report at a first symbol, for example, when drx-onDurationTimer would not be running (e.g., considering grants/assignments/DRX Command MAC CE/Long DRX Command MAC CE received until 4 ms prior to the first symbol, for example, if evaluating DRX Active Time conditions).

FIG. 43A and/or FIG. 43B may be extended to other power saving operations (e.g., DCI-based power saving state switching of FIG. 42). A wireless device 4315 may switch from a normal power state to a power saving state based on receiving first DCI as shown in FIG. 42. The wireless device 4315 may perform one or more power saving operations (e.g., based on (e.g., after or in response to) receiving the first DCI) comprising at least one of: reduced/skipped PDCCH monitoring, and/or transitioning SCell to a dormancy. The wireless device 4315 may stop sending (e.g., transmitting) the uplink beam management comprising P-MPR/PHR of a plurality panels of the wireless device 4315, for example, based on (e.g., after or in response to) receiving the DCI. The wireless device 4315 may switch from the power saving state to the normal power state based on receiving second DCI (e.g., such as described with respect to FIG. 42). The wireless device 4315 may perform one or more non-PS operation (e.g., based on (e.g., after or in response to) receiving the second DCI) comprising at least one of: increased PDCCH monitoring, and/or transitioning a SCell to non-dormancy. The wireless device 4315 may send (e.g., transmit) the uplink beam management comprising P-MPR/PHR of a plurality panels of the wireless device 4315, for example, based on (e.g., after or in response to) receiving the second DCI. A base station 4310 may send (e.g., transmit) to the wireless device 4315 one or more RRC messages comprising an indication indicating whether the wireless device 4315 is required to send (e.g., transmit) the uplink beam report comprising the P-MPR/PHR in a power saving state. The wireless device 4315 may send (e.g., transmit) the uplink beam report in the power saving state, for example, based on (e.g., after or in response to) the indication indicating that the wireless device 4315 is required to send (e.g., transmit) the uplink beam report comprising the P-MPR/PHR in a power saving state. The wireless device 4315 may skip sending (e.g., transmitting) the uplink beam report in the power saving state, for example, based on (e.g., after or in response to) the indication indicating that the wireless device 4315 is not required to send (e.g., transmit) the uplink beam report comprising the P-MPR/PHR in the power saving state.

The wireless device 4315 and the base station 4310 may align on uplink beam report (e.g., as described with respect to FIG. 43A and/or FIG. 43B). The wireless device 4315 and the base station 4310 may align on uplink beam report, for example, if a DRX operation is configured, or a power saving operation is configured. One or more examples described herein may improve uplink throughput and power consumption of the wireless device 4315.

The wireless device 4315 may send (e.g., transmit) periodic or aperiodic uplink beam report comprising P-MPR and/or PHR (e.g., L1-PHR) of the multiple panels (e.g., such as described with respect to FIG. 34 and/or FIG. 36). The wireless device 4315 may send (e.g., transmit) periodic or aperiodic uplink beam report comprising P-MPR and/or PHR (e.g., L1-PHR) of the multiple panels, for example, if the wireless device 4315 is configured with multiple panels at a wireless device 4315 and operating in high frequency (e.g., 30 GHz, 50 GHz, etc.). The uplink beam report may indicate a proximity detection, and/or uplink coverage loss on one of the multiple panels. The wireless device 4315 may send (e.g., transmit) to the base station 4310 one or more CSI reports indicating downlink channel quality of one or more reference signals sent (e.g., transmitted) from a base station 4310 to the wireless device 4315. The uplink beam report may be different from the one or more CSI reports. The uplink beam report may indicate that a second panel or a beam of the second panel from the multiple panels is suitable for next uplink transmission, for example, if proximity is detected on a first panel and/or uplink coverage loss is occurring on the first panel. A base station 4310 may indicate (e.g., instruct) the wireless device 4315 to change to the second panel for uplink transmission (e.g., PUCCH/PUSCH/SRS), for example, based on (e.g., after or in response to) receiving the uplink beam report. A CSI report may indicate a downlink beam and/or a downlink TRP for receiving downlink transmission. A CSI report may indicate a downlink beam or a downlink TRP for receiving downlink transmission, for example, if the CSI report comprises L1-RSRP and/or L1-SINR. The base station 4310 may determine a downlink transmission beam for the downlink transmission (e.g., PDCCH/PDSCH/CSI-RS), for example, based on (e.g., after or in response to) receiving the CSI report. A CSI report may indicate a quantity of spatial property (e.g., rank, precoding weight index, etc.) of a radio propagation channel from the base station 4310 to the wireless device 4315. A CSI report may indicate a quantity of spatial property (e.g., rank, precoding weight index, etc.) of a radio propagation channel from the base station 4310 to the wireless device 4315, for example, if the CSI report comprises PMI/CRI/RI etc. The base station 4310 may determine a transmission format (e.g., MCS, resource allocation of PDCCH/PDSCH, MIMO transmission format, etc.) on a PDSCH, for example, based on (e.g., after or in response to) receiving the second CSI report.

At least some wireless devices may autonomously determine whether to send (e.g., transmit) an uplink beam report (e.g., comprising P-MPR/PHR), for example, if the wireless device 415 is in a power saving operation. The power saving operation may be implemented based on one or more examples described with respect to FIG. 41A, FIG. 41B and/or FIG. 42. A base station may not be aware of a wireless device sending (e.g., transmitting) the uplink beam report via uplink radio resources in a power saving mode. It may be possible that the base station has allocated the uplink radio resources to other wireless devices for uplink transmission. This misalignment on the uplink beam report for power saving operation may result in increased uplink interferences, reduced uplink throughput and/or increased power consumption. As described herein, power saving operation for uplink beam report may be improved.

Figure 44:
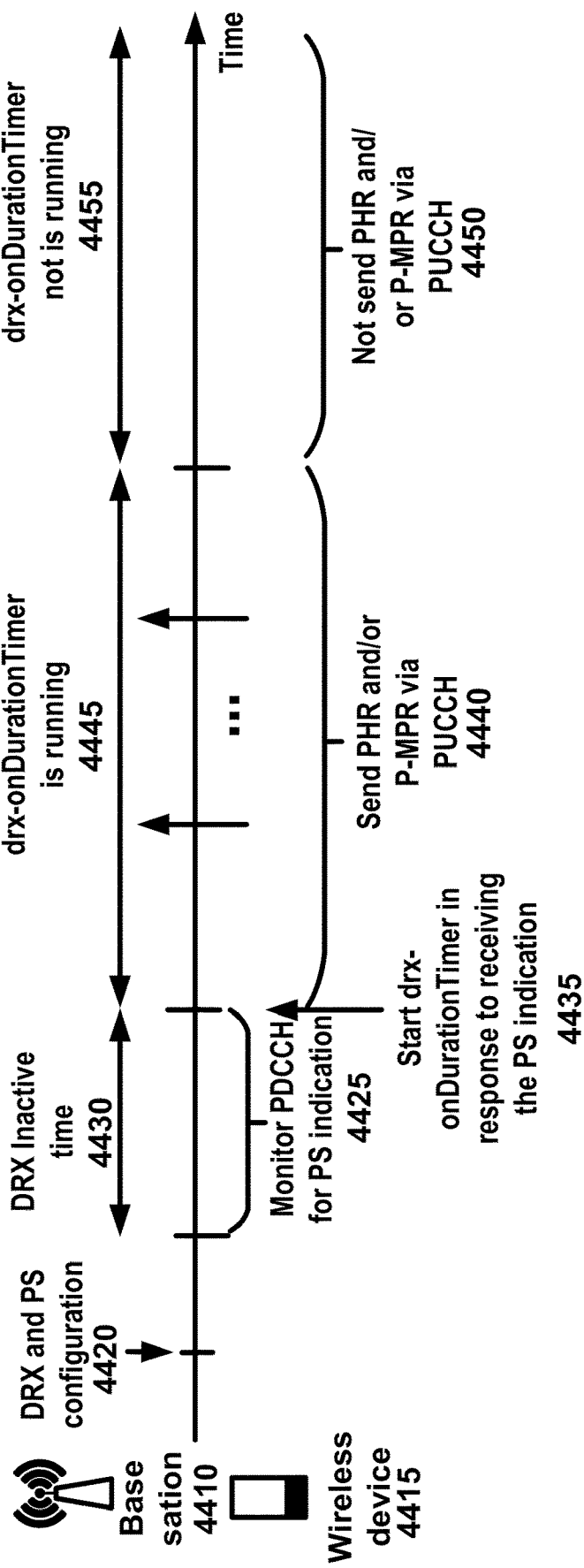
FIG. 44 shows an example of uplink beam reporting using DRX.

FIG. 44 shows an example of uplink beam reporting using DRX. The uplink beam reporting may comprise at least one of a P-MPR, an RSRP, and/or a PHR in a power saving operation. A base station 4410 may send (e.g., transmit), to a wireless device 4415, one or more messages 4420 (e.g., RRC messages) comprising first configuration parameters of a DRX operation and second configuration parameters of a power saving operation. The first configuration parameters may be implemented based on one or more examples described with respect to FIG. 43A and/or FIG. 43B. The second configuration parameters may be implemented based on one or more examples described with respect to FIG. 41A and/or FIG. 41B. The power saving operation may be based on a power saving indication comprised in DCI sent (e.g., transmitted) in a PDCCH. The DCI may be with CRC scrambled by a power saving RNTI (e.g., PS-RNTI). The DCI with CRC scrambled by PS-RNTI may be referred to as DCP. The power saving operation may be associated with a DRX operation. At step 4425, the wireless device 4415 may monitor PDCCH for receiving the DCP in an Inactive Time 4430 of a DRX operation. The Inactive Time 4430 may be a time duration, for example, during which the wireless device 4415 is not in an Active Time of the DRX operation. The Active Time may include a time duration during which, for example, one or more DRX timers (e.g., drx-onDurationTimer, drx-InactivityTimer, drx-RetransmissionTimerDL, drx-RetransmissionTimerUL, ra-ContentionResolutionTimer, etc.) are running, a SR is sent on a PUCCH and is pending, and/or a PDCCH indicating a new transmission addressed to the C-RNTI of a MAC entity has not been received, for example, after successful reception of a RAR for a RA preamble not selected by the MAC entity among contention-based RA preambles.

The first configuration parameters may comprise a first indication (e.g., ps-Wakeup) indicating whether the wireless device 4415 starts drx-onDurationTimer associated with a DCP, for example, if the DCP is monitored but not detected. The first configuration parameters may further comprise a report enable/disable indication indicating whether the wireless device 4415 sends (e.g., transmits) periodic uplink beam report, for example, during a time duration indicated by drx-onDurationTimer, and, for example, if DCI with CRC scrambled by PS-RNTI is configured but associated drx-onDurationTimer is not started. The report enable/disable indication may comprise ps-Periodic_CSI_Transmit or ps-TransmitPeriodicL1-RSRP.

The wireless device 4415 may receive the DCP indicating to start drx-onDurationTimer, for example, during monitoring of the PDCCH for the DCP. At step 4435, the wireless device 4415 may start drx-onDurationTimer, for example, based on (e.g., after or in response to) receiving the power saving indication indicating to start drx-onDurationTimer.

The wireless device 4415 may not receive the DCP, for example, while during monitoring of the PDCCH. The wireless device 4415 may start drx-onDurationTimer based on (e.g., after or in response to) not receiving the DCP. The wireless device 4415 may start drx-onDurationTimer based on (e.g., after or in response to) not receiving the DCP, for example, if the first indication (e.g., ps-Wakeup) indicates that the wireless device 4415 starts drx-onDurationTimer associated with a DCP in case the DCP is monitored but not detected.

At step 4440, the wireless device 4415 may send (e.g., transmit) one or more uplink beam reports, for example, when drx-onDurationTimer is running (e.g., step 4445). At step 4450, the wireless device 4415 may stop sending (e.g., transmitting) uplink beam reports. The wireless device 4415 may not send (e.g., transmit) uplink beam reports, for example, if drx-onDurationTimer is not running (e.g., step 4455).

Figure 45:
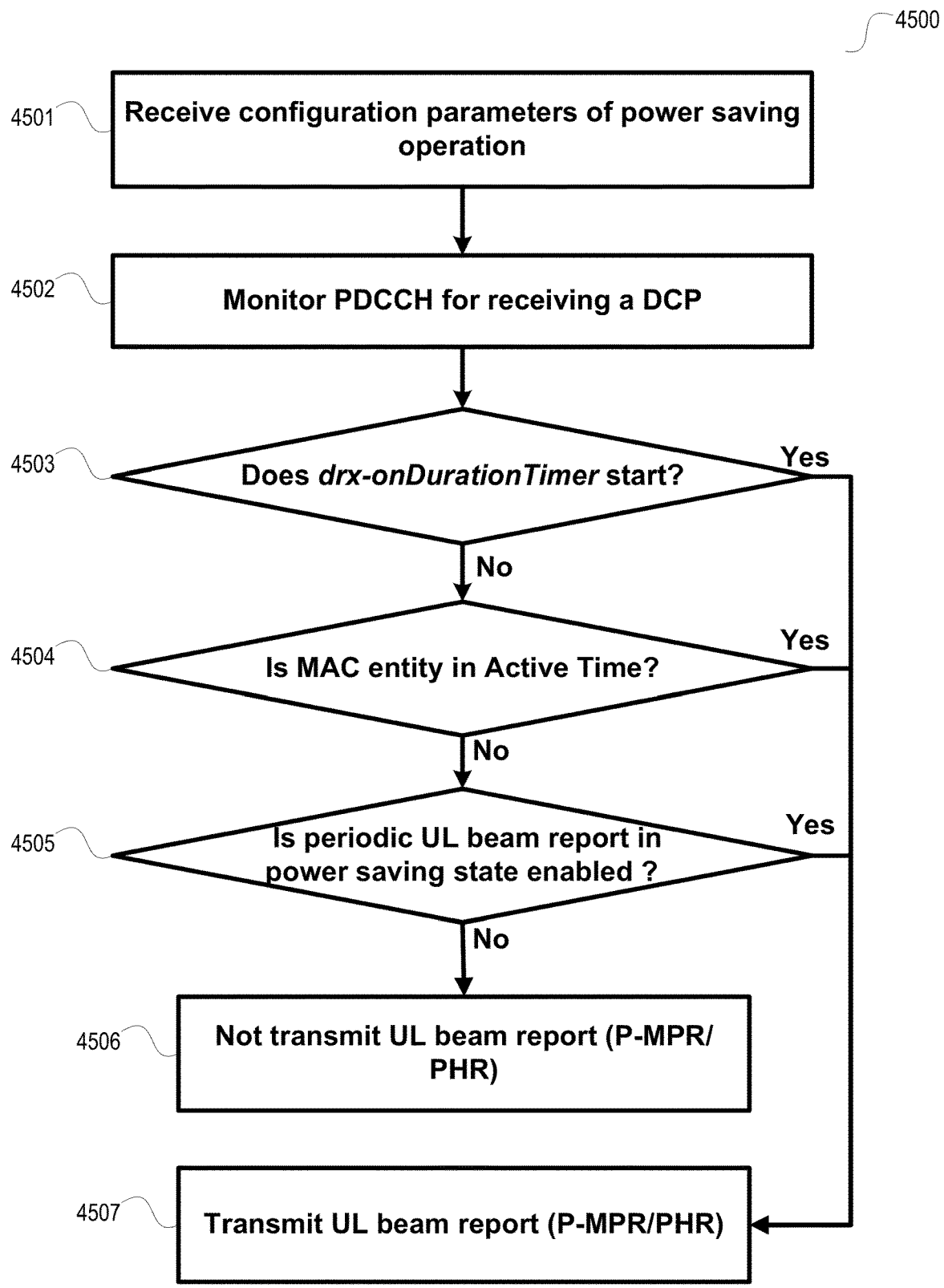
FIG. 45 shows an example method uplink beam reporting for a power saving state.

FIG. 45 shows an example flowchart of uplink beam reporting in a power saving state. The uplink beam reporting may comprise reporting at least one of: a P-MPR, and RSRP, and/or a PHR in a power saving state. A method 4500 may be performed by a wireless device. The steps outlined herein are examples and can be implemented in any combination thereof, including combinations that exclude, add, or modify certain steps. At step 4501, a wireless device may receive from a base station one or more messages (e.g., RRC messages) comprising configuration parameters of a DRX configuration associated with a power saving indication. The power saving indication may be DCI with CRC scrambled by a power saving RNTI (e.g., PS-RNTI). The DCI with CRC scrambled by the PS-RNTI may be referred to as a DCP. The configuration parameters may be implemented based on one or more examples described with respect to FIG. 44.

The first configuration parameters may comprise a first indication (e.g., ps-Wakeup) indicating whether the wireless device starts drx-onDurationTimer associated with a DCP in case the DCP is monitored but not detected. The configuration parameters may comprise an indication indicating whether the wireless device sends (e.g., transmits) periodic uplink beam report in a power saving state. The uplink beam report may be implemented based on one or more examples described with respect to FIG. 34, FIG. 35 and/or FIG. 36. The uplink beam report may comprise at least one of: a P-MPR, and/or a PHR of one or more panels of the wireless device.

At step 4502, the wireless device may monitor PDCCH for receiving the DCP. The wireless device may receive the DCP during the PDCCH monitoring. Based on (e.g., after or in response to) receiving the DCP, the wireless device may start drx-onDurationTimer. The wireless device may send (e.g., transmit) the uplink beam report, for example, if the drx-onDurationTimer is running. The wireless device may not receive the DCP during the PDCCH monitoring. The wireless device may determine whether to start drx-onDurationTimer based on a value of the first indication (e.g., ps-Wakeup). At step 4503, the wireless device may determine whether drx-onDurationTimer has started based on monitoring PDCCH and the first indication. If the timer is running (4503: Yes), the wireless device may send (e.g., transmit) the periodic uplink beam report at step 4507. If the timer is not running (4503: No), at step 4504, the wireless device may determine whether a MAC entity of the wireless device is in Active Time (e.g., considering grants/assignments/DRX Command MAC CE/Long DRX Command MAC CE received and Scheduling Request sent until 4 ms prior to the first symbol, for example, if evaluating all DRX Active Time conditions). The wireless device may send (e.g., transmit) the periodic uplink beam report at step 4507, for example, if the MAC entity of the wireless device is in the Active Time (4504: Yes).

If the MAC entity of the wireless device is not in the Active Time (4504: No), at step 4505, the wireless device may determine whether the indication indicates that transmission of periodic uplink beam report in a power saving state is enabled. If the indication indicating that transmission of the periodic uplink beam report is enabled (4505: Yes), the wireless device may send (e.g., transmit) the periodic uplink beam report at step 4507. The wireless device may send (e.g., transmit) the periodic uplink beam report, for example, if the drx-onDurationTimer is not running and the wireless device (e.g., MAC entity of the wireless device) is not in Active Time. If the indication indicating that transmission of the periodic uplink beam report is not enabled (4505: No), at step 4506, the wireless device may stop sending (e.g., transmitting) the periodic uplink beam report, for example, when the drx-onDurationTimer is not running and the MAC entity is not in Active Time.

A wireless device and a base station may align on uplink beam report. The wireless device and the base station may align on uplink beam report, for example, if a power saving operation is configured. One or more examples disclosed herein may improve uplink throughput and power consumption of the wireless device.

A wireless device may receive, from a base station, one or more messages (e.g., one or more RRC messages) comprising configuration parameters of uplink beam report for a plurality of panels on a cell. The wireless device may activate the cell. The wireless device, based on the activating the cell, may send (e.g., transmit), via a PUCCH resource, the uplink beam report comprising at least one of: a first index indicating a first panel of the plurality of panels, a power management maximum power reduction (P-MPR) associated with the first panel, and/or a power headroom report (PHR) associated with the first panel. The configuration parameters may indicate the uplink control channel resource for the uplink beam report.

The cell may be a SCell. The wireless device may activate the cell based on (e.g., after or in response to) receiving a SCell activation/deactivation MAC CE indicating an activation of the cell. The configuration parameters may comprise first parameters of a plurality of transmission configuration information (TCI) states. The plurality of TCI states may be grouped in TCI groups. Each TCI group may be associated with a corresponding one of the plurality of panels. The index may indicate a TCI group corresponding to the first panel. The configuration parameters may comprise second parameters of a plurality of sounding reference signal resource information (SRI). The plurality of SRI may be grouped in SRI groups, each SRI group being associated with a corresponding one of the plurality of panels. The index may indicate an SRI group corresponding to the first panel. The uplink control resource may be on a primary cell, or a PUCCH SCell. The uplink beam report may be periodic transmission.

The wireless device may determine the P-MPR, associated with the first panel, based on at least one of: a reference signal received power, a transmission signal format for a transmission via the first panel, and/or a proximity detection on the first panel. The wireless device may determine the reference signal received power of a reference signal received on the first panel. The wireless device may determine the PHR, associated with the first panel, based on at least one of: a maximum power reduction (MPR) associated with modulation orders, bandwidth and waveform type of a transmission via the first panel, an additional maximum power reduction (A-MPR) indicated by the base station, and/or a power management MPR (P-MPR) associated with a proximity detection on the first panel. The uplink beam report may comprise a maximum output power associated with the first panel. The uplink beam report may comprise an uplink duty cycle value with the first panel. The wireless device may receive a second command indicating a deactivation of the cell. The wireless device may deactivate the cell based on (e.g., after or in response to) receiving the second command. The wireless device may stop sending (e.g., transmitting) the uplink beam report for the cell.

A wireless device may receive, from a base station, one or more radio resource control messages comprising configuration parameters of uplink beam report for a plurality of panels on a cell comprising a plurality of BWPs. The wireless device may transition the cell to a dormant state. The wireless device may send (e.g., transmit), based on the transitioning the cell to the dormant state and via an uplink control channel, the uplink beam report comprising at least one of: a first index indicating a first panel of the plurality of panels, a P-MPR associated with the first panel, and a PHR associated with the first panel.

A wireless device may receive, from a base station, one or more radio resource control messages comprising configuration parameters of uplink beam report for a plurality of panels on a cell comprising a plurality of BWPs. The wireless device may switch to a first BWP of the plurality of BWPs as an active BWP. The wireless device may send (e.g., transmit), based on the switching and via an uplink control channel, the uplink beam report comprising at least one of: a first index indicating a first panel of the plurality of panels, a P-MPR associated with the first panel, and/or a PHR associated with the first panel.

A wireless device may receive, from a base station, one or more radio resource control messages comprising configuration parameters of uplink beam report for a plurality of panels on a cell comprising a plurality of BWPs. The wireless device may determine a MAC entity of the wireless device is in a DRX active time. The wireless device may send (e.g., transmit) an uplink beam report, for example, based on the MAC entity being in the DRX active time and, for example, via an uplink control channel. The uplink beam report may comprise at least one of: a first index indicating a first panel of the plurality of panels, a P-MPR associated with the first panel, and/or a PHR associated with the first panel.

A wireless device may send/transmit, to a base station, one or more PHRs. The one or more PHRs may indicate one or more difference(s) between a nominal wireless device maximum transmit power and an estimated power for uplink transmissions (e.g., PUCCH, PUSCH, SRS, etc.). Types of PHRs may comprise at least one of: a Type 1 PHR based on PUSCH transmission (e.g., Type 1 PHR is valid for PUSCH transmission occasion i on active UL BWP b of carrier f of serving cell c), a Type 2 PHR based on PUCCH transmission (e.g., Type 2 PHR is valid for PUCCH transmission occasion i of active UL BWP b of carrier f of serving cell c), and/or a Type 3 PHR based on SRS transmission (e.g., Type 3 PHR is valid for SRS transmission occasion i on active UL BWP b of carrier f of serving cell c). A Type 1 PHR may indicate a difference between a nominal wireless device maximum transmit power and an estimated power for UL-SCH transmission per activated serving cell. A Type 3 PHR may indicate a difference between a nominal wireless device maximum transmit power and an estimated power for SRS transmission per activated serving cell. A Type 2 PHR may indicate a difference between a nominal wireless device maximum transmit power and an estimated power for UL-SCH and PUCCH transmission on SpCell of the other MAC entity (e.g., E-UTRA MAC entity in EN-DC, NE-DC, and NGEN-DC).

A wireless device may determine whether a PHR for an activated serving cell is based on an actual transmission or a reference format (e.g., a reference transmission). The determination may be made based on, for example, at least one of: a higher layer signaling of configured grant, periodic/SP SRS transmissions, and/or DCI. The determination may be based on DCI the wireless device may have received, for example, at least until and/or including a PDCCH monitoring occasion during which the wireless device may detect a DCI format 0_0 and/or a DCI format 0_1. The DCI may schedule an initial transmission of a transport block after a PHR was triggered, for example, if the PHR is reported on a PUSCH triggered by the DCI. The wireless device may determine whether a PHR is based on an actual transmission or a reference format. The wireless device may determine whether a PHR is based on an actual transmission or a reference format, for example, based on a higher layer signaling of a configured grant and/or periodic/SP SRS transmissions. The wireless device may determine whether a PHR is based on an actual transmission or a reference format, for example, based on DCI the wireless device may have received at least until the first uplink symbol of a configured PUSCH transmission minus $T_{proc,2} = T'_{proc,2}$. $T_{proc,2}$ may be determined based on the wireless device's capability, which may be based on an assumption that $d_{2,1}=1$, $d_{2,2}=0$. $\mu_{DL}$ may correspond to the subcarrier spacing of the active downlink BWP of the scheduling cell for a configured grant, for example, if the PHR is reported on the PUSCH using the configured grant.

A wireless device may determine that a Type 1 PHR for an activated serving cell is based on an actual PUSCH transmission. For PUSCH transmission occasion i on active UL BWP b of carrier f of serving cell C, the wireless device may determine (e.g., compute, calculate, etc.) the Type 1 PHR as $PH_{type1 b,f,c}(i,j,q_d,l) = P_{CMAX,f,c}(i) - \{P_{O\_PUSCH b,f,c}(j) + 10 \log_{10}(2^\mu \cdot M_{RB,b,f,c}^{PUSCH}(i)) + \alpha_{b,f,c}(j) \cdot PL_{b,f,c}(q_d) + \Delta TF,b,f,c(i) + f_{b,f,c}(i,l)\}$ [dB], where $M_{RB,b,f,c}^{PUSCH}(i)$ may be a bandwidth of the PUSCH resource assignment expressed in number of resource blocks for PUSCH transmission occasion i on active UL BWP b of carrier f of serving cell c. $\alpha_{b,f,c}(j)$ may be a power compensation factor configured by the base station. $\Delta_{TF,b,f,c}(i)$ may be a value of power adjustment for transmission format of the PUSCH. $f_{b,f,c}(i,l)$ may be a PUSCH power control adjustment state l for active UL BWP b of carrier f of serving cell C. $P_{O\_PUSCH,b,f,c}(j)$ may be a target PUSCH received power configured by the base station. $PL_{b,f,c}(q_d)$=referenceSignalPower–RSRP, where referenceSignalPower may be provided by the base station and RSRP may be measured on a reference serving cell. The RSRP may be, for example, an L1-RSRP without filtering based on a filter configuration configured by the base station. The RSRP may be, for example, an L3-RSRP with filtering based on a filter configuration configured by the base station. The wireless device may determine a value of $P_{CMAX,f,c}(i)$ based on, for example, at least one of: a P-MPR, a MPR, a A-MPR, a power value of a power class of the wireless device, and/or a maximum $EIRP_{max}$ of the wireless device, by implementing the examples described herein.

A wireless device may determine that a Type 1 PHR for an activated serving cell is based on a reference PUSCH transmission. For PUSCH transmission occasion i on active UL BWP b of carrier f of serving cell C, the wireless device may determine (e.g., compute, calculate, etc.) the Type 1 PHR as: $PH_{type1b,f,c}(i,j,qd,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\}$ [dB], where) may be computed assuming MPR=dB, A-MPR=dB, P-MPR=0 dB, and $\Delta T_C$=0 dB. MPR, A-MPR, P-MPR, and $\Delta T_C$ may be determined based on the examples described herein. $P_{O\_PUSCH,b,f,c}(j)$ and $\alpha_{b,f,c}(j)$ may be obtained using $P_{O\_NOMINAL\_PUSCH,f,c}(0)$ and p0-PUSCH-AlphaSetId=0. $PL_{b,f,c}(q)$ may be obtained using pusch-PathlossReference-eRS-Id=0, and l=0.

A wireless device may determine that a Type 3 PHR for an activated serving cell is based on an actual SRS transmission. For SRS transmission occasion i on active UL BWP b of carrier f of serving cell c, and if the wireless device is not configured for PUSCH transmissions on carrier f of serving cell c, the wireless device may determine (e.g., compute, calculate, etc.) a Type 3 PHR as $PH_{type3b,f,c}(i,q_s) = P_{CMAX,f,c}(i) - \{P_{O\_SRS,b,f,c}(q_s) + 10 \log_{10}(2^\mu \cdot M_{SRS,b,f,c}(i)) + \alpha_{b,f,c}(q_s) \cdot PL_{b,f,c}(q_d) + h_{b,f,c}(i)\}$ [dB], where $M_{SRS,b,f,c}(i)$ may be an SRS bandwidth expressed in number of resource blocks for SRS transmission occasion i on active UL BWP b of carrier f of serving cell c. $\alpha_{b,f,c}(q_s)$ may be a power compensation factor configured by the base station. $h_{b,f,c}(i)$ may be an SRS power control adjustment state l for active UL BWP b of carrier f of serving cell c. $P_{O\_SRS,b,f,c}(q_s)$ may be a target SRS received power configured by the base station. The wireless device may determine a value of $P_{CMAX,f,c}(i)$ based on, for example, a P-MPR, a MPR, a A-MPR, a power value of a power class of the wireless device, and/or a maximum $EIRP_{max}$ of the wireless device, by implementing the examples described herein.

A wireless device may determine that a Type 3 PHR for an activated serving cell is based on a reference SRS transmission. For SRS transmission occasion i on UL BWP b of carrier f of serving cell c, and if the wireless device is not configured for PUSCH transmissions on UL BWP b of carrier f of serving cell c, the wireless device may determine (e.g., compute, calculate, etc.) a Type 3 PHR as $PH_{type3b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\}$ [dB], where $q_s$ may be an SRS resource set corresponding to SRS-ResourceSetId=0 for UL BWP b and $P_{O\_SRS,b,f,c}(q_s)$. $\alpha_{SRS,f,c}(q_s)$, $PL_{b,f,c}(q_s)$ and/or $h_{b,f,c}(i)$ may be obtained from SRS-ResourceSetId=0 for UL BWP b. $\tilde{P}_{CMAX,f,c}(i)$ may computed/determined assuming MPR=0 dB, A-MPR=0 dB, P-MPR=0 dB, and $\Delta T_C$=0 dB.

Figure 46:
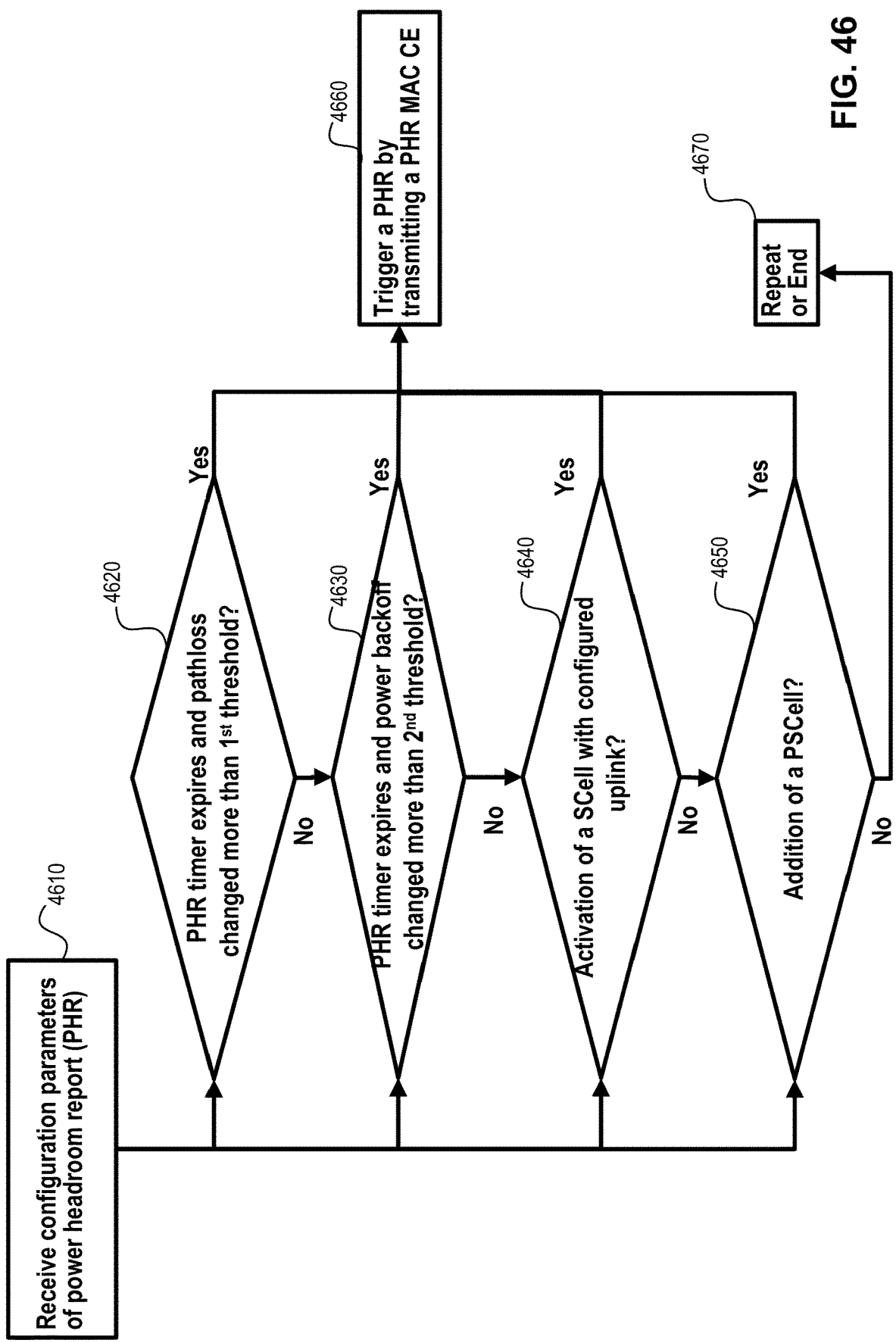
FIG. 46 shows an example method for triggering a PHR procedure.

FIG. 46 shows an example method for triggering a PHR procedure. A base station may send/transmit, to a wireless device, one or more messages (e.g., RRC message(s)) comprising configuration parameters of a PHR. At step 4610, the wireless device may receive, from the base station, the one or more messages comprising the configuration parameters of the PHR. The configuration parameters may comprise a PHR periodic timer (e.g., phr-PeriodicTimer) value for a PHR periodic timer, a PHR prohibit timer (e.g., phr-ProhibitTimer) value for a PHR prohibit timer, a pathloss change threshold (e.g., phr-Tx-PowerFactorChange), a PHR Type 2 indication for other cell (e.g., phr-Type2OtherCell), a PHR mode indication for other cell group (e.g., phr-ModeOtherCG), and/or a multiple PHR reporting indication (e.g., multiplePHR). The multiple PHR reporting indication may indicate whether a power headroom may be reported using a single entry PHR MAC CE or a multiple entry PHR MAC CE. The PHR mode indication may indicate whether a real mode or a virtual mode is used for the PHR of the activated cells that are part of the other cell group (e.g., MCG, SCG), when DC is configured. The PHR Type 2 indication may be set to true to indicate that the wireless device may report a PHR Type 2 for an SpCell of the other MAC entity.

At step 4620, the wireless device may determine whether a pathloss change satisfies a first threshold. The wireless device may determine whether a pathloss has changed more than a first threshold (e.g., phr-Tx-PowerFactorChange dB), for example, if a PHR prohibit timer expires or has expired. A pathloss change (e.g., variation) for one cell may be determined (e.g., assessed, computed, calculated) between, for example, a pathloss measured at a current time on a current pathloss reference and a pathloss measured at a transmission time of a previous (e.g., last) transmission of PHR on a previous pathloss reference in use at that time (e.g., irrespective of whether the pathloss reference has changed in between).

At step 4660, the wireless device may trigger a PHR. The wireless device may trigger the PHR, for example, based on determining that a pathloss has changed more than a first threshold. The wireless device may trigger a PHR, for example, based on whether a pathloss has changed more than a threshold (e.g., phr-Tx-PowerFactorChange dB) for at least one activated serving cell of a MAC entity which is used as a pathloss reference since the last transmission of a PHR in this MAC entity when the MAC entity has UL resources for new transmission. The wireless device may trigger a PHR procedure, for example, based on (e.g., after or in response to) the pathloss having changed more than a threshold (e.g., phr-Tx-PowerFactorChange dB). The wireless device may skip triggering the PHR procedure, and/or determine to not trigger the PHR procedure, for example, based on (e.g., after or in response to) the pathloss not having changed more than a threshold (e.g., phr-Tx-PowerFactorChange dB).

At step 4630, the wireless device may determine whether a power backoff change satisfies a second threshold. The second threshold may be different from the first threshold. The wireless device may determine whether a power backoff change satisfies a second threshold (e.g., phr-Tx-PowerFactorChange dB), for example, if a PHR prohibit timer expires or has expired. This determination may be based on, for example, whether a required power backoff (e.g., due to power management, which may be allowed by P-MPR) for a cell has changed more than the second threshold since the last transmission of a PHR, for example, if there are UL resources allocated for transmission or there is a PUCCH transmission on the cell and the MAC entity has UL resources for a new transmission. The MAC entity may have UL resources allocated for transmission or PUCCH transmission on this cell for the last transmission of the PHR.

At step 4660, the wireless devcie may trigger a PHR procedure. The wireless devcie may trigger a PHR procedure, for example, based on that the required power backoff change satisfies the second threshold. Based on (e.g., after or in response to) the required power backoff change not satisfying the second threshold, the wireless device may skip triggering the PHR procedure, and/or determine to not trigger the PHR procedure. For example, the wireless device (e.g., the MAC entity of the wireless device) may avoid triggering a PHR procedure, for example, if the required power backoff decreases only temporarily (e.g., for up to a few tens of milliseconds). The wirless device may avoid reflecting such temporary decrease in the values of $P_{CMAX,f,c}$/PH, for example, if a PHR procedure is triggered by other triggering conditions.

At step 4640, the wireless device may determine whether an SCell of a MAC entity with configured uplink is activated. At step 4660, the wireless device may trigger a PHR procedure, for example, based on a determination that an SCell of a MAC entity with configured uplink is activated. The wireless device may skip triggering the PHR procedure, and/or the wireless device may determine to not trigger the PHR procedure, for example, based on a determination that an SCell of a MAC entity with configured uplink is not activated. At step 4650, the wireless device may determine whether a PSCell is added. For example, the wireless device may determine whether a PSCell has been newly added or changed (e.g., updated). At step 4660, the wireless device may trigger a PHR procedure. The wireless device may trigger a PHR procedure, for example, based on a determination that a PSCell is added, the wireless device may trigger a PHR procedure. The wireless device may skip triggering the PHR procedure, and/or the wireless device may determine to not trigger the PHR procedure, for example, based on a determination that a PSCell is not added.

Any of steps 4620, 4630, 4640, and/or 4650 may be performed in any order relative to another. Any of steps 4620, 4630, 4640, and/or 4650 may be performed simultaneously (or substantially simultaneously) relative to one or more other of steps 4620, 4630, 4640, and/or 4650. Any one or more of steps 4620, 4630, 4640, and/or 4650 may be performed before, during, or after any other of steps 4620, 4630, 4640, and/or 4650. The PHR procedure may repeat or end at step 4670, for example, if one or more (e.g., all) of steps 4620, 4630, 4640, and/or 4650 do not proceed to trigger a PHR at step 4660.

The wireless device may trigger a PHR procedure based on one or more additional or alternative conditions. For example, a wireless device may trigger a PHR procedure based on whether a PHR periodic timer (e.g., phr-PeriodicTimer) expires or has expired. Based on (e.g., after or in response to) an expiry of a PHR periodic timer, the wireless device may trigger a PHR procedure. Based on (e.g., after or in response to) that a PHR periodic timer does not expire or has not expired, the wireless device may skip triggering the PHR procedure, or determine to not trigger the PHR procedure.

A wireless device may trigger a PHR procedure based on whether a power headroom reporting functionality is configured and/or reconfigured by upper layers (e.g., for not being used for disabling the PHR functionality). The wireless device may trigger a PHR procedure, for example, based on (e.g., after or in response to) the power headroom reporting functionality being configured/reconfigured. The wireless device may skip triggering the PHR procedure, and/or determine to not trigger the PHR procedure, for example, based on (e.g., after or in response to) the power headroom reporting functionality not being configured/reconfigured.

Figure 47:
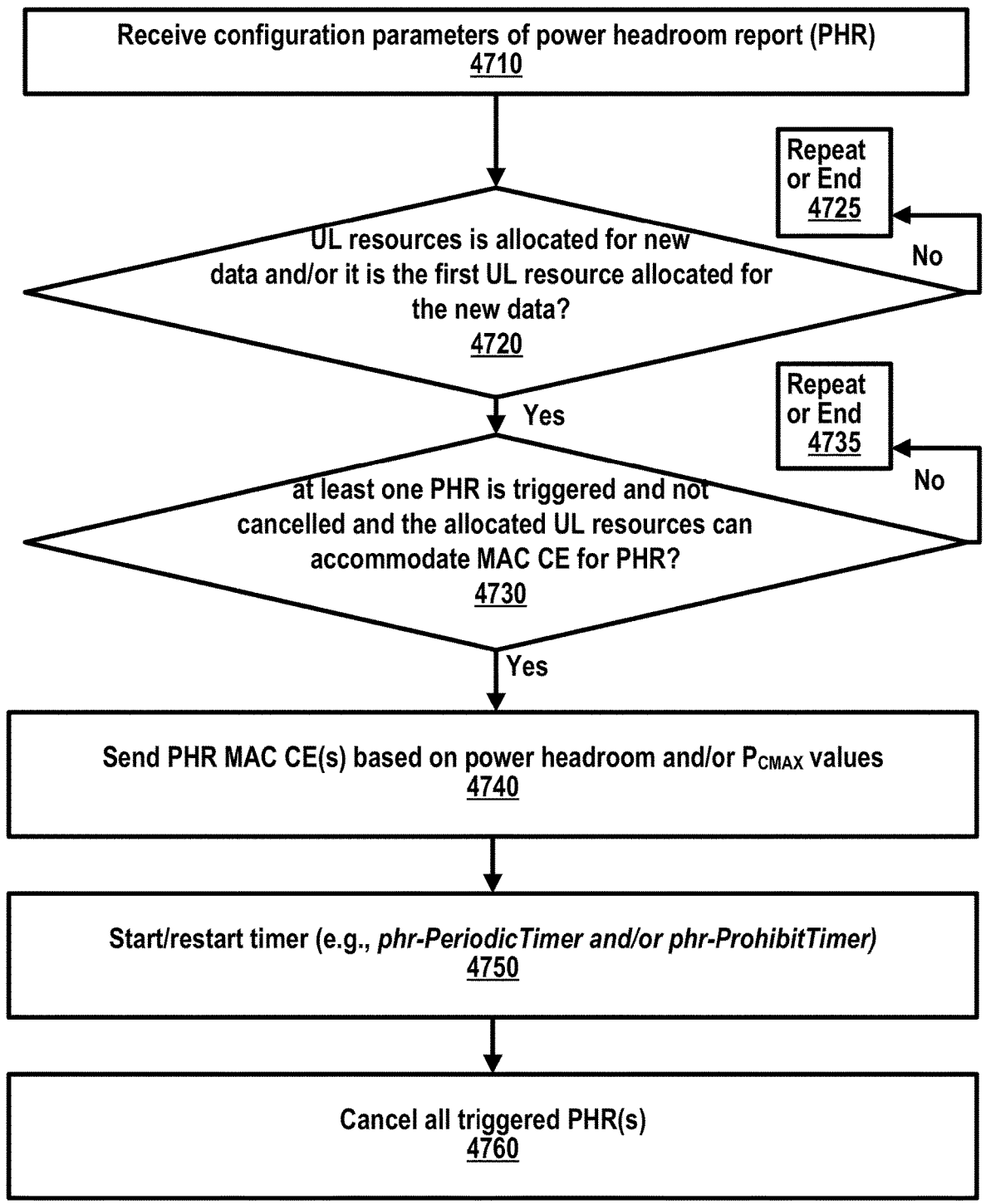
FIG. 47 shows an example method for a PHR procedure.

FIG. 47 shows an example method for a PHR procedure. A base station may send/transmit, to a wireless device, one or more messages (e.g., RRC messages) comprising configuration parameters of a PHR. At step 4710, a wireless device may receive one or more messages (e.g., RRC message(s)) comprising the configuration parameters of the PHR. The configuration parameters may be implemented based on examples described with respect to FIG. 46. For example, the wireless device may trigger a PHR procedure based on one or more examples described with respect to FIG. 46.

At step 4720, the wireless device may determine whether UL resources are allocated for new data and/or whether it is the first UL resource allocated for the new data. For example, a wireless device (e.g., a MAC entity of the wireless device) may have uplink radio resource (e.g., a PUSCH resource) allocated for a new transmission. The wireless device may determine whether the uplink radio resource is the first UL resource allocated for the new transmission since the last MAC reset. The wireless device may start a PHR periodic timer (e.g., phr-PeriodicTimer) based on (e.g., after or in response to) the uplink radio resource being the first UL resource allocated for the new transmission. At step 4725, the wireless device may repeat step 4720 or end the PHR procedure.

At step 4730, the wireless device may determine whether at least one PHR has been triggered and not canceled, and/or whether the allocated UL resources can accommodate the MAC CE (e.g., plus its subheader) for PHR which the MAC entity is configured to send/transmit. The wireless device may obtain values of power headroom and $P_{CMAX,f,c}$ from the physical layer of the wireless device, for example, based on (e.g., after or in response to) at least one PHR having been triggered and not canceled, and/or based on the allocated UL resources accomodating the MAC CE. The wireless device (e.g., the physical layer of the wireless device) may determine the values of power headroom and an allowable transmission power (e.g., $P_{MAX,f,c}$) based on examples discribed herein. The wireless device (e.g., the MAC entity of the wireless device) may instruct a multiplexing and assembly procedure of the MAC entity to generate a PHR MAC CE, for example, based on one or more values reported by (e.g., obtained from) the physical layer of the wireless device. The wireless device may send/transmit the PHR MAC CE. At step 4735, the wireless device may repeat step 4730 and/or step 4720, or the wireless device may end the PHR procedure.

The wireless device may determine to use a single entry PHR MAC CE and/or a multiple entry PHR MAC CE. A PHR MAC CE (e.g., a single entry and/or multiple entry) may be shown in FIG. 48A, FIG. 48B, FIG. 48C and/or FIG. 49. For example, the wireless device may determine to use a multiple entry PHR MAC CE format based on (e.g., after or in response to) multiplePHR being configured with value true. Based on (e.g., after or in response to) using the multiple entry PHR MAC CE format, the wireless device (e.g., the MAC entity of the wireless device) may obtain, for each activated serving cell with configured uplink associated with a MAC entity, value of the Type 1 or Type 3 power headroom for the corresponding uplink carrier. The wireless device may obtain a value for a corresponding $P_{CMAX,f,c}$ field from the physical layer (e.g., if the MAC entity has UL resources allocated for transmission on this serving cell), for example, based on (e.g., after or in response to) using the multiple entry PHR MAC CE format. The wireless device may obtain (e.g., based on using a multiple entry MHR MAC CE format), for each activated serving cell with configured uplink associated with a MAC entity, a value for the corresponding $P_{CMAX,f,c}$ field from the physical layer, if the other MAC entity (e.g., if configured) has UL resources allocated for transmission on this serving cell and a PHR mode (e.g., phr-ModeOtherCG) is set (e.g., by upper layers) to a value (e.g., real).

The wireless device may obtain (e.g., based on using the multiple entry PHR MAC CE format) the value of the Type 2 power headroom for the SpCell of the other MAC entity (e.g., E-UTRA MAC entity), if phr-Type2OtherCell with value true is configured and the other MAC entity is an E-UTRA MAC entity. The wireless device may obtain (e.g., based on using the multiple entry PHR MAC CE format) the value for the corresponding $P_{CMAX,f,c}$ field for the SpCell of the other MAC entity (e.g., E-UTRA MAC entity) from the physical layer, for example, if phr-Type2OtherCell with value true is configured, the other MAC entity is an E-UTRA MAC entity and phr-ModeOtherCG is set to real by upper layers.

The wireless device may determine to use a single entry PHR format based on (e.g., after or in response to) multiplePHR being configured with value false. The wireless device may obtain (e.g., based on using the single entry PHR format) a value of the Type 1 power headroom from the physical layer for the corresponding uplink carrier of the PCell and/or a value for the corresponding $P_{CMAX,f,c}$ field from the physical layer.

At step 4740, the wireless device may send/transmit PHR MAC CE(s) (e.g., multiple entry PHR MAC CE and/or single entry PHR MAC CE), for example, based on power headroom and $P_{CMAX}$ values reported by the physical layer. At step 4750, the wireless device may start or restart a timer (e.g., phr-PeriodicTimer and/or phr-ProhibitTimer), for example, based on (e.g., after or in response to) sending/transmitting the PHR MAC CE(s). At step 4760, the wireless device may cancel all triggered PHR(s), for example, based on (e.g., after or in response to) sending/transmitting the PHR MAC CE(s).

Figures 48A, 48B, 48C:
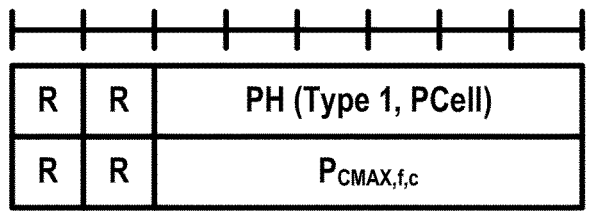
FIG. 48A, FIG. 48B and FIG. 48C show examples of PHRs.

FIG. 48A shows an example of a single entry PHR MAC CE format. The single entry PHR MAC CE may be identified/indicated by a MAC subheader comprising an LCID value (e.g., 111001 as shown in FIG. 20). The single entry PHR MAC CE may have a fixed size and comprise two octets comprising: one or more reserved bits, a power headroom (PH) field and a $P_{CMAX,f,c}$ field. The one or more reserved bits may be set to first values (e.g., all 0s). A PH field of the single entry PHR MAC CE format may indicate a PH level. The length of the PH field may be 6 bits (or any other quantity of bits).

FIG. 48B shows an example of mapping between a reported PH and a corresponding PH level. A PH level may correspond to a measured PH value in dB, for example, based on one or more 3GPP specifications or other standard (e.g., TS 38.133 and/or any variation/other release). A $P_{CMAX,f,c}$ field in the single entry PHR MAC CE format may indicate a $P_{CMAX,f,c}$ used for calculation of the preceding PH field of the single entry PHR MAC CE.

FIG. 48C shows an example of mapping between a reported $P_{CMAX,f,c}$ and a corresponding nominal wireless device transmit power level. A nominal wireless device transmit power level may correspond to a measured $P_{CMAX,f,c}$ value in dBm, for example, based on one or more 3GPP specifications or other standard (e.g., TS 38.133 and/or any variation/other release).

Figure 49:
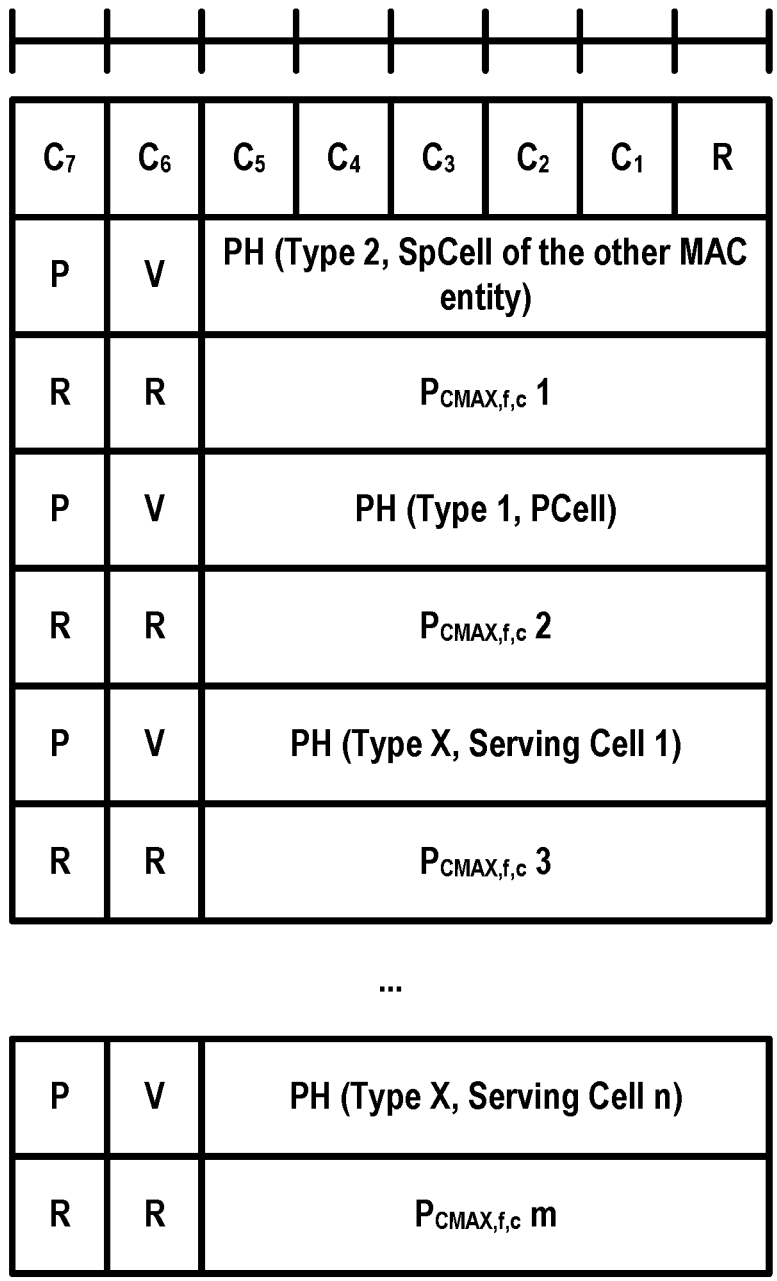
FIG. 49 shows an example of a multiple entry PHR MAC CE format.

FIG. 49 shows an example of a multiple entry PHR MAC CE format. For example, a multiple entry PHR MAC CE format may be identified/indicated by a MAC subheader with an LCID value (e.g., 111000 as shown in FIG. 20). The multiple entry PHR MAC CE may have a variable size, and/or may comprise: a bitmap for cell indication, a Type 2 PH field, and an octet comprising the associated $P_{CMAX,f,c}$ field (if reported) for SpCell of the other MAC entity, a Type 1 PH field and an octet comprising the associated $P_{CMAX,f,c}$ field (if reported) for the PCell. A multiple entry PHR MAC CE may comprise, for example, in ascending order based on the ServCellIndex, one or multiple of Type X PH fields and octets comprising the associated $P_{CMAX,f,c}$ fields (if reported) for serving cells other than PCell indicated in the bitmap. X may be either 1 or 3 (e.g., based on 3GPP specification TS 38.213 and/or TS 36.213). A presence of Type 2 PH field for SpCell of the other MAC entity may be configured by phr-Type2OtherCell with value true. A single octet bitmap may indicate the presence of PH per serving cell, for example, if the highest ServCellIndex of serving cell with configured uplink is less than 8, otherwise four octets may be used. A wireless device (e.g., a MAC entity of the wireless device) may determine whether a PH value for an activated serving cell is based on real transmission or a reference format. The wireless device may determine whether a PH value is based on real transmission or a reference format, for example, by considering/determining configured grant(s) and/or downlink control information that has been received. The received configured grant(s) and/or DCI may be considered/determined at least until (and including) a PDCCH occasion. The PDCCH occasion may be the PDCCH occasion in which the first UL grant for a new transmission that can accommodate the MAC CE for PHR (e.g., as a result of logical channel prioritization (LCP) procedure of the wireless device) is received, for example, at least since a PHR has been triggered (e.g., if the PHR MAC CE is reported on an uplink grant received on the PDCCH), or at least until the first uplink symbol of PUSCH transmission minus PUSCH preparation time (e.g., based on UE capability parameter of the wireless device) if the PHR MAC CE is reported on a configured grant.

A wireless device may omit the octets comprising PH field and $P_{CMAX,f,c}$ field for serving cells in the other MAC entity, for example, except for the PCell in the other MAC entity. The wireless device may omit the octers, for example, for a band combination in which a wireless device does not support dynamic power sharing. The reported values of PH and $P_{CMAX,f,c}$ for the PCell may be determined based on an implementation of the wireless device.

A multiple entry PHR MAC CE may comprise at least one of: a bit associated with a cell identified/indicated by a cell index (e.g., $C_i$), one or more reserved bits (e.g., R), a first indication field (e.g., V) indicating whether a PH value is based on a real transmission or a reference format, a PH field (e.g., PH) indicating a PH level, a second indication field (e.g., P) indicating whether the MAC entity applies power backoff due to power management (e.g., which may be allowed by P-MPR$_c$ based on examples described herein) and/or a $P_{CMAX,f,c}$ field indicating a $P_{CMAX,f,c}$ value for a NR serving cell or a $P_{CMAX,f,c}$ value or $\tilde{P}_{CMAX,c}$ value for the E-UTRA serving cell used for calculation of the PH field. A $C_i$ field may indicate a presence of a PH field for a serving cell with ServCellIndex i. The $C_i$ field set to 1 may indicate that a PH field for the serving cell with ServCellIndex i is reported. The $C_i$ field set to 0 may indicate that a PH field for the serving cell with ServCellIndex i is not reported. The R field may be set to a fixed value (e.g., all zeros).

A V field in the multiple entry PHR MAC CE may indicate if the PH value is based on a real transmission or a reference format. For Type 1 PH, the V field set to 0 may indicate real transmission on PUSCH and the V field set to 1 may indicate that a PUSCH reference format is used. For Type 2 PH, the V field set to 0 may indicate real transmission on PUCCH and the V field set to 1 may indicate that a PUCCH reference format is used. For Type 3 PH, the V field set to 0 may indicate real transmission on SRS and the V field set to 1 may indicate that an SRS reference format is used. Furthermore, for Type 1, Type 2, and Type 3 PH, the V field set to 0 may indicate the presence of the octet comprising the associated $P_{CMAX,f,c}$ field, and the V field set to 1 may indicate that the octet comprising the associated $P_{CMAX,f,c}$ field is omitted.

A PH field of a multiple entry PHR MAC CE may indicate a PH level. The length of the PH field may be 6 bits (or any other quantity of bits). A reported PH and a corresponding power headroom level may be mapped based on examples of FIG. 48B. A P field of a multiple entry PHR MAC CE may indicate whether the MAC entity applies power backoff due to power management. The MAC entity may set the P field to 1, for example, if the corresponding $P_{CMAX,f,c}$ field would have had a different value if no power backoff due to power management had been applied. A $P_{CMAX,f,c}$ field, if present, may indicate the $P_{CMAX,f,c}$ for a NR serving cell and a $P_{CMAX,c}$ or $\tilde{P}_{CMAX,c}$ for an E-UTRA serving cell used for calculation of the PH field. A reported $P_{CMAX,f,c}$ and a corresponding nominal UE transmit power level may be shown in FIG. 48C.

Figure 50:
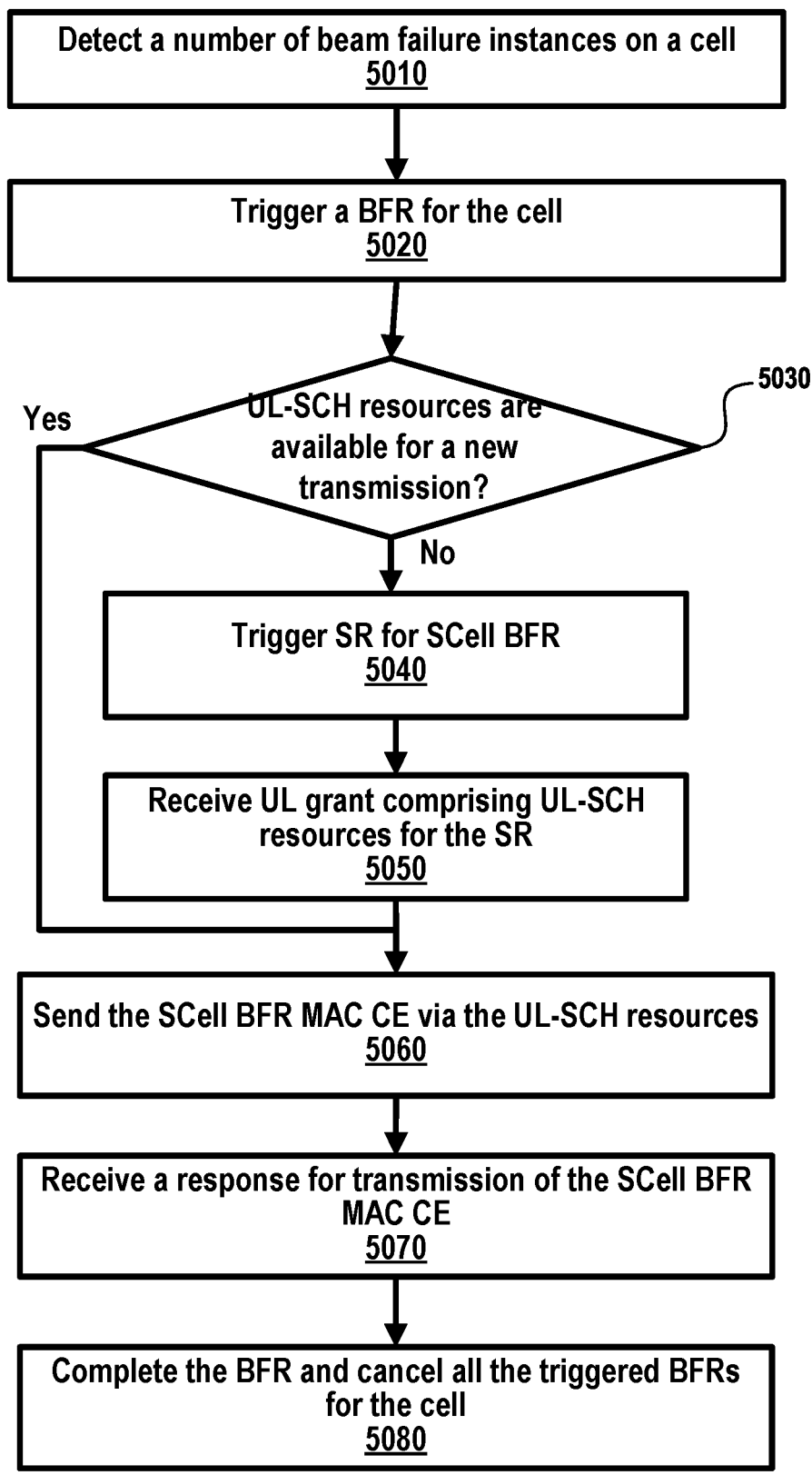
FIG. 50 shows an example method for SCell beam failure recovery (BFR).

FIG. 50 shows an example method for SCell beam failure recovery (BFR). A wireless device may receive, from a base station, one or more messages (e.g., RRC messages) comprising configuration parameters of a BFR procedure for an SCell. The configuration parameters may indicate one or more first RSs for beam failure detection and/or one or more second RSs for candidate beam detection. The wireless device may detect one or more beam failure instances on an SCell based on measurement(s) on the one or more first RSs. The wireless device may determine a beam failure by counting beam failure instance indication from lower layers (e.g., physical layer of the wireless device) to the MAC entity. At step S010, the wireless device may determine (e.g., detect) a number/quantity of beam failure instances on a cell. At step S020, the wireless device may trigger a BFR procedure for the SCell. The wireless device may trigger a BFR procedure for the SCell, for example, based on (e.g., after or in response to) determining that a number of beam failure instances satisfies (e.g., greater than) a threshold (e.g., beamFailureInstanceMaxCount).

At step S030, the wireless device may determine whether an uplink radio resource (e.g., a PUSCH resource) is available for a new transmission. For example, the wireless device may determine whether an uplink radio resource is available for sending/transmitting an SCell BFR MAC CE. At step S040, the wireless device may trigger a scheduling request (SR) for the SCell BFR procedure. The wireless device may trigger a scheduling request (SR) for the SCell BFR procedure, for example, based on (e.g., after or in response to) the uplink radio resource not being available for sending/transmitting the SCell BFR MAC CE. The wireless device may send/transmit a SR via a PUCCH resource (e.g., based on triggering the SR). At step S050, the wireless device may receive an uplink grant comprising an uplink radio resource (e.g., UL-SCH resource) for the SR.

The wireless device may determine an uplink radio resource (e.g., a PUSCH resource) is available for sending/transmitting an SCell BFR MAC CE. The wireless device may instruct a multiplexing and assembly procedure of the MAC entity to generate the SCell BFR MAC CE. The wireless device may instruct a multiplexing and assembly procedure of the MAC entity to generate the SCell BFR MAC CE, for example, based on (e.g., after or in response to) the uplink radio resource being available for the sending/transmitting the SCell BFR MAC CE. An SCell BFR MAC CE may be implemented with a MAC CE format as described with respect to FIG. 51A and/or FIG. 51B. At step S060, the wireless device may send/transmit the SCell BFR MAC CE via the uplink radio resource, for example, based on that an uplink radio resource (e.g., a PUSCH resource) is available for a new transmission. At step S070, the wireless device may receive a response for the sending/transmitting the SCell BFR MAC CE. The response may be a PDCCH addressed to C-RNTI indicating that uplink grant for a new transmission is received for the HARQ process, which may be used for the transmission of the SCell BFR MAC CE. At step S080, the wireless device may complete the SCell BFR procedure successfully. The wireless device may complete the SCell BFR procedure successfully, for example, based on (e.g., after or in response to) receiving the response. The wireless device may cancel all triggered BFRs for the SCell, based on (e.g., after or in response to) receiving the response.

A wireless device may send/transmit an SCell BFR MAC CE and/or a truncated SCell BFR MAC CE, for example, based on available uplink radio resource. The wireless device may generate the SCell BFR MAC CE, for example, if UL-SCH resources may accommodate the SCell BFR MAC CE plus its subheader (e.g., as a result of LCP). The wireless device may generate the truncated SCell BFR MAC CE. The wireless device may generate the truncated SCell BFR MAC CE, for example, based on (e.g., after or in response to) the UL-SCH resources accommodating a truncated SCell BFR MAC CE plus its subheader (e.g., as a result of LCP).

Figure 51A:
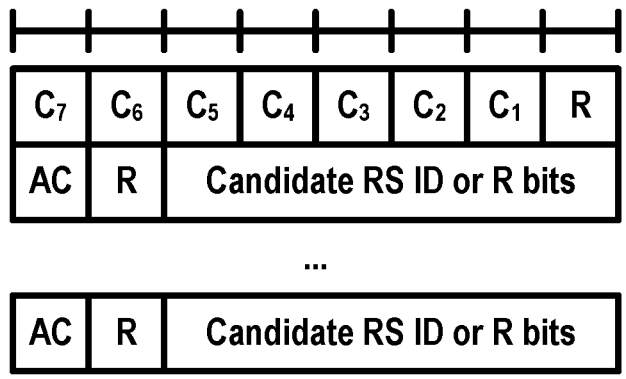
FIG. 51A and FIG. 51B show examples of BFR MAC CE formats.
Figure 51B:
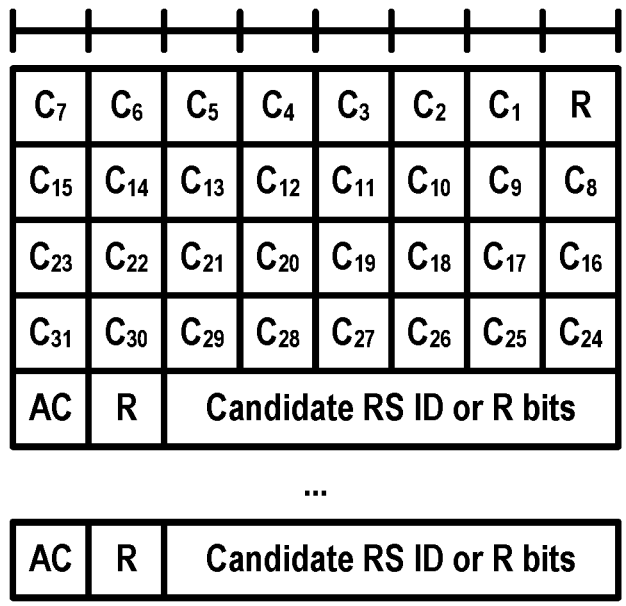

FIG. 51A and FIG. 51B show examples of BFR MAC CE formats. A BFR MAC CE shown in FIG. 51A may be an SCell BFR MAC CE. The SCell BFR MAC CE may comprise a single octet bitmap. The SCell BFR MAC CE may comprise a single octet if used for an SCell having a highest index (e.g., ServCellIndex) of a wireless device's (e.g., the wireless device's MAC entity's) SCell configured with beam failure detection that is less than 8 (or any other quantity). A BFR MAC CE shown in FIG. 51B may be an SCell BFR MAC CE comprising a four-octet bitmap, which may be used for an SCell with a highest index (e.g., ServCellIndex) of this wireless device's (e.g., wireless device's MAC entity's) SCell configured with beam failure detection that is equal to or greater than 8 (or any other quantity). A BFR MAC CE may comprise an SCell BFR MAC CE and/or a truncated SCell BFR MAC CE.

An SCell BFR MAC CE may be identified/indicated by a MAC subheader comprising an LCID value (e.g., 46 with 4 octets). An SCell BFR MAC CE may have a variable size. The SCell BFR MAC CE may comprise a bitmap. The bitmap may be in ascending order, for example, based on an index (e.g., the ServCellIndex) and/or BFR information (e.g., octets comprising candidate beam availability indication (AC) for SCells indicated in the bitmap). A single octet bitmap may be used if a highest index (e.g., highest ServCellIndex) of the wireless device's (e.g., the wireless device's MAC entity's) SCell configured with beam failure detection is less than 8 (or any other quantity), and otherwise four octets (or another quantity of octets) may be used. An SCell BFR MAC CE may comprise at least one of: a $C_i$ field, a candidate RS present/absent indication field (e.g., AC field in FIG. 51A or FIG. 51B), and/or a candidate RS indication field. A $C_i$ field of the SCell BFR MAC CE may indicate beam failure detection and the presence of an octet comprising the AC field for the SCell with ServCellIndex i, Beam failure may be detected and the octet comprising the AC field may be present for the SCell with ServCellIndex i, for example, if the $C_i$ field is set to 1. Beam failure might not be detected and an octet comprising the AC field might not be present for the SCell with ServCellIndex i, for example, if the $C_i$ field is set to 0. The octets comprising the AC field may be present in ascending order based on the ServCellIndex. An AC field may indicate a presence of the candidate RS ID field in the octet. The AC field may be set to 1, for example, if at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available; otherwise, the AC field may be set to 0. The candidate RS ID field may be present, for example, if the AC field set to 1. R bits may be present, for example, if the AC field is set to 0. A candidate RS indication field may be set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of Candidate RS indication field may be 6 bits.

A $C_i$ field may indicate beam failure detection for the SCell with ServCellIndex i, for example, for a truncated SCell BFR MAC CE. Beam failure may be detected and the octet comprising the AC field for the SCell with ServCellIndex i may be present, for example, if the C, field is set to 1. Beam failure might not be detected and the octet comprising the AC field might not be present for the SCell with ServCellIndex i, for example, if the $C_i$ field is set to 0. The octets comprising the AC field, if present, may be included in ascending order based on the ServCellIndex. The number/quantity of octets comprising the AC field included may be maximized, and might not exceed the available grant size. The number/quantity of the octets comprising the AC field in the truncated SCell BFR format may be zero.

A wireless device (e.g., a MAC entity of a wireless device) may allocate resources to the logical channels as follows (e.g., if a new transmission is performed). Logical channels selected for UL grant with Bj>0 may be allocated resources in a decreasing priority order. The MAC entity may allocate resources for all the data that is available for transmission on the logical channel before meeting the PBR of the lower priority logical channel(s), for example, if the PBR of a logical channel is set to infinity. The wireless device may decrement Bj by the total size of MAC SDUs may be served to logical channel j above. If any resources remain, all the logical channels selected may be served in a strict decreasing priority order (e.g., regardless of the value of Bj) at least until, for example, either the data for that logical channel or the UL grant is exhausted (e.g., whichever comes first). Logical channels configured with equal priority may be served equally.

Wireless device implementation may determine the order in which the grants are processed. For example, if the wireless device (e.g., MAC entity of the wireless device) is requested to simultaneously send/transmit multiple MAC PDUs, or if the wireless device (e.g., MAC entity of the wireless device) receives the multiple UL grants within one or more coinciding PDCCH occasions (e.g., on different serving cells), it may be determined based on wireless device implementation in which order the grants are processed.

FIG. 52 shows an example of prioritization of logical channels. The logical channels may be prioritized in accordance with the following order (e.g., highest priority listed first): C-RNTI MAC CE or data from UL-CCCH; CG confirmation MAC CE or BFR MAC CE or multiple entry CG confirmation MAC CE; sidelink configured grant confirmation MAC CE; LBT failure MAC CE; MAC CE for prioritized SL-BSR; MAC CE for BSR, with exception of BSR included for padding; single entry PHR MAC CE or multiple entry PHR MAC CE; MAC CE for the number of desired guard symbols; MAC CE for pre-emptive BSR; MAC CE for SL-BSR, with exception of the prioritized SL-BSR and SL-BSR included for padding; data from any logical channel, except data from UL-CCCH; MAC CE for recommended bit rate query; MAC CE for BSR included for padding; and/or MAC CE for SL-BSR included for padding.

A wireless device may send/transmit UCI bits (e.g., layer 1 control signaling) comprising an uplink beam/power report indicating a panel index of a new panel which is suitable for proximity detection (or MPE issue identification) of uplink transmission. The uplink beam/power report may be sent/transmitted in a similar way of CSI report transmission via a PUCCH resource (or a PUSCH resource). Sending/transmitting the uplink beam/power report in layer 1 control signaling (e.g., UCI bits via PUCCH/PUSCH) may increase signaling overhead and/or power consumption of the wireless device. Layer 1 control signaling transmission via a PUCCH resource may not be reliable. The transmission of the uplink beam/power report in layer 1 control signaling may increase delivery latency of the report, and/or result in uplink coverage loss. Uplink beam/power reporting may be improved as described herein.

A wireless device may trigger one or more PHR reports. A wireless device may trigger one or more PHR reports, for example, based on one or more conditions, such as activation of an Scell, pathloss changes greater than a threshold, and/or timer expiration (e.g., a report prohibit timer expiry). The wireless device may cancel all triggered PHRs, for example, based on (e.g., after or in response to) a PHR report being sent/transmitted. A panel-specific MPE report may be triggered, for example, by reusing PHR report procedure (e.g., although triggering conditions may differ). At least some wireless devices may send/transmit a PHR MAC CE indicating a panel and/or a PHR associated with the panel for the purpose of an MPE indication (e.g., an MPE issue identification/indication). At least some wireless devices may cancel a first PHR for panel-specific PHR reporting, for example, based on (e.g., after or in response to) sending/transmitting a first PHR MAC CE for cell-specific PHR reporting. At least some wireless devices may mistakenly cancel a panel-specific MPE report, for example, based (e.g., after or in response to) sending/transmitting a PHR report MAC CE. Canceling the first PHR for the panel specific PHR reporting (e.g., even though the wireless device has not yet sent/transmitted a second PHR MAC CE for the panel-specific PHR reporting), may result in uplink coverage loss. For example, the second PHR MAC CE may be intended to be sent/transmitted to the base station to indicate that an MPE indication (e.g., an MPE issue) occurs on an active panel.

PHR reporting may be improved, for example by addressing MPE indications on a per-panel basis, as described herein. For example, a first PHR report and at least a second PHR report may be triggered. The first PHR report may be associated with a cell-PHR report and the second PHR report may be associated with a panel-specific MPE report. A wireless device may cancel the first PHR report comprising a cell-specific PHR and keep pending a second PHR report comprising a panel-specific MPE report. The wireless device may cancel the first PHR report comprising a cell-specific PHR and keep pending a second PHR report comprising a panel-specific MPE report, for example, based on (e.g., after or in response to) sending/transmitting a PHR MAC CE that may already comprise the cell-specific PHR. The panel-specific MPE report may indicate an MPE indication is detected on a particular panel (e.g., of a plurality of panels of the wireless device). By keeping pending the trigger for a PHR report for a panel-specific MPE report, a wireless device may be able to transmit the MPE report, for example, if uplink resources become available later. Using per-panel MPE indications, and keeping per-panel MPE indications pending (e.g., at least until resources become available for sending/transmitting), may provide advantages such as reduced signaling overhead and improved MPE reporting.

Figure 53:
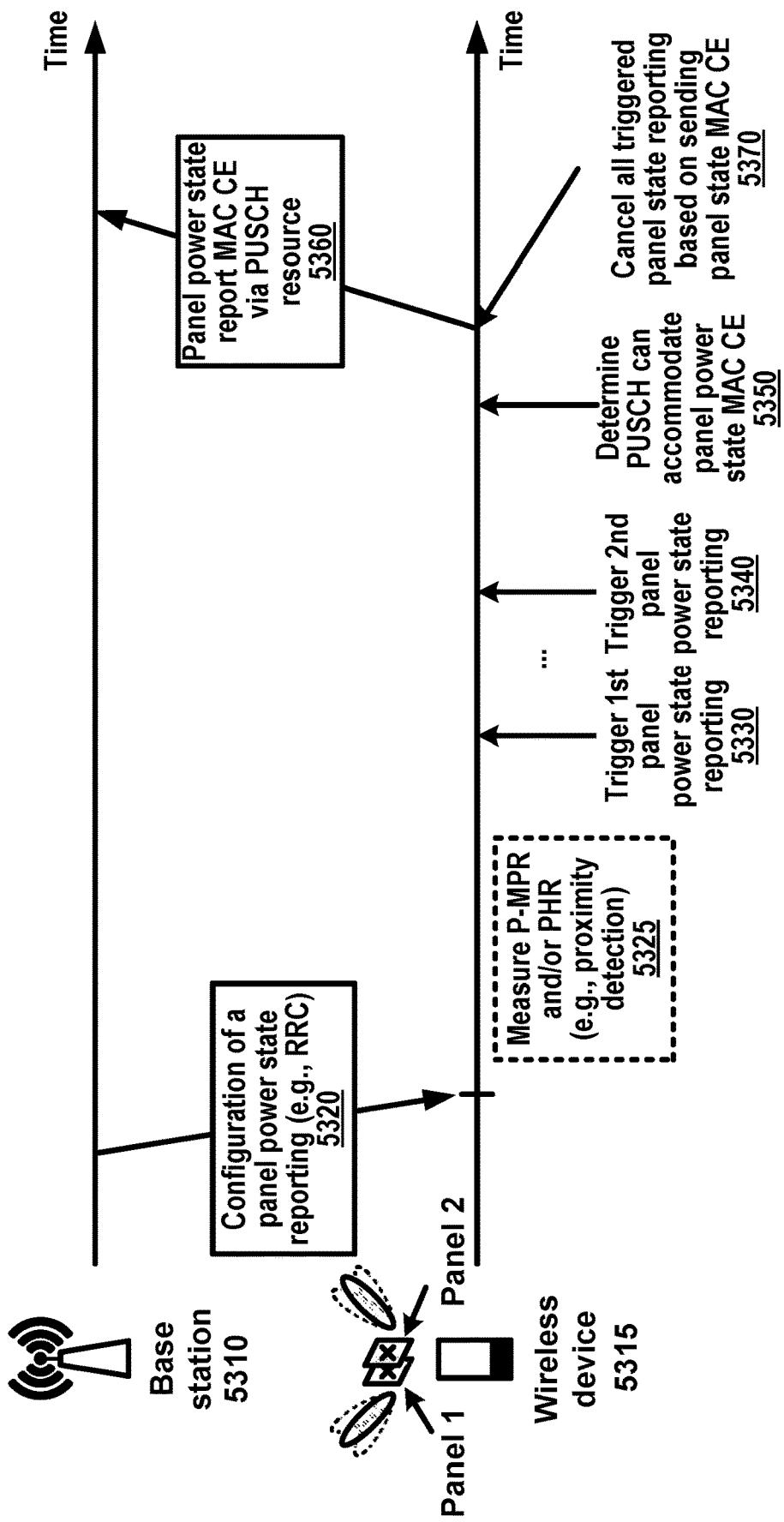
FIG. 53 shows an example of power state reporting.

FIG. 53 shows an example of power state reporting. Power state reporting may comprise panel power (and/or beam) state reporting. A base station 5310 may send/transmit, to a wireless device 5315, one or more messages 5320 (e.g., RRC message(s)) comprising first configuration parameters for panel power state reporting. The configuration parameters may comprise at least one of: a threshold for triggering the panel power state report procedure, and/or a timer value for a first timer used for triggering a panel power state report procedure. The one or more messages 5320 may comprise second configuration parameters of a PHR procedure. The second configuration parameters may comprise at least one of: a value for a power factor (e.g., phr-Tx-PowerFactorChange), a second timer value for a PHR (e.g., phr-ProhibitTimer), a third timer value for a PHR (e.g., phr-PeriodicTimer), and/or the like. The threshold for triggering the panel power state report procedure may be independently and/or separately configured from the value of the power factor (e.g., phr-Tx-PowerFactorChange). The first timer value of triggering the panel power state report procedure may be independently and/or separately configured from the second timer value for the PHR (e.g., phr-ProhibitTimer), and/or the third timer value for the PHR (e.g., phr-PeriodicTimer).

The wireless device 5315 may send/transmit a panel power state report MAC CE 5360 (e.g., a panel specific PHR MAC CE) indicating that a proximity with a first panel of a plurality of panels is detected by the wireless device 5315 and/or the proximity is not detected on at least a second panel of the plurality of panels. The panel-specific PHR MAC CE 5360 may be differentiated from a cell-specific PHR MAC CE (e.g., such as described with respect to FIG. 48A, FIG. 48B, FIG. 48C and/or FIG. 49). The panel-specific PHR MAC CE 5360 may comprise, for a cell, at least one of: a first index identifying/indicating a panel of a plurality of panels, a first P-MPR value for transmission via the panel, a first PHR value for transmission via the panel, and/or a first maximum output power for transmission via the panel.

The wireless device 5315 may measure P-MPR and/or PHR (e.g., 5325). For example, the wireless device 5315 may perform proximity detection on the plurality of panels. The wireless device 5315 may perform proximity detection based on P-MPR and/or PHR (and/or L1-PHR). The wireless device 5315 may trigger, based on the P-MPR and the PHR, a panel power state report procedure comprising sending/transmitting a panel specific PHR MAC CE 5360 with indication of proximity detection on a panel. The wireless device may trigger the panel power state report procedure such as described with respect to FIG. 54.

The wireless device 5315 may trigger a first panel power state report procedure (e.g., at 5330) based on (e.g., after or in response to) at least a first condition of conditions of the triggering being met (e.g., based on one or more examples described with respect to FIG. 54). The wireless device 5315 may trigger the first panel power state report procedure based on (e.g., after or in response to) the at least first condition being met on a first cell of a plurality of cells. The wireless device 5315 may trigger a second panel power state report procedure (e.g., at 5340) based on (e.g., after or in response to) at least a second condition of conditions of the triggering being met (e.g., based on one or more examples described with respect to FIG. 54). The wireless device 5315 may trigger the second panel power state report procedure based on (e.g., after or in response to) the at least second condition being met on a second cell of the plurality of cells. The wireless device 5315 may trigger the first panel power state report procedure based on (e.g., after or in response to) the at least first condition being met on a cell at a first time. The wireless device 5315 may trigger the first panel power state report procedure based on (e.g., after or in response to) the at least second condition being met on the cell at a second time. The second time may be, for example, a number/quantity of slots/frames (e.g., milliseconds, seconds, or any other time duration) after the first time.

The wireless device 5315 may determine whether a PUSCH resource is available for accommodating a panel power state report MAC CE (e.g., at 5350). The wireless device 5315 may determine that a PUSCH resource is available for accommodating a panel power state report MAC CE (e.g., a panel specific PHR MAC CE), for example, after triggering one or more panel power state report procedures comprising the first panel power state report procedure and/or the second panel power state report procedure. The wireless device may send/transmit the panel power state report MAC CE (e.g., at 5360) in/via the PUSCH resource to, for example, the base station 5310. The wireless device 5315 may cancel the one or more panel state report procedures (e.g., at step S370). The wireless device 5315 may cancel the one or more state report procedures (e.g., all triggered and pending panel state report procedures) based on (e.g., after or in response to) the sending/transmitting the panel power state report MAC CE in the PUSCH resource (e.g., at 5360). Canceling one or more triggered and pending panel state report procedures, based on (e.g., after or in response to) sending/transmitting the panel power state report MAC CE, may reduce power consumption of the wireless device and uplink interference to other wireless devices.

A wireless device may determine whether to trigger a panel power state report procedure based on, for example, an expiry of a first timer. The first timer may be configured in one or more messages (e.g., RRC message(s)) for triggering the panel power state report procedure. The wireless device may trigger a first panel power state report procedure based on (e.g., after or in response to) at least a first condition of conditions of the triggering being met (e.g., based on one or more examples described with respect to FIG. 54) and/or a first timer (e.g., the first timer configured in the one or more messages for triggering the panel power state report procedure) expiring and/or having expired. The wireless device may trigger a second panel power state report procedure based on (e.g., after or in response to) at least a second condition of conditions of the triggering being met (based on one or more examples described with respect to FIG. 54) and/or the first timer expiring or having expired. The wireless device may trigger the first panel power state report procedure based on (e.g., after or in response to), for example, the at least first condition being met on a first cell of a plurality of cells and/or the first timer expiring or having expired. The wireless device may trigger the second panel power state report procedure based on (e.g., after or in response to), for example, the at least second condition being met on a second cell of the plurality of cells and/or the first timer expiring or having expired. The wireless device may trigger the first panel power state report procedure based on (e.g., after or in response to), for example, the at least first condition being met on a cell at a first time and/or the first timer expiring or having expired. The wireless device may trigger the first panel power state report procedure based on (e.g., after or in response to), for example, the at least second condition being met on the cell at a second time a number of slots/frames (e.g., milliseconds, seconds) after the first time and/or the first timer expiring or having expired. The wireless device may skip triggering a panel power state report procedure, for example, if the first timer is running and does not expire.

The wireless device may determine that a PUSCH resource is available for accommodating a panel power state report MAC CE (e.g., a panel specific PHR MAC CE). The wireless device may determine that a PUSCH resource is available for accommodating a panel power state report MAC CE, for example, after triggering one or more panel power state report procedures comprising the first panel power state report procedure and/or the second panel power state report procedure. The wireless device may send/transmit the panel power state report MAC CE in/via the PUSCH resource. The wireless device may cancel the one or more panel state report procedures (e.g., all triggered and pending panel state report procedures) based on (e.g., after or in response to) the sending/transmitting the panel power state report MAC CE in/via the PUSCH resource. The wireless device may start or restart the first timer (e.g., a first timer configured for triggering the panel power state report procedure) with an initial timer value. Starting or restarting the first timer based on (e.g., after or in response to) sending/transmitting the panel power state report MAC CE may improve power consumption of the wireless device, for example, by reducing frequent transmissions of the panel power state report MAC CEs.

FIG. 54 shows examples of conditions for triggering a power state reporting. One or more conditions may trigger a panel power state report procedure, for example, if a wireless device is equipped with multiple panels. A wireless device 5415 may be equipped/configured with multiple panels comprising a first panel and at least a second panel. The first panel may be activated. The second panel may be activated. The first panel and the second panel both may both activated. The wireless device may send/transmit uplink signals via a panel (e.g., the first panel, the second panel, or any other quantity of panels) during a time period if the panel is activated.

A wireless device may trigger a panel power state report procedure (e.g., comprising reporting an indication of a proximity detection or an MPE detection or an uplink coverage loss) based on uplink duty cycle(s) of the first panel and/or the second panel. An uplink duty cycle of a cell may be defined/indicated as percentage or quantity of uplink symbols sent/transmitted via the cell within an evaluation period (e.g., a millisecond, a second, or any other duration). The uplink duty cycle may be evaluated per-panel for a cell, for example, if the wireless device switches an uplink transmission between the first panel and the second panel. A first uplink duty cycle of the first panel may be defined/indicated as percentage or quantity of uplink symbols sent/transmitted via the first panel on a cell within/during an evaluation period. A second uplink duty cycle of the second panel may be defined/indicated as percentage or quantity of uplink symbols transmitted via the second panel on the cell within/during the evaluation period.

A wireless device may determine whether to apply a P-MPR value based on a joint evaluation of a first uplink duty cycle of the first panel and a second uplink duty cycle of the second panel (e.g., 5401A). The first uplink duty cycle and the second uplink duty cycle may be evaluated in a same evaluation period. The wireless device may determine to apply the P-MPR value based on a summation of the first uplink duty cycle and the second uplink duty cycle being greater than a threshold (e.g., maxUplinkDutyCycle-PC2-FR1, maxUplinkDutyCycle-FR2, and the like). The wireless device may determine to apply the P-MPR value based on one of the first uplink duty cycle and the second uplink duty cycle being greater than the threshold. The one of the first uplink duty cycle and the second uplink duty cycle, by configuration and/or predefined, may be a least one or a greatest one of the first uplink duty cycle and the second uplink duty cycle. The wireless device may trigger a panel power state report procedure based on (e.g., after or in response to) the first uplink duty cycle evaluated on the first panel (e.g., within an evaluation period) being greater than a threshold and/or the second uplink duty cycle evaluated on the second panel (within the evaluation period) being less than the threshold (e.g., 5401B). The threshold may be a parameter determined based on the wireless device's capability.

A wireless device may send/transmit to a base station one or more wireless device capability messages (e.g., UECapabilityInformation IE, RRC message(s), etc.) comprising a threshold. The wireless device may transmit the one or more wireless device capability messages based on (e.g., after or in response to) receiving from the base station messages for capability enquiry (e.g., UECapabilityEnquiry IE, RRC message(s), etc.). The threshold may be indicated by a duty cycle indication (e.g., maxUplinkDutyCycle in UECapabilityInformation). A duty cycle indication (e.g., maxUplinkDutyCycle) may indicate a maximum percentage of symbols during an evaluation period (e.g., 1 second or any other duration) that can be scheduled for uplink transmission (e.g., for ensuring compliance with applicable electromagnetic power density exposure requirements provided by regulatory bodies, standards organizations, etc.).

A wireless device may determine the likelihood of an uplink coverage loss on a particular panel. The wireless device may determine that an uplink coverage loss may occur on the first panel. The uplink coverage loss may result from application of P-MPR on the first panel (e.g., if proximity detection is near (or in the direction of) the first panel), for example, if the first uplink duty cycle of the first panel is greater than the threshold. The wireless device may determine there is a lower probability (e.g., less likely) that an uplink coverage loss may occur on the second panel than on the first panel, for example, if the second uplink duty cycle of the second panel is less than the threshold. The wireless device may detect (and/or predict) an uplink coverage loss based on the first uplink duty cycle evaluated on the first panel being greater than the threshold and/or the second uplink duty cycle evaluated on the second panel (e.g., within the evaluation period) being less than the threshold. The wireless device may trigger a panel power state report procedure, for example, if the wireless device determines that the first uplink duty cycle evaluated on the first panel is greater than the threshold and/or the second uplink duty cycle evaluated on the second panel (within/during the evaluation period) is less than the threshold and/or based on a proximity detection on the first panel (e.g., 5401B). The wireless device may implement the panel power state report procedure based on one or more examples described with respect to FIG. 53.

A wireless device may trigger a panel power state report procedure for a cell (e.g., comprising reporting an indication of a proximity detection or an MPE detection or an uplink coverage loss) based on a first P-MPR (or a power backoff due to power management) of the first panel on the cell and/or a second P-MPR of the second panel on the cell) (e.g., 5402A). The wireless device may determine P-MPR (or a power backoff) based on at least one of: ensuring compliance with applicable electromagnetic power density exposure requirements and/or addressing unwanted emissions/self-defense requirements (e.g., for simultaneous transmissions on multiple RAT(s) and/or other scenarios that may or may not be within a scope of one or more 3GPP RAN or other specifications), and ensuring compliance with applicable electromagnetic power density exposure requirements (e.g., if proximity detection is used to address such requirements that require a lower maximum output power).

P-MPR (or power backoff) may be evaluated per-panel for a cell, for example, if a wireless device is equipped/configured with multiple panels. A P-MPR evaluated per-panel may be referred as a panel-specific P-MPR, which may be different from a cell-specific P-MPR. The wireless device may determine a cell specific P-MPR for uplink transmission, for example, no matter on which panel the uplink transmission occurs. The wireless device may determine a first power backoff value of a first applicable P-MPR of the first panel based on the requirements described herein, for example, if the wireless device determines transmission via the first panel. The wireless device may determine a second power backoff value of a second applicable P-MPR of the second panel based on the requirements described herein, for example, if the wireless device determines transmission via the second panel.

The wireless device may determine (and/or predict) an uplink coverage loss and/or an MPE issue of the first panel based on the first power backoff of the first panel being greater than a threshold and/or the second power backoff of the second panel being less than a threshold (e.g., 5402B). The threshold may be a power reduction value determined based on a wireless device capability. The wireless device may trigger a panel power state report procedure for the cell based on the first power backoff of the first panel, on the cell, being greater than a threshold and/or the second power backoff of the second panel, on the cell, being less than a threshold.

The wireless device may send/transmit to the base station one or more wireless device capability messages (e.g., UECapabilityInformation IE, RRC message(s), etc.) comprising a threshold. The wireless device may send/transmit the one or more wireless device capability messages based on (e.g., after or in response to) receiving from a base station messages for capability enquiry (e.g., UECapabilityEnquiry IE, RRC message(s), etc.). The threshold may indicate a P-MPR (or a power backoff) value. The wireless device may determine that an uplink coverage loss may occur on the panel (e.g., due to compliance with MPE requirements for proximity detection), for example, if an applied P-MPR value for a panel is greater than the threshold. The wireless device may determine there is a lower probability (e.g., less likely) that an uplink coverage loss may occur on the panel, for example, if the applied P-MPR value for the panel is less than the threshold.

The wireless device may determine (and/or predict) an uplink coverage loss or an MPE issue based on comparison between the first P-MPR of the first panel and the second P-MPR of the second panel. The wireless device may determine that an uplink coverage loss may occur more likely on the first panel than on the second panel, for example, if the wireless device determines that the first P-MPR (power backoff) of the first panel is greater than the second P-MPR of the second panel. The wireless device may trigger a panel power state report procedure for the cell, for example, if the wireless device determines that the first P-MPR of the first panel, on a cell, is greater than the second P-MPR of the second panel on the cell. The wireless device may implement the panel power state report procedure based on one or more examples described with respect to FIG. 53.

A wireless device may trigger a panel power state report procedure (e.g., comprising reporting an indication of a proximity detection or an MPE detection or an uplink coverage loss) for a cell based on change of a first P-MPR (or power backoff) of the first panel and/or change of a second P-MPR of the second panel (e.g., 5403A). The change of P-MPR may be determined per panel for a cell. The wireless device may determine the change of a P-MPR of a panel of a cell based on a comparison between a P-MPR determined for a latest (or current) uplink transmission on the panel of the cell and a P-MPR determined for a previous uplink transmission before the latest uplink transmission on the panel of the cell. The wireless device may detect (or predict) an uplink coverage loss based on (e.g., after or in response to) the change of the first P-MPR being greater than a threshold and/or the change of the second P-MPR being less than the threshold. The threshold may be a power reduction value determined based on a wireless device capability. The wireless device may trigger a panel power state report procedure for a cell based on the change of a first power backoff of the first panel, on the cell, being greater than the threshold and/or the change of a second power backoff of the second panel, on the cell, being less than the threshold (e.g., 5403B).

The wireless device may send/transmit to the base station one or more wireless device capability messages (e.g., UECapabilityInformation IE, RRC message(s), etc.) comprising a threshold. The wireless device may send/transmit the one or more wireless device capability messages based on (e.g., after or in response to) receiving from the base station one or more messages for capability enquiry (e.g., UECapabilityEnquiry IE, RRC message(s), etc.). The threshold may indicate a P-MPR (or a power backoff) change value. The wireless device may determine that an uplink coverage loss may occur on the panel (e.g., due to compliance with MPE requirements in case of proximity detection), if a P-MPR change applied for a panel by the wireless device is greater than the threshold. The wireless device may determine there is a lower probability that an uplink coverage loss may occur on the panel (e.g., due to compliance with MPE requirements in case of proximity detection), for example, if the P-MPR change applied for the panel is less than the threshold.

The wireless device may detect (or predict) an uplink coverage loss for a cell based on a comparison between a first change of a first P-MPR of the first panel and a second change of a second P-MPR of the second panel (e.g., 5403A). The wireless device may determine that an uplink coverage loss may occur more likely on the first panel than on the second panel, for example, if the wireless device determines that the first change of the first P-MPR of the first panel is greater than the second change of the second P-MPR of the second panel. The wireless device may trigger a panel power state report procedure for the cell, for example, if the wireless device determines that the first change of the first P-MPR of the first panel on a cell is greater than the second change of the second P-MPR of the second panel on the cell (e.g., 5403B). The wireless device may implement the panel power state report procedure based on one or more examples described with respect to FIG. 53.

A wireless device may trigger a panel power state report procedure (e.g., comprising reporting an indication of a proximity detection or an MPE detection or an uplink coverage loss) for a cell based on a first P-MPR and a first RSRP of the first panel and/or a second P-MPR and a second RSRP of the second panel (e.g., 5404A). A P-MPR may be determined based on one or more of the examples described herein. P-MPR (or power backoff) may be evaluated per panel for a cell, for example, if the wireless device is equipped with multiple panels. RSRP may be defined as a linear average over power contributions of resource elements of the antenna port(s) that carry reference signals (e.g., SSB and/or CSI-RSs) configured for RSRP measurements within measurement frequency bandwidth in configured reference signals occasions. For frequency range 1 (FR 1), a reference point for the RSRP may be the antenna connector of the wireless device. For FR 2, RSRP may be measured based on a combined signal from antenna elements corresponding to a given receiver branch. RSRP may be evaluated per panel for a cell, for example, if the wireless device is equipped with multiple panels. A first RSRP of a first panel may be measured on received RSs via the first panel. A second RSRP of a second panel may be measured on received RSs via the second panel. The first RSRP may be the same with or different from the second RSRP.

The wireless device may trigger the panel power state report procedure for a cell based on a combined value, of a first P-MPR and a first RSRP of the first panel for the cell, being less than a threshold, and/or a combined value, of a second P-MPR and a second RSRP of the second panel for the cell, being greater than the threshold (e.g., 5404B). A combined value of a RSRP and a P-MPR may be determined as the value of the RSRP minus the value of the P-MPR (e.g., if the value of the P-MPR is equal to or greater than 0). The threshold may be determined based on a wireless device capability.

The wireless device may send/transmit to the base station one or more wireless device capability messages (e.g., UECapabilityInformation IE, RRC message(s)) comprising a threshold. The wireless device may send/transmit the one or more wireless device capability messages based on (e.g., after or in response to) receiving from the base station one or more messages for capability enquiry (e.g., UECapabilityEnquiry IE, RRC message(s), etc.). The threshold may indicate a combined RSRP and P-MPR value for triggering a panel power state report procedure. The wireless device may determine that an uplink coverage loss may occur on the panel (e.g., due to compliance with MPE requirements for proximity detection), for example, if a combined value of measured RSRP value and applicated P-MPR value on a panel is less than a threshold. The wireless device may determine there is a lower probability (e.g., less likely) that an uplink coverage loss may occur on the panel, for example, if a combined value of measured RSRP value and applicated P-MPR value on a panel is greater than threshold.

The wireless device may trigger the panel power state report procedure for a cell based on a comparison between a first combined value of a first P-MPR and a first RSRP of the first panel on the cell, and a second combined value of a second P-MPR and a second RSRP of the second panel on the cell. The wireless device may determine that an uplink coverage loss may occur more likely on the first panel than on the second panel, for example, if the wireless device determines that the first combined value of the first panel is less than the second combined value of the second panel. The wireless device may trigger the panel power state report procedure for a cell based on a first combined value of a first P-MPR and a first RSRP of the first panel on the cell being less than a second combined value of a second P-MPR and a second RSRP of the second panel on the cell.

A wireless device may trigger a panel power state report procedure (e.g., comprising reporting an indication of a proximity detection or an MPE detection or an uplink coverage loss) for a cell based on a first PHR of the first panel on the cell and a second PHR of the second panel on the cell (e.g., 5405A). A wireless device may determine PHR per-panel on a cell, for example, if the wireless device is configured with multiple panels. A PHR evaluated or determined per-panel may be referred to as a panel-specific PHR, which may be different from a cell-specific PHR. The wireless device may determine or calculate a cell-specific PHR for uplink transmission, no matter on which panel the uplink transmission occurs. A wireless device may determine a value of a PHR of a panel on a cell based on the examples described herein. The wireless device may determine a value of a PHR of a panel on a cell based on the examples described herein and/or based on an L1-RSRP on the panel for a pathloss RS. The wireless device may determine a value of a PHR of a panel on a cell based on the examples described herein and/or based on a P-MPR (or power backoff) for the panel on the cell.

A wireless device may trigger the panel power state report procedure for a cell based on a first PHR of the first panel, on the cell, being lower than a threshold and/or a second PHR of the second panel, on the cell, being higher than the threshold (e.g., 5405B). The wireless device may determine (or predict) that an uplink coverage loss may occur more likely on the first panel than on the second panel, for example, if the wireless device determines that the first PHR of the first panel is lower than the threshold and the second PHR of the second panel is higher than the threshold. The threshold may be configured by the base station, e.g., by implementing the examples described herein, or preconfigured to a fixed value.

A wireless device may trigger the panel power state report procedure for a cell based on a comparison between a first PHR of the first panel on the cell and a second PHR of the second panel on the cell. The wireless device may determine (or predict) that an uplink coverage loss may occur more likely on the first panel than on the second panel, for example, if the wireless device determines that the first PHR of the first panel is smaller (e.g., in absolute value) than the second PHR of the second panel. The wireless device may trigger the panel power state report procedure for a cell based on a first PHR of the first panel on the cell being smaller than a second PHR of the second panel on the cell.

One or more examples (e.g., conditions, factors, etc.) described with respect to FIG. 54 may be combined for determining to trigger a panel power state report procedure. A wireless device may trigger the panel power state report procedure for a cell based on a joint evaluation of at least one of: uplink duty cycle, P-MPR, RSRP and/or PHR on a panel for the cell.

Figure 55:
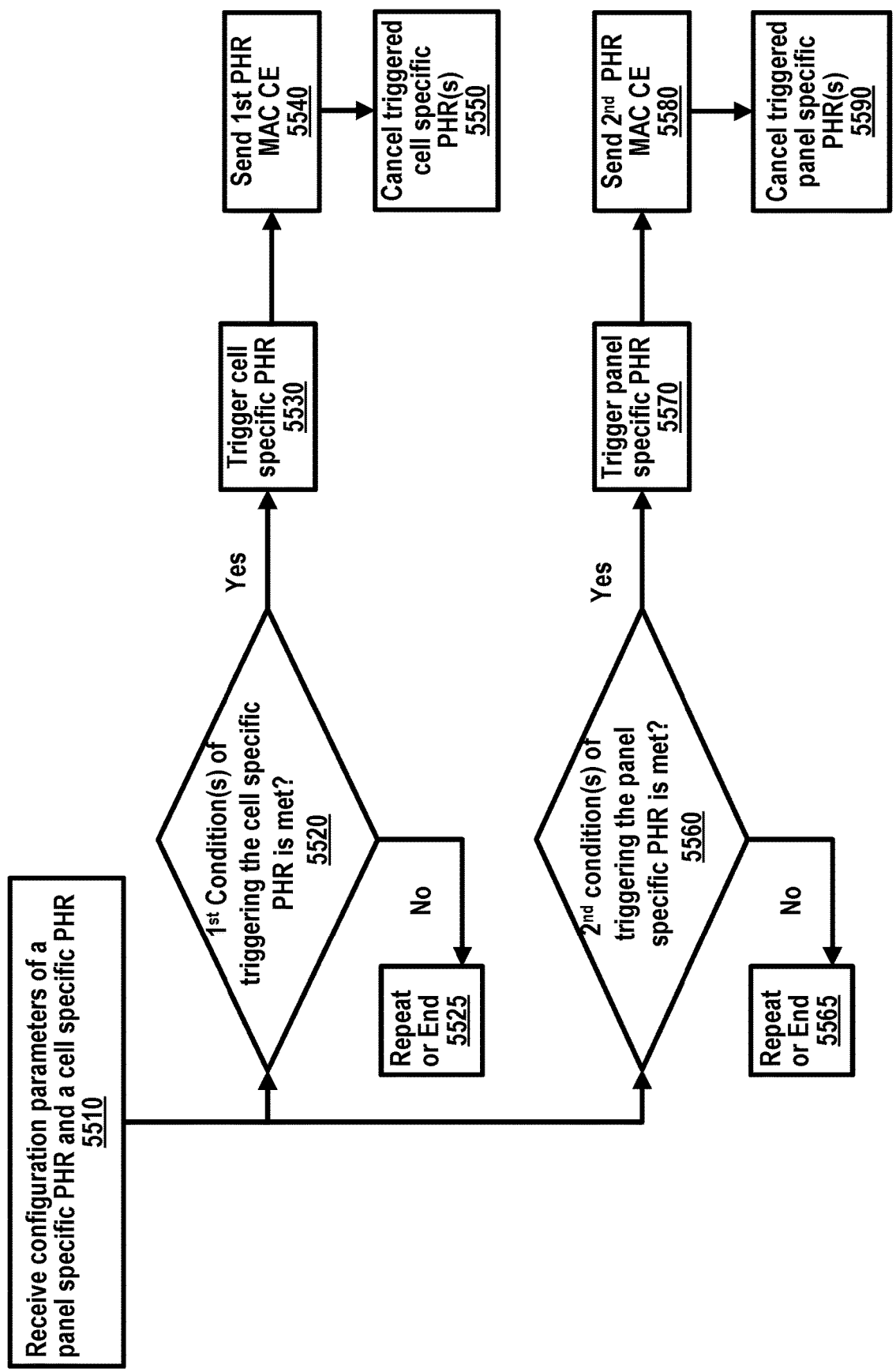
FIG. 55 shows an example method for power state reporting.

FIG. 55 shows an example method for a power state reporting. A base station may send/transmit, to a wireless device, one or more messages (e.g., RRC message(s)) comprising configuration parameters of a panel power state report procedure (e.g., a panel specific PHR) and/or a cell-specific PHR procedure. At step S510, a wireless device may receive the one or more messages comprising the configuration parameters of the panel power state report procedure and/or the cell-specific PHR procedure. The configuration parameters may be implemented based on one or more examples described with respect to FIG. 53.

The wireless device may perform the panel power state report procedure and the cell-specific PHR procedure separately and/or independently. At step S520, the wireless device may determine whether first conditions of triggering a cell specific PHR procedure are met (e.g., by implementing one or more examples described with respect to FIG. 46). At step S530, the wireless device may trigger cell-specific PHR procedure(s), for example, based on (e.g., after or in response to) the first conditions being met. At step S525, the wireless device may repeat step S520 or end the PHR procedure. At step S560, the wireless device may determine whether second conditions of triggering a panel power state report procedure are met (e.g., by implementing one or more examples described with respect to FIG. 54). At step S570, the wireless device may trigger panel power state report procedure(s), for example, based on (e.g., after or in response to) the second conditions being met. At step S565, the wireless device may repeat step S560 or end the PHR procedure.

The wireless device may configure and/or determine the triggered cell-specific PHR procedure to overlap in time with the triggered panel power state report procedure. The triggered cell-specific PHR procedure overlapping with the triggered panel power state report procedure may comprise a PHR MAC CE for the triggered PHR procedure having not been sent/transmitted via a PUSCH resource if (e.g., while) the triggered panel power state report procedure is pending, or a panel power state report MAC CE for the triggered panel power state report procedure having not been sent/transmitted via a PUSCH resource if (e.g., while) the triggered PHR procedure is pending.

The wireless device may determine a PUSCH resource is available for accommodating a PHR MAC CE (e.g., as described with respect to FIG. 48A, FIG. 48B, FIG. 48C and/or FIG. 49). At step S540, the wireless device may send/transmit the PHR MAC CE, for example, based on (e.g., after or in response to) the PUSCH resource being available. At step S550, the wireless device may cancel all triggered cell-specific PHR procedure(s), for example, based on (e.g., after or in response to) sending/transmitting the PHR MAC CE. The wireless device may keep pending the triggered panel power state report procedure(s), for example, based on (e.g., after or in response to) the sending/transmitting the PHR MAC CE.

Figure 56A:
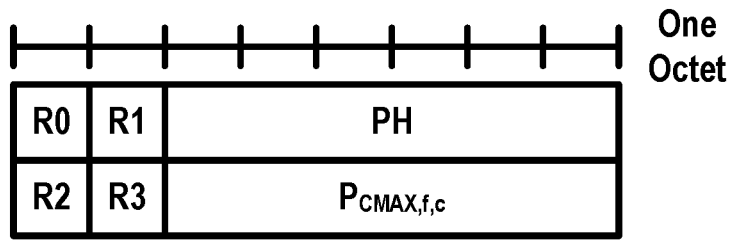
FIG. 56A and FIG. 56B show examples of panel power state report MAC CE formats.
Figure 56B:
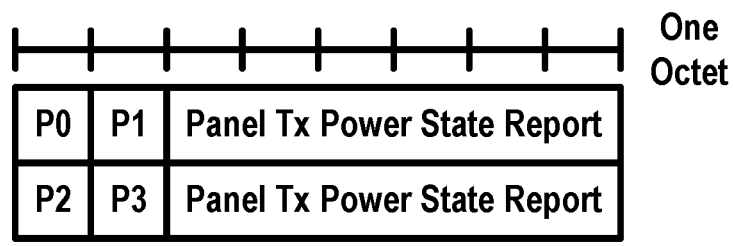
Figure 57:
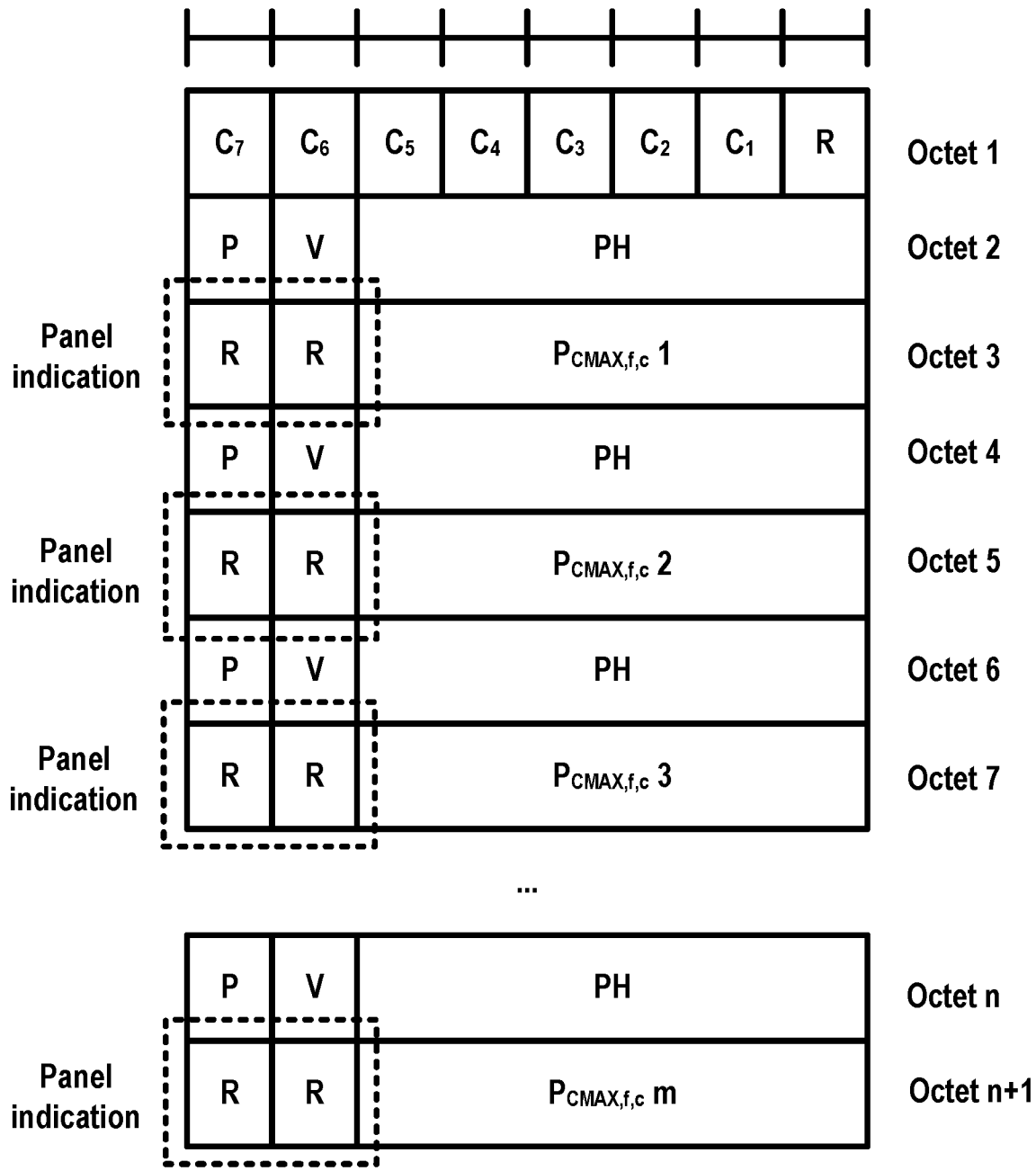
FIG. 57 shows an example of a panel power state report MAC CE format.

The wireless device may determine a PUSCH resource is available for accommodating a panel power state report MAC CE (e.g., a panel specific PHR MAC CE as described with respect to FIG. 56A, FIG. 56B and/or FIG. 57). At step S580, the wireless device may send/transmit the panel power state report MAC CE, for example, based on (e.g., after or in response to) the PUSCH resource being available. At step S590, the wireless device may cancel all triggered panel power state report procedure(s), for example, based on (e.g., after or in response to) sending/transmitting the panel power state report MAC CE. The wireless device may keep pending the triggered cell specific PHR procedure(s) for example, based on (e.g., after or in response to) the sending/transmitting the panel power state report MAC CE.

The wireless device may determine that a PUSCH resource is available for accommodating a panel power state report MAC CE (e.g., a panel-specific PHR MAC CE as described with respect to FIG. 56A, FIG. 56B and/or FIG. 57) and/or a PHR MAC CE (e.g., such as described with respect to FIG. 48A, FIG. 48B, FIG. 48C and/or FIG. 49). The wireless device may send/transmit the panel power state report MAC CE and/or the PHR MAC CE, for example, based on (e.g., after or in response to) the PUSCH resource being available. The wireless device may cancel all triggered panel power state report procedure(s) and/or all triggered cell specific PHR procedure(s), for example, based on (e.g., after or in response to) sending/transmitting the panel power state report MAC CE and/or the PHR MAC CE.

A wireless device may perform panel power state report procedure and cell-specific PHR procedure separately and/or independently. The example methods and/or embodiments may improve uplink coverage and uplink throughput, and also reduce transmission latency of a wireless device.

A wireless device may perform panel power state report procedure and the cell specific PHR procedure jointly. For example, the wireless device may determine whether first conditions of triggering a cell specific PHR procedure are met (e.g., by implementing one or more examples described with respect to FIG. 46). The wireless device may trigger cell specific PHR procedure(s), for example, based on (e.g., after or in response to) the first conditions being met. The wireless device may determine whether second conditions of triggering a panel power state report procedure are met (e.g., by implementing one or more examples described with respect to FIG. 54). The wireless device may trigger panel power state report procedure(s), for example, based on (e.g., after or in response to) the second conditions being met.

A wireless device may configure and/or determine a triggered cell-specific PHR procedure to overlap in time with a triggered panel power state report procedure. A wireless device may determine a PUSCH resource is available for accommodating a PHR MAC CE (e.g., such as described with respect to FIG. 48A, FIG. 48B, FIG. 48C and/or FIG. 49) and/or a panel power state report MAC CE (e.g., a panel specific PHR MAC CE as described with respect to FIG. 56A, FIG. 56B and/or FIG. 57).

A wireless device may send/transmit the PHR MAC CE based on (e.g., after or in response to) the PUSCH resource being available. The wireless device may cancel all triggered cell specific PHR procedure(s) and/or all triggered panel power state report procedure(s) based on (e.g., after or in response to) sending/transmitting the PHR MAC CE.

A wireless device may send/transmit the panel power state report MAC CE based on (e.g., after or in response to) a PUSCH resource being available. A wireless device may cancel all triggered cell-specific PHR procedure(s) and/or all triggered panel power state report procedure(s) based on (e.g., after or in response to) sending/transmitting the panel power state report MAC CE. By implementing examples described herein, a wireless device may jointly perform panel power state report procedure and cell-specific PHR procedure, which may improve uplink coverage and/or uplink throughput, and/or reduce power consumption of a wireless device.

FIG. 56A shows an example of panel power state report MAC CE format. A wireless device may send/transmit to a base station a panel power state report MAC CE for a cell (e.g., PCell) using an example panel power state report MAC CE format based on (e.g., after or in response to) triggering a panel power state report procedure. The wireless device may trigger the panel power state report procedure based on one or more examples described with respect to FIG. 53, FIG. 54 and/or FIG. 55. A panel power state report MAC CE format may have a fixed size (e.g., two octets) with a MAC subheader associated with an LCID value. The MAC CE format may comprise at least one of: a PH field, a maximum transmission power (e.g., $P_{CMAX}$) field, a power backoff field for power management (e.g., P-MPR) and/or a panel indication field. A PH field (e.g., 6 bits with values indicated based on FIG. 48B) may indicate a panel specific PHR for a panel of a cell (e.g., a PCell). A $P_{CMAX}$ field may indicate a panel specific $P_{CMAX}$ (e.g., 6 bits with values indicated based on FIG. 48C) for a panel of the cell. A power backoff field (e.g., 3 bits, 4 bits, or any other quantity of bits) may indicate a power backoff value due to power management. The power backoff value indicated (e.g., explicitly indicated) in the power back field of the MAC CE may enable a base station to flexibly schedule uplink transmission on one of the plurality of panels. A panel indication field may indicate a panel of a plurality of panels of the wireless device. The panel indication field may be 1 bit, for example, if at most two active panels are configured. The panel indication field may be 2 bits, for example, if at most four active panels are configured. The panel indication may comprise any quantity of bits to indicate any quantity of panels or active panels.

A MAC CE for panel power state report may be extended to indicate panel power state reports for multiple panels. The MAC CE may have more than 2 octets comprising first 2 octets for indicating a power state report for a first panel, second 2 octets for indicating a power state report for a second panel, and so on. Each 2 octets may indicate at least one of: a PH value, a $P_{CMAX}$ value, and/or a power backoff value for a corresponding panel of a plurality of panels of the wireless device.

A wireless device may send/transmit to a base station a panel power state report MAC CE by reusing an existing MAC CE format (e.g., a single entry PHR MAC CE). The wireless device may set a first reserved bit (e.g., R0) of a single entry PHR MAC CE (as shown in FIG. 48A) to a first value (e.g., 1) indicating the panel power state report, for example, if the wireless device sends/transmits the PHR MAC CE indicating a panel power state. The wireless device may set one or more second reserved bit (e.g., R1~R3) of the single entry PHR MAC CE to one or more second values (e.g., non zeros) indicating a power state value (e.g., a P-MPR value) for the panel. The wireless device may indicate a PH value of the panel by using a PH field of the single entry PHR MAC CE. The wireless device may indicate a maximum transmission power ($P_{CMAX}$) of the panel by using a $P_{CMAX}$ field of the single entry PHR MAC CE.

A wireless device may send/transmit to a base station a panel power state report MAC CE by reusing an existing MAC CE format (e.g., a PHR MAC CE). The wireless device may set a first reserved bit (e.g., R0) of a single entry PHR MAC CE (as shown in FIG. 48A) to a first value (e.g., 1) indicating the panel power state report, for example, if the wireless device sends/transmits the PHR MAC CE indicating a panel power state. The wireless device may set one or more second reserved bit (e.g., R1-R3) of the single entry PHR MAC CE to one or more second values (e.g., non zeros) indicating a power state value (e.g., a P-MPR value) for the panel. The wireless device may indicate a PH value for the cell (e.g., PCell) by using a PH field of the single entry PHR MAC CE. The wireless device may indicate a maximum transmission power ($P_{CMAX}$) for the cell by using a $P_{CMAX}$ field of the single entry PHR MAC CE.

FIG. 56B shows an example of panel power state report MAC CE format. A wireless device may send/transmit to a base station a panel power state report MAC CE with an example panel power state report MAC CE format based on (e.g., after or in response to) triggering a panel power state report procedure. The wireless device may trigger the panel power state report procedure based on one or more examples described with respect to FIG. 53, FIG. 54 and/or FIG. 55. As shown in FIG. 56B, a panel power state report MAC CE format may have a fixed size (e.g., two octets) with a MAC subheader associated with an LCID value. The MAC CE format may comprise at least one of: a first panel indication field (e.g., P0 and/or P1), a first panel transmission power state report field, a second panel indication field (e.g., P2 and/or P3), a second panel transmission power report. In an example, a panel transmission power state report field (e.g., 6 bits) may indicate a panel power state value (e.g., a panel specific PHR, or a panel specific P-MPR, or a combined value of P-MPR and RSRP) for a panel of a cell (e.g., a PCell). A panel indication field may indicate a panel of a plurality of panels of the wireless device. The first/second panel indication field may be 1 bit (e.g., P0 for the first panel indication field, P2 for the second panel indication field), for example, if at most two active panels are configured. The first/second panel indication field may be 2 bits, for example, if at most four active panels are configured. The wireless device may send/transmit the panel power state report MAC CE with the example MAC CE format indicating power state report for multiple panels for a cell.

FIG. 57 shows an example panel power state report MAC CE format. A wireless device may send/transmit to a base station a panel power state report MAC CE. The wireless device may send the panel power state report MAC CE by reusing an existing MAC CE format (e.g., a multiple entry PHR MAC CE as described with respect to FIG. 49). The wireless device may set one or more first reserved bits (e.g., two Rs in $3^{rd}$ octet as shown in FIG. 57) of the multiple entry PHR MAC CE to a first value indicating a first panel for a first cell, for example, if the wireless device sends/transmits the PHR MAC CE indicating a panel power state. The wireless device may indicate a PH value of the first panel by using a first PH field (e.g., a PH field in $2^{nd}$ octet) of the multiple entry PHR MAC CE. The wireless device may indicate a maximum transmission power (e.g., $P_{CMAX}$) of the first panel by using a first field (e.g., a $P_{CMAX}$ field in $3^{rd}$ octet) of the multiple entry PHR MAC CE. The wireless device may set one or more second reserved bit (e.g., two Rs in $5^{th}$ octet as shown in FIG. 57) of the multiple entry PHR MAC CE to a second value indicating a second panel for a second cell. The wireless device may indicate a PH value of the second panel for a second cell by using a second PH field (e.g., a PH field in $4^{th}$ octet) of the multiple entry PHR MAC CE. The wireless device may indicate a maximum transmission power (e.g., $P_{CMAX}$) of the second panel by using a second field (e.g., a $P_{CMAX}$ field in $5^{th}$ octet) of the multiple entry PHR MAC CE. The wireless device may use other fields (e.g., such as shown in FIG. 57) indicating PH value and $P_{CMAX}$ for a third panel of a third cell. C1~C7 fields of the multiple entry PHR MAC CE may be implemented based on one or more examples described with respect to FIG. 49.

A wireless device may send/transmit to a base station a panel power state report MAC CE indicating panel power states for one or more panels for one or more cells (e.g., based on one or more examples described with respect to FIG. 56A, FIG. 56B, FIG. 56C and FIG. 57). Example MAC CE formats may improve uplink signaling overhead and power consumption of the wireless device.

Figure 58:
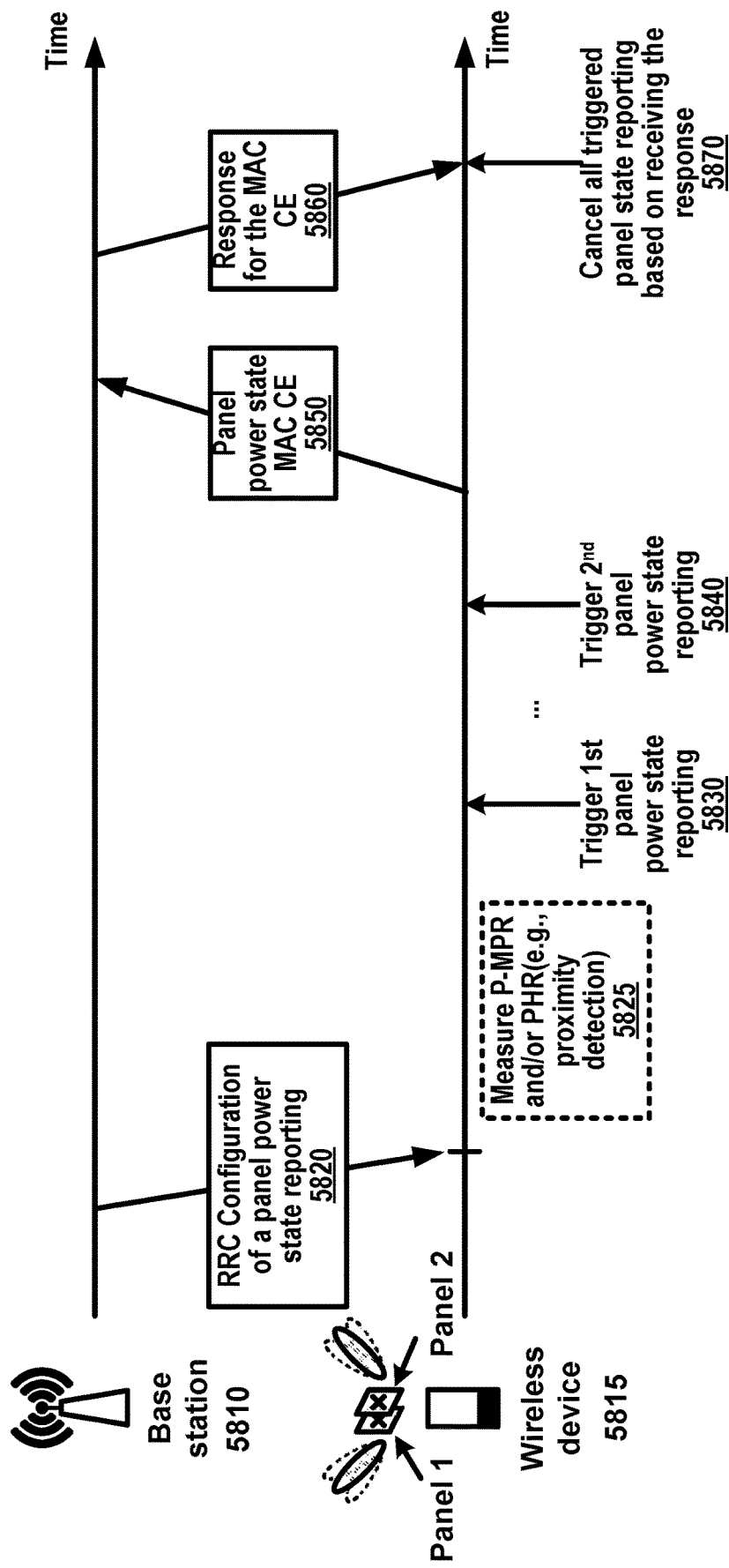
FIG. 58 shows an example for power state reporting.

FIG. 58 shows an example method for power state reporting. The power state reporting may comprise panel power state reporting. A base station 5810 may send/transmit, to a wireless device 5815, one or more messages 5820 (e.g., one or more RRC messages) comprising first configuration parameters of a panel power state report procedure. The wireless device may receive the one or more messages 5820 comprising the first configuration parameters of the panel power state report procedure. The first configuration parameters may comprise at least one of: a threshold for triggering the panel power state report procedure, and/or a first timer value for a first timer used for triggering the panel power state report procedure. The one or more messages 5820 may comprise second configuration parameters of an SCell BFR procedure. The second configuration parameters may be implemented based on one or more examples described with respect to FIG. 50.

The wireless device 5815 may send/transmit a panel power state report MAC CE 5850 indicating that a proximity with a first panel of a plurality of panels is detected by the wireless device 5815 and/or the proximity is not detected on at least a second panel of the plurality of panels. The wireless device 5815 may send/transmit a panel power state report MAC CE 5850 indicating that an uplink coverage loss occurs on a first panel of a plurality of panels and/or the uplink coverage loss does not occur on at least a second panel of the plurality of panels. The panel power state report MAC CE 5850 may comprise at least one of: a first index identifying (e.g., indicating) a panel of a plurality of panels, a first P-MPR value for transmission via the panel, a first PHR value for transmission via the panel, a first maximum output power for transmission via the panel, and/or a first uplink beam indication (e.g., an UL TCI or an SRI indication).

At step S825, the wireless device 5815 may measure P-MPR and/or PHR. The wireless device 5815 may perform proximity detection on the plurality of panels. The wireless device 5815 may perform proximity detection based on P-MPR and/or PHR (or L1-PHR). The wireless device may trigger, based on the P-MPR and/or the PHR, a panel power state report procedure comprising sending/transmitting a panel power state report MAC CE. The wireless device may trigger the panel power state report procedure by implementing one or more examples described with respect to FIG. 54.

At step S830, the wireless device 5815 may trigger a first panel power state report procedure based on (e.g., after or in response to) at least a first condition of conditions of the triggering being met (e.g., based on one or more examples described with respect to FIG. 54). The wireless device 5815 may trigger a second panel power state report procedure based on (e.g., after or in response to) at least a second condition of conditions of the triggering being met (e.g., based on one or more examples described with respect to FIG. 54). The wireless device 5815 may trigger the first panel power state report procedure based on (e.g., after or in response to) the at least first condition being met on a first cell of a plurality of cells. At step S840, the wireless device 5815 may trigger the second panel power state report procedure based on (e.g., after or in response to) the at least second condition being met on a second cell of the plurality of cells. The wireless device 5815 may trigger the first panel power state report procedure based on (e.g., after or in response to) the at least first condition being met on a cell at a first time. The wireless device may trigger the first panel power state report procedure based on (e.g., after or in response to) the at least second condition being met on the cell at a second time. The second time may be, for example, a number of slots/frames (e.g., milliseconds, seconds) after the first time.

The wireless device 5815 may determine that a PUSCH resource is available for accommodating a panel power state report MAC CE after triggering one or more panel power state report procedures comprising the first panel power state report procedure and/or the second panel power state report procedure. The wireless device may send/transmit the panel power state report MAC CE 5850 in the PUSCH resource. The wireless device may receive, from the base station 5810, a response 5860 to the panel power state report MAC CE. The response 5860 may comprise a PDCCH transmission (or DCI via the PDCCH) addressed to C-RNTI indicating that uplink grant for a new transmission is received for the HARQ process, which may be used for the transmission of the panel power state report MAC CE. At step S870, the wireless device 5815 may cancel the one or more panel state report procedures (e.g., all triggered and pending panel state report procedures) based on (e.g., after or in response to) receiving the response 5860. Canceling all triggered and pending panel state report procedures may reduce power consumption of the wireless device and uplink interference to other wireless devices.

A wireless device may send/transmit a MAC CE (e.g., an SCell BFR MAC CE) indicating a candidate panel (and/or an uplink beam indication associated with the candidate panel) for the purpose of MPE issue identification. A wireless device may send/transmit a MAC CE, for example, by applying some existing SCell beam failure recovery (BFR) procedure(s). The candidate panel may be an active panel, of a plurality of panels of the wireless device, on which the wireless device does not detect a human body (or other living organism) in proximity and/or does not detect an uplink coverage loss. At least some wireless devices may cancel an uplink candidate panel/uplink beam reporting procedure, based on (e.g., after or in response to) receiving a response, from a base station, for sending/transmitting an SCell BFR MAC CE for a second procedure (e.g., an SCell BFR procedure). Canceling the uplink candidate panel/uplink beam reporting procedure, although the wireless device has not yet sent/transmitted a panel state/power report MAC CE for the candidate panel/uplink beam reporting or the wireless device has not yet received a response for a sent/transmitted panel state/power report MAC CE, may result in uplink coverage loss. SCell BFR procedures may be improved for MPE issue indication for a panel when reusing SCell BFR procedure for MPE issue indication.

Figure 59:
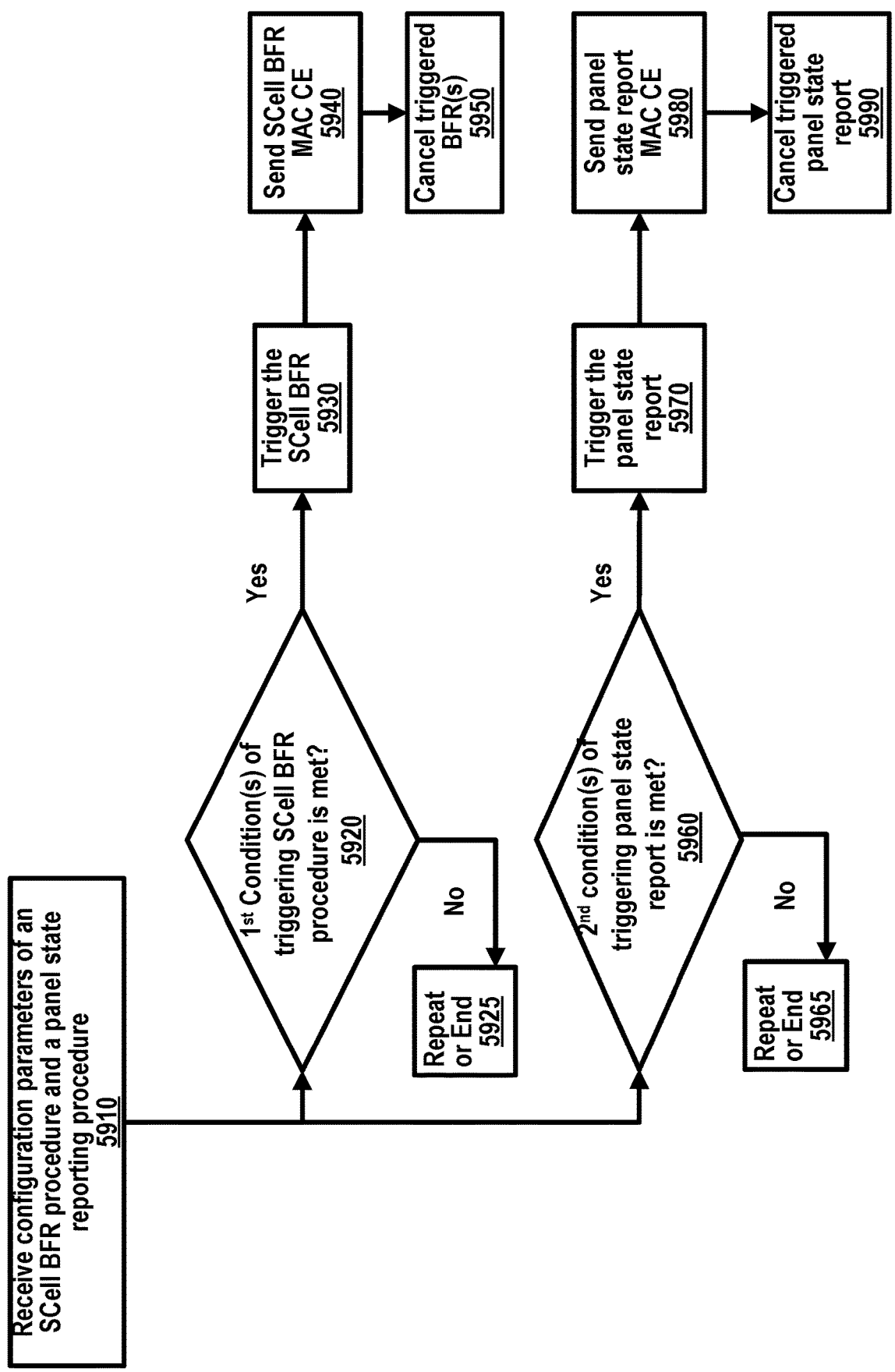
FIG. 59 shows an example method for an SCell BFR procedure and/or power state reporting.

FIG. 59 shows an example method for an SCell BFR procedure and/or a power state reporting. The power state reporting may comprise panel power state reporting. A base station may send/transmit one or more messages (e.g., RRC messages) comprising configuration parameters of an SCell BFR procedure and/or a panel power state report procedure (e.g., a panel specific PHR). At step S910, a wireless device may receive the one or more messages comprising the configuration parameters of the SCell BFR procedure and/or the panel power state report procedure. The configuration parameters may be implemented based on one or more examples described with respect to FIG. 58. A wireless device may perform the panel power state report procedure and an SCell BFR procedure separately and/or independently. At step S920, the wireless device may determine whether first conditions of triggering an SCell BFR procedure are met (e.g., by implementing examples of FIG. 50). At step S930, the wireless device may trigger SCell BFR procedure(s), for example, based on (e.g., after or in response to) the first conditions being met. At step S925, the wireless device may repeat step S920 or end the PHR procedure. At step S960, the wireless device may determine whether second conditions of triggering a panel power state report procedure are met (e.g., by implementing one or more examples described with respect to FIG. 54 and/or FIG. 58). At step S970, the wireless device may trigger panel power state report procedure(s), for example, based on (e.g., after or in response to) the second conditions being met. At step S965, the wireless device may repeat step S960 or end the PHR procedure.

The wireless device may configure/determine the triggered SCell BFR procedure to overlap in time with the triggered panel power state report procedure. The triggered SCell BFR procedure overlapping with the triggered panel power state report procedure may comprise: an SCell BFR MAC CE having been sent/transmitted, for example, if (e.g., while) a panel power state report MAC CE has not been transmitted; and/or an SCell BFR MAC CE having been sent/transmitted and not having been acknowledged (e.g., by receiving a response from the base station), for example, if (e.g., while) the panel power state report MAC CE has not been sent/transmitted or has been sent/transmitted but has not been acknowledged.

The wireless device may determine a PUSCH resource is available for accommodating an SCell BFR MAC CE (e.g., such as described with respect to FIG. 51A and/or FIG. 51B). At step S940, the wireless device may send/transmit the SCell BFR MAC CE based on (e.g., after or in response to the PUSCH resource being available. The wireless device may receive a response for the transmission of the SCell BFR MAC CE. The response may be a PDCCH addressed to C-RNTI indicating that uplink grant for a new transmission is received for the HARQ process, which may be used for the transmission of the SCell BFR MAC CE. At step S980, the wireless device may cancel all triggered SCell BFR procedure(s), for example, based on (e.g., after or in response to) receiving the response for the SCell BFR MAC CE. The wireless device may keep pending the triggered panel power state report procedure(s), for example, based on (e.g., after or in response to) the receiving response for the SCell BFR MAC CE.

Figure 60:
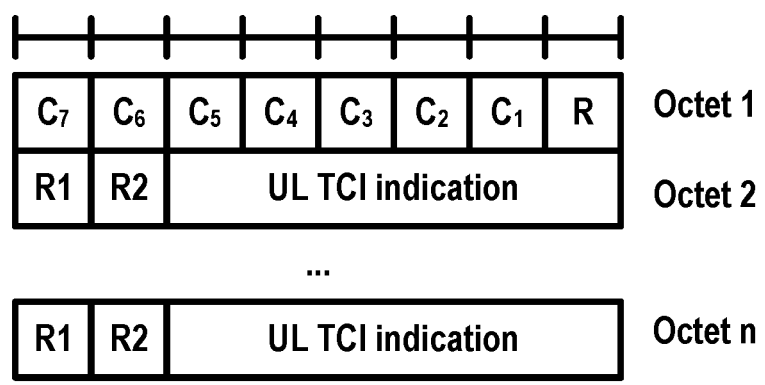
FIG. 60 shows an example of a panel power state report MAC CE format.

The wireless device may determine that a PUSCH resource is available for accommodating a panel power state report MAC CE (e.g., such as described with respect to FIG. 56A, FIG. 56B and/or FIG. 57 and/or FIG. 60). At step S980, the wireless device may send/transmit the panel power state report MAC CE, for example, based on (e.g., after or in response to) the PUSCH resource being available. The wireless device may receive a response for the transmission of the panel power state report MAC CE. The response may be a PDCCH addressed to C-RNTI indicating that uplink grant for a new transmission is received for the HARQ process, which may be used for the transmission of the panel power state report MAC CE. At step S990, the wireless device may cancel all triggered panel power state report procedure(s), for example, based on (e.g., after or in response to) receiving the response for the panel power state report MAC CE. The wireless device may keep pending the triggered SCell BFR procedure(s), for example, based on (e.g., after or in response to) receiving the response for the panel power state report MAC CE. A wireless device may perform panel power state report procedure and SCell BFR procedure separately and/or independently (e.g., such as described with respect to FIG. 59), which may improve uplink coverage and uplink throughput, and/or reduce transmission latency of a wireless device.

FIG. 60 shows an example of a panel power state report MAC CE format. The panel power state report MAC CE format may comprise a beam report MAC CE. A wireless device may send/transmit, to a base station, a panel power state report MAC CE by reusing an existing MAC CE format (e.g., an SCell BFR MAC CE such as shown in FIG. 51A and/or FIG. 51B). The wireless device may set one or more first reserved bits (e.g., R1 and/or R2 in $2^{nd}$ octet as shown in FIG. 60) of the SCell BFR MAC CE to a first value indicating a first panel for a first cell, for example, if the wireless device sends/transmits the SCell BFR MAC CE indicating a panel power state. The wireless device may indicate a first uplink TCI state (e.g., or uplink beam indication) for the first panel by using a first candidate RS field (in $2^{nd}$ octet) the SCell BFR MAC CE. The wireless device may set one or more second reserved bit (e.g., R1 and/or R2 in $n^{th}$ octet as shown in FIG. 60) of the SCell BFR MAC CE to a second value indicating a second panel for a second cell. The wireless device may indicate a second uplink TCI state (e.g., or uplink beam indication) for the second panel by using a second candidate RS field (in $n^{th}$ octet) the SCell BFR MAC CE. The wireless device may use other fields (e.g., such as shown in FIG. 60) indicating a third panel and uplink TC state for the third panel of a third cell. C1~C7 fields of the SCell BFR MAC CE may be implemented based on one or more examples described with respect to FIG. 51A and/or FIG. 51B.

FIG. 56A, FIG. 56B, FIG. 56C, FIG. 57 and/or FIG. 60 may be combined to indicate a panel power and beam state report for one or more panels of one or more cells. A panel power/beam state report MAC CE, based on combination of FIG. 56A, FIG. 56B, FIG. 56C, FIG. 57 and FIG. 60, may comprise, for each cell, at least one of: a panel indication of a panel, a P-MPR value for the panel, a $P_{CMAX}$ for the panel, a PHR for the panel, and/or an UL TCI or beam indication for the panel. Example MAC CE formats may improve uplink signaling overhead and power consumption of the wireless device.

At least some wireless devices may drop the panel power state report MAC CE without considering a suitable priority for the MAC CE, for example, if the wireless device has multiple MAC CEs comprising the panel power and/or beam state report MAC CE to be sent/transmitted. Dropping the panel power state report MAC CE (e.g., without considering a suitable priority) may result in loss of uplink coverage. Priority handling for multiple MAC CEs may be improved, for example, if the wireless device has a pending panel power state report MAC CE to send/transmit, as described herein.

A wireless device may determine/designate a panel power/beam report MAC CE with a same priority level as a MAC CE. The MAC CE may be one of a plurality of MAC CEs, such as described with respect to FIG. 52. The plurality of MAC CEs may comprise at least one of: a C-RNTI MAC CE and/or data from UL-CCCH, a CG confirmation MAC CE or BFR MAC CE and/or multiple entry CG confirmation MAC CE, a sidelink configured grant confirmation MAC CE, an LBT failure MAC CE, a MAC CE for prioritized SL-BSR, a MAC CE for BSR (e.g., with exception of BSR included for padding), a single entry PHR MAC CE and/or multiple entry PHR MAC CE, a MAC CE for the number of desired guard symbols, a MAC CE for pre-emptive BSR, a MAC CE for SL-BSR (e.g., with exception of the prioritized SL-BSR and SL-BSR included for padding), data from any logical channel (e.g., except data from UL-CCCH), a MAC CE for recommended bit rate query, a MAC CE for BSR included for padding, and/or a MAC CE for SL-BSR included for padding. The MAC CE, with the same priority level of the panel power/beam report MAC CE, may be defined/predefined (e.g., known to both the base station and the wireless device).

A wireless device may determine/designate the panel power and/or beam report MAC CE with a same priority level as a cell specific PHR MAC CE, for example, if the wireless device has multiple MAC CEs (e.g., such as shown in FIG. 52) to be sent/transmitted. The wireless device may prioritize the panel power and/or beam report MAC CE over a MAC CE for the number/quantity of desired guard symbols (e.g., such as shown in FIG. 52). The wireless device may prioritize a MAC CE for a BSR (e.g., a MAC CE for BSR with exception of BSR included for padding, such as shown in FIG. 52) over the panel power and/or beam report MAC CE.

A wireless device may prioritize a panel power and/or beam report MAC CE over a cell-specific PHR MAC CE. A wireless device may prioritize a panel power and/or beam report MAC CE over a cell-specific PHR MAC CE, for example, if the wireless device has both a panel power and/or beam report MAC CE, and a cell specific PHR MAC CE to be sent/transmitted. Prioritizing the panel power and/or beam report MAC CE over the cell specific PHR MAC CE may reduce uplink coverage loss (e.g., due to complying with RF requirements for proximity detection).

A wireless device may prioritize the cell specific PHR MAC CE over the panel power and/or beam report MAC CE. A wireless device may prioritize the cell specific PHR MAC CE over the panel power and/or beam report MAC CE, for example, if the wireless device has both a panel power and/or beam report MAC CE, and a cell specific PHR MAC CE to be sent/transmitted. Prioritizing the cell specific PHR MAC CE over the panel power and/or beam report MAC CE may improve uplink throughput.

A wireless device may determine/designate a panel power/beam report MAC CE with a same priority level as an SCell BFR MAC CE. A wireless device may determine/designate a panel power/beam report MAC CE with a same priority level as an SCell BFR MAC CE, for example, if the wireless device has multiple MAC CEs (e.g., such as shown in FIG. 52) to be sent/transmitted. The wireless device may prioritize the panel power and/or beam report MAC CE over a sidelink CG confirmation MAC CE (e.g., such as shown in FIG. 52). The wireless device may prioritize C-RNTI MAC CE or data from UL-CCCH (as shown in FIG. 52) over the panel power and/or beam report MAC CE.

The wireless device may prioritize the panel power and/or beam report MAC CE over the SCell BFR MAC CE. The wireless device may prioritize the panel power and/or beam report MAC CE over the SCell BFR MAC CE, for example, if the wireless device has both a panel power and/or beam report MAC CE, and an SCell BFR MAC CE to be sent/transmitted. Prioritizing the panel power and/or beam report MAC CE over the SCell BFR MAC CE may reduce uplink coverage loss (e.g., due to complying with RF requirements for proximity detection).

The wireless device may prioritize the SCell BFR MAC CE over the panel power and/or beam report MAC CE. The wireless device may prioritize the SCell BFR MAC CE over the panel power and/or beam report MAC CE, for example, if the wireless device has both a panel power and/or beam report MAC CE and an SCell BFR MAC CE to be sent/transmitted. Prioritizing the SCell BFR MAC CE over the panel power and/or beam report MAC CE may reduce downlink beam loss, for example, if a downlink beam is important for maintaining a connection with a base station.

A wireless device configured with one or more panels may receive one or more messages (e.g., RRC messages). The one or more messages may comprise configuration parameters of a panel power state reporting on a cell. The wireless device may trigger the panel power state reporting based on at least one of: a power backoff value for a panel of the panels and/or a power headroom value of the panel. The wireless device may send/transmit, based on the triggering, a MAC CE comprising an indication of the panel, the power backoff value and/or the power headroom value. The MAC CE may comprise a maximum output power associated with the panel. The wireless device may cancel the triggered panel power state reporting, for example, based on (e.g., after or in response to) sending/transmitting the MAC CE. The wireless device may determine the power backoff value for the panel based on at least one of: a RSRP, a transmission signal format for a transmission via the panel, and/or a proximity detection on the panel. The wireless device may determine the RSRP of a RS received on the panel. The wireless device may determine the power headroom value for the panel based on a maximum power reduction (MPR) associated with modulation orders, bandwidth, and waveform type of a transmission via the panel. The wireless device may determine the power headroom value for the panel based on an additional maximum power reduction (A-MPR) indicated by a base station. The wireless device may determine the power headroom value for the panel based on a power management MPR (P-MPR) value. The configuration parameters may comprise first parameters of a plurality of transmission configuration information (TCI) states, wherein the plurality of TCI states may be grouped in TCI groups and each TCI group may be associated with a corresponding one of the panels. The indication of the MAC CE may indicate a TCI group corresponding to the panel. The configuration parameters may comprise second parameters of a plurality of sounding reference signal resource information (SRI), wherein the plurality of SRI may be grouped in SRI groups and each SRI group may be associated with a corresponding one of the panels. The indication of the MAC CE may indicate an SRI group corresponding to the panel. The wireless device may receive a response for the sending/transmitting the medium access control control element. The wireless device may cancel the triggered panel power state reporting based on (e.g., after or in response to) receiving the response. The configuration parameters may comprise an initial timer value for a panel power state report timer. The wireless device may trigger the panel power state reporting based on the panel power state report timer expiring or having expired. The wireless device may start the panel power state report timer based on the initial timer value based on (e.g., after or in response to) sending/transmitting the medium access control element.

The wireless device may trigger a power headroom report procedure for a cell based on at least one of: a power headroom report prohibit timer expiring, a pathloss, for the cell, changing more than a threshold and/or a power backoff, for the cell, changing more than the threshold. The wireless device may send/transmit, based on the triggering the power headroom report procedure, a PHR MAC CE comprising: a power headroom value for the cell and/or a nominal transmit power for the cell. The wireless device may cancel the power headroom report procedure and keeping pending the panel power state reporting based on (e.g., after or in response to) sending/transmitting the PHR MAC CE.

A wireless device, configured with one or more panels, may trigger a PHR procedure for a cell based on a power headroom value of the cell. The wireless device may trigger a panel power state report procedure based on a power backoff value of a panel on the cell. The wireless device may send/transmit a PHR MAC CE based on the triggering the power headroom report procedure. The wireless device may cancel the power headroom report procedure and keep pending the trigged panel power state report procedure, for example, based on (e.g., after or in response to) the sending/ transmitting. The wireless device may send/transmit a panel power state report MAC CE, for example, based on (e.g., after or in response to) the keeping pending the triggered panel power state report procedure.

A wireless device, configured with one or more panels, may trigger a power headroom report procedure for a cell based on a power headroom value of the cell. The wireless device may trigger a panel power state report procedure based on a power backoff value of a panel on the cell. The wireless device may send/transmit a panel power state report MAC CE based on the triggering the panel power state report procedure. The wireless device may cancel the panel power state report procedure and/or keep pending the trigged power headroom report procedure, for example, based on (e.g., after or in response to) the sending/transmitting. The wireless device may send/transmit a PHR MAC CE, for example, based on (e.g., after or in response to) the keeping pending the trigged power headroom report procedure.

A wireless device may generate a PHR MAC CE. The PHR MAC CE may be based on triggering a power headroom reporting procedure. The wireless device may be configured with multiple transmission/reception capabilities, including, for example, one or more panels, antennas, and/or any other device(s) for transmission and/or reception. The wireless device may generate a panel power state report MAC CE based on triggering a panel power state report procedure. The wireless device may prioritize a transmission of the panel power state report MAC CE over the PHR MAC CE. The wireless device may send/transmit, based on the prioritizing, the panel power state report MAC CE. The wireless device may prioritize transmission of the PHR MAC CE over the panel power state report MAC CE. The wireless device may send/transmit, based on the prioritizing, the PHR MAC CE.

A wireless device may trigger an SCell BFR procedure for an SCell, for example, based on a beam failure detection. The wireless device may trigger a panel power state report procedure based on a power backoff value of a panel on the cell. The wireless device may send/transmit an SCell BFR MAC CE based on the triggering the SCell BFR procedure. The wireless device may receive from a base station a response for the SCell BFR MAC CE. The wireless device may cancel the SCell BFR procedure and keep pending the trigged panel power state report procedure, for example, based on (e.g., after or in response to) the receiving the response. The wireless device may send/transmit a panel power state report MAC CE, for example, based on (e.g., after or in response to) the keeping pending the triggered panel power state report procedure.

The wireless device may send/transmit a panel power state report MAC CE based on the triggering the panel power state report procedure. The wireless device may receive from a base station a response for the panel power state report MAC CE. The wireless device may cancel the panel power state report procedure and keep pending the trigged the SCell BFR procedure, for example, based on (e.g., after or in response to) the receiving the response. The wireless device may send/transmit an SCell BFR MAC CE, for example, based on (e.g., after or in response to) the keeping pending the triggered SCell BFR procedure.

The wireless device may prioritize a transmission of the panel power state report MAC CE over the SCell BFR MAC CE. The wireless device may send/transmit, based on the prioritizing, the panel power state report MAC CE. The wireless device may prioritize a transmission of the SCell BFR MAC CE over the panel power state report MAC CE. The wireless device may send/transmit, based on the prioritizing, the SCell BFR MAC CE.

A wireless device may perform a method comprising multiple operations. A wireless device may receive at least one configuration parameter indicating: a time window for exposure detection associated with at least one antenna panel of the wireless device, and/or a threshold associated with a quantity of exposure instances. The wireless device may determine, during the time window and based on a transmission power reduction value associated with a first antenna panel of the at least one antenna panel, a quantity of exposure instances associated with the first antenna panel. The wireless device may transmit, based on the quantity of exposure instances associated with the first antenna panel satisfying the threshold, an indication indicating that the first antenna panel is associated with impermissible exposure. The at least one configuration parameter may further indicate at least one of: a random access resource for exposure reporting associated with the at least one antenna panel of the wireless device, a scheduling request (SR) configuration for exposure reporting associated with the at least one antenna panel of the wireless device; and/or a sounding reference signal (SRS) resource for exposure reporting associated with the at least one antenna panel of the wireless device. Transmitting the indication may comprise at least one of: transmitting a preamble, associated with a random access resource, indicating that the first antenna panel is associated with impermissible exposure; transmitting a scheduling request (SR) indicating that the first antenna panel is associated with impermissible exposure; and/or transmitting a sounding reference signal (SRS) indicating that the first antenna panel is associated with impermissible exposure. Transmitting the indication may comprise transmitting a power headroom report (PHR) comprising the indication. The wireless device may delay transmission of the indication until transmitting the PHR. Transmitting the indication may be based on at least one of: a cell activation associated with the wireless device; a bandwidth part (BWP) switching associated with the wireless device; and/or a transition of the wireless device from a discontinuous reception (DRX) inactive time to a DRX active time. The indication may indicate an uplink coverage loss associated with the first antenna panel. The at least one configuration parameter may comprise at least one configuration parameter for the at least one antenna panel. Each antenna panel of the at least one antenna panel may be associated with a plurality of uplink transmission configuration indication (TCI) states. Determining the quantity of exposure instances associated with the first antenna panel may be based on an uplink duty cycle value associated with the first antenna panel. Determining the quantity of exposure instances associated with the first antenna panel may be based on at least one of: a power threshold; and/or a reference signal received power (RSRP) value associated with the first antenna panel. The wireless device may determine, based on measurement of a reference signal associated with the first antenna panel, a reference signal received power (RSRP) value associated with the first antenna panel. After transmitting the indication, the wireless device may receive downlink control information indicating switching from the first antenna panel to a second antenna panel for uplink transmission. The indication may indicate at least one of: the transmission power reduction value associated with the first antenna panel; and/or a second transmission power reduction value associated with a second antenna panel of the at least one antenna panel. The indication may comprise wireless device assistance information comprising a permissible exposure report. Determining the quantity of exposure instances may be based on an uplink duty cycle value being greater than a threshold duty cycle value. Receiving the at least one configuration parameter may comprise receiving one or more radio resource control (RRC) messages, wherein the one or more RRC messages comprise the at least one configuration parameter. The quantity of exposure instances associated with the first antenna panel may comprise at least one of: a permissible exposure; and/or an impermissible exposure. The quantity of exposure instances associated with the first antenna panel may comprise at least one of: a quantity of permissible exposure instances during the time window; and/or a quantity of permissible exposure instances occurring during contiguous detection intervals. Transmitting the indication may be via at least one of: a random access channel (RACH) resource indicated in the at least one configuration parameter, or a physical uplink control channel (PUCCH) resource of a scheduling request (SR) configuration indicated in the at least one configuration parameter. Transmitting the indication may comprise transmitting at least one of: transmitting an exposure report comprising the indication; and/or transmitting wireless device assistance information comprising the indication. Transmitting the indication may be based on an uplink duty cycle value being greater than a duty cycle threshold. The wireless device may determine a received signal received power (RSRP) value based on a measurement of a reference signal associated with the first antenna panel, wherein the transmitting the indication is further based on the RSRP value. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive at least one configuration parameter indicating a random access resource for exposure reporting associated with at least one antenna panel of the wireless device. The wireless device may determine that a plurality of exposure instances associated with a first antenna panel of the at least one antenna panel satisfies a threshold. The wireless device may transmit, based on the determining, a preamble associated with the random access resource and indicating that the first antenna panel is associated with impermissible exposure. The at least one configuration parameter may indicate: a time window for exposure detection associated with the at least one antenna panel of the wireless device; and/or the threshold, wherein the threshold is associated with a quantity of exposure instances. The at least one configuration parameter may comprise at least one configuration parameter for the at least one antenna panel, and wherein each antenna panel of the at least one antenna panel is associated with a plurality of uplink transmission configuration indication (TCI) states. The wireless device may determine, during a time window and based on a transmission power reduction value associated with the first antenna panel, a quantity of the plurality of exposure instances associated with the first antenna panel. The wireless device may, after transmitting the preamble, receive a response indicating switching from the first antenna panel to a second antenna panel for uplink transmission. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive at least one configuration parameter indicating a scheduling request (SR) configuration for exposure reporting associated with at least one antenna panel of the wireless device. The wireless device may determine that a plurality of exposure instances associated with a first antenna panel of the at least one antenna panel satisfies a threshold. The wireless device may transmit, based on the determining and based on the SR configuration, an SR indicating that the first antenna panel is associated with impermissible exposure. The at least one configuration parameter may indicate: a time window for exposure detection associated with the at least one antenna panel of the wireless device; and/or the threshold, wherein the threshold is associated with a quantity of exposure instances. The at least one configuration parameter may comprise at least one configuration parameter for the at least one antenna panel. Each antenna panel of the at least one antenna panel may be associated with a plurality of uplink transmission configuration indication (TCI) states. The wireless device may determine, during a time window and based on a transmission power reduction value associated with the first antenna panel, a quantity of the plurality of exposure instances associated with the first antenna panel. The SR configuration may comprise a physical uplink control channel (PUCCH) resource associated with the first antenna panel. The at least one configuration parameter may indicate a second SR configuration for exposure reporting associated with a second antenna panel of the at least one antenna panel. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive at least one message indicating a resource configuration for exposure reporting associated with at least one antenna panel of the wireless device. The wireless device may activate a cell associated with the at least one antenna panel. The wireless device may determine, based on the activating the cell, an uplink transmission power reduction value for a first panel of the at least one antenna panel. The wireless device may transmit, via an uplink channel associated with the resource configuration, a report indicating the uplink transmission power reduction value for the first panel. The wireless device may switch from a first uplink bandwidth part (BWP) of the cell to a second uplink BWP of the cell. The wireless device may determine, based on switching from the first uplink BWP of the cell to the second uplink BWP of the cell, a second uplink transmission power reduction value for the first panel. The wireless device may transmit, via a second uplink channel associated with the resource configuration, a report indicating the second uplink transmission power reduction value for the first panel. The first uplink BWP may be in a dormant state, and/or the second uplink BWP may be in a non-dormant state. The wireless device may transition from a discontinuous reception (DRX) inactive time to a DRX active time. The wireless device may determine, based on transitioning from the discontinuous reception (DRX) inactive time to the DRX active time, a second uplink transmission power reduction value for the first panel. The wireless device may transmit, via a second uplink channel associated with the resource configuration, a report indicating the second uplink transmission power reduction value for the first panel. Activating the cell may be based on receiving a medium access control (MAC) control element (CE) indicating an activation of the cell. The cell may be a secondary cell. The at least one message may indicate a plurality of transmission configuration information (TCI) states associated with the first panel. The at least one message may indicate a plurality of sounding reference signal resource indicators (SRIs) associated with the first panel. The resource configuration may indicate an uplink control resource comprising at least one of: an uplink control resource of a primary cell; and/or an uplink control resource of a physical uplink control channel (PUCCH) secondary cell (SCell). The uplink transmission power reduction value for the first panel may be determined based on at least one of: a reference signal received power associated with the first panel; a transmission signal format for transmission via the first panel; and/or a proximity detection associated with the first panel. The report may comprise at least one of: a power headroom report (PHR) associated with the first panel; an index of the first panel; a maximum power reduction associated with the first panel; a maximum output power associated with the first panel; and/or an uplink duty cycle value associated with the first panel. The wireless device may determine, based on a maximum power reduction (MPR), a power headroom report (PHR) associated with the first panel. The MPR may be associated with at least one of a modulation order or a bandwidth. The wireless device may determine a power headroom report (PHR), associated with the first panel, based on at least one of: an additional maximum power reduction (A-MPR) indicated by a base station; and/or a power management MPR (P-MPR) associated with a proximity detection for the first panel. The at least one message may comprise an index indicating at least one of: a transmission configuration information (TCI) state associated with the first panel; and/or a sounding reference signal resource information indicator (SRI) group associated with the first panel. Transmitting the report may comprise at least one of a periodic transmission of a plurality of reports associated with the first panel. The wireless device may determine a received signal received power (RSRP) value based on a measurement of a reference signal associated with the first panel, wherein the transmitting the report is based on the RSRP value. The report may comprise at least one of: a maximum output power associated with the first panel; and/or an uplink duty cycle value associated with the first panel. The at least one message may comprise an indication of the uplink channel resource associated with the resource configuration. The wireless device may, after the transmitting the report, receive a message indicating at least one of: deactivation of the cell associated with the at least one antenna panel; switching to another cell different from the cell associated with the at least one antenna panel; and/or stop transmission of additional reports associated with the first panel. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive at least one message indicating a resource configuration for exposure reporting associated with at least one antenna panel of the wireless device. The wireless device may switch from a first uplink bandwidth part (BWP) of a cell to a second uplink BWP of the cell, wherein the cell is associated with the at least one antenna panel. The wireless device may determine, based on switching from the first uplink bandwidth part (BWP) of the cell to the second uplink BWP of the cell, an uplink transmission power reduction value for a first panel of the at least one antenna panel. The wireless device may transmit, via an uplink channel associated with the resource configuration, a report indicating the uplink transmission power reduction value for the first panel. The wireless device may activate a second cell associated with the at least one antenna panel. The wireless device may determine, based on activating the second cell, a second uplink transmission power reduction value for the first panel. The wireless device may transmit, via a second uplink channel associated with the resource configuration, a report indicating the second uplink transmission power reduction value for the first panel. The wireless device may transition from a discontinuous reception (DRX) inactive time to a DRX active time. The wireless device may determine, based on transitioning from the discontinuous reception (DRX) inactive time to the DRX active time, a second uplink transmission power reduction value for the first panel. The wireless device may transmit, via a second uplink channel associated with the resource configuration, a report indicating the second uplink transmission power reduction value for the first panel. The report may comprise at least one of: an index of the first panel; a maximum power reduction associated with the first panel; a power headroom report (PHR) associated with the first panel; a maximum output power associated with the first panel; and/or an uplink duty cycle value associated with the first panel. The first uplink BWP may be in a dormant state, and/or the second uplink BWP may be in a non-dormant state. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive at least one message indicating a resource configuration for exposure reporting associated with at least one antenna panel of the wireless device. The wireless device may transition from a discontinuous reception (DRX) inactive time to a DRX active time. The wireless device may determine, based on transitioning from the discontinuous reception (DRX) inactive time to the DRX active time, an uplink transmission power reduction value for a first panel of the at least one antenna panel. The wireless device may transmit, via an uplink channel associated with the resource configuration, a report indicating the uplink transmission power reduction value for the first panel. The wireless device may activate a cell associated with the at least one antenna panel. The wireless device may determine, based on the activating the cell, a second uplink transmission power reduction value for the first panel. The wireless device may transmit, via a second uplink channel associated with the resource configuration, a report indicating the second uplink transmission power reduction value for the first panel. The wireless device may switch from a first uplink bandwidth part (BWP) of a cell to a second uplink BWP of the cell. The cell may be associated with the at least one antenna panel. The wireless device may determine, based on the switching, a second uplink transmission power reduction value for the first panel. The wireless device may transmit, via a second uplink channel associated with the resource configuration, a report indicating the second uplink transmission power reduction value for the first panel. The report may comprise at least one of: an index of the first panel; a maximum power reduction associated with the first panel; a power headroom report (PHR) associated with the first panel; a maximum output power associated with the first panel; and/or an uplink duty cycle value associated with the first panel. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may trigger, based on a power headroom value associated with at least one cell, a first power headroom report for the at least one cell. The wireless device may trigger, based on a power backoff value for an antenna panel of the wireless device, a second power headroom report for exposure reporting associated with a first cell of the at least one cell. The wireless device may transmit, based on triggering the first power headroom report, a power headroom report message. After transmitting the power headroom report message, the wireless device may cancel the triggered first power headroom report and/or keep the triggered second power headroom report pending. The wireless device may transmit, after cancelling the triggered first power headroom report, a second power headroom report message indicating at least one of: the antenna panel; a maximum output power associated with the antenna panel; and/or a reference signal received power (RSRP) of a reference signal received via the antenna panel. The wireless device may cancel, after the transmitting the second power headroom report message, the triggered second power headroom report. The wireless device may determine the power backoff value, for the antenna panel, based on at least one of: a reference signal received power associated with the antenna panel; a transmission signal format for a transmission via the antenna panel; a proximity detection associated with the antenna panel; an additional maximum power reduction (A-MPR) indicated by a base station; and/or a power management maximum power reduction (P-MPR) value associated with the proximity detection associated with the antenna panel. The wireless device may determine, based on a maximum power reduction (MPR), the power backoff value for the antenna panel. The MPR may be associated with at least one of a modulation order or a bandwidth. The wireless device may receive at least one configuration parameter of the first cell. The at least one configuration parameter may indicate a plurality of transmission configuration information (TCI) states associated with the antenna panel. The wireless device may receive at least one configuration parameter of the first cell. The at least one configuration parameter may indicate a plurality of sounding reference signal resource indicators (SRIs) associated with the antenna panel. The wireless device may receive a response to the power headroom report message. Cancelling the triggered first power headroom report may be based on receiving the response. The wireless device may receive at least one configuration parameter indicating a timer associated with exposure reporting. Triggering the second power headroom report may be based on an expiration of the timer associated with exposure reporting. The wireless device may transmit a second power headroom report message associated with the triggered second power headroom report. The wireless device may start, based on transmitting the second power headroom report message, the timer associated with exposure reporting. Triggering the first power headroom report may comprise determining a power headroom reporting event for the at least one cell based on at least one of: an expiration of a power headroom report prohibit timer; a change of a pathloss, for the at least one cell, satisfying a pathloss threshold; and/or a change of a power backoff, for the at least one cell, satisfying a power threshold. The power headroom report message may comprise: a power headroom value for the at least one cell; and/or a nominal transmit power for the at least one cell. The wireless device may determine that the first power headroom report is prioritized over the second power headroom report. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may trigger, based on a power headroom value associated with at least one cell, a first power headroom report for the at least one cell. The wireless device may trigger, based on a power backoff value for an antenna panel of the wireless device, a second power headroom report for exposure reporting associated with a first cell of the at least one cell. The wireless device may transmit, based on the triggering the second power headroom report, a power headroom report message. The wireless device may, after transmitting the power headroom report message, cancel the triggered second power headroom report and/or keep the triggered first power headroom report pending. The wireless device may transmit, after cancelling the triggered second power headroom report, a second power headroom report message indicating at least one of: a power headroom value for the at least one cell; and/or a nominal transmit power for the at least one cell. The power headroom report message may indicate at least one of: the antenna panel; a maximum output power associated with the antenna panel; and/or a reference signal received power of a reference signal received via the antenna panel. The wireless device may determine that the second power headroom report is prioritized over the first power headroom report. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may trigger, based on a power headroom value associated with at least one cell, a power headroom report for the at least one cell. The wireless device may trigger, based on a power backoff value for an antenna panel of the wireless device, an exposure report associated with a first cell of the at least one cell. The wireless device may receive an uplink grant indicating at least one uplink resource. The wireless device may transmit, based on the uplink grant and based on a prioritization of a first message for the power headroom report and a second message for the exposure report, at least one of the first message or the second message. After transmitting the first message, the wireless device may cancel the triggered power headroom report and/or keep the triggered exposure report pending. After transmitting the second message, the wireless device may cancel the triggered exposure report and/or keep the triggered power headroom report pending. The first message may comprise a first power headroom report medium access control (MAC) control element (CE), and wherein the second message comprises a second power headroom report MAC CE. Transmitting the at least one message or the second message may comprise multiplexing, based on the prioritization, at least one packet. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements A wireless device may perform a method comprising multiple operations. The wireless device may be configured with antenna panels. The wireless device may trigger a first beam failure recovery (BFR) procedure based on a beam failure detection on a cell. The wireless device may trigger a second BFR procedure a panel based on a power backoff value of an antenna panel of the panels on the cell. The wireless device may transmit a first BFR medium access control control element based on the triggering the first BFR procedure. The wireless device may receive a response corresponding to the first BFR medium access control control element. In response to the receiving the response, the wireless device may: cancel the first BFR procedure; and/or keep pending the second BFR procedure. The wireless device may transmit, in response to the keeping pending the second BFR procedure, a second BFR medium access control control element comprising the power backoff value associated with the antenna panel. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. A wireless device may be configured with panels. The wireless device may generate a secondary cell beam failure recovery (SCell BFR) medium access control control element (MAC CE). The wireless device may generate the SCell BFR MAC CE, for example, based on triggering an SCell BFR procedure. The wireless device may generate a panel maximum permissible exposure (MPE) report MAC CE, for example, based on triggering a panel MPE reporting procedure. The wireless device may prioritize a transmission of the panel MPE report MAC CE over the SCell BFR MAC CE. The wireless device may transmit, based on prioritizing transmission of the panel MPE report MAC CE over the SCell BFR MAC CE, the panel MPE report MAC CE. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   receiving, by a wireless device, at least one message indicating:
   a power reduction threshold for reporting maximum permissible exposure (MPE) power management maximum power reduction (P-MPR); and
   at least one secondary cell; and
   based on the power reduction threshold being satisfied by an MPE P-MPR value associated with a secondary cell of at least one secondary cell, transmitting a report comprising the MPE P-MPR value.

2. The method of claim 1, further comprising determining, based on an exposure requirement for the secondary cell, the MPE P-MPR value.

3. The method of claim 1, wherein the transmitting the report is further based on the secondary cell being activated.

4. The method of claim 1, wherein the power reduction threshold being satisfied by the MPE P-MPR value comprises the MPE P-MPR value being equal to or greater than the power reduction threshold.

5. The method of claim 1, wherein the report further comprises a power headroom report (PHR) value associated with the secondary cell.

6. The method of claim 1, further comprising:
   switching from a first uplink bandwidth part (BWP) of the secondary cell to a second uplink BWP of the secondary cell, wherein the secondary cell is associated with at least one antenna panel of the wireless device; and
   determining, based on the switching, the MPE P-MPR value, wherein the MPE P-MPR value satisfies an exposure requirement associated with the at least one antenna panel.

7. The method of claim 1, wherein the secondary cell is associated with at least one antenna panel of the wireless device, and wherein the method further comprises:
   transitioning from a discontinuous reception (DRX) inactive time to a DRX active time; and
   determining, based on the transitioning, the MPE P-MPR value, wherein the MPE P-MPR value satisfies an exposure requirement associated with the at least one antenna panel.

8. The method of claim 1, wherein the at least one message further indicates at least one of:
   a plurality of transmission configuration information (TCI) states associated with at least one antenna panel associated with the secondary cell;
   a plurality of sounding reference signal resource indicators (SRIs) associated with the at least one antenna panel;
   an uplink control resource of a primary cell; or
   an uplink control resource of a physical uplink control channel (PUCCH) secondary cell.

9. The method of claim 1, wherein the MPE P-MPR value is based on at least one of:
   a reference signal received power associated with at least one antenna panel associated with the secondary cell;
   a transmission signal format for transmission via the at least one antenna panel; or
   a proximity detection associated with the at least one antenna panel.

10. A method comprising:
    transmitting, by a base station, at least one message indicating:
    a power reduction threshold for reporting maximum permissible exposure (MPE) power management maximum power reduction (P-MPR); and
    at least one secondary cell; and
    receiving a report indicating:
    an MPE P-MPR value associated with a secondary cell of the at least one secondary cell; and
    that the power reduction threshold has been satisfied by the MPE P-MPR value.

11. The method of claim 10, wherein the MPE P-MPR value satisfies an exposure requirement for the secondary cell.

12. The method of claim 10, wherein the receiving the report is after the secondary cell being activated.

13. The method of claim 10, wherein the report indicating that the power reduction threshold has been satisfied by the MPE P-MPR value comprises the report indicating that the MPE P-MPR value is equal to or greater than the power reduction threshold.

14. The method of claim 10, wherein the report further comprises a power headroom report (PHR) value associated with the secondary cell.

15. The method of claim 10, further comprising:
    switching from a first uplink bandwidth part (BWP) of the secondary cell to a second uplink BWP of the secondary cell, wherein the secondary cell is associated with at least one antenna panel of a wireless device; and
    wherein the MPE P-MPR value is determined based on the switching and satisfies an exposure requirement associated with the at least one antenna panel.

16. The method of claim 10, wherein the secondary cell is associated with at least one antenna panel of a wireless device, and wherein the MPE P-MPR value is determined based on a transition from a discontinuous reception (DRX) inactive time to a DRX active time and satisfies an exposure requirement associated with the at least one antenna panel.

17. The method of claim 10, the at least one message further indicates at least one of:
    a plurality of transmission configuration information (TCI) states associated with at least one antenna panel associated with the secondary cell;

a plurality of sounding reference signal resource indicators (SRIs) associated with the at least one antenna panel;
an uplink control resource of a primary cell; or
an uplink control resource of a physical uplink control channel (PUCCH) secondary cell.

18. The method of claim 10, wherein the MPE P-MPR value is based on at least one of:
a reference signal received power associated with at least one antenna panel associated with the secondary cell;
a transmission signal format for transmission via the at least one antenna panel; or
a proximity detection associated with the at least one antenna panel.

19. A wireless device comprising:
one or more processors; and
memory storing instructions that, when executed by the one or more processors, configure the wireless device to:
receive at least one message indicating:
a power reduction threshold for reporting maximum permissible exposure (MPE) power management maximum power reduction (P-MPR); and
at least one secondary cell; and
based on the power reduction threshold being satisfied by an MPE P-MPR value associated with a secondary cell of the at least one secondary cell, transmit a report comprising the MPE P-MPR value.

20. The wireless device of claim 19, wherein the instructions, when executed by the one or more processors, further configure the wireless device to determine, based on an exposure requirement for the secondary cell, the MPE P-MPR value.

21. The wireless device of claim 19, wherein the instructions, when executed by the one or more processors, configure the wireless device to transmit the report based on the secondary cell being activated.

22. The wireless device of claim 19, wherein the power reduction threshold being satisfied by the MPE P-MPR value comprises the MPE P-MPR value being equal to or greater than the power reduction threshold.

23. The wireless device of claim 19, wherein the report further comprises a power headroom report (PHR) value associated with the secondary cell.

24. The wireless device of claim 19, wherein the instructions, when executed by the one or more processors, further configure the wireless device to:
switch from a first uplink bandwidth part (BWP) of the secondary cell to a second uplink BWP of the secondary cell, wherein the secondary cell is associated with at least one antenna panel of the wireless device; and
determine, based on the switching, the MPE P-MPR value, wherein the MPE P-MPR value satisfies an exposure requirement associated with the at least one antenna panel.

25. The wireless device of claim 19, wherein the secondary cell is associated with at least one antenna panel of the wireless device, and wherein the instructions, when executed by the one or more processors, further configure the wireless device to:
transition from a discontinuous reception (DRX) inactive time to a DRX active time; and
determine, based on the transitioning, the MPE P-MPR value, wherein the MPE P-MPR value satisfies an exposure requirement associated with the at least one antenna panel.

26. The wireless device of claim 19, the at least one message further indicates at least one of:
a plurality of transmission configuration information (TCI) states associated with at least one antenna panel associated with the secondary cell;
a plurality of sounding reference signal resource indicators (SRIs) associated with the at least one antenna panel;
an uplink control resource of a primary cell; or
an uplink control resource of a physical uplink control channel (PUCCH) secondary cell.

27. The wireless device of claim 19, wherein the MPE P-MPR value is based on at least one of:
a reference signal received power associated with at least one antenna panel associated with the secondary cell;
a transmission signal format for transmission via the at least one antenna panel; or
a proximity detection associated with the at least one antenna panel.

28. A base station comprising:
one or more processors; and
memory storing instructions that, when executed by the one or more processors, configure the base station to:
transmit at least one message indicating:
a power reduction threshold for reporting maximum permissible exposure (MPE) power management maximum power reduction (P-MPR); and
at least one secondary cell; and
receive a report indicating:
an MPE P-MPR value associated with a secondary cell of the at least one secondary cell; and
that the power reduction threshold has been satisfied by the MPE P-MPR value.

29. The base station of claim 28, wherein the MPE P-MPR value satisfies an exposure requirement for the secondary cell.

30. The base station of claim 28, wherein the instructions, when executed by the one or more processors, configure the base station to receive the report after the secondary cell is activated.

31. The base station of claim 28, wherein the report indicating that the power reduction threshold has been satisfied by the MPE P-MPR value comprises the report indicating the MPE P-MPR value is equal to or greater than the power reduction threshold.

32. The base station of claim 28, wherein the report further comprises a power headroom report (PHR) value associated with the secondary cell.

33. The base station of claim 28, wherein the instructions, when executed by the one or more processors, further configure the base station to:
switch from a first uplink bandwidth part (BWP) of the secondary cell to a second uplink BWP of the secondary cell, wherein the secondary cell is associated with at least one antenna panel of a wireless device; and
wherein the MPE P-MPR value is determined based on the switching and satisfies an exposure requirement associated with the at least one antenna panel.

34. The base station of claim 28, wherein the secondary cell is associated with at least one antenna panel of a wireless device, and wherein the MPE P-MPR value is determined based on a transition from a discontinuous reception (DRX) inactive time to a DRX active time and satisfies an exposure requirement associated with the at least one antenna panel.

35. The base station of claim 28, the at least one message further indicates at least one of:

a plurality of transmission configuration information (TCI) states associated with at least one antenna panel associated with the secondary cell;

a plurality of sounding reference signal resource indicators (SRIs) associated with the at least one antenna panel;

an uplink control resource of a primary cell; or an uplink control resource of a physical uplink control channel (PUCCH) secondary cell.

36. The base station of claim 28, wherein the MPE P-MPR value is based on at least one of:

a reference signal received power associated with at least one antenna panel associated with the secondary cell;

a transmission signal format for transmission via the at least one antenna panel; or a proximity detection associated with the at least one antenna panel.

37. A non-transitory computer-readable medium storing instructions that, when executed, configure a wireless device to:

receive at least one message indicating:
a power reduction threshold for reporting maximum permissible exposure (MPE) power management maximum power reduction (P-MPR); and
at least one secondary cell; and based on the power reduction threshold being satisfied by an MPE P-MPR value associated with a secondary cell of at least one secondary cell, transmit a report comprising the MPE P-MPR value.

38. The non-transitory computer-readable medium of claim 37, wherein the instructions, when executed, further configure the wireless device to determine, based on an exposure requirement for the secondary cell, the MPE P-MPR value.

39. The non-transitory computer-readable medium of claim 37, wherein the power reduction threshold being satisfied by the MPE P-MPR value comprises the MPE P-MPR value being equal to or greater than the power reduction threshold.

40. A non-transitory computer-readable medium storing instructions that, when executed, configure a base station to:

transmit at least one message indicating:
a power reduction threshold for reporting maximum permissible exposure (MPE) power management maximum power reduction (P-MPR); and
at least one secondary cell; and receive a report indicating:
an MPE P-MPR value associated with a secondary cell of the at least one secondary cell; and
that the power reduction threshold has been satisfied by the MPE P-MPR value.

41. The non-transitory computer-readable medium of claim 40, wherein the MPE P-MPR value satisfies an exposure requirement for the secondary cell.

42. The non-transitory computer-readable medium of claim 40, wherein the report indicating that the power reduction threshold has been satisfied by the MPE P-MPR value comprises the report indicating that the MPE P-MPR value is equal to or greater than the power reduction threshold.

43. A system comprising:

a wireless device; and
a base station;
wherein the base station is configured to:
transmit at least one message indicating:
a power reduction threshold for reporting maximum permissible exposure (MPE) power management maximum power reduction (P-MPR); and
at least one secondary cell; and
wherein the wireless device is configured to:
based on the power reduction threshold being satisfied by an MPE P-MPR value associated with a secondary cell of at least one secondary cell, transmit a report comprising the MPE P-MPR value.

44. The system of claim 43, wherein the wireless device is further configured to determine, based on an exposure requirement for the secondary cell, the MPE P-MPR value.

45. The system of claim 43, wherein the power reduction threshold being satisfied by the MPE P-MPR value comprises the MPE P-MPR value being equal to or greater than the power reduction threshold.

* * * * *